US012572867B2

(12) United States Patent
Rashkevitch et al.

(10) Patent No.: US 12,572,867 B2
(45) Date of Patent: Mar. 10, 2026

(54) DIGITAL PROCESSING SYSTEMS AND METHODS FOR MANAGING WORKFLOWS

(71) Applicant: Monday.com LTD., Tel Aviv (IL)

(72) Inventors: Greg Rashkevitch, Tel Aviv (IL); Moshik Eilon, Tel Aviv (IL); Nitzan Ezra, Ramat Gan (IL)

(73) Assignee: Monday.com LTD., Tel Aviv (IL)

( * ) Notice: Subject to any disclaimer, the term of this patent is extended or adjusted under 35 U.S.C. 154(b) by 0 days.

(21) Appl. No.: 18/401,357

(22) Filed: Dec. 30, 2023

(65) Prior Publication Data

US 2025/0173652 A1    May 29, 2025

Related U.S. Application Data

(63) Continuation of application No. PCT/IB2023/061994, filed on Nov. 28, 2023.

(51) Int. Cl.
    *G06Q 10/0631*    (2023.01)
    *G06F 3/0486*    (2013.01)
       (Continued)

(52) U.S. Cl.
    CPC ..... *G06Q 10/06316* (2013.01); *G06F 3/0486* (2013.01); *G06F 8/34* (2013.01);
       (Continued)

(58) Field of Classification Search
    CPC .............. G06Q 10/06316; H04L 67/10; G06F 21/6218; G06F 21/44; G06F 9/543;
       (Continued)

(56) References Cited

U.S. PATENT DOCUMENTS 4,972,314 A    11/1990    Getzinger et al.
5,220,657 A    6/1993    Bly et al.
       (Continued)

FOREIGN PATENT DOCUMENTS

CA    2828011 A1    9/2012
CN    103064833 A    4/2013
       (Continued)

OTHER PUBLICATIONS

Drag-and-Drop AI Enables Digital Workforce Deployment at Scale Share (as retrieved from https://www.blueprism.com/resources/blog/drag-and-drop-ai-enables-digital-workforce-deployment-at-scale/); Grant Aylward; Mar. 19 202 (Year: 2020).*
       (Continued)

*Primary Examiner* — Deirdre D Hatcher
(74) *Attorney, Agent, or Firm* — Finnegan, Henderson, Farabow, Garrett & Dunner LLP

(57) ABSTRACT

Systems, methods, and computer-readable media are disclosed for providing a canvas for constructing a workflow having at least one block with Artificial Intelligence (AI) functionality. Operations include displaying a canvas for containing and interconnecting workflow blocks, and enabling placement of workflow blocks on the canvas. The workflow blocks include trigger blocks and action blocks. At least one of the at least one trigger block or the at least one action block is configurable to gain permissions to access a source of dynamic data, enabling placement of an AI block at a downstream location from the plurality of workflow blocks on the canvas. The AI block is enabled to access the source of dynamic data by virtue of the downstream location, and providing an output from the AI block. A prompt of the AI block includes data from the source of dynamic data.

25 Claims, 27 Drawing Sheets

(51) Int. Cl.

| | |
|---|---|
| *G06F 8/34* | (2018.01) |
| *G06F 9/48* | (2006.01) |
| *G06F 9/54* | (2006.01) |
| *G06F 16/176* | (2019.01) |
| *G06F 21/44* | (2013.01) |
| *G06F 21/62* | (2013.01) |
| *G06F 40/186* | (2020.01) |
| *H04L 67/10* | (2022.01) |
| G06Q 10/0633 | (2023.01) |
| G06Q 10/10 | (2023.01) |
| H04L 41/084 | (2022.01) |

(52) U.S. Cl.
CPC ................ *G06F 9/48* (2013.01); *G06F 9/543* (2013.01); *G06F 16/176* (2019.01); *G06F 21/44* (2013.01); *G06F 21/6218* (2013.01); *G06F 40/186* (2020.01); *H04L 67/10* (2013.01); *G06Q 10/0633* (2013.01); *G06Q 10/10* (2013.01); *H04L 41/0843* (2013.01)

(58) Field of Classification Search
CPC . G06F 9/48; G06F 8/34; G06F 3/0486; G06F 16/176; G06F 40/186
See application file for complete search history.

(56) References Cited

U.S. PATENT DOCUMENTS

| | | | |
|---|---|---|---|
| 5,479,602 A | 12/1995 | Baecker et al. |
| 5,517,663 A | 5/1996 | Kahn |
| 5,632,009 A | 5/1997 | Rao et al. |
| 5,657,437 A | 8/1997 | Bishop et al. |
| 5,682,469 A | 10/1997 | Linnett et al. |
| 5,696,702 A | 12/1997 | Skinner et al. |
| 5,726,701 A | 3/1998 | Needham |
| 5,734,837 A | 3/1998 | Flores et al. |
| 5,787,411 A | 7/1998 | Groff et al. |
| 5,880,742 A | 3/1999 | Rao et al. |
| 5,933,145 A | 8/1999 | Meek |
| 5,999,911 A | 12/1999 | Berg et al. |
| 6,016,438 A | 1/2000 | Wakayama |
| 6,016,553 A | 1/2000 | Schneider et al. |
| 6,023,695 A | 2/2000 | Osborn et al. |
| 6,034,681 A | 3/2000 | Miller et al. |
| 6,049,622 A | 4/2000 | Robb et al. |
| 6,088,707 A | 7/2000 | Bates et al. |
| 6,108,573 A | 8/2000 | Debbins et al. |
| 6,111,573 A | 8/2000 | McComb et al. |
| 6,157,381 A | 12/2000 | Bates et al. |
| 6,167,405 A | 12/2000 | Rosensteel et al. |
| 6,169,534 B1 | 1/2001 | Raffel et al. |
| 6,182,127 B1 | 1/2001 | Cronin, III et al. |
| 6,185,582 B1 | 2/2001 | Zellweger et al. |
| 6,195,794 B1 | 2/2001 | Buxton |
| 6,252,594 B1 | 6/2001 | Xia et al. |
| 6,266,067 B1 | 7/2001 | Owen et al. |
| 6,275,809 B1 | 8/2001 | Tamaki et al. |
| 6,330,022 B1 | 12/2001 | Seligmann |
| 6,377,965 B1 | 4/2002 | Fries et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,510,459 B2 | 1/2003 | Cronin et al. |
| 6,522,347 B1 | 2/2003 | Tsuji et al. |
| 6,527,556 B1 | 3/2003 | Koskinen |
| 6,567,830 B1 | 5/2003 | Madduri |
| 6,606,740 B1 | 8/2003 | Lynn et al. |
| 6,626,959 B1 | 9/2003 | Moise et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 6,874,010 B1 | 3/2005 | Sargent |
| 6,988,248 B1 | 1/2006 | Tang et al. |

| | | | |
|---|---|---|---|
| 7,027,997 B1 | 4/2006 | Robinson et al. |
| 7,034,860 B2 | 4/2006 | Lia et al. |
| 7,043,529 B1 | 5/2006 | Simonoff |
| 7,054,891 B2 | 5/2006 | Cole |
| 7,228,492 B1 | 6/2007 | Graham |
| 7,237,188 B1 | 6/2007 | Leung |
| 7,249,042 B1 | 7/2007 | Doerr et al. |
| 7,272,637 B1 | 9/2007 | Himmelstein |
| 7,274,375 B1 | 9/2007 | David |
| 7,379,934 B1 | 5/2008 | Forman et al. |
| 7,380,202 B1 | 5/2008 | Lindhorst et al. |
| 7,383,320 B1 | 6/2008 | Silberstein et al. |
| 7,389,473 B1 | 6/2008 | Sawicki et al. |
| 7,415,664 B2 | 8/2008 | Aureglia et al. |
| 7,417,644 B2 | 8/2008 | Cooper et al. |
| 7,461,077 B1 | 12/2008 | Greenwood |
| 7,464,366 B2 | 12/2008 | Shukla et al. |
| 7,489,976 B2 | 2/2009 | Adra |
| 7,565,270 B2 | 7/2009 | Bramwell et al. |
| 7,617,443 B2 | 11/2009 | Mills et al. |
| 7,685,152 B2 | 3/2010 | Chivukula et al. |
| 7,707,514 B2 | 4/2010 | Forstall et al. |
| 7,710,290 B2 | 5/2010 | Johnson |
| 7,747,782 B2 | 6/2010 | Hunt et al. |
| 7,770,100 B2 | 8/2010 | Chamberlain et al. |
| 7,827,476 B1 | 11/2010 | Roberts et al. |
| 7,827,615 B1 | 11/2010 | Allababidi et al. |
| 7,836,408 B1 | 11/2010 | Ollmann et al. |
| 7,885,847 B2 | 2/2011 | Wodtke et al. |
| 7,916,157 B1 | 3/2011 | Kelley et al. |
| 7,921,360 B1 | 4/2011 | Sundermeyer et al. |
| 7,933,952 B2 | 4/2011 | Parker et al. |
| 7,945,622 B1 | 5/2011 | Pegg |
| 7,954,043 B2 | 5/2011 | Bera |
| 7,954,064 B2 | 5/2011 | Forstall et al. |
| 8,046,703 B2 | 10/2011 | Busch et al. |
| 8,060,518 B2 | 11/2011 | Timmons |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,407,217 B1 | 3/2013 | Zhang |
| 8,413,261 B2 | 4/2013 | Nemoy et al. |
| 8,423,909 B2 | 4/2013 | Zabielski |
| 8,543,566 B2 | 9/2013 | Weissman et al. |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,621,652 B2 | 12/2013 | Slater |
| 8,635,520 B2 | 1/2014 | Christiansen et al. |
| 8,660,881 B2 | 2/2014 | Wood et al. |
| 8,677,448 B2 | 3/2014 | Kauffman et al. |
| 8,689,131 B2 | 4/2014 | Ali et al. |
| 8,719,071 B2 | 5/2014 | MacIntyre et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,825,758 B2 | 9/2014 | Bailor et al. |
| 8,838,533 B2 | 9/2014 | Kwiatkowski et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,021,118 B2 | 4/2015 | John et al. |
| 9,026,897 B2 | 5/2015 | Zarras |

(56) References Cited

U.S. PATENT DOCUMENTS

| | | | |
|---|---|---|---|
| 9,043,362 B2 | 5/2015 | Weissman et al. |
| 9,063,958 B2 | 6/2015 | Müller et al. |
| 9,129,234 B2 | 9/2015 | Campbell et al. |
| 9,159,246 B2 | 10/2015 | Rodriguez et al. |
| 9,172,738 B1 | 10/2015 | daCosta |
| 9,177,238 B2 | 11/2015 | Windmueller et al. |
| 9,183,303 B1 | 11/2015 | Goel et al. |
| 9,223,770 B1 | 12/2015 | Ledet |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,286,475 B2 | 3/2016 | Li et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,395,959 B2 | 7/2016 | Hatfield et al. |
| 9,424,287 B2 | 8/2016 | Schroth |
| 9,424,333 B1 | 8/2016 | Bisignani et al. |
| 9,424,545 B1 | 8/2016 | Lee |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,519,699 B1 | 12/2016 | Kulkarni et al. |
| 9,558,172 B2 | 1/2017 | Rampson et al. |
| 9,569,511 B2 | 2/2017 | Morin |
| 9,613,086 B1 | 4/2017 | Sherman |
| 9,635,091 B1 | 4/2017 | Laukkanen et al. |
| 9,659,284 B1 | 5/2017 | Wilson et al. |
| 9,679,456 B2 | 6/2017 | East |
| 9,720,602 B1 | 8/2017 | Chen et al. |
| 9,727,376 B1 | 8/2017 | Bills et al. |
| 9,760,271 B2 | 9/2017 | Persaud |
| 9,794,256 B2 | 10/2017 | Kiang et al. |
| 9,798,829 B1 | 10/2017 | Baisley |
| 9,811,676 B1 | 11/2017 | Gauvin |
| 9,866,561 B2 | 1/2018 | Psenka et al. |
| 9,870,136 B2 | 1/2018 | Pourshahid |
| 9,911,092 B2 | 3/2018 | Goja |
| 10,001,908 B2 | 6/2018 | Grieve et al. |
| 10,043,296 B2 | 8/2018 | Li |
| 10,067,928 B1 | 9/2018 | Krappe |
| 10,078,668 B1 | 9/2018 | Woodrow et al. |
| 10,169,306 B2 | 1/2019 | O'Shaughnessy et al. |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,318,624 B1 | 6/2019 | Rosner et al. |
| 10,327,712 B2 | 6/2019 | Beymer et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,419,469 B1 | 9/2019 | Singh et al. |
| 10,423,758 B2 | 9/2019 | Kido et al. |
| 10,445,702 B1 | 10/2019 | Hunt |
| 10,452,360 B1 | 10/2019 | Burman et al. |
| 10,453,118 B2 | 10/2019 | Smith et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,505,825 B1 | 12/2019 | Bettaiah et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,546,001 B1 | 1/2020 | Nguyen et al. |
| 10,564,622 B1 | 2/2020 | Dean et al. |
| 10,573,407 B2 | 2/2020 | Ginsburg |
| 10,579,724 B2 | 3/2020 | Campbell et al. |
| 10,587,714 B1 | 3/2020 | Kulkarni et al. |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,733,256 B2 | 8/2020 | Fickenscher et al. |
| 10,740,117 B2 | 8/2020 | Ording et al. |
| 10,747,764 B1 | 8/2020 | Plenderleith |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,762,471 B1 | 9/2020 | Wang et al. |
| 10,795,555 B2 | 10/2020 | Burke et al. |
| 10,795,649 B1 | 10/2020 | Drake et al. |
| 10,809,696 B1 | 10/2020 | Principato |
| 10,817,660 B2 | 10/2020 | Rampson et al. |
| D910,077 S | 2/2021 | Naroshevitch et al. |
| 10,963,578 B2 | 3/2021 | More et al. |
| 10,997,531 B2 | 5/2021 | Leonelli et al. |
| 11,010,371 B1 | 5/2021 | Slomka et al. |
| 11,030,259 B2 | 6/2021 | Mullins et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 11,080,636 B1 | 8/2021 | Son |
| 11,086,894 B1 | 8/2021 | Srivastava et al. |
| 11,144,854 B1 | 10/2021 | Mouawad |
| 11,222,167 B2 | 1/2022 | Gehrmann et al. |
| 11,240,278 B1 | 2/2022 | Wang et al. |
| 11,243,688 B1 | 2/2022 | Remy et al. |
| 11,372,380 B2 | 6/2022 | Iyer et al. |
| 11,429,384 B1 | 8/2022 | Navert et al. |
| 11,443,390 B1 | 9/2022 | Caligaris et al. |
| 11,570,182 B1 | 1/2023 | Tran et al. |
| 11,593,096 B1 | 2/2023 | Chaptini et al. |
| 11,620,615 B2 | 4/2023 | Jiang et al. |
| 11,682,091 B2 | 6/2023 | Sukman et al. |
| 12,105,939 B1 | 10/2024 | Rank et al. |
| 2001/0008998 A1 | 7/2001 | Tamaki et al. |
| 2001/0032248 A1 | 10/2001 | Krafchin |
| 2001/0039551 A1 | 11/2001 | Saito et al. |
| 2002/0002459 A1 | 1/2002 | Lewis et al. |
| 2002/0065848 A1 | 5/2002 | Walker et al. |
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0099777 A1 | 7/2002 | Gupta et al. |
| 2002/0138528 A1 | 9/2002 | Gong et al. |
| 2003/0004771 A1 | 1/2003 | Yaung |
| 2003/0033196 A1 | 2/2003 | Tomlin |
| 2003/0041113 A1 | 2/2003 | Larsen |
| 2003/0051377 A1 | 3/2003 | Chirafesi |
| 2003/0052912 A1 | 3/2003 | Bowman et al. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | McInnes et al. |
| 2003/0135558 A1 | 7/2003 | Bellotti et al. |
| 2003/0137536 A1 | 7/2003 | Hugh |
| 2003/0187864 A1 | 10/2003 | McGoveran |
| 2003/0200215 A1 | 10/2003 | Chen et al. |
| 2003/0204490 A1 | 10/2003 | Kasriel |
| 2003/0233224 A1 | 12/2003 | Marchisio et al. |
| 2004/0010514 A1 | 1/2004 | Agarwal et al. |
| 2004/0032432 A1 | 2/2004 | Baynger |
| 2004/0078105 A1 | 4/2004 | Moon et al. |
| 2004/0078373 A1 | 4/2004 | Ghoneimy et al. |
| 2004/0098284 A1 | 5/2004 | Petito et al. |
| 2004/0119713 A1 | 6/2004 | Meyringer |
| 2004/0133441 A1 | 7/2004 | Brady et al. |
| 2004/0138939 A1 | 7/2004 | Theiler |
| 2004/0139400 A1 | 7/2004 | Allam et al. |
| 2004/0162833 A1 | 8/2004 | Jones et al. |
| 2004/0172592 A1 | 9/2004 | Collie et al. |
| 2004/0212615 A1 | 10/2004 | Uthe |
| 2004/0215443 A1 | 10/2004 | Hatton |

(56) References Cited

U.S. PATENT DOCUMENTS

| | | | |
|---|---|---|---|
| 2004/0230940 A1 | 11/2004 | Cooper et al. |
| 2004/0268227 A1 | 12/2004 | Brid |
| 2005/0010454 A1 | 1/2005 | Falk et al. |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0149908 A1 | 7/2005 | Klianev |
| 2005/0165600 A1 | 7/2005 | Kasravi et al. |
| 2005/0171881 A1 | 8/2005 | Ghassemieh et al. |
| 2005/0210371 A1 | 9/2005 | Pollock et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289170 A1 | 12/2005 | Brown et al. |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0031764 A1 | 2/2006 | Keyser et al. |
| 2006/0036568 A1 | 2/2006 | Moore et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0074735 A1 | 4/2006 | Shukla et al. |
| 2006/0074736 A1 | 4/2006 | Shukla et al. |
| 2006/0080594 A1 | 4/2006 | Chavoustie et al. |
| 2006/0085744 A1 | 4/2006 | Hays et al. |
| 2006/0090169 A1 | 4/2006 | Daniels et al. |
| 2006/0095276 A1 | 5/2006 | Axelrod et al. |
| 2006/0101324 A1 | 5/2006 | Goldberg et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0129913 A1 | 6/2006 | Vigesaa et al. |
| 2006/0136828 A1 | 6/2006 | Asano |
| 2006/0150090 A1 | 7/2006 | Swamidass |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0032993 A1 | 2/2007 | Yamaguchi et al. |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0067373 A1 | 3/2007 | Higgins et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0143736 A1 | 6/2007 | Moriarty et al. |
| 2007/0150389 A1 | 6/2007 | Aamodt et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0233647 A1 | 10/2007 | Rawat et al. |
| 2007/0239746 A1 | 10/2007 | Masselle et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0040181 A1 | 2/2008 | Freire et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0127205 A1 | 5/2008 | Barros |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons et al. |
| 2009/0006171 A1 | 1/2009 | Blatchley et al. |
| 2009/0006283 A1 | 1/2009 | Labrie et al. |
| 2009/0007157 A1* | 1/2009 | Ward ..................... G06F 8/24 |
| | | 719/328 |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0043814 A1 | 2/2009 | Faris et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0075694 A1 | 3/2009 | Kim et al. |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0088875 A1 | 4/2009 | Baier et al. |
| 2009/0094514 A1 | 4/2009 | Dargahi et al. |
| 2009/0113310 A1 | 4/2009 | Appleyard et al. |
| 2009/0129596 A1 | 5/2009 | Chavez et al. |
| 2009/0132331 A1 | 5/2009 | Cartledge et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0248710 A1 | 10/2009 | McCormack et al. |

(56) References Cited

U.S. PATENT DOCUMENTS

| | | |
|---|---|---|
| 2009/0256972 A1 | 10/2009 | Ramaswamy et al. |
| 2009/0262690 A1 | 10/2009 | Breuer et al. |
| 2009/0271696 A1 | 10/2009 | Bailor et al. |
| 2009/0276692 A1 | 11/2009 | Rosner |
| 2009/0292690 A1 | 11/2009 | Culbert |
| 2009/0313201 A1 | 12/2009 | Huelsman et al. |
| 2009/0313537 A1 | 12/2009 | Fu et al. |
| 2009/0313570 A1 | 12/2009 | Po |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327301 A1 | 12/2009 | Lees et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0077260 A1 | 3/2010 | Pillai et al. |
| 2010/0082705 A1 | 4/2010 | Ramesh et al. |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0205521 A1 | 8/2010 | Folting |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241968 A1 | 9/2010 | Tarara et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0251386 A1 | 9/2010 | Gilzean et al. |
| 2010/0257015 A1 | 10/2010 | Molander |
| 2010/0262625 A1 | 10/2010 | Pittenger |
| 2010/0268705 A1 | 10/2010 | Douglas et al. |
| 2010/0268773 A1 | 10/2010 | Hunt et al. |
| 2010/0281462 A1 | 11/2010 | Festa |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0154192 A1 | 6/2011 | Yang et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez Veron et al. |
| 2011/0225525 A1 | 9/2011 | Chasman et al. |
| 2011/0231273 A1 | 9/2011 | Buchheit |
| 2011/0238716 A1 | 9/2011 | Amir et al. |
| 2011/0258040 A1 | 10/2011 | Gnanasambandam |
| 2011/0288900 A1 | 11/2011 | McQueen et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036423 A1 | 2/2012 | Haynes et al. |
| 2012/0036462 A1 | 2/2012 | Schwartz et al. |
| 2012/0050802 A1 | 3/2012 | Masuda |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0130907 A1 | 5/2012 | Thompson et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz et al. |
| 2012/0229867 A1 | 9/2012 | Takagi |
| 2012/0233150 A1 | 9/2012 | Naim et al. |
| 2012/0233533 A1 | 9/2012 | Yücel et al. |
| 2012/0234907 A1 | 9/2012 | Clark et al. |
| 2012/0236368 A1 | 9/2012 | Uchida et al. |
| 2012/0239454 A1 | 9/2012 | Taix et al. |
| 2012/0244891 A1 | 9/2012 | Appleton |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Sitrick et al. |
| 2012/0297307 A1 | 11/2012 | Rider et al. |
| 2012/0300931 A1 | 11/2012 | Ollikainen et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2012/0324348 A1 | 12/2012 | Rounthwaite |
| 2013/0015954 A1 | 1/2013 | Thorne et al. |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024418 A1 | 1/2013 | Sitrick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0054514 A1 | 2/2013 | Barrett-Kahn et al. |
| 2013/0055113 A1 | 2/2013 | Chazin et al. |
| 2013/0059598 A1 | 3/2013 | Miyagi et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0158964 A1 | 6/2013 | Hall et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0215475 A1 | 8/2013 | Noguchi |
| 2013/0238363 A1 | 9/2013 | Ohta et al. |
| 2013/0238968 A1 | 9/2013 | Barrus |

(56)     References Cited

U.S. PATENT DOCUMENTS

| | | |
|---|---|---|
| 2013/0246384 A1 | 9/2013 | Victor |
| 2013/0262527 A1 | 10/2013 | Hunter et al. |
| 2013/0268331 A1 | 10/2013 | Bitz et al. |
| 2013/0297468 A1 | 11/2013 | Hirsch et al. |
| 2013/0307997 A1 | 11/2013 | O'Keefe et al. |
| 2013/0318424 A1 | 11/2013 | Boyd |
| 2013/0339051 A1 | 12/2013 | Dobrean |
| 2014/0002863 A1 | 1/2014 | Hasegawa et al. |
| 2014/0006326 A1 | 1/2014 | Bazanov |
| 2014/0012616 A1 | 1/2014 | Moshenek |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0058801 A1 | 2/2014 | Deodhar et al. |
| 2014/0059017 A1 | 2/2014 | Chaney et al. |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0078557 A1 | 3/2014 | Hasegawa et al. |
| 2014/0082525 A1 | 3/2014 | Kass et al. |
| 2014/0095237 A1 | 4/2014 | Ehrler et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Järvenpää et al. |
| 2014/0143252 A1 | 5/2014 | Silverstein et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188546 A1 | 7/2014 | Goja |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0215303 A1 | 7/2014 | Grigorovitch et al. |
| 2014/0229816 A1 | 8/2014 | Yakub |
| 2014/0240735 A1 | 8/2014 | Salgado |
| 2014/0249877 A1 | 9/2014 | Hull et al. |
| 2014/0257568 A1 | 9/2014 | Czaja et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck |
| 2014/0310345 A1 | 10/2014 | Megiddo et al. |
| 2014/0324497 A1 | 10/2014 | Verma et al. |
| 2014/0324501 A1 | 10/2014 | Davidow et al. |
| 2014/0325552 A1 | 10/2014 | Evans et al. |
| 2014/0337085 A1 | 11/2014 | Li et al. |
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0035918 A1 | 2/2015 | Matsumoto et al. |
| 2015/0039387 A1 | 2/2015 | Akahoshi et al. |
| 2015/0046209 A1 | 2/2015 | Choe |
| 2015/0046900 A1 | 2/2015 | Eldridge et al. |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0088822 A1 | 3/2015 | Raja et al. |
| 2015/0095752 A1 | 4/2015 | Studer et al. |
| 2015/0106736 A1 | 4/2015 | Torman et al. |
| 2015/0125834 A1 | 5/2015 | Mendoza Tascon |
| 2015/0142676 A1 | 5/2015 | McGinnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0178657 A1 | 6/2015 | Kleehammer et al. |
| 2015/0188964 A1 | 7/2015 | Sharma et al. |
| 2015/0205830 A1 | 7/2015 | Bastide et al. |
| 2015/0212717 A1 | 7/2015 | Nair et al. |
| 2015/0220491 A1 | 8/2015 | Cochrane et al. |
| 2015/0234887 A1 | 8/2015 | Greene et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Kim et al. |
| 2015/0295877 A1 | 10/2015 | Roman et al. |
| 2015/0310126 A1 | 10/2015 | Steiner et al. |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370776 A1 | 12/2015 | New |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2015/0379472 A1 | 12/2015 | Gilmour et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0035546 A1 | 2/2016 | Platt et al. |
| 2016/0055134 A1 | 2/2016 | Sathish et al. |
| 2016/0055374 A1 | 2/2016 | Zhang et al. |
| 2016/0057163 A1 | 2/2016 | Boffa et al. |
| 2016/0063435 A1 | 3/2016 | Shah et al. |
| 2016/0068960 A1 | 3/2016 | Jung et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0098574 A1 | 4/2016 | Bargagni |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0196310 A1 | 7/2016 | Dutta |
| 2016/0210572 A1 | 7/2016 | Shaaban et al. |
| 2016/0224532 A1 | 8/2016 | Miller et al. |
| 2016/0224676 A1 | 8/2016 | Miller et al. |
| 2016/0224939 A1 | 8/2016 | Chen et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur Bache et al. |
| 2016/0275150 A1 | 9/2016 | Bourbonnais et al. |
| 2016/0292206 A1 | 10/2016 | Ruiz Velazquez et al. |
| 2016/0299655 A1 | 10/2016 | Migos et al. |
| 2016/0308963 A1 | 10/2016 | Kung |
| 2016/0321235 A1 | 11/2016 | He et al. |
| 2016/0321604 A1 | 11/2016 | Imaeda et al. |
| 2016/0335302 A1 | 11/2016 | Wright et al. |
| 2016/0335303 A1 | 11/2016 | Madhalam et al. |
| 2016/0335604 A1 | 11/2016 | Reminick et al. |
| 2016/0335731 A1 | 11/2016 | Hall |
| 2016/0335903 A1 | 11/2016 | Mendoza Tascon |
| 2016/0344828 A1 | 11/2016 | Häusler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0038919 A1 | 2/2017 | Moss et al. |
| 2017/0041296 A1 | 2/2017 | Ford et al. |
| 2017/0052937 A1 | 2/2017 | Sirven et al. |

(56) References Cited

U.S. PATENT DOCUMENTS

| 2017/0061342 | A1 | 3/2017 | LoRe et al. |
| 2017/0061360 | A1 | 3/2017 | Rucker et al. |
| 2017/0061820 | A1 | 3/2017 | Firoozbakhsh |
| 2017/0063722 | A1 | 3/2017 | Cropper et al. |
| 2017/0075557 | A1 | 3/2017 | Noble et al. |
| 2017/0076101 | A1 | 3/2017 | Kochhar et al. |
| 2017/0090734 | A1 | 3/2017 | Fitzpatrick |
| 2017/0090736 | A1 | 3/2017 | King et al. |
| 2017/0091337 | A1 | 3/2017 | Patterson |
| 2017/0093876 | A1 | 3/2017 | Feng et al. |
| 2017/0109499 | A1 | 4/2017 | Doshi et al. |
| 2017/0111327 | A1 | 4/2017 | Wu |
| 2017/0116552 | A1 | 4/2017 | Deodhar et al. |
| 2017/0124042 | A1 | 5/2017 | Campbell et al. |
| 2017/0124048 | A1 | 5/2017 | Campbell et al. |
| 2017/0124055 | A1 | 5/2017 | Radakovitz et al. |
| 2017/0124740 | A1 | 5/2017 | Campbell et al. |
| 2017/0126772 | A1 | 5/2017 | Campbell et al. |
| 2017/0132296 | A1 | 5/2017 | Ding |
| 2017/0132652 | A1 | 5/2017 | Kedzlie et al. |
| 2017/0139874 | A1 | 5/2017 | Chin |
| 2017/0139884 | A1 | 5/2017 | Bendig et al. |
| 2017/0139891 | A1 | 5/2017 | Ah-Soon et al. |
| 2017/0139992 | A1 | 5/2017 | Morin |
| 2017/0140047 | A1 | 5/2017 | Bendig et al. |
| 2017/0140219 | A1 | 5/2017 | King et al. |
| 2017/0153771 | A1 | 6/2017 | Chu |
| 2017/0161246 | A1 | 6/2017 | Klima |
| 2017/0177556 | A1 | 6/2017 | Fay et al. |
| 2017/0177888 | A1 | 6/2017 | Arora et al. |
| 2017/0185575 | A1 | 6/2017 | Sood et al. |
| 2017/0185668 | A1 | 6/2017 | Convertino et al. |
| 2017/0200122 | A1 | 7/2017 | Edson et al. |
| 2017/0206366 | A1 | 7/2017 | Fay et al. |
| 2017/0212924 | A1 | 7/2017 | Semlani et al. |
| 2017/0220813 | A1 | 8/2017 | Mullins et al. |
| 2017/0221072 | A1 | 8/2017 | AthuluruTlrumala et al. |
| 2017/0228421 | A1 | 8/2017 | Sharma et al. |
| 2017/0228445 | A1 | 8/2017 | Chiu et al. |
| 2017/0228460 | A1 | 8/2017 | Amel et al. |
| 2017/0229152 | A1 | 8/2017 | Loganathan et al. |
| 2017/0236081 | A1 | 8/2017 | Grady Smith et al. |
| 2017/0242921 | A1 | 8/2017 | Rota |
| 2017/0257517 | A1 | 9/2017 | Panda |
| 2017/0262786 | A1 | 9/2017 | Khasis |
| 2017/0269805 | A1 | 9/2017 | Demaris et al. |
| 2017/0270970 | A1 | 9/2017 | Ho et al. |
| 2017/0272316 | A1 | 9/2017 | Johnson et al. |
| 2017/0272331 | A1 | 9/2017 | Lissack |
| 2017/0277620 | A1 | 9/2017 | Kadioglu |
| 2017/0277669 | A1 | 9/2017 | Sekharan |
| 2017/0285879 | A1 | 10/2017 | Pilkington et al. |
| 2017/0285890 | A1 | 10/2017 | Dolman |
| 2017/0289619 | A1 | 10/2017 | Xu et al. |
| 2017/0301039 | A1 | 10/2017 | Dyer et al. |
| 2017/0315683 | A1 | 11/2017 | Boucher et al. |
| 2017/0315714 | A1 | 11/2017 | Shyamsundar et al. |
| 2017/0315974 | A1 | 11/2017 | Kong et al. |
| 2017/0315979 | A1 | 11/2017 | Boucher et al. |
| 2017/0316355 | A1 | 11/2017 | Shrestha et al. |
| 2017/0322963 | A1 | 11/2017 | Ramamurthi et al. |
| 2017/0324692 | A1 | 11/2017 | Zhou |
| 2017/0329479 | A1 | 11/2017 | Rauschenbach et al. |
| 2017/0351252 | A1 | 12/2017 | Kleifges et al. |
| 2017/0372442 | A1 | 12/2017 | Mejias |
| 2017/0374205 | A1 | 12/2017 | Panda |
| 2018/0011827 | A1 | 1/2018 | Avery et al. |
| 2018/0025084 | A1 | 1/2018 | Conlan et al. |
| 2018/0026954 | A1 | 1/2018 | Toepke et al. |
| 2018/0032492 | A1 | 2/2018 | Altshuller et al. |
| 2018/0032570 | A1 | 2/2018 | Miller et al. |
| 2018/0039651 | A1 | 2/2018 | Tobin et al. |
| 2018/0055434 | A1 | 3/2018 | Cheung et al. |
| 2018/0075104 | A1 | 3/2018 | Oberbreckling et al. |
| 2018/0075115 | A1 | 3/2018 | Murray et al. |
| 2018/0075413 | A1 | 3/2018 | Culver et al. |
| 2018/0075560 | A1 | 3/2018 | Thukral et al. |
| 2018/0081505 | A1* | 3/2018 | Ron ............................ G06F 9/54 |
| 2018/0081863 | A1 | 3/2018 | Bathla |
| 2018/0081868 | A1 | 3/2018 | Willcock et al. |
| 2018/0088753 | A1 | 3/2018 | Viégas et al. |
| 2018/0088989 | A1 | 3/2018 | Nield et al. |
| 2018/0089299 | A1 | 3/2018 | Collins et al. |
| 2018/0095938 | A1 | 4/2018 | Monte |
| 2018/0096417 | A1 | 4/2018 | Cook et al. |
| 2018/0109760 | A1 | 4/2018 | Metter et al. |
| 2018/0121028 | A1 | 5/2018 | Kuscher et al. |
| 2018/0121994 | A1 | 5/2018 | Matsunaga et al. |
| 2018/0128636 | A1 | 5/2018 | Zhou |
| 2018/0129651 | A1 | 5/2018 | Latvala et al. |
| 2018/0157455 | A1 | 6/2018 | Troy et al. |
| 2018/0157467 | A1 | 6/2018 | Stachura |
| 2018/0157468 | A1 | 6/2018 | Stachura |
| 2018/0157633 | A1 | 6/2018 | He et al. |
| 2018/0173715 | A1 | 6/2018 | Dunne |
| 2018/0174104 | A1 | 6/2018 | Schikora et al. |
| 2018/0181650 | A1 | 6/2018 | Komatsuda et al. |
| 2018/0181716 | A1 | 6/2018 | Mander et al. |
| 2018/0189734 | A1 | 7/2018 | Newhouse et al. |
| 2018/0210936 | A1 | 7/2018 | Reynolds et al. |
| 2018/0225270 | A1 | 8/2018 | Bhide et al. |
| 2018/0232422 | A1 | 8/2018 | Park et al. |
| 2018/0260371 | A1 | 9/2018 | Theodore et al. |
| 2018/0260435 | A1 | 9/2018 | Xu |
| 2018/0262705 | A1 | 9/2018 | Park et al. |
| 2018/0276417 | A1 | 9/2018 | Cerezo Sanchez |
| 2018/0285918 | A1 | 10/2018 | Staggs |
| 2018/0293217 | A1 | 10/2018 | Callaghan |
| 2018/0293587 | A1 | 10/2018 | Oda |
| 2018/0293669 | A1 | 10/2018 | Jackson et al. |
| 2018/0329930 | A1 | 11/2018 | Eberlein et al. |
| 2018/0330320 | A1 | 11/2018 | Kohli |
| 2018/0357047 | A1 | 12/2018 | Brown et al. |
| 2018/0357305 | A1 | 12/2018 | Kinast et al. |
| 2018/0365429 | A1 | 12/2018 | Segal |
| 2018/0367484 | A1 | 12/2018 | Rodriguez et al. |
| 2018/0373434 | A1 | 12/2018 | Switzer et al. |
| 2018/0373757 | A1 | 12/2018 | Schukovets et al. |
| 2019/0004773 | A1 | 1/2019 | Hoberman |
| 2019/0005094 | A1 | 1/2019 | Yi et al. |
| 2019/0011310 | A1 | 1/2019 | Turnbull et al. |
| 2019/0012342 | A1 | 1/2019 | Cohn |
| 2019/0034395 | A1 | 1/2019 | Curry et al. |
| 2019/0036989 | A1 | 1/2019 | Eirinberg et al. |
| 2019/0042628 | A1 | 2/2019 | Rajpara |
| 2019/0050445 | A1 | 2/2019 | Griffith et al. |
| 2019/0050466 | A1 | 2/2019 | Kim et al. |
| 2019/0050812 | A1 | 2/2019 | Boileau |
| 2019/0056856 | A1 | 2/2019 | Simmons et al. |
| 2019/0065545 | A1 | 2/2019 | Hazel et al. |
| 2019/0068703 | A1 | 2/2019 | Vora et al. |
| 2019/0073350 | A1 | 3/2019 | Shiotani |
| 2019/0095413 | A1 | 3/2019 | Davis et al. |
| 2019/0097909 | A1 | 3/2019 | Puri et al. |
| 2019/0108046 | A1 | 4/2019 | Spencer-Harper et al. |
| 2019/0113935 | A1 | 4/2019 | Kuo et al. |
| 2019/0114308 | A1 | 4/2019 | Hancock |
| 2019/0114589 | A1 | 4/2019 | Voss et al. |
| 2019/0123924 | A1 | 4/2019 | Embiricos et al. |
| 2019/0130611 | A1 | 5/2019 | Black et al. |
| 2019/0138583 | A1 | 5/2019 | Silk et al. |
| 2019/0138588 | A1 | 5/2019 | Silk et al. |
| 2019/0138653 | A1 | 5/2019 | Roller et al. |
| 2019/0147030 | A1 | 5/2019 | Stein et al. |
| 2019/0155821 | A1 | 5/2019 | Dirisala |
| 2019/0166110 | A1 | 5/2019 | Miu |
| 2019/0179501 | A1 | 6/2019 | Seeley et al. |
| 2019/0199823 | A1 | 6/2019 | Underwood et al. |
| 2019/0208058 | A1 | 7/2019 | Dvorkin et al. |
| 2019/0213557 | A1 | 7/2019 | Dotan-Cohen et al. |
| 2019/0220161 | A1 | 7/2019 | Loftus et al. |
| 2019/0236188 | A1 | 8/2019 | McKenna |
| 2019/0243879 | A1 | 8/2019 | Harley et al. |
| 2019/0251884 | A1 | 8/2019 | Burns et al. |

(56) References Cited

U.S. PATENT DOCUMENTS

| | | |
|---|---|---|
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0327294 A1 | 10/2019 | Subramani Nadar et al. |
| 2019/0340550 A1 | 11/2019 | Denger et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0377791 A1 | 12/2019 | Abou Mahmoud et al. |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua Garcia |
| 2020/0026352 A1 | 1/2020 | Wang et al. |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez Salgado et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0176089 A1* | 6/2020 | Jones .................... G16H 10/20 |
| 2020/0192785 A1 | 6/2020 | Chen |
| 2020/0193388 A1 | 6/2020 | Tran-Kiem et al. |
| 2020/0247661 A1 | 8/2020 | Rao et al. |
| 2020/0265112 A1 | 8/2020 | Fox et al. |
| 2020/0279315 A1 | 9/2020 | Manggala |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0310835 A1 | 10/2020 | Momchilov |
| 2020/0326824 A1 | 10/2020 | Magahern et al. |
| 2020/0327244 A1 | 10/2020 | Blass et al. |
| 2020/0334019 A1 | 10/2020 | Bosworth et al. |
| 2020/0341947 A1 | 10/2020 | Aziz et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0374146 A1 | 11/2020 | Chhabra et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2020/0409949 A1 | 12/2020 | Saxena et al. |
| 2020/0410395 A1 | 12/2020 | Ray et al. |
| 2021/0014136 A1 | 1/2021 | Rath |
| 2021/0019287 A1 | 1/2021 | Prasad et al. |
| 2021/0021603 A1 | 1/2021 | Gibbons |
| 2021/0034058 A1 | 2/2021 | Subramanian et al. |
| 2021/0034443 A1 | 2/2021 | Lowin et al. |
| 2021/0035069 A1 | 2/2021 | Parikh |
| 2021/0042796 A1 | 2/2021 | Khoury et al. |
| 2021/0049524 A1 | 2/2021 | Nachum et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0065203 A1 | 3/2021 | Billigmeier et al. |
| 2021/0072883 A1 | 3/2021 | Migunova et al. |
| 2021/0073526 A1 | 3/2021 | Zeng et al. |
| 2021/0084120 A1 | 3/2021 | Fisher et al. |
| 2021/0096852 A1 | 4/2021 | Stump et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0149553 A1 | 5/2021 | Lereya et al. |
| 2021/0149688 A1 | 5/2021 | Newell et al. |
| 2021/0149925 A1 | 5/2021 | Mann et al. |
| 2021/0150489 A1 | 5/2021 | Haramati et al. |
| 2021/0158214 A1* | 5/2021 | Witt ...................... G06N 20/00 |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0248311 A1 | 8/2021 | Helft et al. |
| 2021/0257065 A1* | 8/2021 | Mander ................. G16H 10/60 |
| 2021/0264220 A1 | 8/2021 | Wei et al. |
| 2021/0273957 A1 | 9/2021 | Boyer et al. |
| 2021/0326519 A1 | 10/2021 | Lin et al. |
| 2021/0328888 A1 | 10/2021 | Rath |
| 2021/0342785 A1 | 11/2021 | Mann et al. |
| 2021/0365446 A1 | 11/2021 | Srivastava et al. |
| 2021/0374197 A1 | 12/2021 | Chauhan |
| 2021/0382611 A1 | 12/2021 | Gan |
| 2021/0397585 A1 | 12/2021 | Seward |
| 2022/0011732 A1* | 1/2022 | Hall .................... G06F 21/6218 |
| 2022/0099454 A1 | 3/2022 | Decrop et al. |
| 2022/0121325 A1 | 4/2022 | Roberts et al. |
| 2022/0121478 A1 | 4/2022 | Chivukula et al. |
| 2022/0129283 A1 | 4/2022 | Sharma et al. |
| 2022/0138004 A1 | 5/2022 | Nandakumar et al. |
| 2022/0147934 A1 | 5/2022 | Chandrashekar et al. |
| 2022/0191251 A1 | 6/2022 | Gavish et al. |
| 2022/0221591 A1 | 7/2022 | Smith et al. |
| 2022/0245328 A1 | 8/2022 | Tsabba |
| 2022/0261288 A1 | 8/2022 | Viswanathan et al. |
| 2022/0291666 A1* | 9/2022 | Cella ........................ B25J 13/00 |
| 2022/0292180 A1 | 9/2022 | Chauhan |
| 2022/0300850 A1 | 9/2022 | Mendez et al. |
| 2022/0308918 A1 | 9/2022 | Pandey et al. |
| 2022/0335362 A1 | 10/2022 | Nikain et al. |
| 2022/0358190 A1 | 11/2022 | Baghani et al. |
| 2022/0382522 A1 | 12/2022 | Heynemann Nascentes da Silva et al. |
| 2023/0004832 A1 | 1/2023 | Sahasi et al. |
| 2023/0004900 A1 | 1/2023 | Gleave |
| 2023/0016946 A1 | 1/2023 | Wouhaybi et al. |
| 2023/0081880 A1 | 3/2023 | Mathur et al. |
| 2023/0083891 A1 | 3/2023 | Achin et al. |
| 2023/0107316 A1* | 4/2023 | Ripa ......................... G06F 8/34 |
| | | 700/29 |
| 2023/0108808 A1 | 4/2023 | Lerman |
| 2023/0113369 A1 | 4/2023 | Wang et al. |
| 2023/0142774 A1 | 5/2023 | Hashemi et al. |
| 2023/0153651 A1* | 5/2023 | Bi .......................... G06N 20/00 |
| | | 706/45 |
| 2023/0153724 A1* | 5/2023 | Thampy ............. G06Q 10/0633 |
| | | 705/7.27 |
| 2023/0188516 A1 | 6/2023 | Danilov et al. |
| 2023/0230006 A1 | 7/2023 | Bosch et al. |
| 2023/0259839 A1 | 8/2023 | Manalo et al. |
| 2023/0316382 A1* | 10/2023 | Faricy ............... G06Q 30/0631 |
| | | 705/26.7 |
| 2023/0385085 A1* | 11/2023 | Singh ...................... G06N 7/01 |
| 2023/0396641 A1 | 12/2023 | Hebbagodi et al. |
| 2024/0046142 A1* | 2/2024 | Marks ................... G06N 20/00 |
| 2024/0053727 A1* | 2/2024 | Timisescu .......... G06F 12/0802 |

FOREIGN PATENT DOCUMENTS

| | | |
|---|---|---|
| CN | 107123424 A | 9/2017 |
| CN | 107422666 A | 12/2017 |
| CN | 107623596 A | 1/2018 |
| CN | 107885656 A | 4/2018 |
| CN | 108717428 A | 10/2018 |
| CN | 112929172 A | 6/2021 |
| EP | 3443466 B1 | 12/2021 |
| KR | 20150100760 A | 9/2015 |
| KR | 20220016276 A | 2/2022 |
| WO | 2004100015 A2 | 11/2004 |
| WO | 2006116580 A2 | 11/2006 |

(56) References Cited

FOREIGN PATENT DOCUMENTS

| WO | 2008109541 A1 | 9/2008 |
|---|---|---|
| WO | 2014088393 A1 | 6/2014 |
| WO | 2017202159 A1 | 11/2017 |
| WO | 2018023798 A1 | 2/2018 |
| WO | 2018042424 A1 | 3/2018 |
| WO | 2020139865 A1 | 7/2020 |
| WO | 2020187408 A1 | 9/2020 |
| WO | 2021096944 A1 | 5/2021 |
| WO | 2021144656 A1 | 7/2021 |
| WO | 2021161104 A1 | 8/2021 |
| WO | 2021220058 A1 | 11/2021 |
| WO | 2022153122 A1 | 7/2022 |

OTHER PUBLICATIONS

SiMa.ai Creates Drag-And-Drop Platform for Building AI Workflows (as retrieved from https://www.forbes.com/sites/karlfreund/2023/09/12/simaai-creates-drag-and-drop-platform-for-building-ai-workflows/?sh=789de8466046); Karl Freund; Sep. 12, 2023 (Year: 2023).*

Low-Code and No-Code AI: New AI Development—What is code anymore?!?! (as retrieved from https://www.linkedin.com/pulse/low-code-no-code-ai-new-development-what-code-anymore-c-l-abor-jr); C Arbor Jr; Jul. 15, 2023 (Year: 2023).*

How to Use Generative AI for Document Extraction & Processing, Nov. 27, 2023 (Year: 2023).*

International Search Report and Written Opinion for International Application No. PCT/IB2023/061994, dated Apr. 25, 2024, 11 pages.

Anupam et al., "Personalizing the Web Using Site Descriptions", Proceedings of the Tenth International Workshop on Database and Expert Systems Applications, ISBN: 0-7695-0281-4, DOI:10.1109/DEXA.1999.795275, Jan. 1, 1999, pp. 732-738. (Year: 1999).

Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).

Bahrebar et al., "A Novel Type-2 Fuzzy Logic for Improved Risk Analysis of Proton Exchange Membrane Fuel Cells in Marine Power Systems Application", Energies, 11, 721, pp. 1-16, Mar. 22, 2018 (Year: 2018).

Barai et al., "Image Annotation System Using Visual and Textual Features," In: Proceedings of the 16th International Conference on Distributed Multi-media Systems, pp. 289-296 (2010).

Breitgand et al., "Serverless Data Analytics Platform," CloudButton, Feb. 13, 2022, retrieved on [Jan. 14, 2024]. Retrieved from the internet <URL: https://cloudbutton.eu/docs/deliverables/CloudButton_D3.1_Public.pdf> (Year: 2022).

Chen et al., "Artificial Intelligence in Education: A Review," IEEEAccess vol. 8, pp. 75264-75278 (Year: 2020).

D'Alessio et al., Monday.com Walkthrough 2018\All Features, Platforms & Thoughts, Mar. 1, 2018, pp. 1-55 (Year: 2018).

Dapulse.com "features," extracted from web.archive.org/web/2014091818421/https://dapulse.com/features; Sep. 2014 (Year: 2014).

Dapulse.com, "High Level Overview", Extracted from https://web.archive.org/web/20161104170936/https://dapulse.com (Year: 2016).

"Demonstracion en espanol de Monday.com," published Feb. 20, 2019. https://www.youtube.com/watch?v=zOgydTgof1A (Year: 2019).

Desmedt et al., "Function-Based Access Control (FBAC) From Access Control Matrix to Access Control Tensor." In Proceedings of the 8th ACM CCS International Workshop on Managing Insider Security Threats, pp. 89-92 (2016).

Donath, "Interfaces Make Meaning" chapter from the Social Machine: Designs for Living Online, pp. 41-76, copyright 2014. (Year: 2014).

Dorn et al., "Efficient Full-Field Vibration Measurements and Operational Modal Analysis Using Neuromorphic Event-Based Imaging." Journal of Engineering Mechanics, vol. 144, No. 7, Jul. 1, 2018 (Year: 2018).

Gutwin et al., "Supporting Informal Collaboration in Shared-Workspace Groupware", J. Univers. Comput. Sci., 14(9), 1411-1434 (2008).

Hupfer et al., "Introducing collaboration into an application development environment." In Proceedings of the 2004 ACM conference on Computer supported cooperative work (CSCW '04). Association for Computing Machinery, New York, NY, USA, pp. 21-24 (Year: 2004).

International Search Report and Written Opinion of the International Search Authority in PCT/IB2020/000024, mailed May 3, 2021 (13 pages).

International Search Report and Written Opinion of the International Search Authority in PCT/IB2020/000658, mailed Nov. 11, 2020 (12 pages).

International Search Report and Written Opinion of the International Search Authority in PCT/IB2020/000974, mailed May 3, 2021 (19 pages).

International Search Report and Written Opinion of the International Search Authority in PCT/IB2021/000090 dated Jul. 27, 2021.

International Search Report and Written Opinion of the International Search Authority in PCT/IB2021/000297, mailed Oct. 12, 2021 (20 pages).

International Search Report and Written Opinion of the International Search Authority in PCT/IB2023/061991, mailed Feb. 26, 2024 (6 pages).

Ionescu et al., "A chat-centric collaborative environment for web-based real-time collaboration," 2015 IEEE 10th Jubilee International Symposium on Applied Computational Intelligence and Informatics, Timisoara, Romania, 2015, pp. 105-110 (Year: 2015).

Kantorovitz, I., "Lexical Analysis Tool," May 2004, [Retrieved on Nov. 19, 2021], Retrieved from the internet: <URL: https://dl.acm.org/doi/pdf/10.1145/997140.997147> pp. 66-74 (Year: 2004).

Kollmann, F., "Realizing Fine-Granular Read and Write Rights on Tree Structured Documents." in the Second International Conference on Availability, Reliability and Security (ARES'07), pp. 517-523. IEEE, 2007. (Year: 2007).

Larson et al., "Introducing Data Mining Concepts Using Microsoft Excel's Table Analysis Tools," Oct. 2015, [Retrieved on Nov. 19, 2021], Retrieved from the internet: <URL: https://dl.acm.org/doi/pdf/10.5555/2831373.2831394> 3 Pages (127-129) (Year: 2015).

List, B., "An Evaluation of Conceptual Business Process Modelling Languages", SAC'06, Apr. 23-27, 2006, pp. 1532-1539 (Year: 2006).

Monday.com et al., "Basic Walkthrough", https://www.youtube.com/watch?v=VpbgWyPf74g; Aug. 9, 2019. (Year: 2019).

Pedersen et al., "Tivoli: an electronic whiteboard for informal workgroup meetings," Conference on Human Factors in Computing Systems: Proceedings of the INTERACT '93 and CHI '93 conference on Human factors in computing systems; Apr. 24-29, 1993, pp. 391-398 (Year 1993).

Peltier, J., "Clustered and Stacked col. and Bar Charts", Aug. 2011, Peltier Technical Services, Inc., pp. 1-128; (Year: 2011).

"Pivot table"—Wikipedia; URL: https://en.wikepedia .org/w/index.php?title=Pivottable&oldid=857163289, originally retrieve on Oct. 23, 2019; retrieved on Jul. 16, 2021.

Rodrigo, A., Project Management with Monday.com: a 101 Introduction; Jul. 22, 2019, pp. 1-21, 2019.

ShowMyPC, "Switch Presenter While Using ShowMyPC"; web archive.org; Aug. 20, 2016.

Singh, V., "A Theoretical Framework of a BIM-based Multi-Disciplinary Collaboration Platform", Nov. 5, 2020, Automation in Construction, 20 (2011), pp. 134-144 (Year: 2011).

Sreenath et al., "Agent-based service selection," Journal of Web Semantics 1.3, pp. 261-279 (Year: 2004).

Stancu et al., "SecCollab-Improving Confidentiality for Existing Cloud-Based Collaborative Editors." In 2017 21st International Conferences on Control Systems and Computer Scient (CSCS), pp. 324-331. IEEE,2017. (Year: 2017).

Stohr, E., Workflow Automation: Overview and Research Issues, 2001, Information Systems Frontiers 3:3, pp. 281-296 (Year: 2001).

"Using Filters in Overview," published Mar. 7, 2017. https://www.youtube.com/watch?v=hycANhz7gww (Year: 2017).

(56) References Cited

OTHER PUBLICATIONS

Wilson et al., "Beyond Social Graphs: User Interactions in Online Social Networks and their Implications," ACM Transactions on the Web, vol. 6, No. 4, Article 17, Nov. 2012 (Year: 2012).

Zhang et al., "Integrating semantic NLP and logic reasoning into a unified system for fully-automated code checking," Automation in Construction, vol. 73, 2017, pp. 45-57, ISSN 0926-5805, https.//doi.org/10.1016/j.autcon.2016.08.027.

Zhenjiang et al., "Asynchronous Event-Based Visual Shape Tracking for Stable Haptic Feedback in Microrobotics," IEEE Transactions on Robotics, IEEE Service Center, Piscataway, NJ, vol. 28, No. 5, Oct. 1, 2012, pp. 1081-1089 (Year: 2012).

Ziheng, G., "Advanced Cyberinfrastructure for Managing Hybrid Geoscientific AI Workflows" (Year: 2019).

International Search Report and Written Opinion in PCT/IB2023/061992, mailed Mar. 19, 2024, 7 pages.

* cited by examiner

500

700

1000

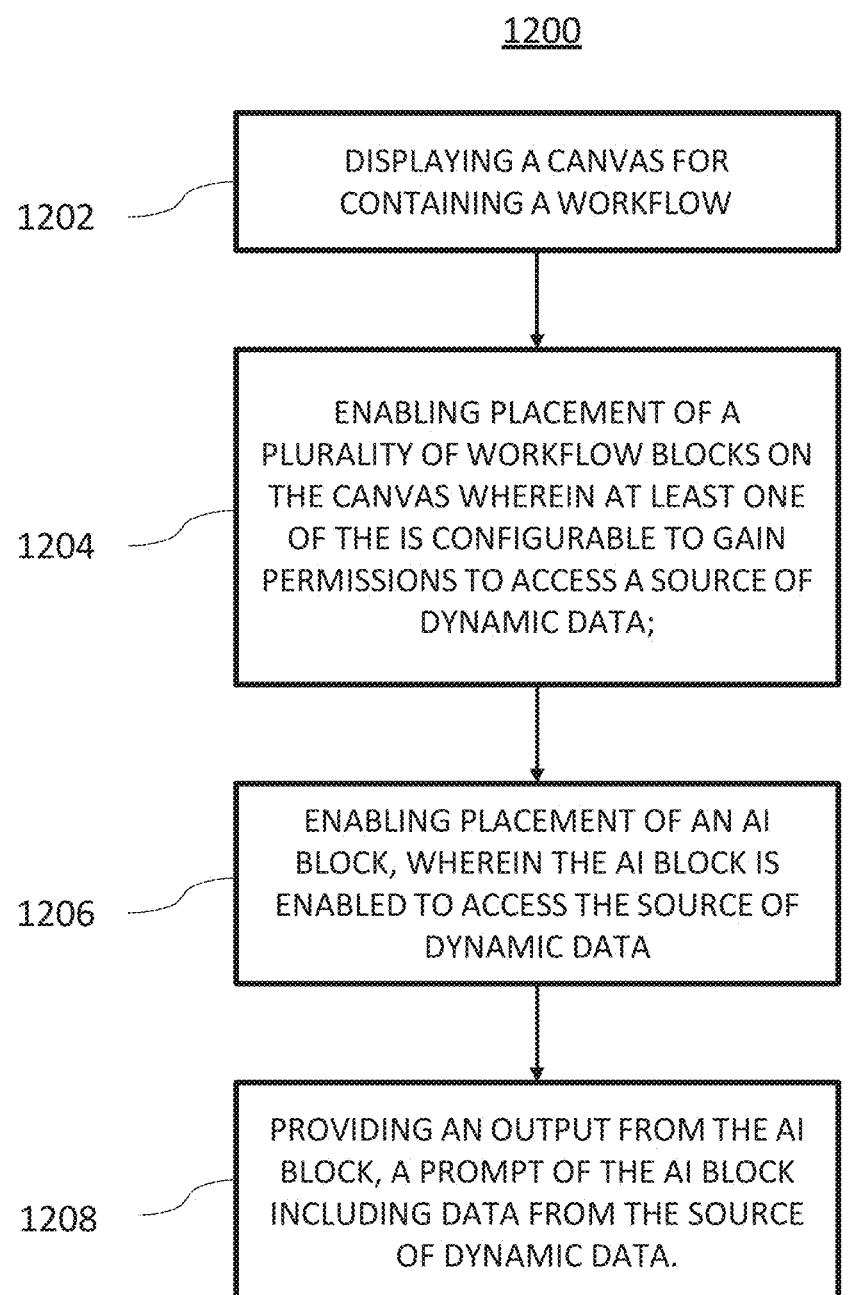

1200

1202 — DISPLAYING A CANVAS FOR CONTAINING A WORKFLOW

1204 — ENABLING PLACEMENT OF A PLURALITY OF WORKFLOW BLOCKS ON THE CANVAS WHEREIN AT LEAST ONE OF THE IS CONFIGURABLE TO GAIN PERMISSIONS TO ACCESS A SOURCE OF DYNAMIC DATA;

1206 — ENABLING PLACEMENT OF AN AI BLOCK, WHEREIN THE AI BLOCK IS ENABLED TO ACCESS THE SOURCE OF DYNAMIC DATA

1208 — PROVIDING AN OUTPUT FROM THE AI BLOCK, A PROMPT OF THE AI BLOCK INCLUDING DATA FROM THE SOURCE OF DYNAMIC DATA.

FIG. 12

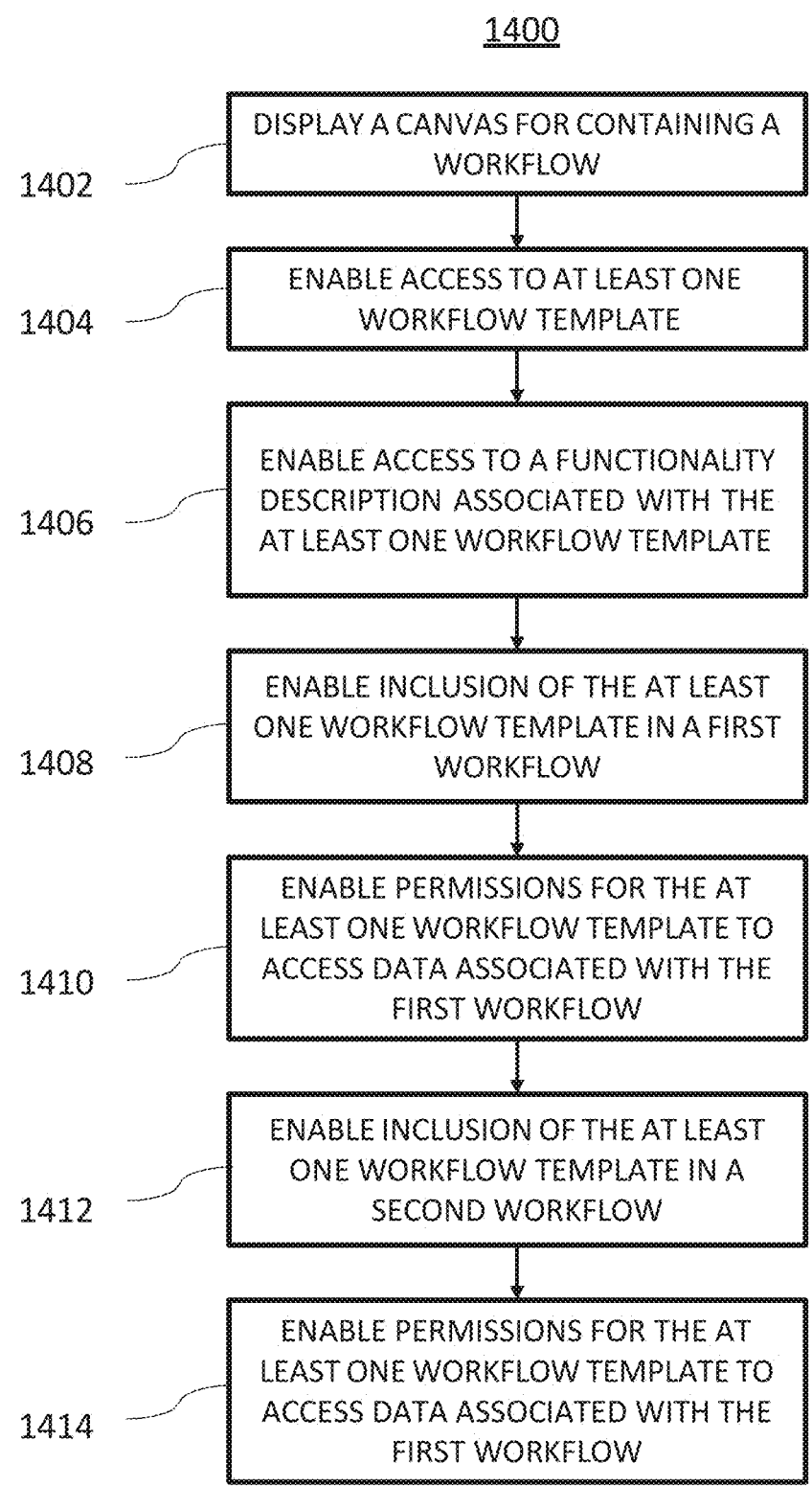

1400

1402 — DISPLAY A CANVAS FOR CONTAINING A WORKFLOW

1404 — ENABLE ACCESS TO AT LEAST ONE WORKFLOW TEMPLATE

1406 — ENABLE ACCESS TO A FUNCTIONALITY DESCRIPTION ASSOCIATED WITH THE AT LEAST ONE WORKFLOW TEMPLATE

1408 — ENABLE INCLUSION OF THE AT LEAST ONE WORKFLOW TEMPLATE IN A FIRST WORKFLOW

1410 — ENABLE PERMISSIONS FOR THE AT LEAST ONE WORKFLOW TEMPLATE TO ACCESS DATA ASSOCIATED WITH THE FIRST WORKFLOW

1412 — ENABLE INCLUSION OF THE AT LEAST ONE WORKFLOW TEMPLATE IN A SECOND WORKFLOW

1414 — ENABLE PERMISSIONS FOR THE AT LEAST ONE WORKFLOW TEMPLATE TO ACCESS DATA ASSOCIATED WITH THE FIRST WORKFLOW

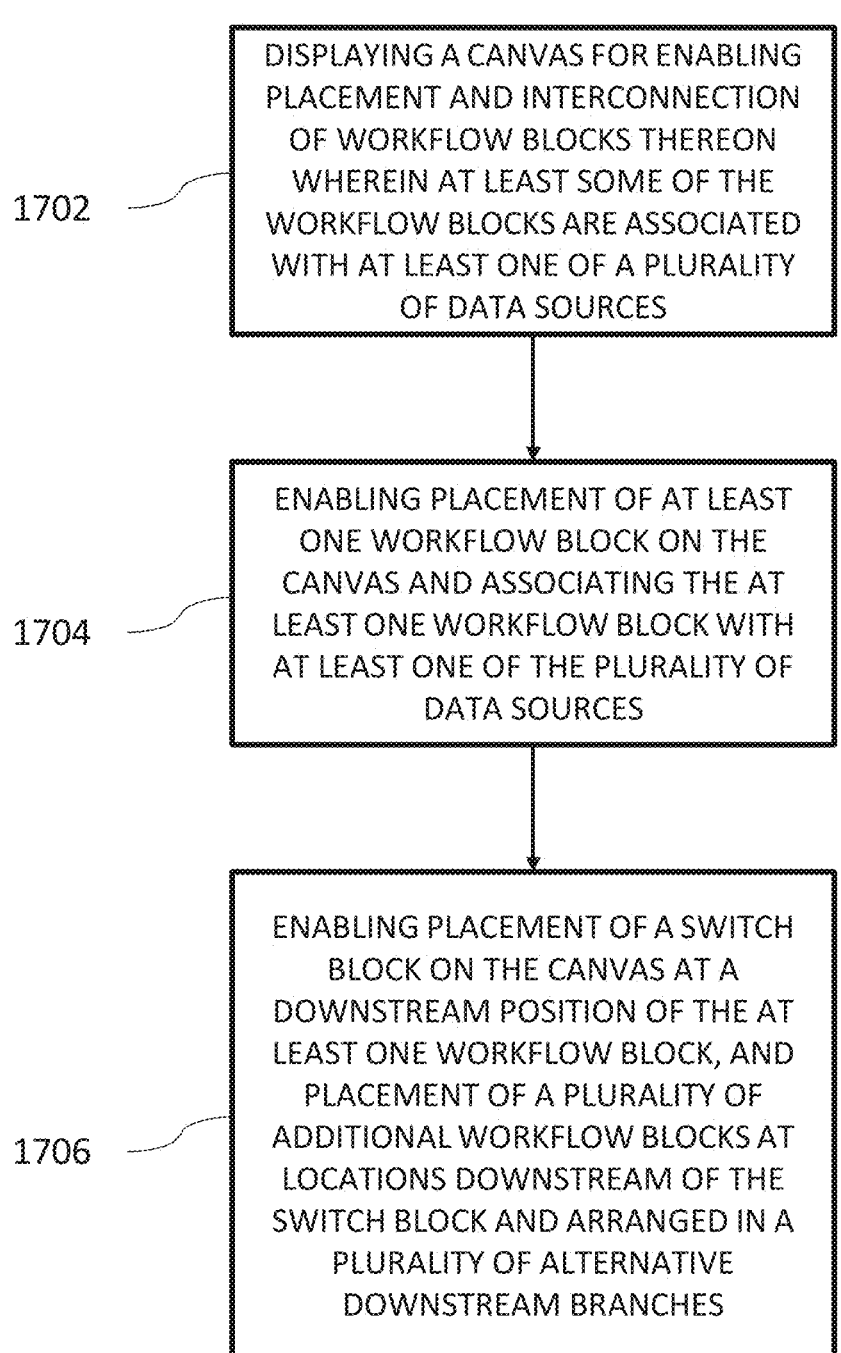

1702

DISPLAYING A CANVAS FOR ENABLING PLACEMENT AND INTERCONNECTION OF WORKFLOW BLOCKS THEREON WHEREIN AT LEAST SOME OF THE WORKFLOW BLOCKS ARE ASSOCIATED WITH AT LEAST ONE OF A PLURALITY OF DATA SOURCES

1704

ENABLING PLACEMENT OF AT LEAST ONE WORKFLOW BLOCK ON THE CANVAS AND ASSOCIATING THE AT LEAST ONE WORKFLOW BLOCK WITH AT LEAST ONE OF THE PLURALITY OF DATA SOURCES

1706

ENABLING PLACEMENT OF A SWITCH BLOCK ON THE CANVAS AT A DOWNSTREAM POSITION OF THE AT LEAST ONE WORKFLOW BLOCK, AND PLACEMENT OF A PLURALITY OF ADDITIONAL WORKFLOW BLOCKS AT LOCATIONS DOWNSTREAM OF THE SWITCH BLOCK AND ARRANGED IN A PLURALITY OF ALTERNATIVE DOWNSTREAM BRANCHES

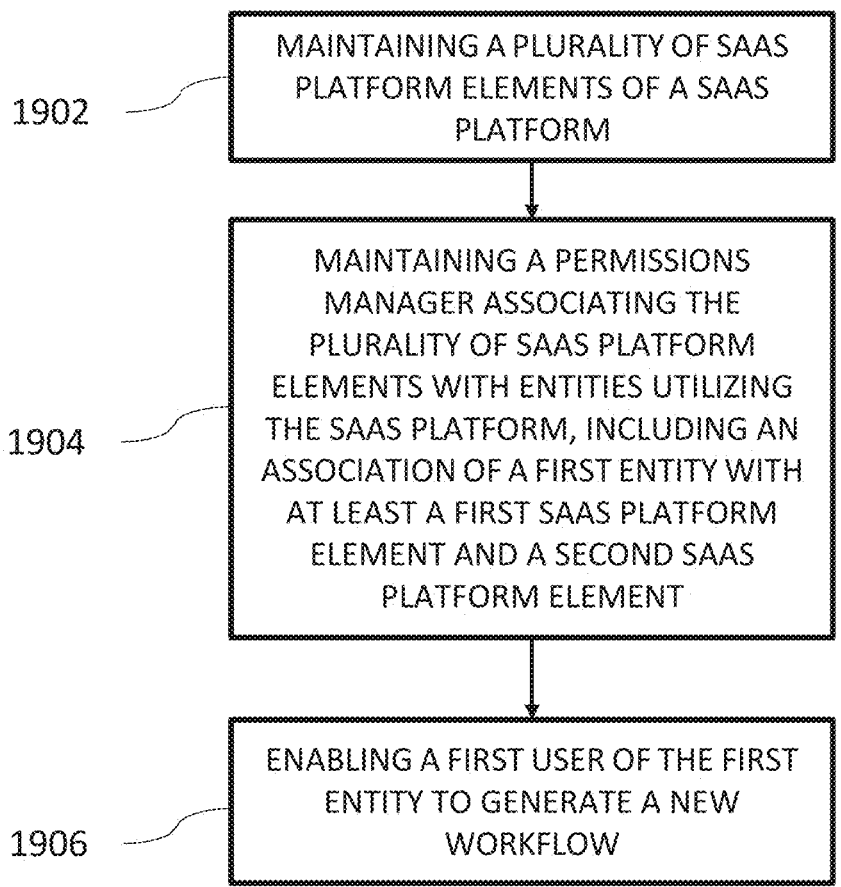

1902

MAINTAINING A PLURALITY OF SAAS PLATFORM ELEMENTS OF A SAAS PLATFORM

1904

MAINTAINING A PERMISSIONS MANAGER ASSOCIATING THE PLURALITY OF SAAS PLATFORM ELEMENTS WITH ENTITIES UTILIZING THE SAAS PLATFORM, INCLUDING AN ASSOCIATION OF A FIRST ENTITY WITH AT LEAST A FIRST SAAS PLATFORM ELEMENT AND A SECOND SAAS PLATFORM ELEMENT

1906

ENABLING A FIRST USER OF THE FIRST ENTITY TO GENERATE A NEW WORKFLOW

FIG. 19A

1906 – GENERATING A NEW WORKFLOW

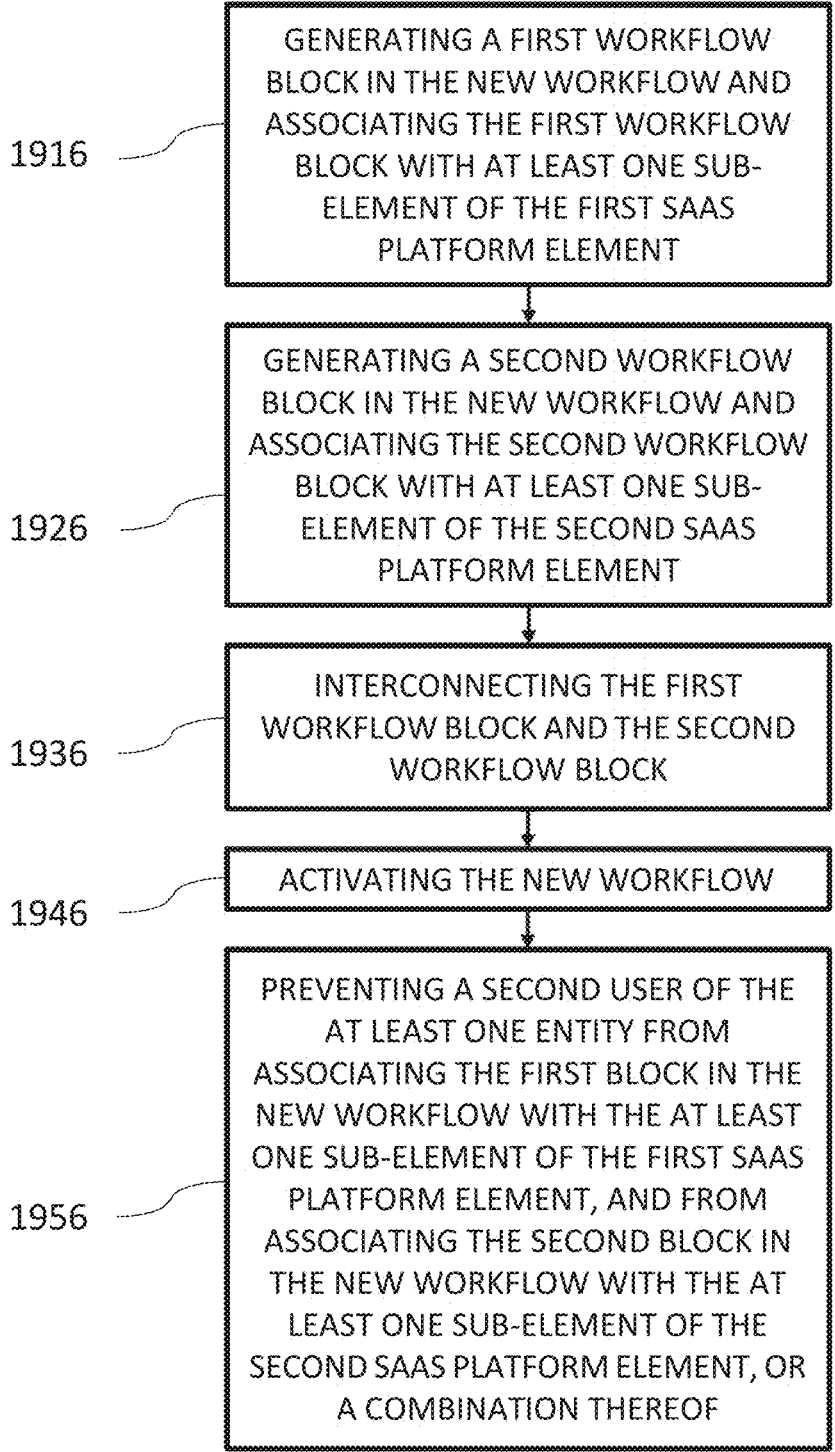

1916 — GENERATING A FIRST WORKFLOW BLOCK IN THE NEW WORKFLOW AND ASSOCIATING THE FIRST WORKFLOW BLOCK WITH AT LEAST ONE SUB-ELEMENT OF THE FIRST SAAS PLATFORM ELEMENT

1926 — GENERATING A SECOND WORKFLOW BLOCK IN THE NEW WORKFLOW AND ASSOCIATING THE SECOND WORKFLOW BLOCK WITH AT LEAST ONE SUB-ELEMENT OF THE SECOND SAAS PLATFORM ELEMENT

1936 — INTERCONNECTING THE FIRST WORKFLOW BLOCK AND THE SECOND WORKFLOW BLOCK

1946 — ACTIVATING THE NEW WORKFLOW

1956 — PREVENTING A SECOND USER OF THE AT LEAST ONE ENTITY FROM ASSOCIATING THE FIRST BLOCK IN THE NEW WORKFLOW WITH THE AT LEAST ONE SUB-ELEMENT OF THE FIRST SAAS PLATFORM ELEMENT, AND FROM ASSOCIATING THE SECOND BLOCK IN THE NEW WORKFLOW WITH THE AT LEAST ONE SUB-ELEMENT OF THE SECOND SAAS PLATFORM ELEMENT, OR A COMBINATION THEREOF

FIG. 19B

DIGITAL PROCESSING SYSTEMS AND METHODS FOR MANAGING WORKFLOWS

PRIORITY

This application is a continuation of International Application No. PCT/IB2023/061994, filed on Nov. 28, 2023, which is incorporated herein in its entirety.

TECHNICAL FIELD

The present disclosure relates generally to workflow management systems, methods and computer readable media. Various disclosed embodiments employ structures and non-transitory computer-readable storage media that store program instructions executable by at least one processing device to perform any of the steps and/or methods described herein.

BACKGROUND

Operation of modern enterprises can be complicated and time-consuming. In many cases, managing the operation of a single project requires integration of several employees, departments, and other resources of the entity. To manage the challenging operation, project management software applications may be used. Such software applications allow a user to organize, plan, and manage resources in collaboration with other user by providing a collaborative platform in which users share project-related information in order to optimize the time and resources spent on each project.

Project management software applications commonly leverage workflows to enable users to plan, execute, and monitor processes, projects, and daily tasks. By illustrating a series of tasks needed to accomplish a specific objective, workflows facilitate efficient and organized project management, allowing users to strategize effectively, carry out tasks, and track progress along the way. Project management software relying on the use of workflows are often referred as to workflow management software or platforms, these digital tools are designed to facilitate the efficient design, implementation, and operation of workflows.

However, managing workflows can be a challenging task due to various factors. Firstly, workflows often exhibit high complexity, involving multiple interconnected steps, dependencies, and decision points. Designing a workflow platform that effectively captures and accommodates the complexity of desired process flows can be a complex endeavor. Additionally, workflows frequently require integration with multiple existing systems, such as databases or applications. Ensuring seamless data flow, compatibility, and interoperability between these diverse systems can be technically complex and time-consuming. Furthermore, operating workflows entails ongoing maintenance of underlying systems, ensuring data integrity, managing updates and upgrades, and promptly addressing any issues or bugs that may arise. Sustaining operational workflows and keeping them aligned with evolving technological landscapes can be demanding. The present disclosure describes solutions to address or overcome one or more of the above-stated challenges, among other drawbacks in existing workflow managing systems.

SUMMARY

Embodiments consistent with the present disclosure provide digital systems, methods, and computer readable media for managing workflows. The disclosed embodiments may be implemented using a combination of conventional hardware and software as well as specialized hardware and software such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

In one embodiment, systems, methods, and computer readable media for applying workflows to internal and external resources are disclosed. Systems, methods, devices, and non-transitory computer readable media may involve at least one processor configured to: receive a selection of a template for a predefined workflow to be implemented in an existing user's account having at least one internal resource; receive a selection of a set of resources from a plurality of resources to implement the functionality of the predefined workflow, wherein the selection of the set of includes the at least one internal resource of the existing user's account and at least one external resource accessible via an API; query a secure storage area to determine that credentials are non-existent for the at least one external resource; initiate an authentication flow with the at least one external resource to obtain a token from the at least one external resource; receive the token; store the token in the secure storage area; and initiate a configuration of the predefined workflow to the set of resources to initiate functionality of the predefined workflow.

In another embodiment, methods, and computer readable media for expediting workflow construction and revision are disclosed. Systems, methods, devices, and non-transitory computer readable media may involve at least one processor configured to: display a canvas for containing workflow blocks of a workflow; enable generation of the workflow blocks wherein at least some of the workflow blocks are associated with at least one of a plurality of data sources; enable, during generation of the workflow blocks, assignment of global variables to the workflow blocks; construct a global variable repository linked to the workflow, wherein the global variable repository includes, for each of a plurality of global variables, a linkage field; enable construction of the workflow using the workflow blocks with the plurality of global variables defined in the global variable repository, wherein during a construction process, at least some of the linkage fields are permitted to remain empty; and following construction of the workflow, receive data to fill the at least some empty linkage fields, where the at least some empty linkage fields are mapped to the at least one of the plurality of data sources.

In yet another embodiment, methods, and computer readable media for providing a workflow building module utilizing a canvas are disclosed. Systems, methods, devices, and non-transitory computer readable media may involve at least one processor configured to: during a configuration phase: enable construction of a workflow via a selection of preconstructed workflow blocks capable of being interconnected with logical connections; enable placement on a canvas of a first workflow block selected from the preconstructed workflow blocks, wherein the first workflow block has a first input field having a static subfield, and a subfield URL for retrieving dynamic subfields associated with the static subfield; upon placement of the first block on the canvas, invoke the subfield URL to retrieve the dynamic subfields; enable placement of a second workflow block on the canvas selected from the preconstructed workflow blocks downstream of the first workflow block and in a same branch as the first workflow block, the second workflow block having a second input field capable of utilizing a subset of the dynamic subfields of the first workflow block; and during a runtime phase: fetch values associated with the subset of the dynamic subfields of the first workflow block; and use at least one of the fetched subset values as inputs for the second workflow block.

In yet another embodiment, methods, and computer readable media for providing a canvas for constructing a workflow are disclosed. Systems, methods, devices, and non-transitory computer readable media may involve at least one processor configured to: display a canvas for containing and interconnecting workflow blocks; enable placement of a plurality of workflow blocks on the canvas wherein the plurality of workflow blocks includes at least one trigger block and at least one action block, and wherein at least one of the at least one trigger block or the at least one action block is configurable to gain permissions to access a source of dynamic data; enable placement of an AI block at a downstream location from the plurality of workflow blocks on the canvas, wherein the AI block is enabled to access the source of dynamic data by virtue of the downstream location; and provide an output from the AI block, wherein a prompt of the AI block includes data from the source of dynamic data.

In yet another embodiment, methods, and computer readable media for graphically constructing nested workflows are disclosed. Systems, methods, devices, and non-transitory computer readable media may involve at least one processor configured to: display a canvas for enabling placement and interconnection of workflow blocks thereon; enable access to at least one workflow template, wherein the at least one workflow template includes a series of interconnected blocks predetermined in order and agnostic to information the series of blocks is capable of processing; enable access to a functionality description associated with the at least one workflow template; enable inclusion of the at least one workflow template at a downstream location from at least one first workflow block in a first workflow; enable permissions for the series of blocks of the at least one workflow template to access data associated with upstream workflow blocks of the first workflow in a same branch of the first workflow as the at least one workflow template; enable inclusion of the at least one workflow template at a downstream location from at least one second workflow block in a second workflow; and enable permissions for the series of blocks of the at least one workflow template to access data associated with upstream workflow blocks of the second workflow in a same branch of the second workflow as the at least one workflow template.

In yet another embodiment, methods, and computer readable media for performing workflow construction operations are disclosed. Systems, methods, devices, and non-transitory computer readable media may involve at least one processor configured to: display a canvas for enabling placement and interconnection of workflow blocks thereon wherein at least some of the workflow blocks are associated with at least one of a plurality of data sources; enable placement of at least one workflow block on the canvas and associating the at least one workflow block with at least one of the plurality of data sources; enable placement of a switch block on the canvas at a downstream position of the at least one workflow block, and placement of a plurality of additional workflow blocks at locations downstream of the switch block and arranged in a plurality of alternative downstream branches; wherein the switch block is configured to direct trigger action flow to at least one of the plurality of alternative downstream branches; and wherein the switch block is configured with a plurality of differing queries associated with the plurality of alternative downstream branches, at least one of the plurality of differing queries being associated with the at least one of the plurality of data sources.

In yet another embodiment, methods, and computer readable media for facilitating SaaS platform element interconnections are disclosed. Systems, methods, devices, and non-transitory computer readable media may involve at least one processor configured to: maintain a plurality of SaaS platform elements of a SaaS platform, each of the plurality of SaaS platform elements including a plurality of sub-elements; maintain a permissions manager associating the plurality of SaaS platform elements with entities utilizing the SaaS platform, wherein each of the plurality of SaaS platform elements is associated with at least one entity of the entities utilizing the SaaS platform, and the permissions manager includes an association of a first entity with at least a first SaaS platform element and a second SaaS platform element; and, enable a first user of the first entity to generate a new workflow for the at least one entity, wherein the generation includes: generate a first workflow block in the new workflow and associating the first workflow block with a at least one sub-element of the first SaaS platform element; generate a second workflow block in the new workflow and associate the second workflow block with at least one sub-element of the second SaaS platform element; interconnect the first workflow block and the second workflow block; activate the new workflow, and prevent a second user of the at least one entity from associating the first block in the new workflow with the at least one sub-element of the first SaaS platform element, from associating the second block in the new workflow with the at least one sub-element of the second SaaS Platform element, or a combination thereof.

BRIEF DESCRIPTION OF THE DRAWINGS

The accompanying drawings, which are incorporated in and constitute a part of this disclosure, illustrate various disclosed embodiments. In the drawings:

FIG. 12 is a flowchart of an exemplary process for constructing a workflow, the workflow having at least one block incorporating AI functionality, consistent with some disclosed embodiments;

FIG. 14 is a flowchart of an exemplary process for constructing nested workflows; consistent with some disclosed embodiments;

FIG. 17 is a flowchart of an exemplary process for performing construction operations of a workflow, wherein the workflow uses at least one switch block, consistent with some disclosed embodiments;

FIG. 19A is a flowchart of an exemplary process for performing operations facilitating SaaS platform element interconnections, consistent with some disclosed embodiments;

FIG. 19B is a flowchart of an exemplary process of generating a new workflow in association with one of the steps illustrated in FIG. 19A, consistent with some disclosed embodiments;

DETAILED DESCRIPTION

Figure 1:
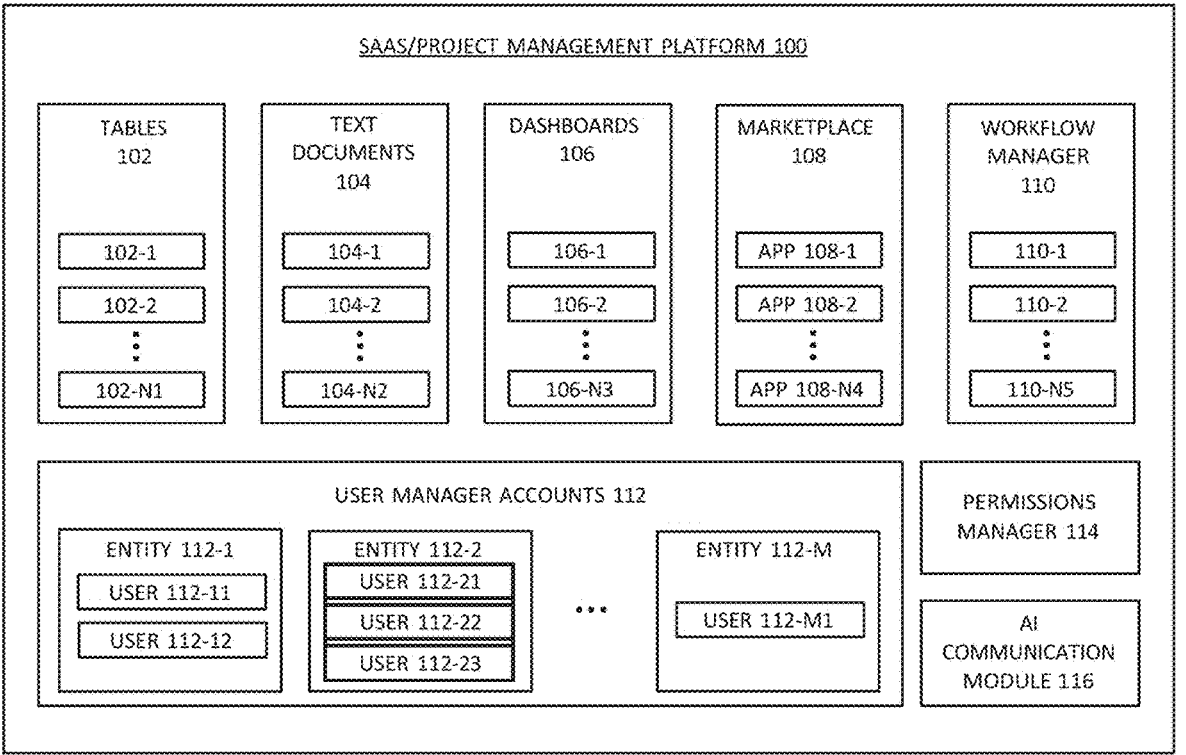
FIG. 1 is a block diagram of an exemplary SaaS/project management platform, consistent with some disclosed embodiments.

Disclosed embodiments provide new and improved techniques for workflow implementing and managing artificial intelligence functionalities in applications.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspects of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience and form the word "embodiment" as used herein is intended to refer to a single embodiment or multiple embodiments of the disclosure.

Certain embodiments disclosed herein include devices, systems, and methods for collaborative work systems that may allow one or more users to interact with information in real time. To avoid repetition, the functionality of some embodiments is described herein solely in connection with a processor or at least one processor. It is to be understood that such exemplary descriptions of functionality apply equally to methods and computer-readable media and constitute a written description of systems, methods, and computer-readable media. The underlying platform may allow a user to structure systems, methods, or computer-readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond what is displayed in a table. For example, a board may further contain cell comments, hidden rows and columns, formulas, data validation rules, filters, specific formatting, audits logs, version history, cross-referencing with different boards, external linking with data sources, permissions of access or a combination thereof. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining one or more associated data types and may further include metadata (e.g., definitions, validation rules, ranges, hyperlinks, macros . . . ). When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure but rather may be practiced in conjunction with any desired organizational arrangement. In addition, tablature may include any type of information, depending on intended use. As an example, when used in conjunction with a project/task management application, the tablature may include any information associated with one or more tasks, such as one or more status values, projects, time-frames/deadlines, countries, persons, teams, progress statuses, a combination thereof, or any other information related to a task. In some cases, a hierarchy may be established between different items/cells in a same row. For example, a unique identifier (UID) may be assigned to an item and the other cell of the same row may then be associated with the item or the assigned UID.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. In alternative scenarios, permission may not only be provided at the board level, but also at a more granular level such as rows, columns and even individual cells, allowing for fine-grained control over who may access, view, edit, or interact with the data included in the board, particularly useful when dealing with collaborative boards. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real-time in collaborative work systems involving electronic collaborative word-processing documents. Electronic collaborative word processing documents (and other variations of the term) as used herein are not limited to only digital files for word processing but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information and may be linked to other sources of data for dynamic updates. Blocks may be automatically organized by the system or may be manually selected by a user according to preference. In one embodiment, a user may select a segment of any information in an electronic word-processing document and assign it as a particular block for input, editing, formatting, or any other further configuration.

An electronic collaborative word-processing document may be stored in one or more repositories connected to a network accessible by one or more users through their computing devices. In one embodiment, one or more users may simultaneously edit an electronic collaborative word-processing document. The one or more users may access the electronic collaborative word-processing document through one or more user devices connected to a network. User access to an electronic collaborative word processing document may be managed through permission settings set by an author of the electronic collaborative word processing document. Alternatively, permissions to specific portions of the electronic collaborative word-processing document may be provided in order to control access, facilitate collaboration, and ensure that different users have appropriate levels of involvement and authority over different parts of the content. An electronic collaborative word-processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as temporary storage. Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuits (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated into a single circuit. When more than one processor is used, the processors may be configured to operate independently or collaboratively and may be co-located or located remotely from each other. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the foregoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or an unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near-field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column-oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), or virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multi-dimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data with different levels of granularity (e.g., a specific board, a plurality of boards . . . ) or across an entirety of an account or entity (e.g., multiple boards, workspaces, or projects within the account). An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more automations, logical rules, logical sentence structures and logical (sentence structure) templates. While these terms are described herein in differing contexts, in the broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that responds to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyperparameters, where the hyperparameters are set manually by a person or automatically by a process external to the machine learning algorithm (such as a hyperparameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

Workflow management platforms are digital tools or software designed to streamline and automate various processes within an organization. They help to coordinate and manage tasks, activities, and information flow among several team members or different departments, ensuring efficient collaboration and productivity. These platforms typically provide features such as task assignment, progress tracking, notifications, and document management. In some cases, a workflow management platform may be incorporated into a broader project management platform or Software-as-a-Service (SaaS) platform. Within the context of this disclosure, a SaaS platform may refer to any kind of cloud-based software delivery model where service providers host software applications and make them accessible to users over the Internet. Instead of installing, managing, and maintaining the software locally, users access and utilize it through a web browser or thin client interface.

SaaS platforms offer a wide range of applications and services to meet various business needs such as customer relationship management (CRM), human resources management (HRM), project management, accounting, marketing automation, and more. In most scenarios, these platforms operate on a subscription basis, with customers paying recurring fees for software access and usage. SaaS platforms may provide several advantages including:

Accessibility: Users may conveniently and securely access software and data from any device with an internet connection.

Scalability: SaaS platforms may easily scale up or down to accommodate changing business requirements, providing flexibility and cost-effectiveness.

Cost-effectiveness: By eliminating upfront investments in hardware and software, SaaS reduces initial costs. Customers may pay subscription fees based on their usage.

Maintenance and Updates: Service providers handle software maintenance, updates, and security patches, relieving customers of these responsibilities.

Collaboration: SaaS platforms often offer collaboration features, enabling multiple users to work together, share data, and communicate within the platform.

Customization: SaaS platforms offer a high level of customization, allowing businesses to tailor the software to their specific needs. These applications can be seamlessly integrated with other business applications, particularly those offered by the same software provider. This integration enables smooth data flow and collaboration between different software systems, enhancing overall productivity and efficiency.

Some examples of SaaS platforms include Monday.com™ for project management, Salesforce™ for CRM, Slack™ for team collaboration, Dropbox™ for file hosting and sharing, Microsoft 365™ for productivity tools, Google Workspace™ apps for productivity and collaboration tools, Zendesk™ for customer support, HubSpot™ for marketing, and Shopify™ for e-commerce.

SaaS may include a plurality of SaaS Platform elements which may correspond to components or building blocks of the platform that works together to deliver software applications and services over the Internet. Examples of such elements may include application software, infrastructure, or user interface. For example, a platform may offer project management capabilities to its users via dashboards, tables, text documents, a workflow manager or diverse applications offered on a marketplace, all of which constitute building blocks and therefore elements of the platform. Application offered on the marketplace may be provided by developers external to the SaaS platform, accordingly, they may utilize a user interface different from a generic user interface provided by the SaaS platform. In addition, each SaaS platform element may include a plurality of SaaS platform sub-elements which may refer to smaller components or features that are part of a larger element within a SaaS platform. These sub-elements may be designed to perform specific tasks or provide specialized functionality. The collaboration of multiple sub-elements aims to create a comprehensive and integrated SaaS solution. Examples of SaaS platform sub-element may include a widget associated with a dashboard, a column or a cell associated with a table, or a workflow block associated with a workflow manager.

Accordingly, a workflow management platform may serve as a central component of a SaaS platform by providing a centralized hub for task, schedule, and resource management, providing automation capabilities, data synchronization, and improving project management collaboration and communication. FIG. 1 is a block diagram of an exemplary SaaS/Project management platform 100. As illustrated, SaaS platform 100 includes a plurality of SaaS platform elements, namely Tables 102, Text documents 104, Dashboards 106, Marketplace 108, and a workflow manager 110. Each of these SaaS platform elements includes a plurality of SaaS platform sub-elements respectively 102-1 through 102-N1 for Tables 102, 104-1 through 104-N2 for Text documents 104, 106-1 through 106-N3 for Dashboards 106, APP 108-1 through APP 108-N4 for Marketplace 108 and 110-1 through 101-N5 for Workflow Manager 110, wherein N1, N2, N3, N4 and N5 represent natural numbers.

Several entity or organization accounts (user management accounts) 112 (112-1 to 112-M, M being a natural number) may be affiliated with SaaS platform 100 and managed via a user manager. Each of these entity accounts may include at least one user account. For example, entity account 112-1 includes two user accounts 112-11, 112-12, entity account 112-2 three user accounts 112-21, 112-22, and 112-23, and entity account 112-M one user account 112-M1. Within the context of the current disclosed embodiments, an entity account may refer to the central account managing the overall SaaS platform subscription, billing, and settings. Within this entity account, multiple user accounts may be created for different individuals within the entity/organization. User accounts may have their own login credentials, access privileges, and settings. The entity account owner or administrators may have control over access, permissions, and data segregation. User accounts may collaborate and share resources within the entity account while maintaining a personalized experience. Each of the user accounts 112 may include different permutations of SaaS platform elements such as a plurality of tables, text documents, dashboards, marketplace applications or workflows (not shown in FIG. 1) in association with the above-mentioned SaaS platform elements 102, 104, 106, 108, and 110. Accordingly, various SaaS platform elements or sub-elements may include metadata associated with users. Metadata associated with users may provide additional information and context about the users themselves, their profiles, roles, preferences, and interactions within the SaaS platform. Examples of metadata may include user profiles, roles and permissions, activity logs, usage indications, preferences and settings, user associations/relationships, user history or a combination thereof.

In addition, each of these user accounts may include one or more private apps, that have been specifically designed and tailored to suit the needs of a user and that employ functionalities offered by or in association with SaaS platform 100 (via SaaS platform elements 102, 104, 106, 108, and 110 or their associated sub-elements). Private apps are exclusively accessible to users who are affiliated with an entity owning that app. These applications are not publicly available (i.e., not on the market/publicly offered on the marketplace 108) and may only be accessed by individuals who have specific authorization or are part of the designated user group. The privacy settings associated with these apps restrict access to ensure that only authorized users can use and interact with them. This level of privacy and restricted access helps maintain confidentiality, control, and security over the app's functionalities and data, limiting usage to approved individuals within the user account. Centralization of user access and authorization management is performed by a permission manager 114 enabling administrators to control and regulate user privileges, ensuring that users have appropriate levels of access to data, features, and resources based on their roles and responsibilities. Permissions Manager 114 may offer granular control, and role-based access, facilitating efficient user management, collaboration, and compliance monitoring. Its objective is to enhance data security, streamline user administration, and maintain proper governance within the SaaS platform.

As used in this disclosure, the term "workflow" may refer to any kind of structured and organized sequence of tasks, activities, or steps that are designed and executed with the goal of achieving a specific outcome or objective. Workflows may provide a systematic approach to managing and coordinating work processes in an efficient, reliable, and structured manner. Within a workflow, each task or activity may be connected to the next in a logical sequence of actions. This means that the completion of one task triggers the start of the next task in line, ensuring a smooth progression throughout the workflow. The tasks may be interdependent, meaning that the output or result of one task may serve as the input or requirement for the subsequent task.

Workflows may be initiated by specific triggers. These triggers may be events, conditions, or actions that prompt the start of a workflow. Examples of workflow triggers may include user input, such as clicking a button or validating a line of command, or an automated event, such as a timer reaching a certain point or receiving a specific notification. Furthermore, a single trigger may initiate a chain of successive actions or a series of tasks. This means that upon the occurrence of a trigger event, multiple actions can be sequentially executed, one after another, based on the predefined workflow design.

The interconnectivity and dependency of tasks within a workflow enable the flow of information and data between different stages. When workflows are operated or run, a sequential flow of execution of consecutive tasks occurs. This sequential flow may be referred to as trigger-action flow, wherein each task is executed one after another in a specific order, ensuring that the completion of one task triggers the start of the next task in line. This flow ensures a logical progression of work and the achievement of the desired outcome, where the output or result of one task may become the input or requirement for the subsequent task.

Workflows may be visually represented using various graphical tools such as workflow diagrams, flowcharts, or process flowcharts. These visual representations may offer a clear visualization of the tasks involved in the workflow, their relationships and an overview of the entire streamline of the workflow. In this context, each task, or activity within the workflow is depicted as a workflow node or workflow block in the graphical representation. These blocks represent individual steps or actions for performance within the workflow. The workflow blocks are interconnected through logical connections, which may be represented by arrows or lines, to illustrate the flow and sequence of tasks. These connections show the dependencies and relationships between different tasks within the workflow.

The graphical representation of the workflow may be organized in a tree structure consisting of a main branch that represents the primary flow of the workflow, and it may have several ramifications or sub-branches branching off from it ultimately defining a plurality of workflow branches. Information or data may be transferred from workflow blocks to downstream workflow blocks in accordance with the trigger-action flow. This inheritance of information may vary depending on the design and configuration of the workflow. While some scenarios may involve automatic inheritance of information, others may rely on explicit connections and dependencies. For example, in a first scenario, a workflow block may automatically inherit all information from all workflow blocks upstream within a same branch by virtue of its position on the workflow, and may therefore access or utilize freely this information. In an alternative scenario, a workflow block may only inherit information provided by the specific upstream workflow block it is connected to or dependent upon. The workflow design and configuration determine how information flows within a workflow and the specific scenario employed. It is the responsibility of the workflow designer to establish the appropriate connections and dependencies between workflow blocks to ensure the smooth and accurate flow of data throughout the workflow.

It is possible for workflow branches or ramifications to reunite or converge at a single workflow block. This convergence point serves as a point in the workflow where multiple branches or paths merge back into a unified flow. In workflow design, it is common to have branching logic where different paths or branches diverge based on certain conditions or decisions. Each branch may have its own set of tasks or actions to be performed. However, at some point, it may be necessary for these branches to come together and continue with a shared set of tasks or actions. The convergence workflow block represents this merging point where the separate branches or paths reconvene. At this block, the workflow transitions from multiple paths to a single unified path. The tasks or actions following the convergence block are typically shared by all the converging branches. This convergence point may enable the coordination and synchronization of different branches within the workflow ensuring that all necessary conditions or prerequisites from the separate branches have been fulfilled before proceeding with the subsequent tasks. In an alternative scenario, the convergence workflow block may be set up to trigger its action only after all the actions in the converging branches of the workflow have been completed. This ensures that the workflow proceeds to the convergence point only when all the parallel branches have finished their respective tasks.

It is also to be appreciated that workflows are substantially unidirectional, meaning that the tasks within each branch of the workflow are executed in a specific descending order. This order ensures that the tasks within a branch are performed from the top of the branch (first task) to the bottom of the branch (last task). The unidirectional nature of workflows helps maintain a clear and predictable flow of tasks within the overall process. However, it is possible for a workflow to incorporate loops to handle repetitive or iterative tasks. Loops may enable the repetition of a specific set of actions or tasks until a certain condition is met. Different types of loops may be employed within a workflow such as predefined loops, wherein the number of iterations or repetitions is predetermined and defined within the workflow design, or conditional loops configured to continue iterating as loons as a specific condition remains true, the condition being evaluated at the end of each iteration. Despite the inclusion of loops within a workflow, the overall workflow still maintains a unidirectional flow. The trigger-action flow typically starts at the first task and progresses downstream, following the defined sequence of tasks until it reaches a final task. The presence of loops may cause the flow to travel back and forth for a certain number of iterations but the loop itself is contained within the sequential flow of the overall workflow. Once the loop is completed, the workflow continues its unidirectional progression towards the final task. Loops do not disrupt the overall unidirectional flow of the trigger-action sequence. The looped section acts as a sub-process that is executed as needed, and once it concludes, the workflow resumes its forward movement towards the final task.

Workflow management operations may be performed by using a workflow management platform or a workflow manager integrated into a larger SaaS platform as illustrated in FIG. 1. Workflow management operations may be divided into two main phases: a configuration/construction phase and an execution/running phase. The configuration/construction phase of a workflow may refer to the initial setup and customization of the workflow. It involves defining the specific steps, tasks, i.e., workflow blocks and logical connections that make up the workflow and configuring the necessary parameters and settings. During the configuration/construction phase, the sequence of tasks or steps that need to be performed is determined, inputs and outputs for each step are identified, and any dependencies or conditions that govern the workflow specified. For example, a configuration/construction phase may involve designing a flowchart to visualize the workflow structure. Additionally, any required resources (tools, software, applications, systems . . . ) that will be used with the workflow may be set up. This includes configuring any integration with external or internal resources, and integration of the former may require an authentication flow. The configuration/construction phase is valuable as it establishes the foundation and provides the functionality of the workflow. Once the workflow is properly configured, it can be executed or run and managed effectively, leading to increased efficiency and productivity, this corresponds to the execution/running phase. The execution phase of a workflow can be initiated manually by a user, or be initiated automatically in accordance with its configuration.

The design of a workflow during a configuration/construction phase may be established by using a workflow canvas. Within the context of this disclosure, a canvas may refer to any graphical interface that enables users to design and organize workflow blocks. A canvas may provide a visual representation of the workflow, enabling users to create, modify and organize the various workflow components visually and intuitively and may correspond to one of tools provided by a workflow manager, such as workflow manager 110 illustrated in FIG. 1. Workflow blocks may be represented as boxes, shapes, or icons on the canvas, with lines or arrows connecting them to indicate the flow or sequence of the workflow referred to as logical connections. A canvas may provide a flexible environment in which users may drag and drop workflow blocks, rearrange their position, and establish connections or relationships between them. It may enable users to visualize workflow structure and logic, making complex processes easier to understand and manage. In short, using a canvas to contain workflow blocks has the potential to simplify the process of designing, editing and documenting workflows, enabling users to create clear, visually appealing representations of their processes or automation sequences.

Workflow canvas may be utilized in association with a display. As used in this disclosure, the term "display" refers either to any physical device capable of providing a visual representation of a canvas or directly to a visual representation of a canvas. Examples of physical devices acting as displays may include computer screens, smartphone screens, tablet screens, smartwatch screens, laptop screens, video walls, projectors, head-mounted displays or virtual reality headsets. Any visual representation of a device or display may be characterized by dimensions, these dimensions are limited to the physical dimensions of the device, and often, a workflow canvas may not be completely presented on a display device or fit a window. This drawback is common among devices with small screens, such as smartphones or tablets. To solve this issue canvas may also offer some additional features such as zooming in, zooming out, panoramic panning or a navigation map. Within the context of this disclosure, a navigation map may refer a visual representation, potentially displayed in a corner of a display, providing an overview of a larger area or environment. It is designed to assist users in orienting themselves and navigating through a canvas. The navigation map often displays relevant information to help users understand their current location on the canvas and make informed decisions about movement and direction.

Figure 2:
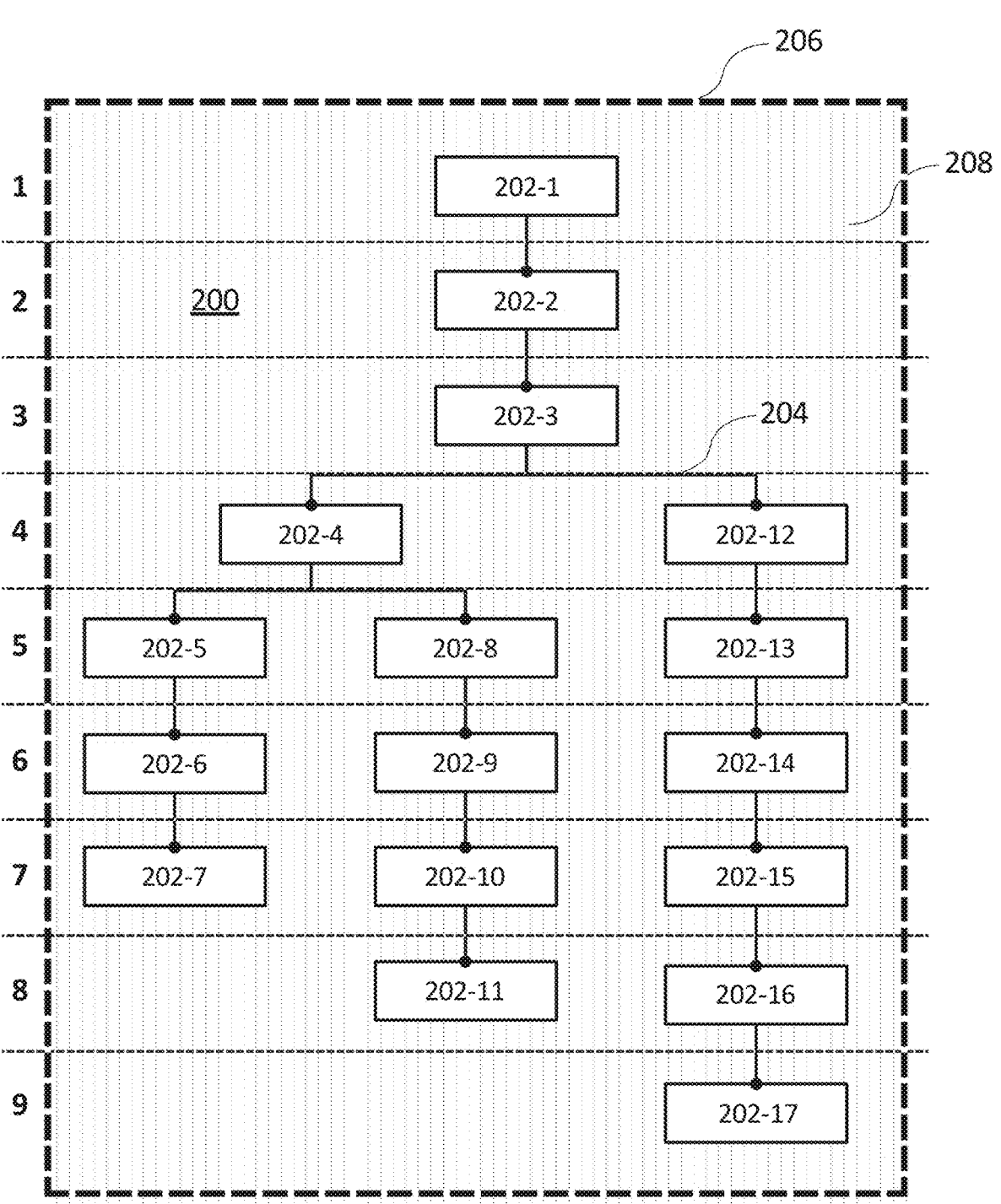
FIG. 2 is an exemplary workflow diagram presented on a canvas, consistent with some disclosed embodiments.

FIG. 2 represents an exemplary workflow diagram 200 associated with an exemplary workflow. Workflow diagram 200 includes a plurality of workflow blocks 202 (202-1 through 202-17), illustrated as white boxes, each workflow block 202 being associated with a specific task or activity of the exemplary workflow. Workflow blocks 202 are interconnected by a plurality of logical connections 204, illustrated as black continuous lines. Workflow diagram 200 is presented on a display 206 whose dimensions are illustrated by black dashed lines and utilizing a workflow canvas 208 represented by a light grey grid. It is to be appreciated that the design of workflow blocks 202 of workflow diagram 200 is merely an example of visual design, workflow blocks may adopt any type of visual design. It is also appreciated that two different workflow blocks may have different visual designs in terms of shape, color, texture, aspect, size, iconography or style. Similarly, logical connections 204 may adopt any kind of visual design with different styles, colors, curvatures, thicknesses, begin types, end types etc.

In certain instances, the visual design of a workflow block may signify its intended function or offer visual cues corresponding to workflow block categories. For example, trigger blocks might sport distinct shapes compared to action blocks. Similarly, the appearance of a logical connection can offer distinct visual cues corresponding to its specific functionality. For example, a time-dependent logical connection could be represented as a box positioned between the connecting lines, featuring a prominent clock icon at its center. In another example, logical connections that follow user-dependent actions could exhibit variations from connections that establish a simple cause-and-effect relationship between two blocks. Altering the type of connection may be achieved by interacting directly with the connecting line on the canvas. Furthermore, logical connections may incorporate rules dictating the extent to which previously provided data should be transmitted downstream-whether fully, partially, or not at all. For instance, if a first block necessitates the selection of an employee, a second block requires an employee from the selected individual's team, and a third block involves sending an email, the logical connection between the second and third blocks might include a rule to exclude managerial details from the gathered information. This exclusion ensures that such information remains inaccessible to prevent its inadvertent inclusion in the email.

While figures of the present disclosure represent workflow diagrams as two-dimensional structures, workflow diagrams may be represented as three-dimensional structures. Additional visual information may be displayed in association with workflow diagram 200. Examples of additional visual information may include labels, text, annotations or comments. The inclusion of additional visual information may ensure a comprehensive understanding of the workflow's components and processes without the need for additional assistance. For example, changing the labelling and text within workflow blocks may enhance their clarity and informativeness and enable a user to readily grasp the purpose or function of each block without requiring further explanations. On the other hand, the inclusion of annotations or comments within the workflow blocks may offer supplementary information or explanations and serve to clarify intricate tasks or provide guidance to users when interpreting the workflow. The inclusion of additional visual information may represent one of the features offered by a workflow canvas.

Workflow diagram 200 includes three distinct workflow branches: a first workflow branch having seven workflow blocks (workflow blocks 202-1 through 202-7), a second branch having eight workflow blocks (workflow blocks 202-1 through 202-4 and 202-8 through 202-11), and a third workflow branch having nine workflow blocks (workflow blocks 202-1 through 202-3 and 202-12 through 202-17). These branches, i.e., the workflow blocks 202 and the logical connection 204 that form them, have been defined during a workflow configuration/construction phase of workflow diagram 200. During an execution/running phase, trigger-action flow may move along any of these three branches. Yet, certain scenarios might call for the simultaneous parallel execution of two or more branches. Consequently, workflow diagram 200 can also be conceptualized as featuring a primary branch (workflow blocks 202-1-202-3) that splits into two secondary branches (workflow blocks 202-4 and 202-12 through 202-17) along with two tertiary branches (workflow blocks 202-5 through 202-7 and 202-8 through 202-11)

In some cases, the unidirectional/descending execution of the workflow occurs vertically on the canvas. In such cases, when two branches are performed at the same time, workflow blocks that are located on a same horizontal layer/level of the canvas will be executed in parallel. Such practice ensures that in cases of multiple branches, it will be clear which tasks occur in parallel to enable downstream blocks to relay on performed tasks from workflow blocks from the upper level of different branches. For example, in the situation depicted in FIG. 2, where dashed lines and numerical references on the left denote identified canvas layers, blocks 202-5 and 202-8 of layer 5 may be executed concurrently. Once block 202-6 operates, the execution of both 202-5 and 202-8 is assured. An implication of this practice is that the distance between two blocks may exceed that of a single-block separation. It is to be appreciated that the numbering and the layer partition may or may not be displayed alongside a canvas.

In some disclosed embodiments, workflow blocks 202 may be configured to receive at least one trigger and implement at least one action. Within the context of this disclosure, triggers for a workflow block may refer to events or conditions that trigger the execution of the block or determine when it should be executed. The specific triggers available for a workflow block may vary depending on the workflow system or platform being used. Examples of triggers associated with workflow blocks may include any one or more of the following:

Time-based triggers: These triggers are based on specific time intervals or schedules. For example, a workflow block may be set to run at a particular date and time, or scheduled to run periodically, e.g., hourly, daily, weekly or monthly.

Event-based triggers: These triggers are based on the occurrence of specific events or actions within systems or environments of the workflow block or associated with the workflow block. Examples include the creation or modification of a file, the receipt of an e-mail or notification, or a user action. Event-based triggers are also on the occurrence of specific events within the workflow, such as the end of execution of a directly proceeding upstream workflow block.

Data Triggers: These triggers are based on changes or conditions within a specific data set or source. For example, a workflow block may be triggered when a specific data field meets certain conditions, such as exceeding a threshold value, or when a new record is added to a database.

External triggers: These triggers are initiated by external resources such as systems or applications. For example, a workflow block may be triggered when a Web API call is received, or when a specific event occurs in an embedded application.

Manual triggers: Manual triggers require user intervention to initiate the execution of a workflow block. This may be done by interacting with the user, for example by clicking a button, or by manually launching the workflow via a user interface.

Conditional triggers are based on specific conditions or criteria. The workflow block is triggered only when the conditions defined in the trigger are met. For example, a block may be triggered when a particular input is entered, or when a specific status is reached/selected.

The above list is not intended to be exhaustive, and many additional triggers for workflow blocks may be designed according to the specific needs and requirements of a workflow.

In parallel, in the context of some disclosed embodiments, workflow block actions may refer to the specific tasks or operations that are performed as part of the overall process. The types of actions available in a workflow may vary depending on the workflow system or platform being used and workflow block actions may be performed by internal or external resources. Examples of actions associated with workflow blocks may include at least one of the following:

Data Manipulation Actions: These actions involve operations on data, such as creating, reading, updating, copying or deleting records in a database, transforming data formats, or performing calculations.

Communication Actions: These actions involve sending signals such as alerts, messages, or notifications to users or internal or external systems to provide other systems with information, such as updates, request information from external systems, such as feedback for an input, or trigger further actions in remote and internal systems. These notifications may be sent via any type of user interface (i.e., communication channel e.g., email, SMS, instant messaging, vocal message) or API, respectively.

Decision Actions: These actions enable a workflow to branch or take different paths based on the outcome of a condition. For example, executing different actions based on the value of a data field or the result of a calculation.

Control Workflow Actions: These actions involve managing the flow and execution of the workflow itself. They include actions like starting or stopping a workflow, pausing/resuming workflow execution, or triggering sub-workflows or subprocesses.

User Interaction Actions: These actions involve facilitating user input and interactions within the workflow. They may include displaying forms or interfaces for users to enter data, select options, or make decisions within the workflow process.

The above list is not intended to be exhaustive, and many additional actions for workflow blocks may be designed according to the specific needs and requirements of a workflow.

In addition, workflow blocks 202 may be configured to utilize at least one variable. Workflow block variables may refer to placeholders used to store and manipulate data within a workflow block or the entire workflow. Variables may include input variables for receiving data, output variables for storing results, temporary variables for intermediate computations, control variables for flow control, and context variables for contextual information. Workflow block variables may provide and enhance adaptability, control, and flexibility of workflows by enabling the manipulation and transformation of data along the trigger-action flow. Workflow block variables may be either local or global, meaning that they are either limited to a specific block of a workflow or accessed, modified, or updated by different workflow blocks throughout the entire workflow. It is to be appreciated that some workflow blocks may not be configured to utilize any variables. An example of a workflow block that is not configured to use a variable could be a "Notification Display" block. This block's purpose might be to display a predetermined notification message to the user without requiring any dynamic input. The content of the notification message would be fixed and defined within the configuration of the workflow block itself. The block would simply display the message as part of the workflow process, without needing to interact with or utilize any variables.

Workflow blocks 202 may be categorized as a function of the at least one received trigger and the at least one implemented action, and/or a specific type of variable they utilize. For example, a workflow may include a start block and at least one end block depending on the number of branches included in the workflow. These workflow blocks are respectively placed at the beginning of the workflow and at the end of the workflow branches. A start block may be configured to receive a manual trigger such as a user clicking a button to initiate the execution/running phase of a workflow and accordingly implement a control workflow action. Similarly, an end block may be triggered by an event trigger corresponding to the end of execution of a penultimate workflow block in a workflow branch to stop the workflow and therefore implement a control workflow action. Start blocks and end blocks may not be configured to utilize any type of variables. In another example, a workflow may include one or more decision blocks, these blocks are usually located at a branching point of workflow where the trigger-action flow splits into two or more distinct ramifications, each leading to a different set of tasks or actions. As their name suggests, these blocks implement decision actions and may be triggered by an event corresponding to the end of execution of a connected upstream workflow block. Referring to FIG. 2, workflow diagram 200 includes at least two decision blocks namely 202-3 and 202-4, which define the first, second and third branches of workflow diagram 200. Alternatively, a workflow block may also be categorized as a trigger block or an action block, i.e., a workflow block that substantially behaves as a trigger for subsequent downstream workflow blocks or essentially performs an action such as a data manipulation action, for example. Action blocks inherently follow trigger blocks, and trigger blocks often constitute the beginning of a workflow. The different types of workflow blocks available in a workflow may vary depending on the workflow manager or platform being used, and many additional actions for workflow blocks may be designed according to the specific needs and requirements of a workflow. For example, a workflow may include an AI block, i.e., a block with Artificial Intelligence functionalities or a switch block a particular type of decision block configured to direct trigger action flow to one or more workflow branches. Additional details regarding these two types of blocks are provided in the sections below. Blocks of differing types may be associated with different visual designs. For example, a start block may have a different shape than a decision block.

In order to implement the functionality of workflow blocks 202, at least one of an input field or an output field may be required. An input field may refer to the data that a workflow block needs in order to execute its tasks. It represents the input or the information required for the block to perform its intended operations. This input may be provided by a user, or it may be generated from a previous workflow block. On the other hand, an output field may refer to the data that a workflow block may produce or send to a subsequent workflow block. It represents the output or the result generated by the block after it has executed its tasks. This output may be used as input for another block in the workflow sequence. In addition to that some workflow blocks may be associated with at least one resource to be functional. As used herein, a resource may refer to any element or entity that is required to carry out or complete a specific task or process. Resources may include various types of inputs, assets, or capabilities that are needed to perform the activities within a workflow and may encompass a wide range of items such as a data source, a file, software, an application, or a digital tool. For example, if the task of a workflow block corresponds to sending an email using a particular mailbox, the mailbox is associated with the workflow block to implement its functionality. It should be noted that some of the actions implemented by workflow blocks may be directly executed by the resources, in which case the action implemented by workflow blocks corresponds to the sending of instructions/commands to the associated resources. Taking the previous example, the mailbox is effectively sending the e-mail, and the workflow block is configured to send instructions (e.g., e-mail text, recipient, subject line . . . ) to the mailbox.

The triggers and actions of workflow blocks and by extension the type of workflow blocks, as well as the input/output fields and associated resources of workflow blocks, are determined during a configuration/construction phase of a workflow. Generation, construction, or placement of a workflow block on a canvas may be performed in different ways. For example, in some embodiments a user may start the creation of a workflow block from scratch, defining the at least one trigger to be received and the at least one action to be implemented, the input/output fields as well as the variables to be used or processed by the workflow block. This situation usually arises when a workflow requires a relatively specific workflow block. However, many different workflows share similar workflow blocks. Therefore, in another scenario, a workflow block may be created or generated using workflow block templates. Workflow block templates may be accessed and selected via a repository or a library of workflow block templates. A library of workflow block templates may include public workflow block templates i.e., created and shared by a plurality of users or developers associated with a workflow management platform, private workflow block templates i.e., created by a specific user and saved by the specific user for subsequent use, or a combination thereof. When a workflow management platform employs a canvas for workflow management operations the library may be displayed on the canvas or in association with the canvas. Selection of workflow blocks or placement of workflow blocks on a canvas from the library of template workflow blocks may be performed in a plurality of different ways. In some embodiments, placement of template workflow blocks may be performed by receiving a selection of workflow block templates from a displayed library of template workflow blocks or by dragging and dropping workflow block templates from the displayed library to the canvas, as described below in relation to FIGS. 3A-B. In some embodiments, workflow block templates may be associated with a functionality description. This functionality description may be configured to inform a user about the capability and functionality of a workflow block template as well as ways to incorporate the workflow block template inside an existing workflow diagram. A workflow template or a workflow block template refers to a pre-configured group of two or more blocks that serves as a starting point or an intermediate section of a workflow. In some embodiments, the library of workflow templates may include the functionality description associated with the workflow templates. Accordingly, the functionality descriptions may be presented on a display in association with the workflow block templates. Additional information may be also included in the library of workflow templates. For example, the library of workflow block templates may include dates of creation of workflow block templates, lists of resources to be used in relation to the workflow block template, lists of input/output fields, types of operation performed by workflow block templates, types of block, names of creators or any additional information that may help to define the workflow block template. In an alternative example, if the workflow block templates are public, the library of workflow block templates may include user feedback on using workflow block templates.

Figure 3A:
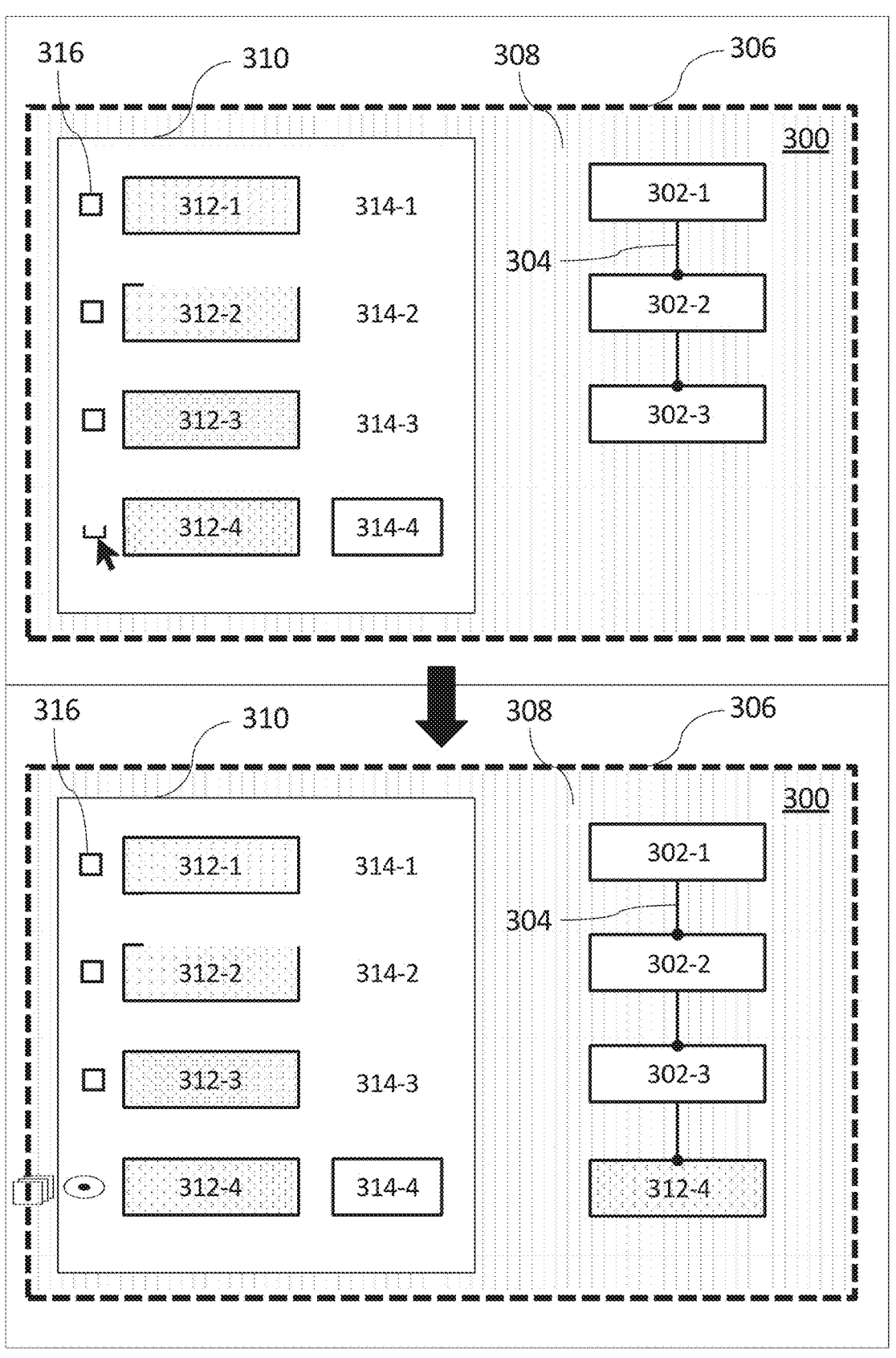
FIG. 3A is a first exemplary use case wherein a workflow block template is added to a workflow diagram using a library of workflow block templates, consistent with some disclosed embodiments.

The reception of a selection of workflow block templates from a displayed library of template workflow may be performed for example by using a Graphic User Interface (GUI) component. Within the context of this disclosure, a GUI component may refer to any kind of visual element or control that enable users to interact with a GUI. Examples of GUI components may include buttons, checkboxes, lists, sliders, bars, text fields, or additional GUI elements depending on the specific needs and design of the GUI. FIG. 3A includes two panels, the top panel represents an exemplary workflow diagram 300 associated with an exemplary workflow including a plurality of workflow blocks 302 (302-1 through 302-3) interconnected by a plurality of logical connections 304 and presented on a display 306 utilizing a workflow canvas 308. FIG. 3A further illustrates a library of workflow block templates 310 displayed on display 306 in association with canvas 308. Library 310 includes four distinct workflow block templates 312 (312-1 through 312-4) and their associated functionality description 314 (314-1 through 314-4). For the sake of clarity, the visual design of each workflow block template 312 is separate from the others.

A library of workflow block templates may include more workflow block templates than may fit on a display, in that situation additional GUI components such as a scroll bar may allow a user to explore the entire library. In the top panel of FIG. 3A, selection of a workflow block template is performed by selecting one of the checkboxes 316. In this case, the user who created and who is designing workflow diagram 300 wishes to add template workflow block 312-4 to workflow diagram 300. To that end, checkbox 316 associated with workflow block template 312-4 is ticked. After reception of the selection of workflow block template 312-4 (checkbox ticked), this latter is automatically added to canvas 308 and to workflow diagram 300 as illustrated in the bottom panel of FIG. 3A. In the bottom panel of FIG. 3A workflow diagram 300 now includes four workflow blocks 302-1 through 302-3 and 314-4. In the example shown in FIG. 3A, workflow block template 312-4 has been added to the end of workflow diagram 300, however, it should be appreciated that workflow block templates may be added to any level of a workflow diagram and that the exact location of a workflow block template may be selected prior to invoking the library of workflow block templates or when selecting a workflow block template using, for example, a GUI component associated with a canvas. In the situation of FIG. 3A, logical connections 304 have been automatically added in relation to workflow block template 314-4, but in alternative situations, logical connections may not be created. In any case, users always have the option of moving and adjusting the location of workflow blocks once they are on the canvas as well as the logical connections interconnecting the blocks.

Figure 3B:
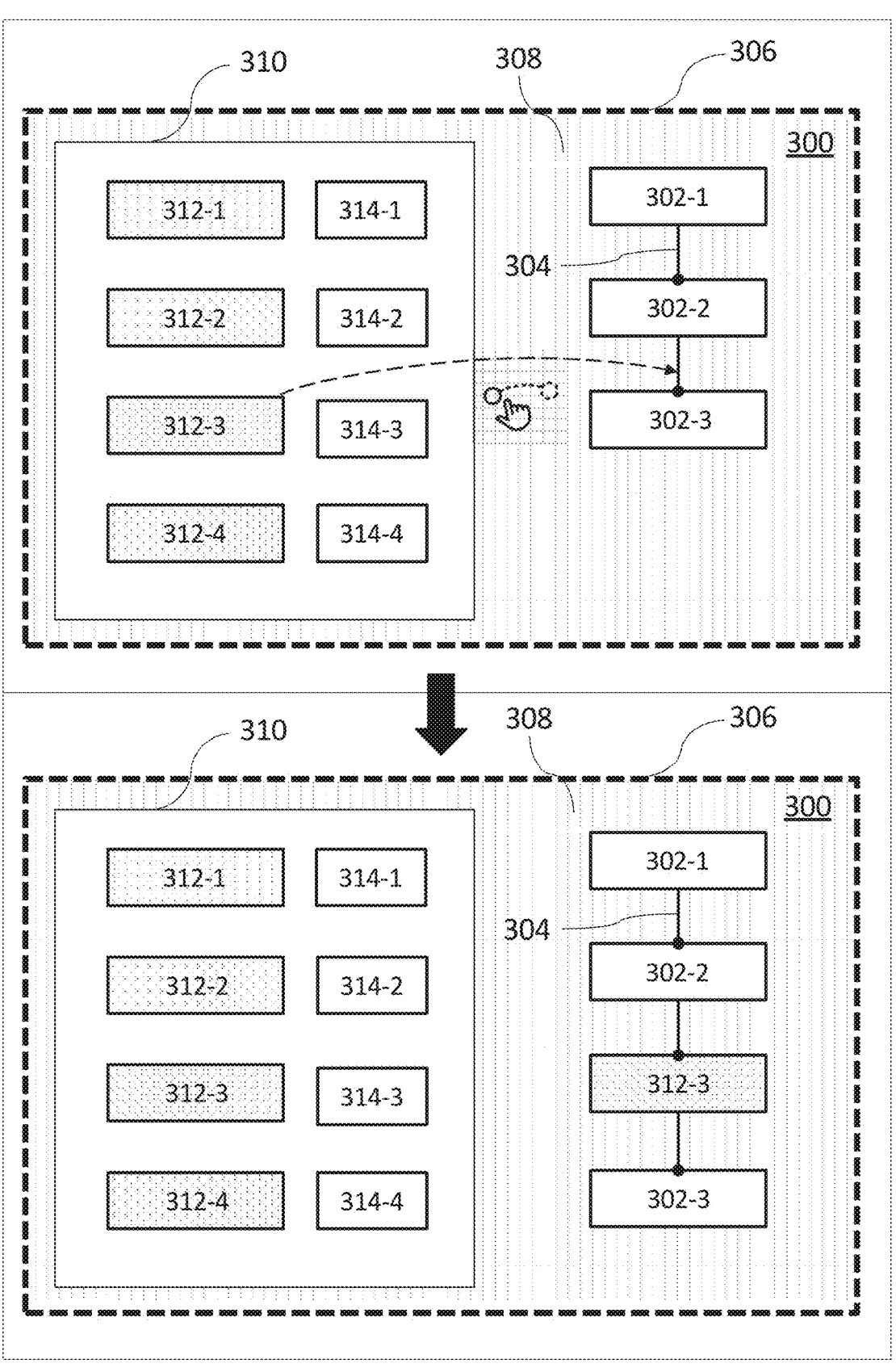
FIG. 3B is a second exemplary use case wherein a workflow block template is added to a workflow diagram using a library of workflow block templates, consistent with some disclosed embodiments.

As mentioned above, the reception of a selection of workflow block templates from a displayed library of template workflow may be performed by dragging and dropping workflow block templates from the displayed library. FIG. 3B depicts a situation similar to that shown in FIG. 3A, where a user adds a workflow block template (in this case, workflow block template 312-3) to workflow diagram 300, with the difference that workflow block selection is performed by dragging and dropping workflow block template 312-3 from the displayed library 310 to canvas 308, as illustrated by the dashed arrow and associated icon on the top panel of FIG. 3B. Once the user has dropped workflow block template 312-3 onto canvas 308 and more specifically between workflow block 302-2 and workflow block 302-3, workflow block template 312-3 is automatically added to the workflow diagram 300 at the designated location as illustrated in the bottom panel of FIG. 3B. Similarly, logical connections 304 are created between workflow block template 312-3 and workflow blocks 302-2 and 302-3. Starting from the situation shown in the bottom panel of FIG. 3A or 3B, the user designing workflow diagram 300 is able to modify (e.g., add additional workflow blocks) and further configure workflow diagram 300 using canvas 308.

Figure 3C:
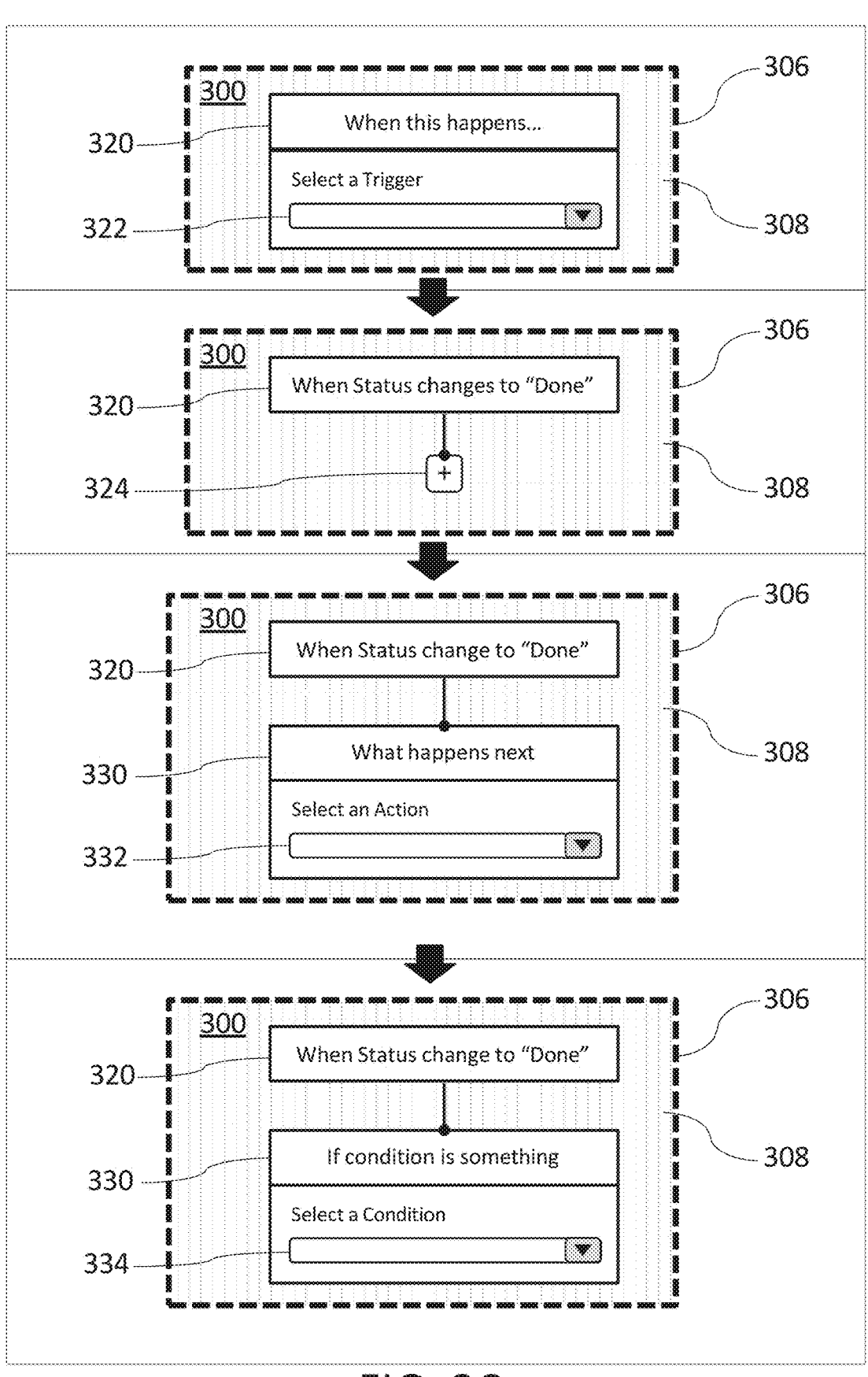
FIG. 3C is an exemplary use case wherein the configuration phase of a workflow is facilitated via interaction with multiple GUI components displayed alongside a canvas, consistent with some disclosed embodiments.

In alternate embodiments, the process of configuring or constructing a workflow could be enhanced through the utilization of several graphical user interface (GUI) components. These components are designed to simplify the creation of workflow blocks by interacting with various factors, including triggers, actions, input and output fields, variables, and necessary resources for block execution. FIG. 3C provides visual examples of distinct instants within the workflow configuration phase, where the integration of multiple GUI components alongside a canvas contributes to the facilitation of the construction process. In the uppermost panel of FIG. 3C, a user initiates the configuration phase by introducing a first block 320 and opting for a trigger through a trigger drop-down menu 322. As soon as the trigger is chosen, the descriptive label of block 320 undergoes modification to mirror the selected trigger, as portrayed in the second panel of FIG. 3C. Furthermore, an additional "+" button emerges, serving as an invitation for the incorporation of a subsequent block. Upon user engagement with this button, say, by clicking it, a second block 330 emerges on the canvas. Concurrently, a graphical user interface (GUI) provides guidance for the selection of an action via an action drop-down menu 334, as showcased in the third panel of FIG. 3C. If the user opts for a decision action, the descriptive label and GUI attributes of the second block 330 adapt to echo this decision. Subsequently, the GUI of the second block 330, suggests the selection of a condition through a condition drop-down menu 334. This is depicted in the fourth and final panel of FIG. 3C. This iterative configuration process can continue until the user achieves contentment with the overall design. It is to be appreciated that workflow diagram 300 displayed on canvas 306 in conjunction with display 308 in FIG. 3C is purely illustrative. At each block, other parameters may be solicited (e.g., variables, resources). Moreover, while drop-down menus 322, 332, and 334, along with the "+" button 324, serve as examples of GUI components aimed at simplifying the construction of the workflow diagram, various other types of GUI components can be introduced to facilitate parameter selection and the comprehensive diagram configuration. These may include buttons, sliders, checkboxes, and text input fields, among others.

Figure 4:
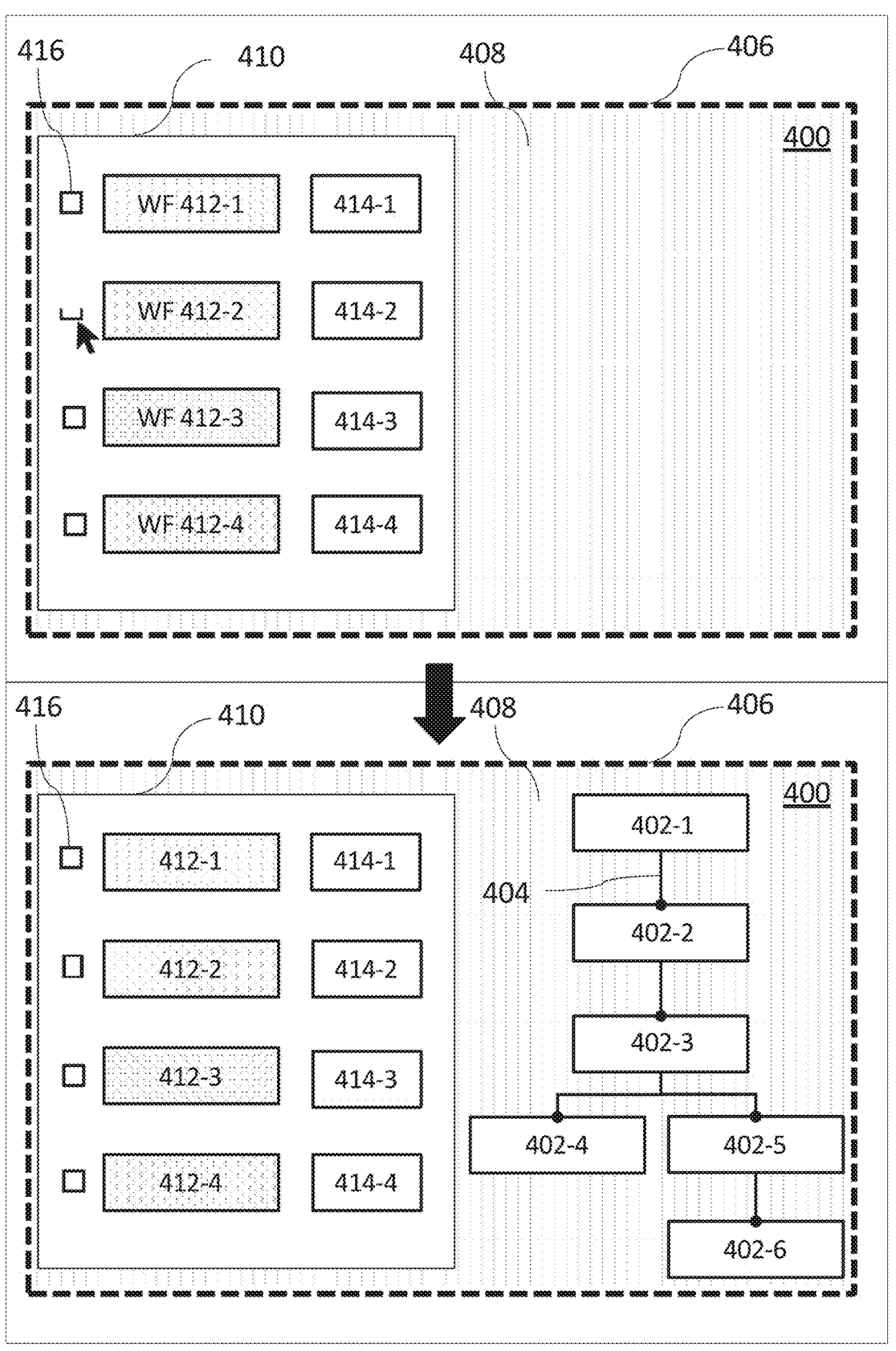
FIG. 4 is an exemplary use case wherein a workflow diagram is created from a workflow template using a library of workflow templates, consistent with some disclosed embodiments.

In some situations, a workflow configuration/construction phase may start directly with a complete workflow template. Similar to what has been described for workflow block templates, workflow templates may be accessed and selected via a workflow template library. A workflow template library may include public workflow templates, i.e., created and shared by a plurality of users or developers associated with a workflow management platform, private workflow templates, i.e., created by a specific user and saved by that user for later use, or a combination of both. When a workflow platform uses a canvas for workflow operations, the library may be displayed on the canvas or in association with it. Selecting workflow templates or placing workflow templates on a canvas from the library of workflow templates may be done in different ways. In some embodiments, workflow template placement may be performed by receiving a selection of workflow templates from a displayed library of workflow templates, or by dragging and dropping workflow templates from the displayed library to the canvas. FIG. 4. Illustrates a situation wherein a user adds a workflow template to a blank canvas 408 to generate a workflow diagram 400. Canvas 408 is presented on display 406, presenting a library of workflow templates 410 as well, comprising four workflow templates WF 412 (412-1 through 412-4) with their associated functionality description 414 (414-1 through 414-4). For the sake of clarity, the visual design of each workflow template 412 is separate from the others.

A library of workflow templates may include more workflow templates than may fit on a display, in that situation additional GUI components such as a scroll bar may allow a user to explore the entire library. In the top panel of FIG. 4, a workflow block template is selected by ticking one of the checkboxes 416. In this case, the user who is designing workflow diagram 400 wishes to start the design with template workflow 412-2. To that end, checkbox 416 associated with workflow template 412-2 is ticked. After reception of the selection of workflow template 412-2 (checkbox ticked), this latter is automatically added to canvas 408 and to workflow diagram 400 as illustrated in the bottom panel of FIG. 4. Workflow diagram 400 now includes six workflow blocks 402-1 through 402-6 interconnected with logical connection 404. It is to be appreciated that the user designing workflow diagram 400 may have in an alternative scenario dragged and dropped workflow template 412-2 from workflow template library 410 onto canvas 408 in a manner similar to what has been described in relation to workflow block template in FIG. 3B. Starting from the situation shown in the bottom panel of FIG. 4, the user designing workflow diagram 400 is able to modify (e.g., add additional workflow blocks) and further configure workflow diagram 400 using canvas 408.

The use of workflow block templates or workflow templates may greatly expedite the configuration/construction phase for a workflow diagram. Instead of starting from scratch each time a new workflow is needed, templates (workflow template or workflow block template) provide a pre-defined structure and set of functionalities that may be reused. By utilizing templates, users may save time and effort by not having to reinvent the wheel for common workflow patterns or processes. Users may select a template that closely matches their requirements and then customize it to fit their specific needs. While some templates may be used immediately after selection, most often they need to be configured or adapted to align with the user's specific requirements. This customization process involves defining triggers and actions, specifying input and output fields, setting up variables, identifying required resources, or a combination of these factors for each workflow block within the template.

Some templates may come preconfigured with certain of the above-listed factors. These preconfigured templates provide a more specific starting point for users and may align closely with common use cases. The level of configuration in a template may vary depending on the workflow management platform being used. Some templates might be fully preconfigured and ready to use out-of-the-box, requiring minimal or no customization. These templates are designed to address common workflows or tasks that many users encounter. Other templates may have partial pre-configuration, where certain aspects of the workflow are already set up, but additional customization is still required. For example, a template might have predefined triggers and actions, but the user needs to specify the specific data inputs and outputs, configure variables, or adjust resource requirements to match their specific needs. However, even with preconfigured templates, it may be beneficial to review and adapt the template to ensure it aligns with the user's specific requirements. Workflows often have unique characteristics, dependencies, or integrations that require customization, and templates serve as a foundation that may be modified to meet those specific needs. So, while preconfigured templates may expedite the configuration process, users should still expect to perform some level of customization to ensure the workflow aligns with their specific requirements. To facilitate the editing of workflows, particularly workflow blocks, a GUI component integrated with the canvas may be employed. For instance, when a user clicks on a workflow block, a dialogue box may be displayed in association with the canvas. This dialogue box enables users to configure various parameters of the workflow block, including triggers, actions, input/output fields, variables, and resources. By utilizing this dialogue box, users can conveniently customize and fine-tune the settings of individual workflow blocks to suit their specific requirements. In some cases, workflow can be configured with various parameters either before placement of the next workflow block, or at any time during the configuration/construction phase.

As mentioned previously, during a workflow configuration/construction phase, a user may be required to define various parameters for the workflow, including parameters for individual workflow blocks. One aspect of these parameters is the allocation and utilization of resources within the workflow. Resources in this context refer to the assets, capabilities, or components that the workflow requires to perform its tasks effectively, i.e., to be functional. These resources may vary depending on the nature of the workflow and the specific requirements of the tasks involved (e.g., data source, file, software, application, digital tool . . . ).

Resources may be divided into two categories: internal resources and external resources. Internal resources are owned, controlled, or managed by the user implementing the workflow. They are within the direct purview and control of the workflow and may be readily accessed and utilized. For example, referring to FIG. 1, internal resources may include a combination of tables, text documents, dashboards, and applications (private, public or both) controlled by a user wishing to implement a workflow via the workflow manager 110 and affiliated with an existing user's account (managed by user manager 112). Additionally, or alternatively, internal resources may refer to intrinsic data, i.e. data or results generated by specific workflow blocks during the execution of the workflow. Additionally, or alternatively, internal resources may refer to multiple products of a single platform, that manage and operate them (such as Office Suite™, Google Suite™ and the Monday.com Suite™ including workflow management, sales CRM, Monday Dev etc.) On the other hand, external resources are provided by entities external to the existing user's account and may include databases, file systems, web applications, servers, IoT devices, or third-party data providers. These resources are accessed and utilized by the workflow pending integration and obtention of some form of authorization or permission from the external provider, for example via an API. The specific authorization process may vary depending on the type of resource and the policies set by the external provider. In the context of the present disclosure, an API may refer to a set of rules and protocols that enable different software applications to communicate and interact with each other, thus allowing users to access functionalities and services provided by external systems. An API aims to ease integration and interoperability between software systems by defining standardized methods, data formats and interaction conventions.

It is to be appreciated that even though two existing user accounts (e.g., user account 112-11 and user account 112-12) may fall within the borders of an entity account (e.g., entity account 112-1), the internal resources of one account may not be necessarily be shared with the other. Therefore, internal resources of one user account may be considered external resources for another account within the same entity account. This division between internal and external resources may help in managing and integrating resources within the workflow. It distinguishes the resources directly controlled by the existing user's account from those that require external integration and authorization, providing a clear understanding of the resource landscape for workflow implementation.

Figure 5:
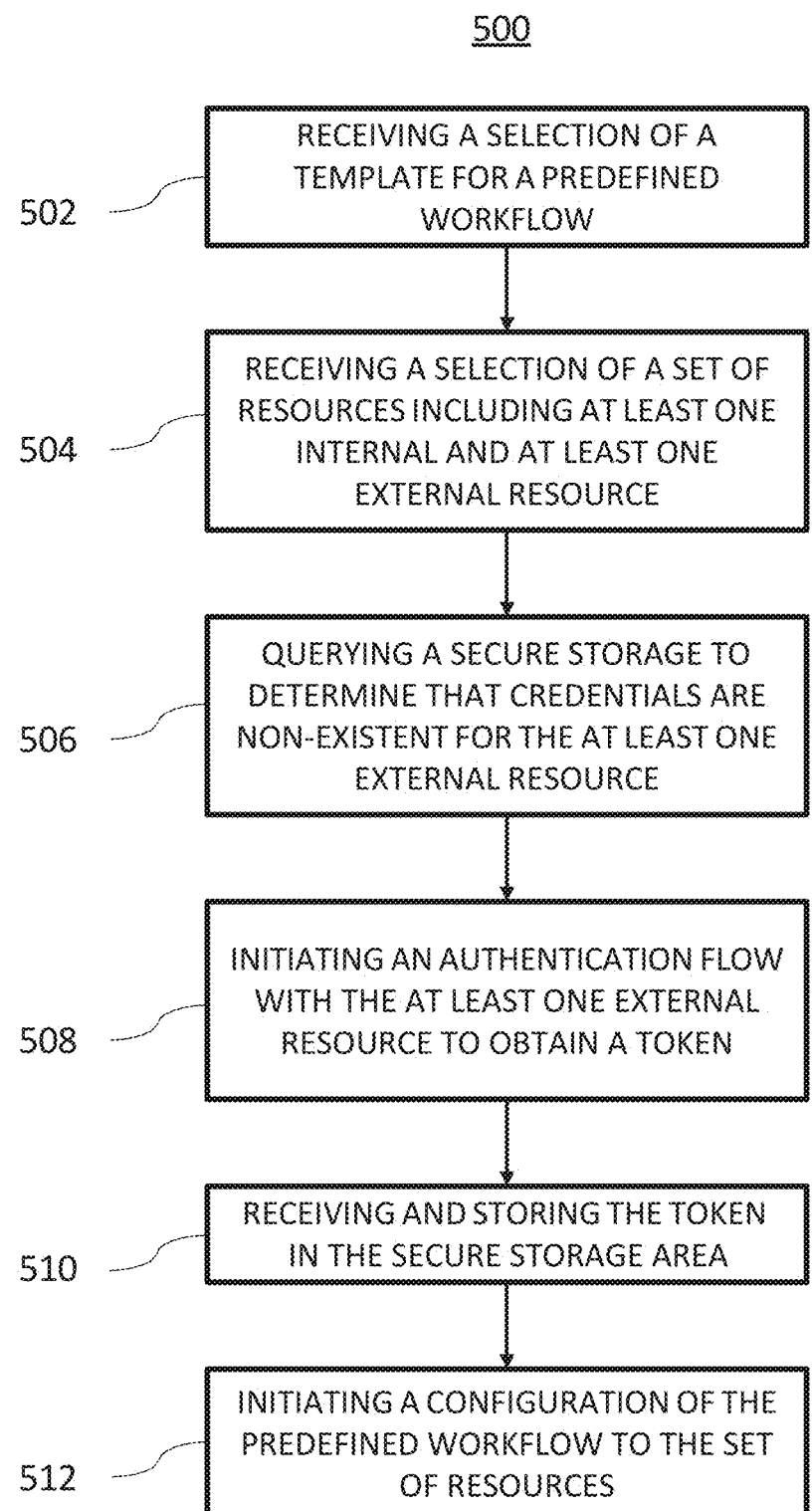
FIG. 5 is a flowchart of an exemplary process for performing operations for applying workflows to internal and external resources, consistent with some disclosed embodiments.

FIG. 5 is a flowchart of an exemplary process (500) for performing operations for applying workflows to internal and external resources. Process 500 is discussed herein for explanatory purposes and is not intended to be limiting. In some embodiments, steps of process 500 may be changed, modified, substituted, or rearranged, consistent with the present disclosure. Process 500 may be implemented using one or more components of a computing device 2100 (discussed in FIG. 21) or user device 2220 of computing architecture 2200 (discussed in FIG. 22). Some disclosed embodiments may include at least one processor that may be configured to execute stored instructions to perform operations for applying workflows to internal and external resources. As shown in FIG. 5, process 500 may include steps 502, 504, 506, 508, 510, and 512 discussed in further detail below.

Figure 6:
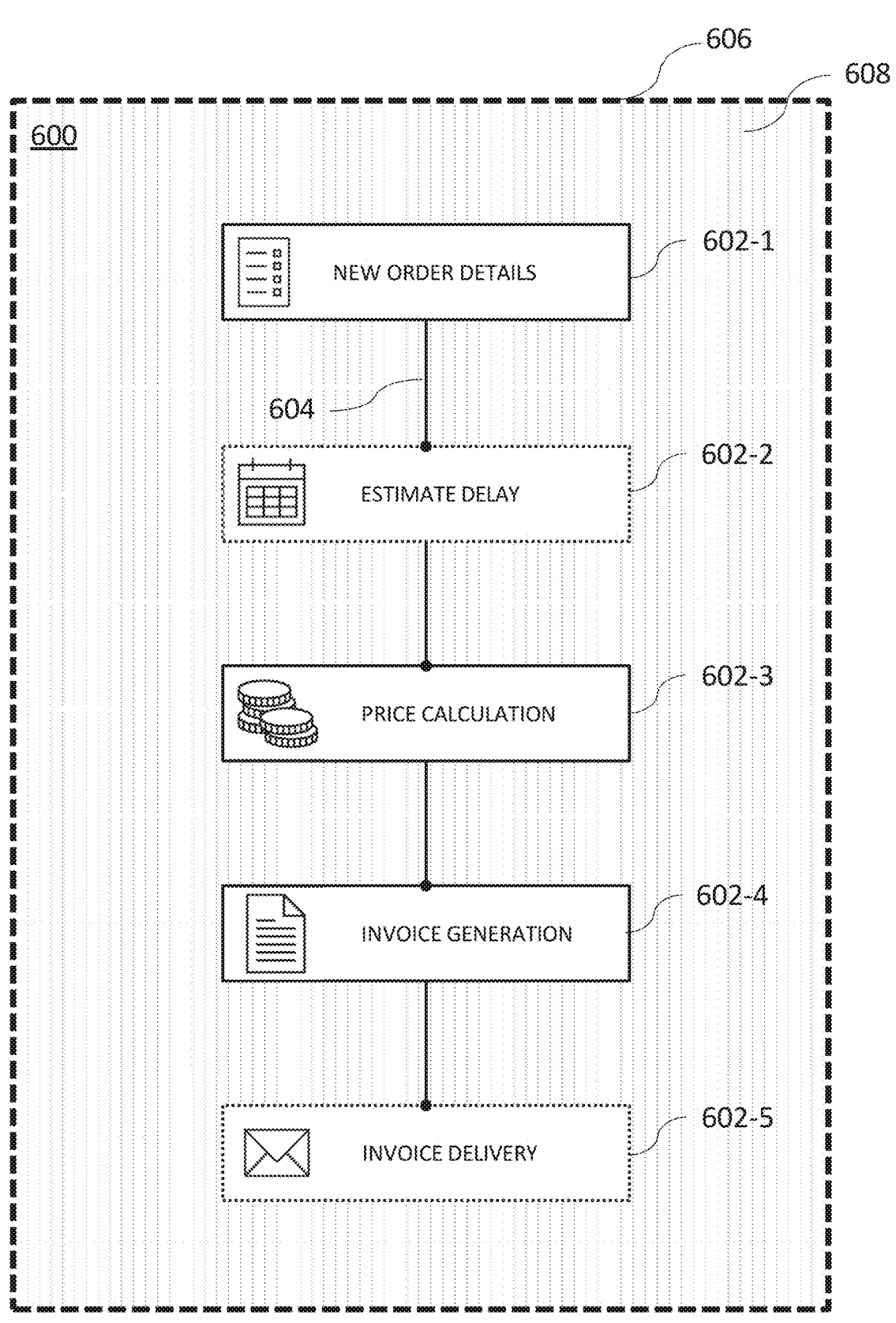
FIG. 6 is an exemplary workflow diagram presented on a canvas, including a plurality of interconnected blocks associated to a plurality of resources, consistent with some disclosed embodiments.

FIG. 6 depicts an exemplary workflow diagram 600 of a workflow initiated by a user of SaaS platform 100, which necessitates being implemented by allocating a plurality of resources. In this example, the user of SaaS platform 100 is a sales representative employed by a company that wishes to create a workflow for delivering an invoice to a customer of the company following an order. Referring to FIG. 1 the company may control one of the entity accounts (112-1 through 112-M) and the sales representative as a user of SaaS platform 100 may be affiliated with an existing user account that belongs to the one of the entity accounts managed by the company. Workflow diagram 600, presented on display 606 utilizing a workflow canvas 608, includes five interconnected workflow blocks 602 (602-1 through 602-5) and a plurality of logical connection 604. With respect to the workflow diagram presented in the preceding figures, the visual design of the workflow blocks is enhanced, featuring descriptive labels and iconography aiding in understanding the function performed by the blocks. Each workflow block 602 represents a particular task involved in the process of delivering an invoice to a customer following an order. More specifically:

Workflow block 602-1—New order trigger: This block serves as a trigger block for initiating the tasks performed in the following workflow blocks. For example, workflow block 602-1 can be connected to an incoming orders table, and when a new order is inserted thereto, the generation of a new order ID will result with the actuation of workflow block 602-1. A further purpose of this block is to obtain the customer order detail. For example, an order ID may be provided as an input field or via user input, and the block will retrieve the order details corresponding to the order ID from an internal database controlled by the sales representative such as a table. Examples of order details may include the name of the customer, the content of the order (products, quantity etc.), a mode of delivery, an e-mail address, or one or more additional data associated with the customer order. These order details may then be included in the output fields of workflow block 602-1 and utilized by downstream workflow blocks (602-2 through 602-5). In some cases, the details are obtained in the form of a Json object corresponding to the order ID, such that in addition to the information itself, also the hierarchy of the information is also obtained. In some cases, the workflow block is provided with pointers to the corresponding storage position in a Database in which the object details are located.

Workflow block 602-2—Estimate delay: This block estimates the expected readiness and delivery time for the customer's order. The estimation may be performed by checking the next available slot in the company's production line schedule (associated with a production account) or by utilizing an external calendar application used by the company's production lines. In some cases, a formula, an external app or any combination thereof can be used to calculate the estimated date.

Workflow block 602-3—Price calculation: The goal of this block is to calculate the total price of the customer order, including any applicable taxes, discounts, or additional charges. This may involve utilizing the order details (products, quantity . . . ) fetched by workflow block 602-1 in conjunction with an application or a table containing formulas or macros controlled by the sales representative. In some cases, workflow may access sections of private resources, given that the builder of the workflow enabled it, in order to use private information in calculations made by the workflow blocks. For example, the workflow block can be connected to an internal resource having a client list with discount percentages for each of them. In order to conform with privacy policies, the workflow block may have partial access, or specifically an access only to an item in that private resource that is associated with the order ID information.

Workflow block 602-4—Invoice generation: Using an invoicing application or a text document template, workflow block 602-4 generates an invoice based on the order details fetched by workflow block 602-1 and the price calculated by workflow block 602-3.

Workflow block 602-5—Invoice delivery: Workflow automatically sends the invoice generated by workflow block 602-4 to the customer using the fetched order details. For example, it may generate and send an email using an email box external to SaaS platform 100 and to the sale representant account.

Workflow blocks 602, interconnected through logical connections 604, form a sequence of tasks that enable the sales representative to effectively deliver an invoice to a customer following an order. To implement the functionality described, a combination of internal and external resources is utilized. In more detail, the internal resources (blocks with solid borders) include an internal database for fetching order details (602-1), an application or table for price calculation (602-3), and an invoicing application or text document template for invoice generation (602-4). These internal resources are engageable and/or controlled by the sales representative or under the direct purview of workflow 600. The external resources (blocks with dotted borders) consist of a production line schedule or calendar application for estimating the order delay (602-2) and an external email box for invoice delivery (602-5). These resources are provided by entities external to the sales representative's account and require integration and authorization. The visual design modifications in FIG. 6 emphasize the distinction between internal and external resource dependencies within the workflow diagram.

Some disclosed embodiments may involve receiving a selection of a template for a predefined workflow to be implemented in an existing user's account having at least one internal resource. A selection is a choice or a pick. For example, the choice or pick may be from a group or set of options. A selection may be received by a computer system or processor when one or more signals associated with the selection are obtained by the computer system or processor. When selecting a workflow template for a predefined workflow, a user, who is associated with the existing user's account, may choose from a range of available workflow templates. Once a template is selected, a predefined workflow corresponding to the chosen template is identified and made ready for implementation in the existing user's account. The selection process may be carried out in different ways, including using a repository or a library of workflow templates, as described in the above sections in relation to FIG. 4. An example of receiving a selection is exemplified as step 502 of FIG. 5. With reference to the example illustrated in FIG. 6, the sales representative may select a template from a workflow template library displayed alongside canvas 608. This selection may be made by ticking a checkbox or by dragging and dropping the template from the library onto canvas 608. This may cause an associated signal to be sent to a processor. Once the template is chosen, the predefined workflow depicted by workflow diagram 600 is added to canvas 608.

Consistent with some disclosed embodiments, the existing user's account may contain at least one internal resource, i.e., resources engageable and/or directly controlled by the user implementing the workflow and within the immediate scope or control of the predefined workflow. For example, the sales representative's account may control a plurality of internal resources, including an internal order database, an application or table for price calculation and an invoicing application.

Some embodiments may further include an additional step of maintaining a repository that houses a plurality of predefined workflow templates. In such cases, the template for the predefined workflow is selected from the repository. As used herein maintaining a repository refers to preserving, keeping, or sustaining information in one or more storage locations. In some instances, maintaining may also include ongoing management and care of repository. A predefined workflow template refers to a pre-designed or pre-formatted document, file, or structure that serves as a starting point for establishing a workflow. It is to be appreciated that the template for a predefined workflow may not be directly affiliated with any specific resources needed to implement its functionality. As depicted in FIG. 6, once the template is selected, the resulting workflow diagram 600 may be independent of the actual resources required for its execution. The template serves as a blueprint or guide for the workflow structure and sequence of tasks. It outlines the logical flow and arrangement of tasks, but it does not inherently include the specific resources or data sources needed to carry out those tasks.

In some embodiments, the predefined workflow may include a plurality of blocks interconnected by logical connections and arranged in at least one branch. As discussed previously, blocks represent individual steps or actions for performance within a workflow and logical connections, which may be represented by arrows or lines, illustrate the flow and sequence of tasks between blocks. For example, as illustrated in FIG. 6, workflow diagram 600 includes five workflow blocks (602-1 through 602-5) interconnect by a plurality of logical connections 604 and arranged in one branch. Additionally, in some embodiments, each block of the plurality of blocks may be configured to receive at least one trigger, implement at least one action, and at least some of the plurality of blocks may be configured to utilize at least one variable. The at least one trigger and the at least one action may encompass any of the triggers and actions described throughout the present disclosure. For example, in some embodiments, the at least one trigger may include at least one of a time-based trigger, an event-based trigger, a data trigger, an external trigger, a manual trigger, a conditional trigger, or a combination thereof, and the at least one action may include at least one of a data manipulation action, communication action, user interaction action, control workflow action, decision action, or a combination thereof. Definitions of these terms are provided hereinabove. In some embodiments, workflow blocks may be preconfigured with at least one action specific to the block, and require at least one resource as an input/output.

By way of one example, referring to FIG. 6, workflow blocks 602 are triggered by event-based triggers which are determined based on a receipt action that corresponds to the trigger mechanism that was preconfigured for workflow block 602-1 located at the beginning of the workflow execution plan, or on the completion of tasks in directly preceding upstream workflow blocks for workflow blocks 602-1 through 602-5 given that there are preceding workflow blocks. The actions implemented within each workflow block are tailored to their specific purposes. Workflow blocks 602-2 through 602-4 perform specific data manipulation actions that involve creating and reading data. Workflow block 602-5 on the other hand, executes a communication action by sending an email to the company's customer. Finally, workflow block 602-1 may be triggered by either one of a user interaction action, which requires an input of an order ID from the user, and a data manipulation action that automatically retrieves order details from an internal order database given a fulfillment of a predefined condition inherent to that type of workflow block.

Some disclosed embodiments may involve receiving a selection of a set of resources from a plurality of resources to implement the functionality of the predefined workflow, wherein the selection of the set includes the at least one internal resource of the existing user's account and at least one external resource accessible via an API. An example of receiving a selection of a set of resources is exemplified as step 505 of FIG. 5. By way of example, the plurality of resources may contain all resources available to the existing user's account. This encompasses the at least one internal resource that is under the control of the existing user's account. Furthermore, it may include at least one external resource managed by a user account different from the existing user's account but within the same entity account or provided by an entity external to the existing user's account. Additionally, a catalogue of external resources provided by a workflow management platform may be part of the available resources. This catalogue serves as a collection of external resources that users may select and integrate into their workflows, enhancing the functionality and capabilities of the predefined workflow. This may include various digital tools or software accessible via an API. For example, one such resource could be a mailbox service.

The selection of the set of resources from the plurality of resources to implement the functionality of the predefined workflow may be performed through various means. In some embodiments, a user affiliated with the existing user's account may manually specify and select the desired set of resources by providing input through a user interface or via a configuration file or settings where the user may specify the required set of resources. This may involve the utilization of checkboxes, dropdown menus, or other interactive elements to choose the set of resources. For example, referring to FIG. 6, a graphical user interface (GUI) may be displayed in conjunction with canvas 608. In this scenario, a sales representative may have the option to select a set of resources (e.g., by dragging and dropping) from the available plurality of resources. In this example, the sales representative may choose the internal order database, pricing application, invoicing application, production line schedule, and mailbox service to implement the functionalities associated with workflow blocks 602-1, 602-3, 602-4, 602-2, and 602-5, respectively. This selection of resources corresponds to the overall functionality depicted in workflow diagram 600.

Alternatively, in some embodiments, an intelligent system or algorithm, e.g., having Artificial Intelligence (AI) capabilities, may analyze the predefined workflow and automatically determine the necessary resources and perform the selection of the set of resources, based on predefined rules or patterns. In some cases, the selection of the set of resources can be brought to the user for approval or amendment prior to implementing their association with their respective workflow blocks. This analysis may take into account the workflow's steps, and dependencies, and/or leverage contextual information such as the specific task, industry, or user role to identify the appropriate set of resources.

The selection process may be done for each individual workflow block, allowing specific resources to be chosen for each block. Alternatively, the selection may be made at the overall workflow level, where a set of resources is chosen to apply to the entire workflow. The chosen resources contribute to the functionality and capabilities of the workflow, and the selection method depends on the desired level of granularity and control for resource allocation.

Some embodiments may involve performing a pre-selection to generate a suggested set of resources from the plurality of resources. A pre-selection is an identification of a set of resources for assisting a user in selecting the appropriate resources for their workflow. This pre-selection may be based on one or more of the received trigger(s), implemented action(s), and utilized variable(s) within the blocks of the predefined workflow. The suggested set of resources may be made accessible to the user of the existing user's account, facilitating their resource selection process. In some cases, these suggested resources may be displayed in association with a canvas while the user is editing the template for the predefined workflow and selecting the set of resources. For instance, in FIG. 6, since workflow block 602-5 implements a notification action, a suggested set of resources may include a mailbox or email service to facilitate the sending of notifications. This suggestion is based on the specific requirements of the implemented action within that block. In certain embodiments, the suggested set of resources may, by default, include the at least one internal resource that is controlled by the existing user's account. This ensures that the user's resources are considered as part of the suggested set, providing a starting point for selecting additional external resources, if needed.

In some embodiments, a system used in conjunction with the workflow-building platform may identify a plurality of interconnected blocks that share a common resource. Upon utilizing this resource in a first interconnected block, the system could suggest employing the same resource as input for the subsequent interconnected block.

In some embodiments, for each block of the plurality of blocks of the predefined workflow, the at least one trigger may be configured to use data from the at least one internal resource, data from the at least one external resource, or a combination thereof and the at least one action may be configured to involve data from the at least one internal resource, data from the at least one external resource, or a combination thereof. "Involving data" refers to the incorporation or utilization of data within a particular process, task, trigger, or action. For example, the data may be actively used, processed, or manipulated to perform certain operations, which may include sending instructions or commands to relevant applications or systems. For instance, in reference to the example illustrated in FIG. 6, the action implemented by workflow block 602-5 may involve data from at least one internal resource and data from at least one external resource by sending an email comprising the generated invoice to the customer using an external mailbox and an internal email template accessible via the existing user account. In such a situation, workflow block 602-5 retrieves the predefined email template from the internal resource, which contains a standardized response message for order queries; populates the template with relevant information such as the customer's details, order specifics, and the generated invoice and, uses the configured external mailbox to send the customized email to the customer's email address.

In some embodiments, each block of the plurality of blocks may be configured to access data from the set of resources and variables involved in all preceding blocks in the workflow. "Accessing data from the set of resources and variables involved in all preceding blocks" refers to retrieving data from prior blocks or retrieving information associated with the data from prior blocks. For example, each block may inherit information processed by some or all upstream preceding blocks. The output or processed data from the previous blocks, for example, may be passed on as input to the subsequent blocks in the predefined workflow. As the workflow progresses, the information may flow from one block to another, with each block building upon the data processed by its upstream predecessors. This inheritance may help ensure that the output or results from earlier stages of the workflow are available and accessible to the subsequent stages. In the example of FIG. 6, each workflow block directly inherits and utilizes the information processed by its preceding upstream blocks. Workflow block 602-2 utilizes the data processed by workflow block 602-1 to estimate the delay for the order. Workflow block 602-3 inherits data from the internal order database, which has been processed by workflow block 602-1. Based on this inherited data, workflow block 602-3 may perform its data manipulation action, such as calculating the total price of the customer's order. Similarly, workflow block 602-4 also inherits data from the internal order database processed by workflow block 602-1. Additionally, it receives the price calculated by workflow block 602-3. With this inherited data, workflow block 602-4 generates the invoice to be sent to the customer. Finally, workflow block 602-5 inherits the information processed by all preceding blocks (602-1 through 602-4). Using this information, workflow block 602-5 performs its action of sending an email to the customer. The email may include details from the internal order database, the estimated delay for the order, and the generated invoice.

It is to be appreciated that not every workflow block requires or utilizes all the information available from the preceding blocks. Each block may only need to access and utilize a specific subset or portion of the inherited information to perform its designated tasks or actions. For example, in FIG. 6, workflow block 602-3 may not need the delay estimated by workflow block 602-2 to calculate the total of the order. The necessary data for calculating the order total, such as item prices, quantities, or discounts, may have been processed and provided by workflow block 602-1. Therefore, block 602-3 may focus on performing the calculation solely based on the relevant data it has inherited from block 602-1, without needing the additional information from block 602-2

In some embodiments, each block of the plurality of blocks may be associated with a single resource from the set of resources. For example, in workflow diagram 600 each workflow block may be associated with a single resource of the set of resources selected by the sales representative. More specifically, blocks 602-1, 602-3, and 602-3 are each associated with a different internal resource and blocks 602-2 and 602-5 are associated with differing external resources. It is to be appreciated that two workflow blocks may be associated with a same single resource from the set of resources. Alternatively, some of the blocks of the plurality of workflow block may be associated with a plurality of resources from the set of resources. For example, workflow block 602-5 may send the generated invoice to the customer by using both an external mailbox and an internal email template accessible through the existing user account, in which case workflow block 602-5 is associated with two distinct resources.

In some embodiments, each block of the plurality of blocks may have at least one generic variable for interacting with one of the set of resources. A generic variable or a global variable refers to a variable that is accessible and usable across multiple instances of a workflow block or throughout an entire workflow. It is a variable that holds a value or information that may be shared and accessed by different workflow blocks. The purpose of using generic or global variables is to enable the exchange and sharing of data between different parts of the workflow, allowing for a consistent and synchronized information flow. These variables may store values, flags, or other types of data that need to be accessible and consistent across various stages or components of the workflow. The role of generic/global variables in a workflow is described in more detail in the following sections in relation to FIGS. 7 to 9.

In the example depicted in FIG. 6, a global variable representing the quantity of the product ordered by the customer may be utilized throughout the workflow blocks 602-1 to 602-5. This global variable serves as a shared piece of information that can be accessed and modified by different blocks within the workflow. Workflow block 602-1 fetches the relevant data from the internal order database and populates the global variable with the quantity of the product ordered. This information is then passed on to subsequent blocks in the workflow. For example, workflow block 602-2 utilizes the global variable to estimate the delay for the order based on the quantity of the product. Block 602-3, responsible for calculating the total price, also relies on the global variable to perform the price calculation based on the quantity of the product. Similarly, workflow block 602-4 incorporates the quantity from the global variable into the invoice generated for the customer. Finally, workflow block 602-5 may include the quantity information in the email text sent to the customer. The global variable representing the quantity of the product ordered is just one example of how a shared piece of information may be utilized throughout the workflow. Other global variables may also be employed to represent different aspects of the order, or any other relevant information required by the workflow.

Additionally, in some embodiments involve querying a plurality of required inputs from the alternative set of resources for the generic variables to operate the predefined workflow when the existing user implements the predefined workflow on an alternative set of the plurality of resources. Querying a plurality of required inputs refers to the act of request to retrieve and/or to retrieving information from the plurality of inputs, in this case for the generic variables as previously discussed. During such a step, the process may query a plurality of required inputs from the alternative set of resources specifically for the generic variables used in the predefined workflow. When the predefined workflow is executed on the alternative set of resources, it may require different inputs or configurations compared to the original set of resources. The process recognizes this change and prompts the user to provide the necessary inputs for the generic variables. These inputs ensure that the predefined workflow may operate correctly with the new set of resources and adapt to any variations or specific requirements of the alternative environment. In some embodiments, the alternative set of resources and the selected (original) set of resources may share at least one common resource. For example, in relation to FIG. 6, the sales representative may choose to use an updated internal order database with different formatting. In this situation, it is likely that new required inputs will be needed to operate workflow diagram 600 with this alternative set of resources. The updated internal order database may have different data fields, structures, or formatting compared to the original database. As a result, the predefined workflow diagram 600 may need to retrieve and process data differently from this alternative database. Therefore, querying new required inputs may be valuable to adapt the workflow and ensure its proper functionality with the updated internal order database. The process may accordingly prompt the sales representative to provide the specific inputs needed for the generic variables in workflow diagram 600 to interact effectively with the alternative set of resources.

Some disclosed embodiments may involve storing an amended version of a template for the predefined workflow as an amended template stripped from the set of resources in the repository. An amended template refers to a modified version of the original template. An amended template is one that has undergone at least one alteration or change to its structure, content, or configuration. The modifications could involve adding, removing, or modifying workflow blocks, adjusting the sequence of tasks, updating resource dependencies, or making any other relevant adjustments to tailor the template to specific requirements or preferences. For example, the sales representative may have added a sixth workflow block to workflow diagram 600 to handle an update task, such as changing a status field in the internal order data to indicate that the order has been processed. After making this addition, the sales representative may choose to store the amended workflow diagram 600 as an amended template by separating it from the set of resources established in step 504. By preserving the amended template separately, users may retain and reuse their customized versions of the original templates while keeping them independent of the associated set of resources. This allows for greater flexibility and adaptability in managing and evolving predefined workflows within a workflow management platform.

Some disclosed embodiments may involve querying a secure storage area to determine that credentials are nonexistent for the at least one external resource. Credentials for an external resource refers to any kind of authentication information for securely connecting to and/or accessing data from that source. Examples of credentials may include usernames and passwords, API keys, tokens, certificates, or key pairs. These credentials may be used to verify the identity of the user or application accessing the resource and enable secure and authorized access to the external resource. Handling and storing credentials are valuable aspects to securely protect against unauthorized access. A secure storage refers to any kind of container, digital vault, or storage location where credentials are handled or stored in a way designed to ensure protection against unauthorized access, loss, alteration, or disclosure. Examples of secure storage area may include a secure repository or database, a key vault or another secure storage mechanism affiliated with a workflow management platform where credentials and access information are stored securely. Querying a secure storage area refers to issuing a request to access, check, confirm data, and/or retrieve stored data from the secure storage area. By querying this storage area, the process may determine whether the required credentials for the external resource are nonexistent. Such querying is exemplified in flowchart form in process 500 of FIG. 5, at step 506. This step may ensure, for example, that the predefined workflow may proceed without encountering any issues related to missing or invalid credentials. By verifying the absence of credentials in the secure storage area, the system may take appropriate measures, such as notifying the user or initiating an authentication flow as explained below, to ensure smooth execution of the workflow without interruptions or security vulnerabilities. In the example shown in FIG. 6, it is possible that during process 500, the credentials for certain external resources are determined to be missing. More specifically, the production line schedule (associated with block 602-2) or the mailbox (associated with block 602-5) could be identified as lacking the necessary credentials in the secure storage area. In some cases, lacking the necessary credentials mean also lacking any credentials, as credentials of another users, or credentials associated with the entity itself may be used instead of a private credential associated only with the user itself.

Some disclosed embodiments may involve initiating an authentication flow with the at least one external resource to obtain a token from the at least one external resource. Tokens refer to any digital pieces of information used for authentication purposes, such as authenticating the identity of a user or application. Tokens may, for example, provide access to external resources by serving as proof of authorization. After successful authentication, a token may be generated and may be presented in subsequent requests to the data source. The token may contain various information about the user or application's identity and access rights. If the token is valid and authorized, access gets granted to the requested resource. Tokens may have an expiration time and may require periodic refreshing. Moreover, as used herein, an authentication flow may refer to any processes used for verifying the identity of a user or application seeking access to a system or resource. The specific steps and mechanisms may vary, but the flow ensures secure and authorized access. For example, an authentication flow may involve the following steps: 1—A user is providing credentials, such as a username and password, which are validated by the authentication system 2—If the credentials are correct, an authentication token is issued. 3—The token is then presented in subsequent requests, and its authenticity and validity are verified by the system. 4—If the token is valid, access is granted to the requested resource. Initiation of the authentication flow aims to address the missing credentials issue, in order to ensure that the predefined workflow may proceed smoothly and that the necessary access and functionality are available for the involved external resources. An example of initiating an authentication flow to obtain a token is exemplified as step 508 of FIG. 5.

At step 510, process 500 may include receiving the token and storing the token in the secure storage area. Following the initiation of the authentication flow and the issuance of the token, the received token may be securely stored in the designated secure storage area. This secure storage area may be specifically designed to ensure the confidentiality and protection of sensitive information, such as the token. Storing the token in this secure storage area may prevent unauthorized access and minimizes the risk of security breaches. By securely storing the token, its confidentiality is maintained, and it may be accessed securely when required for future interactions with the associated external resource. This further ensures that only authorized entities may retrieve and utilize the token, maintaining the integrity and security of the authentication process.

At step 512, process 500 may include initiating a configuration of the predefined workflow to the set of resources to initiate functionality of the predefined workflow. This configuration step establishes the needed connections, parameters and dependencies between the workflow and the selected set of resources. During the configuration process, the predefined workflow is aligned and integrated with the selected resources to enable the desired functionality. This may involve establishing data connections, defining triggers and actions, configuring access permissions and mapping inputs and outputs between the workflow and the resources. By configuring the predefined workflow according to the set of resources, the predefined workflow can effectively use and interact with the chosen resources to achieve the desired objective. The configuration process may be carried out by a software associated with a workflow management platform and may incorporate some AI functionality to enhance the configuration process.

In some embodiments, initiating a configuration of the predefined workflow may include enabling interaction with the at least one external resource in order to initiate functionality of the predefined workflow. Enabling interaction may allow the predefined workflow to access, retrieve, and utilize data or functionality from the at least one external resource. It establishes the foundation for seamless communication, data exchange, and collaboration between the workflow and the at least one external resource, enabling the workflow to leverage the capabilities, insights, and services provided by the resources. More specifically, in some embodiments, enabling interaction with the at least one external resource may include at least one of: storing data to the at least one external resource; fetching data from the at least one external resource; sending instructions to the at least one external resource; or a combination thereof. For example, referring to FIG. 6, a configuration process of workflow diagram 600 involves enabling interaction with external data resources. This may include fetching data from the production line schedule (in relation to block 602-2), and sending instructions and data to the mailbox, such as an email text, a recipient or customer mail address, an attached generated invoice, or a subject line of the email (in relation to block 602-5).

In some embodiments, initiating a configuration of the predefined workflow may include querying a plurality of required inputs from the set of resources to initiate functionality of the predefined workflow using a user interface. The user interface which may correspond in some situations to a GUI displayed in association with a canvas, may allow the user to interact with the set of resources and retrieve the specific inputs required by the workflow. These required inputs may include data, parameters, settings, or any other relevant information needed for the successful execution of the workflow. The user interface presents the required inputs in a structured and accessible manner, such as through forms, fields, checkboxes, dropdown menus, or other interactive elements or GUI components. Referring to FIG. 6, workflow diagram 600 may require multiple inputs from the set of resources to be functional. For instance, in order for workflow block 602-3, responsible for calculating the total price of the customer's order to perform this calculation, specific inputs such as the order details (e.g., product quantity, unit price, discounts), tax rates, and any additional charges applicable to the order are required. These inputs may be queried to and obtained from the internal order database and the pricing application.

In some other embodiments, initiating a configuration of the predefined workflow may include during the configuration of the predefined workflow identifying a mismatch between a block in the workflow and at least one resource; and solving the mismatch. A mismatch may occur when a workflow block requires a specific resource that is not available or when a resource is assigned to a block that does not require it. Solving the mismatch may involve resolving the discrepancy between the block and the specific resource to ensure a proper alignment and functionality within the workflow. This may involve adjusting the configuration settings, updating resource assignments, finding alternative resources that may fulfil the requirements of the block or creating new resources that may fulfil the requirements of the block. The goal is to ensure that each block in the workflow is correctly associated with the necessary resources to implement the functionality of the predefined workflow.

In some embodiments, the mismatch may be an external mismatch between the block in the workflow and the at least one external resource and solving the external mismatch may include using credentials. As used herein, an external mismatch or authentication mismatch between a workflow block and an external resource may occur when there is a difference in the authentication requirements or mechanisms used to access the external resource resulting in authentication failures or insufficient privileges. Mismatches may occur in credential types, authentication flows, or access permissions. Resolving the authentication mismatch may involve different processes or subprocesses. For example, solving the external mismatch may involve addressing the credential-related issues by providing the required credentials or authorization to enable interaction between the block and the external resource. This may involve supplying valid credentials, configuring access permissions, or establishing secure connections to ensure seamless communication and integration between the workflow block and the external resource. The goal is to overcome the external mismatch and establish a successful connection that allows the predefined workflow to effectively utilize the functionalities provided by the external resource.

In some other embodiments, the mismatch may be an internal mismatch between the block in the workflow and the at least one internal resource and solving the internal mismatch may include verifying that the at least one internal resource has a set of functionality required by the block. An internal mismatch may arise when a block in the workflow requires specific functionalities or capabilities that are not supported by the associated internal resource. To address this mismatch, the configuration process may verify whether the internal resource possesses the needed functionalities required by the block. This verification ensures that the internal resource may meet the functional requirements of the block. If the internal resource lacks the required functionalities, alternative solutions are explored. This may involve modifying or replacing the internal resource, integrating additional resources, or adapting the workflow design to align with the available internal capabilities. The goal is to resolve the internal mismatch by ensuring that the internal resource adequately supports the required functionalities of the block. By doing so, the predefined workflow can be executed successfully, leveraging the capabilities of the internal resources to achieve the desired functionality. For example, in FIG. 6 an internal mismatch with block 602-3 may arise when the specific internal pricing application or table lacks the needed functionality or information to perform the required calculations due to the unique characteristics of the customer's order. For instance, if the order involves a custom product for which a standard applicable price has not been established, the pricing application may not have the required data to determine the pricing. In another instance, the workflow may include a record invoice workflow block (not illustrated in FIG. 6) downstream to the invoice delivery block 602-5, called docket delivery. In that block, the invoice details, as well as further details about the order are recorded in an internal resource. In some cases, a mismatch is recognized when the system determines that there aren't any internal resources available to the user to implement the workflow template completely. To solve this mismatch, the system may be configured to create a custom-tailored internal resource in the user's account that fits the requirements of said record invoice workflow block. While doing so, the system considered whether creation is appropriate to the permission level of the user, and the available resources available to him by the SaaS platform. If a permission request from a higher-level user of the entity is required, such request may be made by the system. If a resource is prohibited from being used due to an access requirement involving a more costly account type, a suggestion of upgrading the user's account/trial may be provided by the system. In other examples, to solve this internal mismatch, the configuration process may involve modifying the action implemented by workflow block 602-3. One possible solution could be to add a user interaction action, such as a prompt or input field, to the workflow block. This would allow the workflow to query and the user to provide the necessary price information for the custom product. By incorporating a user interaction action, the workflow may overcome the limitations of the pricing application and gather the required data to perform the calculations for block 602-3. Compatibility issues, similar to the internal mismatch described above, may also arise in relation to external resources, provided that there are no authentication issues. Just like with internal resources, external resources may not always possess the required functionalities or capabilities to seamlessly integrate with a specific block in the workflow.

In some embodiments, process 500 may further include managing privacy settings associated with the predefined workflow, wherein the privacy settings include a list of users with permission to operate the predefined workflow. As used herein, privacy settings refers to any kind of instructions that govern the access and permissions granted to users who may operate the predefined workflow. One specific aspect of the privacy settings may correspond to the management of a list of users with permissions to operate the predefined workflow. This list defines the authorized individuals that have the right to interact with and execute the workflow. By maintaining this list, the process ensures that only designated users may access and operate the workflow, providing a level of control and security. The privacy settings may include various levels of permissions, such as read-only access, editing capabilities, or administrative privileges. These permissions may be assigned to different users or user groups. For example, the sales representative may decide to authorize other members of the sales team to access and run workflow template 600, but not to edit workflow diagram 600 itself, ensuring this way that the integrity and consistency of workflow diagram 600 are maintained. In some embodiments, a workflow manager, like workflow manager 110, might feature an interface designed to facilitate comprehensive control and administration of all workflows within an entity's account. This encompasses a spectrum of workflows, ranging from those accessible to all users associated with the entity, to those viewable exclusively by specific users, and even workflows restricted to a single user (along with potential visibility to their supervisors) but concealed from the wider entity audience.

It is to be appreciated that a user giving access to the predefined workflow may not automatically grant access to the at least one resource managed by the existing user's account. In some embodiment, the privacy setting may further include a list of users with permissions to access the at least one internal resource of the existing user account. Similarly, various levels of permission may be provided for the at least one internal resource. In scenarios wherein the at least one internal resource includes a plurality of internal resources, the privacy settings may include different permissions to access for the plurality of internal resources. For example, the sales representative giving access to operate workflow diagram 600 to other members of the sales teams may also give them access and authorization to edit the internal order database but not the pricing application or the invoicing application.

As mentioned in the previous sections, workflow blocks may make use of variables to implement their functionality. Among these variables, there is a specific type known as global variables. In the context of this discussion, global variables refer to variables that may be accessed, utilized, or modified across multiple instances of a workflow block or by different workflow blocks throughout the entire workflow. These global variables allow for the sharing of data or information between various instances of the same block or between different blocks within the workflow. Their purpose is to enable the exchange of information, facilitate coordination, and support communication among different components of the workflow. By leveraging global variables, data that needs to be shared or accessed by multiple instances or blocks within the workflow may be stored and retrieved effectively, ensuring consistency, and enabling complex automation processes. The utilization of global variables in workflows enhances flexibility, and reusability, and facilitates seamless coordination and synchronization of activities across the workflow.

Global variables within a workflow may be created during the configuration/construction phase of the workflow. This may involve defining and initializing the global variables before the execution of the workflow starts. During this phase, the global variables may be associated with specific values or resources that will be used throughout the workflow. Global variables may also be created independently, separate from the workflow block creation process. They may be defined in a separate section or module and then referenced and utilized within the workflow blocks as needed. This allows for greater flexibility and modularity in managing global variables. Once the global variables have been created, they may be attributed or assigned to various workflow blocks as required. This attribution enables the workflow blocks to access, utilize, or modify the values stored in the global variables.

It is to be appreciated that global variables may have associations with various resources or data sources utilized throughout a workflow. These resources may include databases, tables, files, or any other type of data sources that are utilized within the workflow. Furthermore, global variables may also be linked to intrinsic data or results that are generated by specific workflow blocks. This means that global variables have the capability to capture and store internal data or output that is produced by individual blocks during the execution of the workflow. In addition to their associations with data sources and intrinsic data, global variables may capture different types of data. This includes dynamic data, which refers to data with properties and values that may change during the running or execution phase of the workflow. It also includes primitive or static data, which represents data that remains constant throughout the execution of the workflow. Overall, a global variable may be associated with a combination of data sources, intrinsic data generated by workflow blocks, and dynamic or static data. This comprehensive association enables global variables to serve as a versatile and flexible mechanism for handling data within the workflow. When a global variable is created, either in a workflow block or in the repository, it is either a custom type or a primitive type. Custom type is chosen from a defined type that the developer of the block chose, and the primitive type is chosen from a closed list of primitive types predefined by the workflow managing platform. An example for a Custom type is a board or table with predetermined columns, a user profile with three predetermined parameters, a .txt file having a specific string of text in its title etc. . . . .

A global variable may be defined by different characteristic fields such as: a name field referring to an identifier or a label of the global variable; a value field, representing the actual data or information stored in the global variable (integer, float, Boolean, text string, or any other data type); or a type field, indicating the data type of the value stored in the global variable. It should be noted that global variables can encompass more than simple data entries and may be complex objects, such as table rows/columns, entire tables, dashboards, a function, a SaaS platform element, a SaaS platform sub-element or other numerical objects, providing enhanced functionality within the workflow. In some cases, global variable could derive from entity resources that are inaccessible to a user of the entity. For example, a global variable can be used to calculate daily Average Recurring Revenue (ARR) by applying a formula on numerous cells in one or more finance boards/tables. These boards/tables could be beyond the reach of most entity users. Nevertheless, this variable can still be utilized by users within their workflows, without requiring them to possess knowledge about the intricate origins of this figure.

While global variables may provide various advantages when used in conjunction with a workflow, different challenges may be associated with their utilization. For example, these challenges may encompass readability, maintainability, dependency, access security, privacy, and scalability issues, which may rebut and minimize the utilization of global variables. The following sections describe digital systems and methods that facilitate and encourage the implementation of global variables within a workflow, streamlining their use and management and alleviating the aforementioned challenges.

Figure 7:
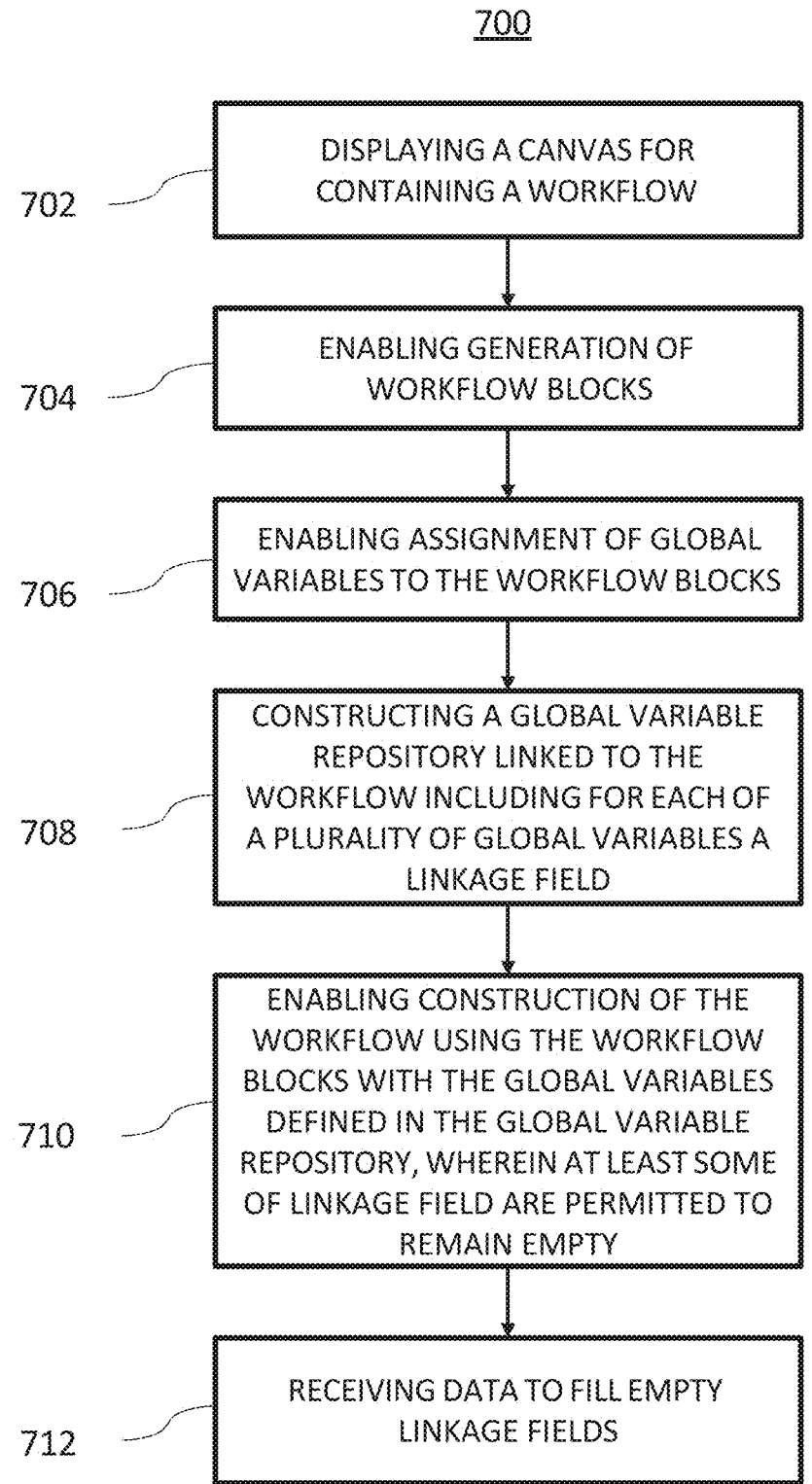
FIG. 7 is a flowchart of an exemplary process for performing operations for expediting construction and revision of workflow employing global variables, consistent with some disclosed embodiments.

FIG. 7 is a flowchart of an exemplary process (700) for performing operations for expediting construction and revision of workflow employing global variables. Process 700 is discussed herein for explanatory purposes and is not intended to be limiting. In some embodiments, steps of process 700 may be changed, modified, substituted, or rearranged, consistent with the present disclosure. Process 700 may be implemented using one or more components of a computing device 2100 (discussed in FIG. 21) or user device 2220 of computing architecture 2200 (discussed in FIG. 22). Disclosed embodiments may include at least one processor that may be configured to execute stored instructions to perform operations for expediting construction and revision of workflow employing global variables. As shown in FIG. 7, process 700 may include steps 702, 704, 706, 708, 710, and 712 discussed in further detail below.

At step 702, process 700 may include displaying a canvas for containing workflow blocks of a workflow. Displaying a canvas, such as canvas 208, 308, 408, or 608, in relation to a display, such as display 206, 306, 406, and 606, may be accomplished using various methods. For instance, it may involve utilizing a graphical user interface (GUI), a web-based application, or a software application. In the context of a Software-as-a-Service (SaaS) platform, this operation may be performed by a SaaS platform component like workflow manager 110. The canvas may be presented in conjunction with a user device, such as user device 2220. When displaying a canvas, several factors should be considered, including determining the suitable placement of the canvas within the display, ensuring appropriate sizing and proportions relative to the display, and enabling responsive and scalable interaction between the canvas and the display. Additionally, establishing a contextual relationship between the canvas and the display may be achieved through various GUI components like visual cues, borders, scroll bars, or a navigational map. The canvas is designed to accommodate workflow blocks, however, upon initial presentation on the display, the canvas may be empty and devoid of any workflow blocks. In other words, when the canvas is first displayed, there might not be any pre-existing workflow blocks present on it.

At step 704, process 700 may include enabling generation of the workflow blocks wherein at least some of the workflow blocks are associated with at least one of a plurality of data sources. The process of generation of workflow blocks, or construction/placement of workflow blocks on the displayed canvas may be performed in different manners. In some embodiments, enabling generation of workflow blocks may include enabling creation of new blocks. In other words, the process may enable generation of new, non-preexisting blocks from scratch. To accomplish this, various factors may need to be defined to establish the functionality of the workflow blocks. These factors may include triggers and actions, input and output fields, (local) variables, identification of required resources, or a combination of these elements. Any of these operations may be performed in conjunction with a GUI like a workflow-building tool or palette displayed in association with the canvas. The GUI may provide users with the tools and options needed to define and configure the desired properties and functionalities of the workflow blocks. This allows users to easily create new blocks, specify their behaviors, and set up the connections between different blocks on the canvas.

In some other embodiments, enabling generation of workflow blocks may include enabling selection of workflow blocks from a library of template workflow blocks. As previously described in relation to FIGS. 3A-B, the selection may be performed in various ways. For example, in some embodiments, process 700 may further include displaying the library of template workflow blocks in association with the canvas, and enabling selection of the workflow blocks from the library of template workflow blocks may include enabling dragging of the workflow blocks from the displayed library of template workflow blocks to the canvas. In some alternative examples, enabling selection of the workflow blocks from the library of template workflow blocks may include receiving a selection of workflow block templates from the displayed library of template workflow blocks. For example, by utilizing at least one GUI component (e.g., checkboxes) associated with the displayed library of template workflow blocks. The ability to choose workflow blocks from a library enhances the efficiency and convenience of workflow construction by leveraging predefined functionalities and configurations.

Furthermore, in some other embodiments, enabling generation of workflow blocks may include enabling selection of workflow from a library of template workflow, as previously described in relation to FIG. 4. In such a situation, process 700 may further include displaying the library of template workflow in association with the canvas, and enabling selection of workflow from a library of template workflow may include receiving a selection of a workflow template from the displayed library of template workflow or enabling dragging and dropping of the workflow template from the displayed library of template workflow to the canvas. The workflow template may already include a plurality of interconnected blocks. It should be noted that the use of workflow block templates or workflow models does not completely obviate the need to define more precisely certain factors required to implement workflow functionality.

Consistent with the disclosed embodiments, at least some of the generated workflow blocks may be associated with at least one of a plurality of data sources. In some embodiments, the at least one of a plurality of data sources may be classified as an internal data source or an external data source, i.e. a data source controlled and managed by a user designing the workflow and that falls within the workflow's jurisdiction or a data sources controlled by an external provider requiring the establishment of an authentication process to access the data. The association of the at least one of a plurality of data sources to the workflow blocks may be accomplished using process 500 illustrated in FIG. 5. This process outlines the steps involved in linking the data sources to the respective workflow blocks. Referring to the example depicted in FIG. 6, when canvas 608 is initially displayed in conjunction with display 606, a user or the sales representative, in this case, may have generated workflow blocks 602-1 to 602-5 by selecting workflow block templates from a displayed library. Some of these blocks are associated with specific data sources. For instance, block 602-1 is linked to the internal order database, indicating that it interacts with and retrieves information from that particular data source.

At step 706, process 700 may include enabling, during generation of the workflow blocks, assignment of global variables to the workflow blocks. As mentioned previously, the generation of global variables may be closely related to the generation of workflow blocks. In addition, the generation of global variables may be performed during the edition of a workflow block. Accordingly, in one scenario, when a block is generated/placed or edited on the canvas, at least one global variable may be created to implement the functionality of the workflow block or to facilitate interaction and data storage with a resource or data source associated with the block. For instance, if a block is responsible for sending an email using a specific mailbox, a global variable representing the recipient's email address may be created. The creation of the global variable may be performed automatically or is the result of a user input creating specifically a global variable during the creation of a workflow block. In such a situation assignment of a global variable created in conjunction with a workflow block is automatically achieved. The global variable created in conjunction with a workflow block may be later utilized and assigned to workflow blocks that are generated later in the process. As a result, when a user is creating a workflow block, all the global variables created previously in conjunction with former workflow blocks may be assigned to the newly created block. In this manner, a user may build an entire workflow, and interconnect the blocks by the global variables created for each, without associating any of the global variables with a either internal or external resource. The workflow created this way may be used as a workflow template (as described above), or be associated with resources prior to activation thereof.

Alternatively, global variables may be generated independently from the workflow blocks using a separate module or mechanism. These global variables may be saved in a global variables reservoir or repository to be used at a later occurrence, and then may be populated or associated with different data sources, including data sources used within the workflow, intrinsic data, dynamic or static data, or a combination thereof. Referring to the example provided in FIG. 6, the sales representative may proactively create various global variables that they anticipate will be utilized by the workflow blocks, even before generating the actual blocks. For instance, global variables corresponding to the customer's name, contact information, quantity and type of product ordered, total order price, and estimated delay for the order may be created. These global variables may then be assigned to their respective workflow blocks. In this alternative scenario, the assignment of global variables may be accomplished through various methods. The module used to generate the global variables may offer different approaches for assigning them, providing flexibility to the user. For example, the module may present fillable fields, provide the option to assign global variables through code programming, include a GUI displayed in association with the canvas with various GUI components or supporting drag-and-drop functionality to perform the assignments.

In some embodiments, each of the workflow blocks of the workflow may be configured to receive at least one trigger and to implement at least one action. The at least one trigger and the at least one action may encompass any of the triggers and actions described throughout the entirety of the present disclosure. For example, in some embodiments, the at least one trigger may include at least one of a time-based trigger, an event-based trigger, a data trigger, an external trigger, a manual trigger, a conditional trigger, or a combination thereof, and the at least one action may include at least one of a data manipulation action, notification action, user interaction action, control workflow action, decision action, or a combination thereof. Additionally, in some embodiments, a global variable assigned to one of the workflow blocks may be used by the at least one trigger, the at least one action or in a combination thereof. Taking FIG. 6 as an example, if a global variable is generated for the total price of the customer's order and assigned to workflow blocks 602-3 and 602-4, it may be utilized by the actions performed by those blocks. In particular, the global variable may be used by workflow block 602-3 to calculate the total price, thereby populating the value of the global variable, and by workflow block 602-4 to generate the invoice, incorporating the value of the global variable into the invoice.

At step 708, process 700 may include constructing a global variable repository linked to the workflow, wherein the global variable repository includes, for each of a plurality of global variables, a linkage field. Within the context of this disclosure, a global variable repository in relation to a workflow may refer to any type of library maintaining the global variable generated in conjunction with the workflow, utilized by the workflow or assigned to any block of the workflow. The global variable repository may take the form of a GUI displayed in association with a canvas configured to house the workflow blocks. In addition, the global repository may incorporate an editor capability, i.e., a user may edit, create, delete, merge global variables and assign them to workflow blocks. As such the global variables repository may correspond to the separate module configured to generate the variable mentioned earlier. In some cases, at least a portion of the global variable repository may be linked directly to the entity, and thus be shared with all, or some, of the users of that entity. For example, the global variable repository can include a shared portion, in which global variables that are relevant to the entirety of the entity can be stored (and be maintained by users with permission to do so), and a private portion, in which global variables that are relevant only to a single workflow, or to a single users can be stored.

Each of a plurality of global variables included within the global variable repository may include a linkage field. As used herein, a linkage field may refer to a type of field used to link or bind a global variable to a specific location for a piece of data or a data source. By binding a global variable to a specific location, the global variable is assigned or initialized with the value of the data or a reference to it. This enables the global variable to represent or hold this data throughout the execution of a program or workflow. This binding process may involve assigning the value to the variable, either directly or indirectly via a reference or pointer. Once the binding has been established, the global variable may be used to access, modify or reference data throughout the workflow the variable retains this association until it is explicitly modified or updated, via the global variable repository for example. Examples of linkage fields may include user input, database, APIs, output from workflow blocks, file uploads, or specific URLs.

In some embodiments, each of a plurality of global variables included in the global variable repository is created either as a custom type or a primitive type. This dual categorization system enables the creation of global variables that can be meticulously tailored to intricate data structures, known as custom types, or alternatively, as basic/common and fundamental data types—referred to as primitive types. Notably, the workflow management platform itself suggests and presents the available primitive types, enhancing the user experience by streamlining the global variable creation process. This dynamic framework ensures that the repository remains highly adaptable, catering to diverse data processing needs with a combination of user-defined custom types and platform-offered primitive types.

In some embodiments, the plurality of global variables included in the global variable repository may be inherent to the workflow blocks generated. In other words, the existence and quantity of global variables are directly tied to the nature and number of workflow blocks that have been generated within the workflow. Each workflow block may introduce new global variables or utilize existing ones, resulting in a plurality of global variables associated with the overall workflow.

Figure 8:
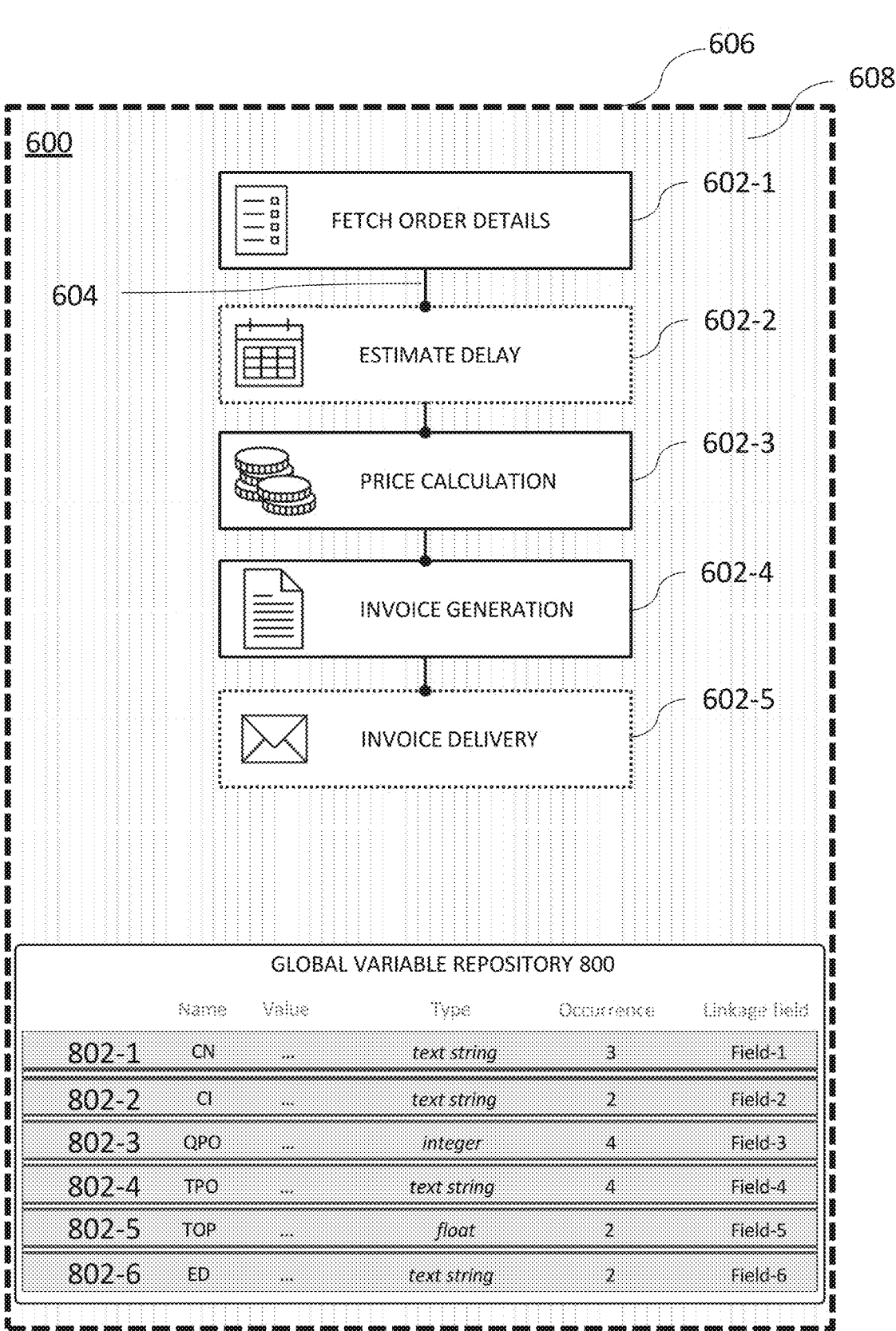
FIG. 8 illustrates the exemplary workflow diagram presented on the canvas shown in FIG. 6, wherein the canvas is supplemented with a global variable repository including a plurality of global variables and their associated linkage fields, consistent with some disclosed embodiments.

FIG. 8 depicts workflow diagram 600 of FIG. 6, presented on display 606 in conjunction with canvas 608, wherein canvas 606 has been supplemented with a global variable repository 800. Global variable repository 800 serves as a dedicated area for managing and storing the global variables associated with workflow diagram 600. As illustrated, global variables repository includes six global variables 802 (802-1 through 802-6). These global variable include global variable 802-1 labeled as "CN" representing the Customer's Name (e.g., John Doe); global variable 802-2 labeled as "CI" representing the Contact Information of the customer (e.g., email address john.doe@mail.com); global variable 802-3 labeled as "QPO" representing the Quantity of Product Ordered (e.g., 10); global variable 802-4 labeled as "TPO" representing the Type of Product Ordered (e.g., Product A); global variable 802-5 labeled as "TOP" representing the Total Order Price (e.g., 150.99 $); and global variable 802-6 labeled as "ED" representing the estimated delay to produce and deliver the customer's order (e.g., 10 days). Each of these global variables (802-1 through 802-6) is respectively associated with a linkage field labeled as "Field-1" through "Field-6" within global variable repository 800. In the current example, all the global variables 802 are associated with internal results of workflow blocks. More specifically, global variables 802-1 through 802-4 are associated with the results of workflow block 602-1, global variable 802-5 with the result of workflow block 602-3, and global variable 802-6 with the result of workflow block 602-2. In an alternative example, the sales representative could have opted to utilize global variables, such as global variables 802-1 through 802-4, directly linking them to elements within the internal order database, thus bypassing the need for workflow block 602-1. However, this approach would require modifying the linkage field for each new order, as the global variables would need to be updated accordingly.

In relation to FIG. 6, the display of workflow 600 on canvas 608 has been adjusted to accommodate both the workflow diagram 600 and the global variable repository 800. The space between workflow blocks has been reduced to allow for simultaneous display. However, this is just one possible configuration, and in some cases, the arrangement of the workflow diagram may remain unchanged while the global variable repository is displayed, potentially causing parts of the diagram to be hidden. To facilitate navigation, GUI components such as scroll bars may be provided to allow users to view the entire workflow diagram. Additionally, in cases where the limited display dimensions result in a partial representation of the global variables within the global variable repository, supplementary GUI components may be incorporated to enhance navigation throughout the repository.

In some embodiments, the global variable repository may further include for each of the plurality of global variables at least one of a name field, a type field, a value field, or a combination thereof. For example, as shown in FIG. 8, global variable repository 800 includes for each of global variable 802-1 through 802-6, a name field, a value field, and a type field in addition to the linkage field. In the current example, the value fields of the global variables are empty since they depend on the results of various workflow blocks and the workflow is still under construction. However, the type fields of the global variables are already populated, as they may be configured during the creation of the global variables. For instance, the sales representative may have set the type field of the "QPO" global variable 802-3 to represent an integer, knowing that it corresponds to the quantity of the product ordered. Alternatively, the type field may be populated in conjunction with the value field. For example, if the estimated delay calculated by block 602-2 may be expressed as either a number (e.g., 10) or a text string (e.g., 10 days), the type field of global variable 802-6 may be adjusted accordingly.

In some embodiments, the global variable repository may further include for each of the plurality of global variables an occurrence field. The occurrence field may correspond to the number of times a global variable is assigned or utilized within the workflow. For example, in FIG. 8, global variable 802-1 (representing the Customer's Name) is utilized in three different instances. It is involved in the action implemented by block 602-1, and it is also incorporated in the generated invoice by block 602-4 and in the email generated by block 602-5. In some embodiments, the global variable repository may further include a sorting functionality. For example, a global variable repository GUI may be supplemented by various GUI components in order to sort the global variables by name, type, number of occurrences, or order of apparition within the workflow.

In some embodiments, at least one first global variable assigned to at least one-first workflow block may be dependent on at least one second global variable assigned to at least one second workflow block at an upstream position with respect to a position of the at least one-first workflow block. For example, referring to FIG. 8, global variable 802-5 "TOP" representing the total order price assigned to block 602-3 is dependent on global variables 802-3 "QPO" and 802-4 "TPO" representing respectively the quantity of product ordered and the type of product ordered assigned to block 602-1 (therefore at an upstream position with respect to block 602-3). The price of the order will fluctuate with the number and type of products ordered. Furthermore, in some embodiments, process 700 may further include when the at least one second global variable is modified, checking that the linkage field of the at least one first global variable is not broken. By definition, a broken linkage field no longer functions correctly or leads to its intended destination. For example, if the global variable 802-4 "TPO" is modified to represent a custom product with no established price, it may lead to a potential issue in determining the total order price, thereby breaking the linkage field of the global variable 802-5 "TOP". To address this, process 700 may verify whether the linkage field of global variable 802-5 "TOP" is intact or broken. In the worst-case scenario where the linkage field is broken, appropriate actions may be taken, such as issuing an alert to notify that one of the linkage fields in the global variable repository is broken.

At step 710, process 700 may include enabling construction of the workflow using the workflow blocks with the plurality of global variables defined in the global variable repository, wherein during a construction process, at least some of the linkage fields are permitted to remain empty. For example, in some embodiments, enabling construction of the workflow includes enabling placement of workflow blocks, and enabling logical connection between the workflow blocks on the canvas. Once the workflow blocks have been created or generated, and the global variables have been assigned, the final design and visual arrangement of the workflow may not be immediately established. In such cases, process 700 enables the placement, and arrangement of workflow blocks on the canvas and the establishment of interconnections between them, even if some of the linkage fields of the global variables defined in the global variable repository are left empty. This provides flexibility in assigning values to the global variables and establishing the desired functionality of the workflow at a later stage of the workflow construction process, allowing for iterative development and refinement of the workflow design. In some embodiments, the at least some of the linkage fields that are permitted to remain empty may include all of the linkage fields. For example, with reference to FIG. 8, process 700 enables the construction or further refinement of workflow diagram 600, regardless of whether "Field-1" through "Field-6" of global variables 802-1 through 802-6 are empty.

At step 712, process 700 may further include, following construction of the workflow, receiving data to fill the at least some empty linkage fields, where the at least some empty linkage fields are mapped to the at least one of the plurality of data sources. The reception of data to fill the empty linkage fields may be performed in various ways. For example, it may be done through the global variable repository GUI, where a specific GUI component allows for the editing of the linkage fields. Users can input or select the desired values to populate the empty fields, thereby establishing the necessary connections between the global variables and the corresponding workflow blocks. Referring to FIG. 8, the sales representative may edit and populate any of the empty linkage field of global variable repository 800.

Once the linkage fields have been established global variables 802 are linked the plurality of data sources associated with workflow block 602, particularly in this case intrinsic results generated by workflow blocks 602. Once construction of the workflow achieved and linkages filed of the global variables established, the workflow may be ready to be executed.

In some embodiments, process 700 may further include enabling editing of a name of a global variable in the workflow. This enables users to modify the identifier or label associated with a global variable, providing flexibility and customization in the naming conventions used within the workflow. The specific implementation of editing the name of a global variable within the workflow may vary. For example, it may be achieved by utilizing the global variable repository GUI, allowing users to select the global variable they want to edit and modify its name field. A user may click on the variable, select an edit option, and enter the desired new name in a text field or through a similar user interaction. In some embodiments, editing of a name of one of the plurality of global variables in the workflow may cause a change in the name of the one of the plurality of global variables throughout the workflow. In other words, the changes made to the name of a global variable are then updated and reflected throughout the workflow where the variable is referenced. For example, referring to FIG. 8, the sales representative may choose to edit the name of global variable 802-5 from "TOP" to "Price" to avoid confusion with the name of global variable 802-4 "TPO". Once this change is made, the new name "Price" will be reflected and displayed in all the blocks of workflow diagram 600 where the global variable 802-5 is referenced, allowing for clearer and more distinct labelling of the global variables within the workflow.

Alternatively, in some embodiments, editing of a name of one of the plurality of global variables in the workflow may be caused by a data source linked via the linkage field of one of the plurality of global variables. This means that if the data source associated with a global variable suggests a different name, it may automatically update and modify the name of that global variable in the workflow. This provides automation capability in the naming process, ensuring consistency between the global variable and its linked data source. For example, in FIG. 8, global variable 802-5 "TOP" is linked to the intrinsic result of block 602-3 that calculates the "Total Order Price" based on the quantity and unit price of products. If a new pricing algorithm is selected for block 602-3 configured to calculate a "Total Amount", block 602-3 may suggest switching the name to "TA". In this case, the process may automatically detect the suggestion and apply the name change to the global variable throughout the workflow. Consequently, all references to "Total Order Price" or "TPO" in the workflow would be automatically updated to "TA" to maintain consistency with the new pricing algorithm selected.

Figure 9:
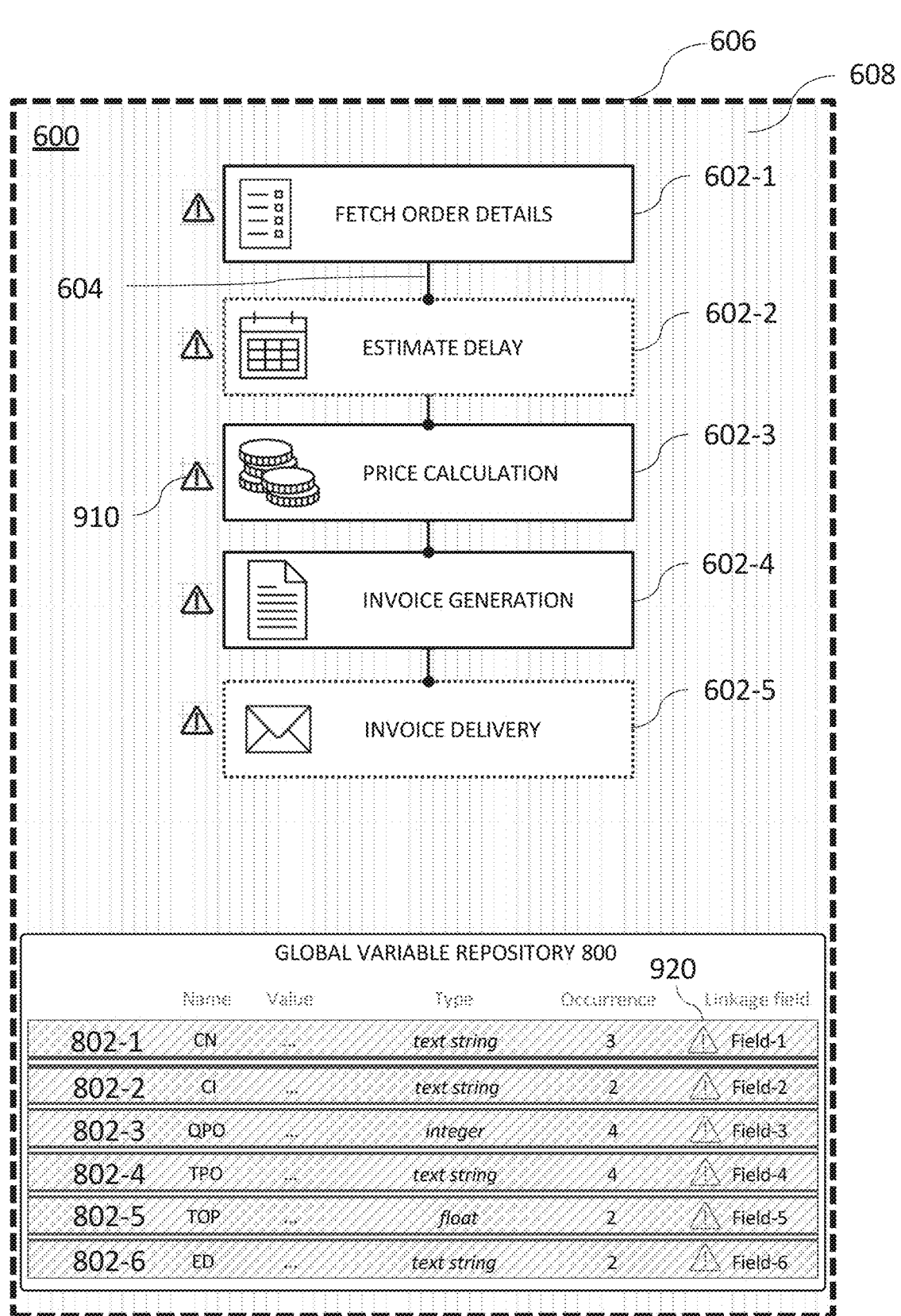
FIG. 9 illustrates exemplary visual alerts in association with the canvas and the global variable repository of FIG. 8 when all the linkage fields of the global variable repository are empty, consistent with some disclosed embodiments.

In some embodiments, process 700 may further include, following construction of the specific workflow, issuing an alert identifying at least some of the plurality of global variables containing an empty linkage field. In the context of this disclosure, an alert may refer to any kind of notifications or warning messages generated within the workflow management system to inform the user about a specific issue or condition. In this case, the alert specifically identifies the global variables that have empty linkage fields, highlighting the need for attention or further action to properly assign or connect those variables within the workflow. The alert may be displayed through a graphical user interface, displayed as a pop-up message, or communicated through any other means of communication within the workflow system. For example, FIG. 9 illustrates different visual alerts, in a situation wherein all the linkage fields of global variable repository 800 are empty. In this example, warning signs 910 are displayed next to the workflow block 602 assigned with a global variable comprising an empty linkage field, in this particular case all of them. In addition, supplementary warning signs 920 are placed near the empty linkage fields, and visual designs of global variables 802 are modified in global variables repository 800, providing further identification of the problem. Similarly, in some embodiments, process 700 may further include, following construction of the specific workflow, issuing an alert identifying at least some of the plurality of global variables with a broken linkage field. In some cases, when a resource which is connected to a global variable is about to be changed by a user, and when this change will cause an alert to be issued, the system can provide the user with a warning prior to the implementation of the change This notification will convey that the intended action might impact one or more active workflows, potentially leading to the deactivation of some workflows if executed. Additionally, in select cases, specific cells needed for a workflow's functionality can be visually distinguished, aiding the user in recognizing their involvement within an active workflow.

In some embodiments, process 700 may further include storing the constructed workflow as a template in a library of template workflow, wherein in the template, the linkage filed of the plurality of global variables has been emptied. In this scenario, the intentional omission of values in the linkage fields of the global variables allows for the template to be reused by alternative users. When an alternative user selects this template, they may recover the global variable repository that was constructed along with the original workflow. However, the linkage fields of the global variables in the repository are intentionally left empty, providing the alternative user with the flexibility to establish the necessary connections and input the appropriate values based on their specific needs and preferences.

In the previous sections, the configuration of resources for workflows and workflow blocks was examined, alongside the utilization and implementation of global variables. The following section will comprehensively explore input fields, emphasizing their essential role in a workflow block design and the distinctions between their static and dynamic components.

Input fields are valuable components within a workflow block as they provide the data needed for the block to execute its task effectively. They may play a significant role in workflow automation by serving as user interface elements that enable users to provide information, make selections, and trigger specific actions within the workflow block. These input fields serve as a means for users to supply the required data, such as text inputs, dropdown menus, checkboxes, or file upload fields, ensuring that the workflow block has access to the information needed to perform its designated task. Moreover, input fields may also be populated with data generated from a previous block in the workflow, allowing for seamless data flow and facilitating the integration of multiple workflow steps.

It should be appreciated that input fields may encompass both static and dynamic subfields. Static subfields in a workflow block input field have fixed definitions or properties that do not change during runtime, i.e., that remain constant throughout the workflow block's execution. These fields typically represent constant information or settings associated with the block. For example, a static field could be a block's name, type, or any other attribute that remains the same regardless of the specific instance or configuration of the block. On the other hand, dynamic subfields offer a more interactive and adaptable experience by having definitions or properties that can change dynamically at runtime. These fields are typically associated with data inputs, configurations, or attributes that may vary based on specific conditions or user inputs. Dynamic fields allow for customization and adaptability within the workflow.

Furthermore, within workflows, there is a beneficial synergy between input fields, configured resources, and global variables. This synergy allows for the integration of global variables and resources into dynamic subfields within workflow blocks. By leveraging global variables alongside dynamic subfields, data sharing becomes seamless, enabling users to populate input fields dynamically and drive the workflow's behavior based on previous user selections or system data. This capability empowers users to create more flexible and adaptable workflows that respond to specific user inputs or system conditions.

Figure 10:
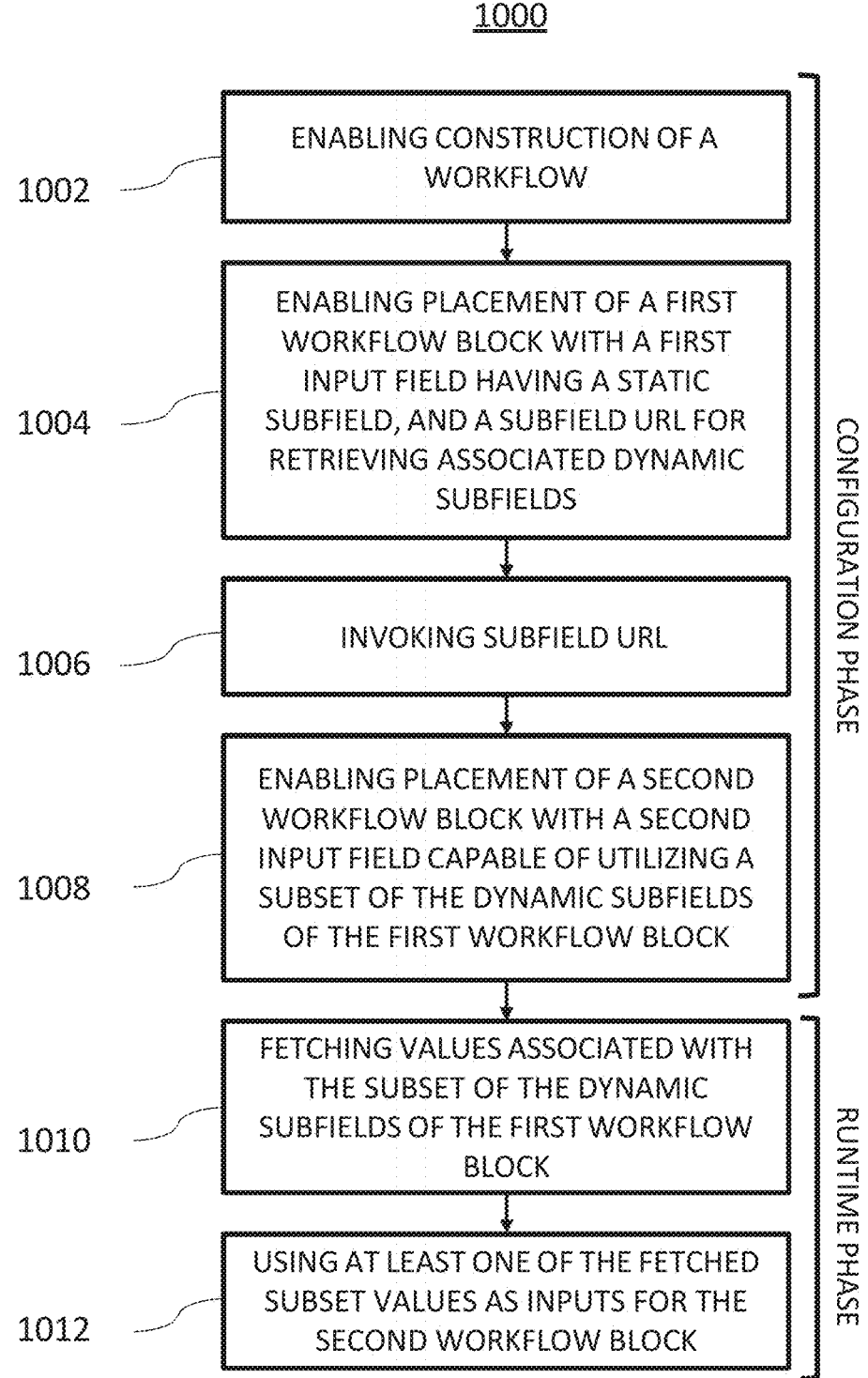
FIG. 10 is a flowchart of an exemplary process for providing a workflow-building module utilizing a canvas, the workflow including workflow blocks having input fields utilizing static and dynamic subfields, consistent with some disclosed embodiments.

FIG. 10 is a flowchart of an exemplary process (1000) for providing a workflow-building module utilizing a canvas, the workflow including workflow blocks having input fields utilizing static and dynamic subfields. Process 1000 is discussed herein for explanatory purposes and is not intended to be limiting. In some embodiments, steps of process 1000 may be changed, modified, substituted, or rearranged, consistent with the present disclosure. Process 1000 may be implemented using one or more components of a computing device 2100 (discussed in FIG. 21) or user device 2220 of computing architecture 2200 (discussed in FIG. 22). Disclosed embodiments may include at least one processor that may be configured to execute stored instructions to perform operations for providing a workflow-building module utilizing a canvas, the workflow including workflow blocks having input fields utilizing static and dynamic subfields. As shown in FIG. 10, process 1000 may include steps 1002, 1004, 1006, 1008, 1010, and 1012 discussed in further detail below.

At step 1002, process 1000 may include, during a configuration phase, enabling construction of a workflow via a selection of preconstructed workflow blocks capable of being interconnected with logical connections. To enable the construction of a workflow, a canvas interface, such as canvas 208, 308, 408, or 608, may be provided alongside a display, such as display 206, 306, 406, or 608, to house the workflow blocks. This canvas serves as an intuitive space for users to create and build their workflows. It incorporates various graphical user interface (GUI) components that facilitate block configuration, placement, and interconnection. In some embodiments, the preconstructed workflow blocks may be stored in a database. More specifically, the canvas, in addition to its primary functions, may also offer block selection and integration capabilities. This may be achieved by enabling users to select workflow blocks from a library of template blocks, as described earlier in the previous sections related to FIGS. 3A-B. When the library of template workflow blocks is displayed in conjunction with the canvas, users can make selections by choosing workflow block templates from the displayed library. For example, in reference to FIG. 6, any of the workflow blocks 602-1 through 602-5 may be selected from a library of template workflow blocks. It should be noted that the use of workflow block templates does not completely obviate the need to define more precisely certain factors (e.g., internal or external resources) required to implement workflow functionality.

At step 1004, process 1000 may include enabling placement on a canvas of a first workflow block selected from the preconstructed workflow blocks, wherein the first workflow block has a first input field having a static subfield, and a subfield URL for retrieving dynamic subfields associated with the static subfield. In other words, once the process of selection is performed, placement onto the canvas at a desired location is enabled. For example, once workflow block 602-1 has been selected, it may be placed onto canvas 608 at its designated position, in the current example at the top of workflow diagram 600, meaning that workflow block 602-1 corresponds to the first workflow block and the first task to be executed. In some embodiments, enabling placement on the canvas of the first workflow block may include enabling selection of the first workflow block from a library of template workflow blocks or enabling dragging and dropping the first workflow block from the library of template workflow blocks to the canvas, as described in relation to FIGS. 3A-B. In some cases, a workflow block may be considered as placed on a canvas for invoking the subfield URL, only when a type of a workflow block was selected for placement and an input to be associated with the block is chosen. In other cases, if the first workflow block is associated with a predetermined type of an internal resource, but a specific resource is not associated therewith during the configuration phase, the system can, by default, initiate acquiring all possible subfields related to that predetermined type of an internal resource for use in downstream blocks.

The first workflow block (e.g., 602-1) has an input field, this input field may include a static subfield and at least one dynamic subfield associated with the static subfield. The dynamic subfield may be retrieved via a subfield URL. In the context of the present disclosure a subfield URL refers to a specific subset or subcategory of information comprised within a larger URL or web address. A subfield URL may involve adding additional parameters or paths to the main URL to access a specific resource or data within a website. For example, consider the following URL: https://www.example.com/items/category_item1/item1. In this URL, "items" and "category_item1" are subfields that provide more specific information about the desired resource. The "products" subfield indicates that the URL is related to items, and the "category_item1" subfield specifies a particular category within the items section. Finally, "item1" is a subfield that represents a specific item within the chosen category. When used dynamic subfields are used in conjunction with global variables, subfield URLs may be used as linkage fields. In some embodiments, the first input field may include a plurality of static subfields and a plurality of subfield URLs. In some embodiments, the plurality of subfield URLs are acquired automatically (all the options are selected and imported) and are hidden from the user in the first block itself. For example, when a board is selected as a static field in the input field, all of the plurality of subfield URLs thereof (the updates, the columns, the items, metadata information etc.) is imported and being available for downstream blocks.

Figure 11:
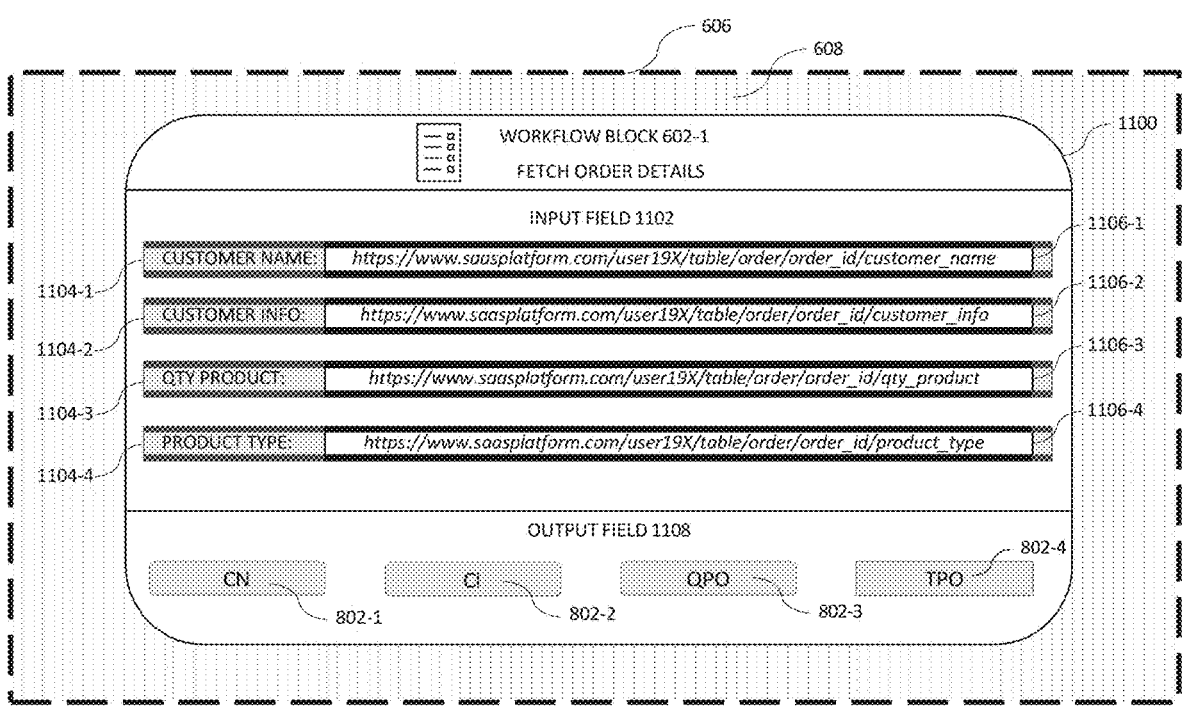
FIG. 11 illustrates an editing window designed for implementing the functionality of a first workflow block of the exemplary workflow diagram shown in FIG. 6, the editing window includes a plurality of input fields having static and dynamic subfields, consistent with some disclosed embodiments.

FIG. 11 illustrates an editing window 1100 designed for implementing the functionality of workflow block 602-1, presented on display 606 in association with canvas 608. The appearance of the editing window may be triggered by a user interaction within canvas 608. For instance, a user may click on workflow block 602-1, prompting the display of editing window 1100. As depicted in FIG. 11, workflow block 602-1 comprises an input field 1102 containing several static subfields 1104. These static subfields include "Customer Name" (static subfield 1104-1), "Customer Information" (static subfield 1104-2), "Quantity of Product Ordered" (static subfield 1104-3), and "Type of Product Ordered" (static subfield 1104-4). Each static subfield 1104 is associated with a corresponding dynamic subfield 1106 (1106-1 through 1106-4) and a subfield URL used to retrieve values for the dynamic subfields 1106. The purpose of workflow block 602-1 is to retrieve order details and populate global variables 802-1 through 802-4 (as defined in relation to FIG. 8) associated with the dynamic subfields 1106. This is accomplished by accessing an internal order database or table using the provided subfield URLs. The subfield URLs may be provided by a user, such as the sale representative via the editing window. The global variables 802-1 through 802-4 are illustrated within the output field 1108 of workflow block 602-1. They serve as storage for the values obtained from the internal order database, enabling further processing or utilization within the workflow. Editing window 1100 presented here is just one example of an editing window configured for the functionality of workflow block 602-1. In some embodiments, the editing window 1100 may include additional information or GUI components tailored to implement the specific functionality of workflow block 602-1.

In some embodiments, the complete subfield URLs may not be displayed within the editing window 1100. Instead, a shorter placeholder or placeholder text may be utilized in their place. The use of placeholders allows for a more concise and visually streamlined representation of the subfield URLs. Rather than displaying the entire URL, which may be lengthy and potentially overwhelming for users, a placeholder text provides a simplified and intuitive reference to the location or source of the dynamic subfield values.

It is to be appreciated that the provision of dynamic subfields associated with static subfields in input fields may be achieved through various methods, not limited to the utilization of subfield URLs. One such method is by incorporating user input during the execution of the workflow to generate dynamic subfields. When a workflow is executed, users may provide inputs that dynamically influence the behavior or content of the workflow. These user inputs may be captured and utilized to generate dynamic subfields within the input fields. For example, one may consider an input field that consists of a static subfield, such as a text entry window, and a dynamic subfield that needs to be populated based on the user's input. When the user enters text into the input window, the entered value may be captured and used to generate the corresponding dynamic subfield. It is also worth noting that when a workflow block requires multiple dynamic subfields, the value or selection made in a first dynamic subfield may serve as a trigger or basis for populating subsequent dynamic subfields. This value provided by a user or obtained from a source in the first dynamic subfield may be used to dynamically generate options or populate other fields accordingly. In an alternative scenario to the one depicted in FIG. 11, workflow 602-1 may involve a user interaction that requires the input of an order ID. This order ID would be associated with additional static and dynamic subfields, and the value entered in this dynamic subfield would influence the population of dynamic subfields 1106. For instance, when the sales representative provides an order ID as input, it could trigger the retrieval of specific information related to that order. This information could then populate the dynamic subfields 1106 associated with the order, dynamically updating their values based on the provided order ID.

In some embodiments, the first block may be an internal block associated with at least one internal resource. As used herein, internal blocks may refer to stages or components within a workflow that are self-contained and do not rely on external interactions. Internal blocks represent the steps or tasks that may be performed within the workflow itself, or that are affiliated with resources that are controlled by the user at the origin of the workflow. These blocks are often sequential and may involve activities such as data processing, analysis, or decision-making. For example, referring to FIG. 1, block 602-1 is an internal block, it is configured to process and retrieve data from an internal order database (internal resource) controlled and managed by the sales representative. Alternatively, in some other embodiments, the first block may be an external block associated with at least one external resource. In contrast with internal blocks, external blocks may correspond to stages or components of a workflow that involve interactions or dependencies with entities outside the immediate workflow. External blocks often involve external systems. They may include tasks such as receiving inputs from external sources, obtaining approvals, sending notifications, or integrating with external tools or APIs. These blocks typically rely on external inputs, communication, or coordination to move the workflow forward.

At step 1006, process 1000 may include upon placement of the first block on the canvas, invoking the subfield URL to retrieve the dynamic subfields. When the first block is placed on the canvas, it triggers the initiation of the workflow process. As part of this initialization, the subfield URL is invoked to fetch the needed dynamic subfields for that particular first block. This retrieval process ensures that the input field within the first block is populated with the relevant and up-to-date dynamic subfield values. By invoking the subfield URL, the workflow system establishes a connection to the designated source, such as an internal database or an external resource. It retrieves the required information based on the provided URL and populates the corresponding dynamic subfields within the input fields of the block. This initial invocation of the subfield URL sets the foundation for subsequent interactions and data processing within the workflow. The retrieved dynamic subfields provide the needed context and input for executing further steps and actions within the workflow. For example, upon placement of workflow block 602-1 onto canvas 608, the subfield URLs illustrated in FIG. 11 may be invoked to retrieve and populate dynamic subfields 1106-1 through 1106-4.

In some embodiments, the retrieved dynamic subfields of the first workflow block may be usable as input values associated with at least one workflow block downstream of the first workflow block. In other words, the dynamic subfields obtained from the first workflow block serve as valuable data inputs that may be passed on and utilized by subsequent workflow blocks within the workflow. When the dynamic subfields are retrieved from the first workflow block, they contain relevant and updated information. This data may be seamlessly transferred and employed as input values for downstream workflow blocks, enabling continuity and information flow throughout the workflow. This transfer of data may be performed via the utilization of global variables. It is worth appreciating that in order for the workflow blocks downstream of the first workflow block to utilize the retrieved dynamic subfields, they need to be positioned on a similar branch or path within the workflow. This ensures the logical flow of data and dependencies between the blocks.

Referring to FIGS. 6 and 8, any of the workflow block 602-2 through 602-5 may utilize the retrieved dynamics fields of block 602-1. For example, workflow block 602-3 is using the dynamic subfields 1104-3 (Quantity of product ordered) and 1104-4 (Type of product ordered) obtained from block 602-1. These dynamic subfields are accessed through global variables 802-3 and 802-4, respectively. Block 602-3 utilizes this data to perform calculations, specifically to determine the total price of the customer's order.

In some embodiments, the retrieved dynamic subfields of the first workflow block may be usable as output values associated with the first workflow block or with at least one workflow block downstream of the first workflow block. In the context of the workflow, the dynamic subfields obtained from the first workflow block serve valuable information that may be utilized as outputs. These outputs may be utilized within the first workflow block to drive subsequent actions or decisions, or they may be passed on as inputs to downstream workflow blocks for further processing and then these same downstream workflow blocks may utilize these values as output. For example, the first workflow block may generate dynamic subfields that represent calculated results, status updates, or transformed data. These dynamic subfields, functioning as output values, may be used within the first workflow block to influence its behavior or to provide information for subsequent steps within the same block. Furthermore, these output values may also be utilized by downstream workflow blocks processing the received input values and generating their own output values based on the computations or actions performed. Similarly, this transfer of data may be performed via the utilization of global variables. It is worth appreciating that in order for the workflow blocks downstream of the first workflow block to utilize and output the retrieved dynamic subfields, they need to be positioned on a similar branch or path within the workflow. This ensures the logical flow of data and dependencies between the blocks. In the example illustrated in FIG. 11, output field 1108 of block 602-1 includes all the retrieved dynamic fields 1106-1 through 1106-4 via utilization of global variables 802-1 through 802-4.

At step 1008, process 1000 may include enabling placement of a second workflow block on the canvas selected from the preconstructed workflow blocks downstream of the first workflow block and in a same branch as the first workflow block, the second workflow block having a second input field capable of utilizing a subset of the dynamic subfields of the first workflow block. After the initial selection and placement of the first workflow block onto the canvas placement of the second block at a location downstream of the first workflow block and in the same branch as the workflow block is enabled. For example, referring to FIG. 6 once workflow block 602-1 is in position, the next step is to place workflow block 602-2, which was selected alongside workflow block 602-1. In accordance with process 1000, workflow block 602-2 may be placed onto canvas 608 at a location directly below workflow block 602-1. This ensures that workflow block 602-2 is positioned downstream of the first workflow block 602-1 and in the same branch as the first workflow block 602-1. In some embodiments, enabling placement on the canvas of the second workflow block may include enabling selection of the second workflow block from a library of template workflow blocks or enabling dragging and dropping the second workflow block from the library of template workflow blocks to the canvas, as described in relation to FIGS. 3A-B.

Consistent with some disclosed embodiments, the second workflow block has a second input field capable of utilizing a subset of the dynamic subfields of the first workflow block. For example, the second workflow block may be specifically designed or constructed in a way that enables it to access and utilize dynamic subfields of the first workflow block as inputs. For example, in the design of the second workflow block, the second input field may be explicitly configured to accept and process dynamic subfields from the first block. The selection of the actual subset of the dynamic subfields of the first workflow block may be achieved through the configuration or customization options provided by the workflow management platform or canvas (e.g., GUI component, drop-down menus . . . ). The user designing the workflow may specify which dynamic subfields, hence which subset should be used as inputs for each workflow block, including the second block. For example, referring to FIG. 11, workflow block 602-1 may be configured to utilize any of the dynamic subfields 1106-1 through 1106-4 of workflow block 602-1, the sales representation then during configuration of workflow 602-2 may only select dynamic subfields 1106-3 and 1106-4 and their associated global variable 802-3 and 802-4. These chosen subfields are the ones required for estimating the delay needed to complete the customer's order in conjunction with the production line schedule. In some embodiments, enabling placement of a second workflow block on the canvas may include identifying a relevant dynamic subfield of the first workflow block and include the relevant dynamic fields in the second input field. In other words, the second workflow block may automatically recognize that a relevant dynamic subfield was acquired upstream in the first block, and upon placement thereof on the canvas the workflow builder will suggest selecting the relevant dynamic subfield as an input thereto. For example, during configuration of workflow 602-2, upon placement thereof the processor may perform an inquiry whether a relevant dynamic data is available in any of the upstream blocks, and if so, a GUI element may suggest a user to select them as input, and specifically for the example, to select dynamic subfields 1106-3 and 1106-4 as input.

In some embodiments, the second input fields may include a static subfield or a plurality of static subfields. This at least one static subfield may be associated with the subset of the dynamic subfields of the first workflow block. It is to be appreciated that in addition to being capable of utilizing a subset of the dynamic subfields from the first workflow block, the second input field may also include its own set of static and associated dynamic subfields. This means that the second input field is not limited to relying solely on the dynamic subfields obtained from the first block. It may have its own specific static subfields that provide fixed values and incorporate its own dynamic subfields that interact with other components of the workflow or receive data from preceding blocks. By having its own set of static and dynamic subfields, the second input field may gather additional information, perform calculations, or trigger specific actions within the context of the second workflow block. As an example, the input field of workflow block 602-2 may include an additional static and dynamic field related to a level of priority assigned to the customer order. This level of priority, provided by the sales representative, may have an impact on the determination of the estimated delay for the order and also influence the production line schedule accordingly. By incorporating this additional static field for capturing the level of priority and a dynamic field to receive and process that input, the workflow block 602-2 gains the ability to prioritize specific customer orders. This priority level may be used as a factor in calculating the estimated delay, allowing the block to consider and adjust the production line schedule based on the priority assigned to the order.

In some embodiments, the second workflow block may be an internal block associated with at least one internal resource or an external workflow block associated with at least one external resource. For instance, referring to FIG. 6, workflow block 602-2 is an external block associated with an external resource (production line schedule).

In some embodiments, the subset of the dynamic subfields of the first workflow block may be an entire set of the dynamic subfields of the first workflow block. In this scenario, the user has the option to select all the dynamic subfields of the first workflow block and include them as part of the second input fields. By selecting the complete set of dynamic subfields, the user may ensure that the second input field may utilize all the dynamic subfields generated by the first block. This comprehensive integration of data allows the second workflow block to make full use of the information provided by the first block.

In some embodiments, process 1000 may further include during a configuration phase initiating configuration of a plurality of resources to implement functionality of the preconstructed workflow blocks. During the configuration phase, when dealing with preconstructed workflow blocks that may not be fully operational or are selected from a workflow template library, the implementation of their functionality, as well as the overall workflow functionality, may require a variety of resources (both internal and external). The user may be responsible for identifying and assigning these resources to ensure the execution of the workflow blocks. Alternatively, this process may be carried by a software associated with a workflow management platform, potentially incorporating AI functionality. For instance, referring to FIG. 6, block 602-1 needs access to an internal order database to retrieve customer order details, while block 602-2 requires interaction with a production scheduling system to determine estimated order completion time. During the configuration phase, the sales representative would configure and establish connections between these resources and their respective workflow blocks. The process of configuring a plurality of resources to implement the functionality of the preconstructed workflow blocks may be achieved using a process similar to process 500, as illustrated in FIG. 5. This process provides a framework and outlines the needed steps to link the resources to their corresponding workflow blocks.

Some disclosed embodiments may involve, during a runtime phase, fetching values associated with the subset of the dynamic subfields of the first workflow block. Fetching refers to a process of retrieving data or information, in this instance, data or information having to do with the subsets of dynamic subfields of the first workflow block. This step may ensure that the data required for the execution of the second workflow block is retrieved and made available. Fetching the values associated with the subset of dynamic subfields during the runtime phase allows for obtaining real-time or up-to-date data, as these values may have been generated or updated during the course of the workflow execution. This dynamic data retrieval process contributes to the overall functionality and accuracy of the workflow, enabling it to adapt to changing conditions and produce reliable results. Related functionality is exemplified in step 1010 of process 1000.

Some disclosed embodiments may involve using at least one of the fetched subset values as inputs for the second workflow block. After fetching the values associated with the subset of dynamic subfields from the first workflow block, these values may be utilized as inputs for the second block during the execution of the workflow. For example, referring to FIG. 6 in conjunction with process 1000, second workflow block 602-2 is designed to calculate the estimated delivery time for a customer's order based on various factors. The first workflow block, block 602-1, retrieves relevant order details such as the product quantity, and product type. These dynamic subfields (dynamic subfields 1106-3 and 1106-4) of block 602-1 contain the needed information for estimating the delay to complete the customer's order. During the runtime phase of process 1000, the values associated with the dynamic subfields of block 602-1 are fetched. These fetched values are then used as inputs for block 602-2. Using these fetched subset values, block 602-2 performs its calculations. Related functionality is exemplified in step 1012 of process 1000. In another example, if a second workflow block is configured to summarize each column of a board referred to in a first workflow block, the dynamic subfield of the first block can be used to retrieve an up-to-date information on the amount and content of all the columns, and that data can be used in the input of the second workflow block. Thus, each actuation of the workflow will utilize the up-to-date amount and content of the columns in the board, as it is acquired anew each actuation of the workflow.

Some disclosed embodiments, may involve during a configuration phase: enabling placement of one or more additional blocks selected from the preconstructed workflow blocks, wherein each one of the one or more additional blocks has an additional input field capable of utilizing another subset of the dynamic subfields of the workflow blocks preceding each of the one or more additional blocks; and, during a runtime phase: fetching values associated with each of the other subsets of the dynamic subfields; and using the fetched subset values as inputs for the one or more additional workflow blocks. In a similar manner to steps 1008-1012, which correspond to the placement and implementation of the second workflow block, process 1000 may repeat these steps for one or more additional blocks. These additional blocks may be placed downstream of the first and second workflow blocks or between them. They may be organized in a single branch or multiple branches within the workflow structure. Each of these additional blocks is designed or constructed to utilize a specific subset of the dynamic subfields from the preceding workflow blocks. This means that they may access and utilize the dynamic subfields of the workflow blocks that come before them in a same branch as inputs. The user configuring the workflow specifies which subset of dynamic subfields should be utilized by each additional block. During the runtime phase, all the values associated with each subset of dynamic subfields are fetched, and these fetched values are used as inputs for the respective workflow blocks.

For example, in the context of FIG. 6, process 1000 enables the placement and implementation of workflow blocks 602-3 through 602-5. Each of these blocks may utilize a specific subset of dynamic subfields from the preceding blocks. For instance, block 602-3 may utilize dynamic values from blocks 602-1 and 602-2, block 602-4 may utilize dynamic subfields from blocks 602-1 to 602-3, and block 602-5 may utilize dynamic subfields from blocks 602-1 to 602-4.

In some embodiments, each of the one or more additional blocks may be an internal block associated with at least one internal resource or an external block associated with at least one external resource. For example, in FIG. 6, blocks 602-3 and 602-4 are internal blocks associated respectively with an internal pricing application and an internal invoice template, and block 602-5 is an external block associated with an external mailbox.

Consistent with the disclosed embodiments, any of the workflow blocks discussed above (first workflow block, second workflow block and the one or more additional blocks) may be configured to receive at least one trigger and to implement at least one action. The at least one trigger and the at least one action may encompass any of the triggers and actions described throughout the entirety of the present disclosure. For example, in some embodiments, the at least one trigger may include at least one of a time-based trigger, an event-based trigger, a data trigger, an external trigger, a manual trigger, a conditional trigger, or a combination thereof, and the at least one action may include at least one of a data manipulation action, notification action, user interaction action, control workflow action, decision action, or a combination thereof.

Some disclosed embodiments may involve AI functionality, which refers to the capabilities and features that enable a software system or application to exhibit behaviors and perform tasks that would typically require human intelligence. AI functionality allows machines to analyze data, learn from it, reason, and make decisions based on patterns and insights derived from the data. Examples of tasks that may be facilitated with AI functionality include comprehension of natural language, recognition of patterns or structures in a data set, or the generation of predictions/forecasts. AI functionality may include, for example, different techniques and technologies such as Natural Language Processing (NLP), Natural Language Generation (NLG), Machine Learning (ML), Neural Network (NN), Deep Learning (DL), Large Language Model (LLM), or Computer Vision. AI functionalities empower applications to analyze, interpret, and generate data, automate processes, optimize performance, and offer intelligent solutions for intricate problems.

AI systems may possess multiple functionalities simultaneously, and their capabilities may span different areas of AI. For instance, an AI system may have both generative AI functionality to produce new content, such as text or images, and analytical AI functionality to analyze existing data, detect patterns, make decisions, or identify anomalies like a fraud. These functionalities may be intertwined within a single AI system, allowing it to generate new content while also performing analysis on that content or other data. Differing AI functionalities may overlap and there may be interplay between them. Moreover, AI systems may exhibit a wide range of capabilities that are not limited to a single category or functionality.

In the context of SaaS platforms or project management platforms, AI functionality may manifest in the form of AI assistants working in close relation with a SaaS platform element or sub-element. An AI assistant also known as a virtual assistant may refer to any kind of digital tool or software utilizing artificial intelligence to provide interactive assistance to a user, which may be personalized to the user itself. AI assistants may act as personal assistants, chatbots, virtual customer service representatives or productivity assistants, helping to perform tasks related to project management such as scheduling, organizing, prioritizing, and providing recommendations based on data analysis and patterns. They can help streamline workflows, automate repetitive tasks, offer insights and suggestions, and enhance overall productivity and efficiency. AI assistants may simulate human-like conversational interactions and learn from user interactions and data inputs, to continuously improve their capabilities and adapt to user preferences, improving productivity and experience.

AI assistants may be powered by AI agents, also referred to as AI engines or AI core technology, i.e., components responsible for understanding user inputs, generating appropriate responses, and performing tasks on behalf of the user. An AI agent utilizes artificial intelligence technologies, such as NLP, ML, decision-making algorithms or any of the above-listed AI technologies or others, to interpret user queries, process information, and provide relevant and context-aware assistance. AI agents within AI assistants may incorporate various components, including perception to understanding user inputs (e.g., speech recognition or text parsing), reasoning and decision-making to generate appropriate responses, and action to execute tasks or interact with external systems. It may also involve learning capabilities to improve performance over time through user interactions and feedback. The AI agent acts as the intelligent core of the AI assistant, enabling it to understand user intent, provide accurate and helpful responses, and perform tasks or services on behalf of the user. It drives the conversational and interactive capabilities of the AI assistant, making it capable of simulating human-like interactions and assisting users with their requests. Examples of AI assistants include Apple Siri™, Amazon Alexa™, Microsoft Cortana™, IBM Watson™, OpenAI ChatGPT-4™ and Bard™ Google's Assistant. The specific name or brand of the AI agent behind an AI assistant may vary depending on the developer or company that created it, some may not be publicly disclosed, like Siri™'s AI agent for example, while others are known, like Google's AI agent that powers Bard™, called Language Model for Dialogue Application (LaMDA). Communication and data exchange between a SaaS platform and an AI agent may be performed in various ways. For example, with reference to FIG. 1, an AI communication module 116 may be included in the SaaS platform 100 to establish a connection between the SaaS platform and one or more AI agents.

AI agents may specialize in different types of operations or data processing based on their training, the AI technologies employed and their design. Accordingly, AI agents may be programmed and trained to specialize in specific domains, tasks, or industries. For example, different AI agents may specialize in the generation of different types of content such as text, images, code, or audio signals. In another example, different AI agents may be labelled by a specific type of data used in their training set, a first AI agent may be specialized in customer relationships and trained to handle customer inquiries, a second AI agent may be specialized in financial analysis and have the ability to understand economic terminologies and analyze financial data, and a third AI agent may specialize in healthcare and generate treatment recommendation based on inquiries comprising medical terms and information. Despite the existence of these specialized AI agents, more general and versatile AI agents may handle different types of operations or data. These agents possess broader capabilities and may perform a variety of tasks across different domains. For example, an AI agent may be able to generate both text and visual presentations. It could be trained and programmed to understand natural language and then generate written content. Additionally, it could utilize its visual processing capabilities to create visual presentations or even generate images based on a given input.

In accordance with some embodiments, whenever a use of an AI agent is discovered or made in relation to an implementation of AI functionality, a compliance check may be performed. Compliance checks aim to ensure an ethical and legal utilization of artificial intelligence by guaranteeing that an AI agent adheres to predetermined codes of conduct, regulatory requirements, and/or ethical guidelines. Conducting a compliance check is a process that may require one or more of the following steps:

Establish Clear Policies and Standards: Define precise policies, criteria, procedures, and standards that the AI agent must meet to in terms of transparency, fairness, reliability, and accountability. This encompasses researching and identifying relevant laws, regulations, sector-specific requirements, and ethical guidelines for AI.

Identify Purpose and Context: Understand the specific purpose and intended use of the AI agent by capturing its goals, objectives, and operational context. Evaluate the underlying AI technology, including data selection, algorithmic design, and model training techniques.

Ensure Data Privacy and Security: Monitor how data is collected, stored, and used by the AI agent. Implement practices that prioritize data privacy, such as obtaining proper consent, anonymizing or pseudonymizing personal data, and employing secure storage and processing methods.

Mitigate Bias and Unfair Treatment: Scrutinize the AI agent for potential biases that may result in unfair treatment or discrimination against individuals or groups. Enhance the diversity and representativeness of training data and incorporate fairness-aware algorithms to mitigate biases.

Monitor AI Agent Behavior: Continuously observe and analyze the behavior of the AI agent across different use cases. Keep abreast of changes in regulations and guidelines, and adapt the compliance verification process accordingly.

Conduct Audits and Reviews: Perform regular audits and reviews to evaluate ongoing compliance and identify areas for improvement. Stay informed about evolving regulations and guidelines, adapting the compliance check process accordingly.

Document the Compliance Check: Maintain comprehensive documentation of the compliance check process, including results, actions taken, and implemented changes. Keep records of compliance to demonstrate accountability and provide transparency, vis-à-vis stakeholders.

By following one or more of the above steps, entities that provide AI functionality ensure that their AI agents operate within a clear, legal, and ethical environment, which promotes the responsible and trustworthy use of AI. Compliance checks may be performed using a compliance check digital toolkit or plug-in tool. While compliance checks are valuable to ensure ethical and regulatory adherence, there may be situations where non-compliance-related guidance or technical instructions may be provided to an AI agent to influence its behavior or output in a specific manner. The purpose of such guidance or instructions is to shape the AI agent response to align with desired objectives or outcomes. This process may be accomplished by setting one or more of the following preferences:

Language preferences: Users may instruct the AI agent to respond in a specific language, adopt certain terminologies (e.g., industry jargon, dialects, idioms), or emulate a particular tone or style (e.g., mimicking a specific character).

Formatting preferences: Instructions may be given to the AI agent regarding the desired structure of the response, such as using a cypher, employing bullet points, or incorporating visual aids.

Specific data preferences: Users may provide guidance to the AI agent about the data or sources to be utilized in generating the response. This may include specifying the use of accurate and reliable data sources, particular databases, or considering a specific dataset.

Task-specific preferences: Users may offer instructions or guidelines to the AI agent for responding to a specific task, such as following a prescribed method or utilizing a predetermined algorithm.

By influencing an AI agent's behavior, users may obtain responses that meet their specific needs or align with their intended outcomes, even if those instructions are not related to compliance requirements. However, it is to be appreciated that a user may ensure that the provided instructions or guidance fall within the boundaries of responsible and ethical use of AI technology.

Incorporating AI functionality into a workflow, particularly within a SaaS platform, is a complex endeavor that demands careful consideration and a well-defined process. The following section aims to provide a comprehensive overview of the steps required to achieve a seamless integration of AI capabilities into a workflow.

FIG. 12 is a flowchart of an exemplary process (1200) for constructing a workflow, the workflow having at least one block with AI functionality. Process 1200 is discussed herein for explanatory purposes and is not intended to be limiting. In some embodiments, steps of process 1200 may be changed, modified, substituted, or rearranged, consistent with the present disclosure. Process 1200 may be implemented using one or more components of a computing device 2100 (discussed in FIG. 21) or user device 2220 of computing architecture 2200 (discussed in FIG. 22). Disclosed embodiments may include at least one processor that may be configured to execute stored instructions to perform operations for constructing a workflow having at least one block with AI functionality. As shown in FIG. 12, process 1200 may include steps 1202, 1204, 1206, and 1208 discussed in further detail below.

Figure 13:
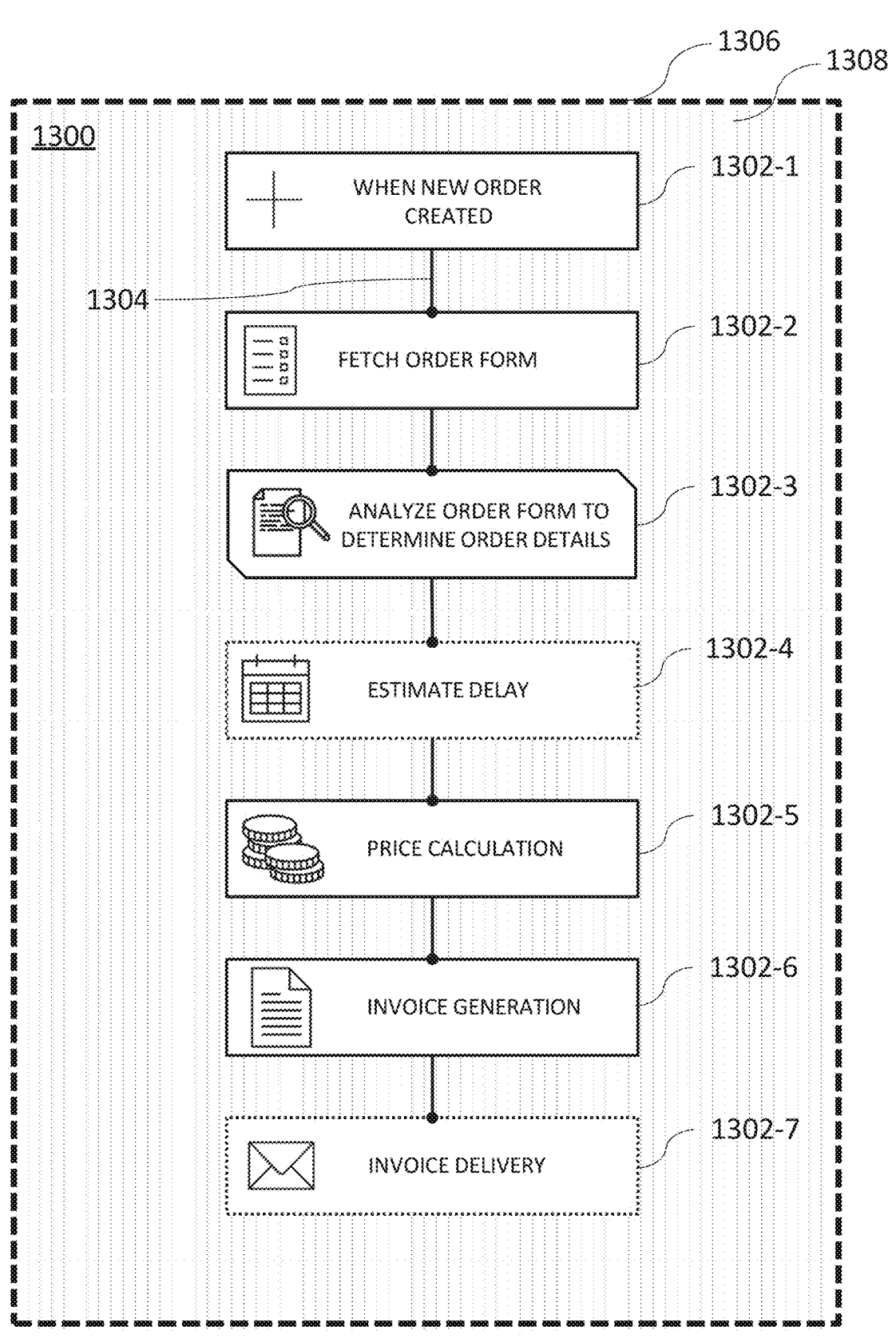
FIG. 13 illustrates an alternative version of the workflow diagram shown in FIG. 6 featuring one block incorporating AI functionality, consistent with the disclosed embodiments.

FIG. 13 illustrates a workflow diagram 1300 that showcases an exemplary workflow initiated by a user of the SaaS platform 100. This diagram represents an alternative version of the original workflow diagram 600 shown in FIG. 6, incorporating additional AI functionality to enhance the process.

In this scenario, the sales representative aims to improve the process of delivering invoices to customers by incorporating AI functionality to determine pertinent order details. Currently, the sales teams of the company request customers to complete an order form for processing their orders. Upon receiving the completed order form, a sales team member manually creates a new order item in the internal order database and manually extracts the relevant order details from the information provided on the form. To save time and streamline the process, the sales representative wishes to automate this procedure by providing the order form to an AI agent capable of extracting the needed order details from the form, thereby eliminating the need for human intervention. With the introduction of AI functionality to extract relevant order details from the order form, the remaining task for the sales team member is to simply create a new order item in the system and attach the corresponding order form.

Workflow diagram 1300, presented on display 1306 utilizing a workflow canvas 1308, includes seven interconnected workflow blocks 1302 (1302-1 through 1302-7) and a plurality of logical connection 607. Each workflow block 1302 represents a particular task involved in the process of delivering an invoice to a customer following an order. More specifically:

Workflow block 1302-1—When a new order item is created: The purpose of this block is to detect the addition of a new order item to the internal order database of the sales team. Block 1302-1 may further retrieve an order ID associated with the new order created.

Workflow block 1302-2—Fetch order form: This block retrieves the order form corresponding to the new order, for example by using an order ID obtained by block 1302-1.

Workflow block 1302-3—Analyze order form to determine order details: This block employs AI functionality in order to extract pertinent order details from the order form provided by block 1302-2. Once the order details have been determined block 1302-3 may populate global variables with the order details such as global variables 802-1 through 802-4 as introduced and described in relation to FIG. 8.

Workflow blocks 1302-4 thought 1302-7: These blocks correspond respectively to workflow blocks 602-2 through 602-5 of workflow diagram 600, whose functions have been described in earlier sections.

Workflow blocks 1302, interconnected through logical connections 1304, form a sequence of tasks that enable the sales representative to effectively deliver an invoice to a customer following an order. To implement the functionality described, a combination of internal and external resources is utilized. In more detail, the internal resources (blocks with solid borders) include an internal database for detecting the creation of a new order item and fetching the corresponding order form (1302-1 and 1302-2), an application or table for price calculation (1302-5), and an invoicing application or text document template for invoice generation (1302-6). These internal resources are controlled by the sales representative. The external resources (blocks with dotted borders) consist of a production line schedule or calendar application for estimating the order delay (1302-5) and an external email box for invoice delivery (1302-7). These resources are provided by entities external to the sales representative's account and require integration and authorization. The visual design modifications in FIG. 13 emphasize the distinction between internal and external resource dependencies within the workflow diagram. Implementation of these resources in conjunction with workflow diagram 1300 may be performed by following the steps of process 500 described in the previous section in relation to FIG. 5.

Some disclosed embodiments involve displaying a canvas for containing and interconnecting workflow blocks. Displaying a canvas, refers to rendering a visual surface. By way of non-limiting examples, FIGS. 2, 3, 4, 6, 8, and 13 respectively illustrate examples of canvases 208, 308, 408, 608 and 1308, in relation to a display, such as displays 206, 306, 406, 606, or 1306. Displaying such canvases may be accomplished using various methods. For instance, it may involve utilizing a graphical user interface (GUI), a web-based application, or a software application. In the context of a Software-as-a-Service (SaaS) platform, this operation may be performed by a SaaS platform component like workflow manager 110. The canvas may be presented in conjunction with a user device, such as user device 2220. When displaying a canvas, several factors should be considered, including determining the suitable placement of the canvas within the display, ensuring appropriate sizing and proportions relative to the display, and enabling responsive and scalable interaction between the canvas and the display. Additionally, establishing a contextual relationship between the canvas and the display may be achieved through various GUI components like visual cues, borders, scroll bars, or a navigational map. Displaying a canvas is presented by example at step 1202 in process 1200 of FIG. 12. A canvas may be designed to accommodate workflow blocks, however, upon initial presentation on the display, the canvas may be empty and devoid of any workflow blocks. In other words, when the canvas is first displayed, there might not be any pre-existing workflow blocks present on it.

Some disclosed embodiments involve enabling placement of a plurality of workflow blocks on the canvas wherein the plurality of workflow blocks includes at least one trigger block and at least one action block, and wherein at least one of the at least one trigger block or the at least one action block is configurable to gain permissions to access a source of dynamic data. In addition, some embodiments may involve enabling generation of the plurality of workflow blocks. Enabling placement in this context refers to providing software or running software than permits workflow blocks to be situated on a canvas. The process of placement/construction and generation of workflow blocks on the displayed canvas may be performed in different manners. In some embodiments, at least a portion of the plurality of workflow blocks may be new blocks. In other words, the process may enable generation of new, non-preexisting blocks from scratch. To accomplish this, various factors may need to be defined to establish the functionality of the workflow blocks. These factors may include triggers and actions, input and output fields, (local) variables, identification of required resources, or a combination of these elements. Any of these operations may be performed in conjunction with a GUI like a workflow-building tool or palette displayed in association with the canvas. The GUI may provide users with the needed tools and options to define and configure the desired properties and functionalities of the workflow blocks. This allows users to easily create new blocks, specify their behaviors, and set up the connections between different blocks on the canvas. Enabling placement is depicted, for example, in FIG. 12 at step 1204.

In some other embodiments, at least a portion of the plurality of workflow blocks may be preconstructed workflow template blocks. As used therein preconstructed workflow template blocks refers to any kind of template blocks already partially configured or fully configured for use within a workflow. These blocks are designed to provide predefined functionality or perform specific tasks. Additionally, in some embodiments, the preconstructed workflow blocks may be selectable from a template library. More specifically, the canvas, in addition to its primary configuration, placement, and interconnection functions, may also offer block selection and integration capabilities. This may be achieved by enabling users to select workflow blocks from a template library, picklist, or other listing or repository (collectively a library). When the library of template workflow blocks is displayed in conjunction with the canvas, users can make selections by choosing workflow block templates from the displayed library. In some embodiments, enabling placement on the canvas of preconstructed workflow template blocks may include enabling selection of preconstructed workflow template blocks from the template library by utilizing GUI component or enabling dragging and dropping of preconstructed workflow blocks from the template library to the canvas, as described in relation to FIGS. 3A-B. For example, in reference to FIG. 13, after step 1204, a plurality of workflow blocks, more specifically workflow blocks 1302-1 and 1302-2 may have been incorporated into canvas 1306. These blocks could have been created from scratch, involving the construction of each block individually. Alternatively, they might have been selected from a template library that is presented alongside canvas 1306.

In accordance with some disclosed embodiments, the plurality of blocks in the workflow diagram may include at least one trigger block and at least one action block. As mentioned earlier, a trigger block functions substantially as a trigger for subsequent downstream workflow blocks, while an action block performs a specific action. For instance, referring to FIG. 13, block 1302-1 acts as a trigger by responding to the creation of a new order item in the internal order database. It initiates the trigger/action flow for the subsequent downstream blocks in workflow 1300. On the other hand, block 1302-2 represents an action block that performs the action of fetching the order details associated with the newly created order.

In addition, it should be noted that either the at least one trigger block or the at least one action block, or both, may be configured to obtain the permissions needed to access a source of dynamic data. This source of dynamic data may refer to any provider, repository, or system that supplies real-time or frequently updated information to the workflow process. The data from this source may consist of various entries that can change over time or between different workflow executions. Such a source of dynamic data may be provided by either an internal or an external resource as described in earlier sections. For example, in the context of FIG. 13, the internal order database serves as a source of dynamic data. The content of this database may evolve over time, such as the creation of new order items. In the current implementation of workflow 1300, trigger block 1302-1 is configured to detect the creation of a new item in this database. Additionally, action block 1302-2 is configured to retrieve information (such as the order form) from this database. Both blocks are designed to gain the needed permissions and access to this internal source of dynamic data.

Some disclosed embodiments may involve enabling placement of an AI block at a downstream location from the plurality of workflow blocks on the canvas, wherein the AI block is enabled to access the source of dynamic data by virtue of the downstream location. An AI block in a workflow may refer to a specific step or component within a larger workflow, where the block incorporates Artificial Intelligence (AI) technologies or has some AI functionality. An AI block may perform various tasks such as data pre-processing, feature extraction, model training, prediction or inference, decision-making, or any other AI-related operation. By incorporating AI blocks into a workflow, organizations may harness the power of AI to automate processes, gain insights from data, improve decision-making, increase efficiency, and achieve better outcomes. AI blocks may be powered by AI agents When referring to the information processing, utilization, or access within AI blocks, the terms "AI blocks" and "AI agents" may be used interchangeably. Both terms indicate the underlying AI components responsible for performing the computational tasks and providing the desired functionality within the workflow. Enabling placement of an AI block is exemplified in FIG. 12 at step 1206.

Placement of the AI block may be performed in accordance with any of the methods described above in relation to the plurality of blocks. Particularly, it is to be appreciated that an AI may be a preconstructed block selected from a template library. In the workflow diagram, the AI block is positioned downstream from the other workflow blocks on the canvas. This downstream placement enables the AI block to access the source of dynamic data and effectively utilize and process the dynamic data in its operations or decision-making processes. In reference to the example illustrated in FIG. 13, block 1302-3 represents the AI block within workflow diagram 1300. Its purpose is to utilize AI functionality in extracting and gathering order details from the order form provided by block 1302-2. Visually, the AI block 1302-3 is depicted with a distinct design, featuring a rectangle with snipped diagonal corners, setting it apart from the other blocks in the diagram. Moreover, as illustrated block 1302-3 is positioned downstream from blocks 1302-1 and 1302-2, indicating its location in the workflow sequence. This downstream placement allows AI block 1302-3 to access the internal order database and retrieve the needed data for order detail extraction. By leveraging AI capabilities, block 1302-3 enhances the workflow by automating the process of gathering order details from the order form.

In some embodiments, wherein the AI block is powered by an AI agent, the AI agent may be selectable from a plurality of available AI agents. The AI agent powering the AI block may consist of processes or tools such as those that perform machine learning, deep learning, computer vision, natural language processing, or a combination of different AI techniques. The selection of the AI agent may be performed in different ways, including during the configuration or construction phase of the workflow with interaction on the canvas. In some embodiments, the selection of the AI agent from a plurality of available AI agents may be performed via the AI block. When accessing the editing interface of the AI block, the user may be presented with various GUI components like checkboxes or dropdown menus to choose the AI agent powering the block. The plurality of available AI agents may include AI agents who specialize in different types of operations. The workflow management platform, where the workflow including the AI block is designed and executed, may pre-validate or pre-approve the plurality of available AI agents. This pre-validation process may involve compliance checks to ensure the AI agents comply with relevant regulations governing the platform. In some embodiments, the process may further include determining a preselection of pertinent AI agents to be presented during the AI agent selection process. This preselection aims to assist users in making their selections by suggesting pertinent AI agents. For instance, when the user is choosing the AI agent through a dropdown menu, a preselection of suggested AI agents may be displayed at the beginning of the dropdown menu. This preselection may be based on an analysis of the context of the AI block performed by the workflow management platform, for example by using a predetermined AI agent dedicated to this task. In the case of workflow diagram 1300, an AI agent specifically designed for document pattern recognition may be suggested due to its relevance to the task at hand.

In some embodiments, the AI block may be enabled to use data processed by at least one of the workflow blocks preceding the AI block in a same branch as the AI block. In addition to having access and utilizing data from the source of dynamic data by virtue of its downstream position, the AI block may be configured to utilize data processed by at least one of the preceding upstream blocks in the same branch as the AI agent. This allows the AI block to take advantage of the information gathered and processed by the preceding blocks in the same branch, providing a more comprehensive and informed outcome. For example, in workflow 1300, AI block 1302-3 is utilizing the order form fetched by block 1302-2 but may also utilize other data from the internal order database such as previously processed order items in order to refine its analysis and determine the order details.

In some embodiments, the AI block may be enabled to modify data in the source of dynamic data. Modifying data within the source of dynamic data may include various types of data manipulation mechanisms such as editing, adding, suppressing, merging, or any other form of data manipulation. By having the ability to modify data within the source of dynamic data, the AI block may update the source of dynamic data and actively contribute to the data management process. For example, with reference to FIG. 13, AI block 1302-3 may perform data modifications within the internal order database. It may edit a generic order ID initially provided with a more specific order ID after fetching the name of the customer, or it may populate the database with the relevant order details extracted from the order form, ensuring that the database is updated with the most accurate and up-to-date information.

Some disclosed embodiments involve, upon placement of the AI block, verifying that any block of the plurality of workflow blocks upstream of the AI block is not associated with a private database. A private database refers to any form of data structure or repository having at least some restricted-access. For example, a private database may be a repository of data that is not intended for public access. Private databases may also include repositories that are restricted to authorized individuals or entities with specific permissions or privileges and safeguard sensitive information, complying with security measures and privacy regulations to ensure data confidentiality and integrity. Verifying that upstream blocks are not associated with private databases may help a user preserve data confidentiality, comply with regulations (e.g., the General Data Protection Regulation (GDPR) in the European Union), mitigate security risks, and/or maintain good data governance. This verification step ensures that sensitive data is protected, and only accessed through authorized and secure channels within the workflow, it ensures that the integration of AI blocks with access to private databases is done in a controlled and compliant manner. Accordingly, the verification process may involve checking that an appropriate authentication flow has been established by any of the upstream plurality of blocks in relation to a private database and that appropriate access has been granted. The verification process may be part of a broader compliance check performed by the workflow management platform or SaaS platform whenever an AI block involving an agent is detected within the workflow. Even with authorization to access a private database, the data contained within that database may still be considered private.

In the context of FIG. 13, the verification process may include ensuring that proper authorization has been granted to blocks 1302-1 and 1302-2 with respect to the internal order database. Additionally, the verification process may focus on confirming that sensitive data, such as customers' names or information, stored within this database is not publicly exposed. By conducting this verification, the process and the platform may ensure that the workflow complies with data privacy and security standards. It verifies that the authorized access rights to the private database are appropriately granted and that any sensitive information contained within it remains confidential and protected from unauthorized access.

Furthermore, some embodiments, involve, upon placement of the AI block on the canvas, displaying in association with the canvas a graphic user interface (GUI) configured to receive a selection of permissions for the AI block. The GUI, whether as a dedicated interface or part of a broader editing interface, allows users to select and specify the permissions or access rights for the AI block. It provides a means for users to define and customize the permissions granted to the AI block within the workflow. These permissions may include accessing specific data sources (e.g., source of dynamic data), interacting with external systems or resources, and performing various actions, such as data modifications. For example, by presenting this GUI, process 1200 in collaboration with the workflow management platform or SaaS platform, may empower users with precise and granular control over the permissions assigned to the AI block. They have the ability to determine the scope and extent of the AI block's capabilities and its interactions within the workflow. Users may navigate through the GUI, choosing from a set of predefined permissions or even creating custom permissions tailored to the workflow's requirements and the desired AI functionality. This selection of permissions process ensures that the AI block operates within defined boundaries and aligns with an organization's policies and security considerations. The GUI enables users to manage and enforce appropriate restrictions and access controls, thereby maintaining the integrity and security of the workflow and its associated data. For instance, during the configuration of AI block, 1302-3, a GUI associated with canvas 1306 allows the sales representative to select the appropriate set of permissions for the AI block. These permissions may encompass comprehensive or limited access to the internal order database, as well as the ability to modify the data stored within it.

Some disclosed embodiments may involve providing an output from the AI block, wherein a prompt of the AI block includes data from the source of dynamic data. "Providing an output from the AI block" refers to generating a result or response using the AI mechanisms associated with the AI block. For example, the output may represent the outcome or information derived from the AI block's computations or actions. The output generation is represented by way of example, in FIG. 12 at step 1208. The output may take various forms depending on the specific AI block and its purpose within the workflow. It may include textual information, numerical data, visual representations, or any other format suitable for conveying the AI block's findings or recommendations. The purpose of providing this output is to communicate the insights, predictions, or actions determined by the AI block to the user or downstream components of the workflow. It serves as the tangible outcome of the AI block's computation, enabling users to make informed decisions or trigger subsequent steps based on the generated output. The output generated by the AI block holds significant value within the workflow and may be effectively utilized in conjunction with other components, including global variables and internal/external resources. In some embodiments, the output of the AI block may be directly displayed on the canvas after execution of the AI block.

Referring to FIG. 13, AI block 1303 serves as an example of where the output may be leveraged in such a manner. For example, after analyzing the order form to extract relevant order details, AI block 1303 may employ to populate global variables, more specifically global variables 802-1 through 802-4 as illustrated and explained in FIG. 8. These global variables may store and retain the extracted order details, making them accessible to other parts of the workflow. Furthermore, the AI block may also incorporate the relevant order details into the internal order database. This involves adding the extracted information to the database, ensuring that it becomes part of the overall order database. This integration enables the organization to leverage the captured data for further processing, analysis, or retrieval in subsequent workflow stages. By utilizing the output of the AI block in conjunction with global variables and the internal order database, the workflow gains the ability to maintain a synchronized and up-to-date repository of relevant order details. This facilitates efficient information sharing, improves data consistency, and enhances the overall functionality and effectiveness of the workflow.

The output generated by the AI block may be intricately linked to the prompt provided to the AI block or the AI agent powering it. In this context, a prompt may refer to any sort of input, command, or query directed to the AI block or AI agent, with the intention of eliciting a desired response or outcome, such as generating specific content or providing an answer. Prompts may take the form of questions, commands, or instructions that guide the AI agent in producing the desired output. The quality of the prompt may play a valuable role in obtaining a desired response with a sufficient level of accuracy and quality. A well-crafted prompt increases the likelihood of receiving a responsive output of high quality. The quality of a prompt is characterized by its accuracy and specificity, ensuring that the guidance provided to the AI agent aligns with the intended outcome. Prompts may be constructed using free language input, where users interact with an AI agent through a user interface (UI). Alternatively, prompts may be formulated as coded messages directed to an AI agent's application programming interface (API). In some cases, a combination of both approaches, i.e., a combination of free language input and coded instructions enabling users to provide high-level guidance in natural language and include specific instructions in a structured format, may be used. As discussed earlier, non-compliance-related guidance or technical instructions provided to the AI agent may be included in prompts thereby influencing the behavior of the AI agent. These additional instructions may be embedded in the free language prompt, included as settings messages sent to the AI agent API before making the request, or hardcoded into the AI agent's API itself. Prompt may be defined during the configuration process of the AI block by a user, via an editing interface of the AI block for example.

In line with the disclosed embodiments, the prompt of an AI block may incorporate data sourced from the source of dynamic data. Alternatively, in some embodiments, the prompt of the AI block may include data from the source of dynamic data and at least some of the data processed by the at least one of the workflow blocks preceding the AI block in the same branch as the AI block. When considering a specific branch in the workflow, the AI block's prompt may encompass relevant data obtained from the dynamic data source, as well as information processed by the preceding workflow blocks within that branch. This allows the AI block to leverage the contextual information and insights derived from the preceding blocks when generating its response or output. By including data processed by preceding workflow blocks in the prompt, the AI block may benefit from the accumulated knowledge and intermediate results within the workflow branch. This enhances the AI block's ability to analyze, interpret, and respond to the given task or inquiry, taking into account the specific context established by the preceding blocks.

To illustrate, in reference to FIG. 13, the prompt of AI block 1302-3 may encompass the order form, which is the output of block 1302-2, as well as some information for the internal order database such as the order ID or the name of the person in the sales team that have created the new item. Alongside these items, specific instructions such as "Analyze order form to extract relevant order details" may be included within the prompt. To achieve a more accurate and desirable outcome, the sales representative configuring AI block 1302-3 may choose to provide a more specific prompt. This could involve explicitly listing the desired order details, such as the customer's name and information, the quantity of the product ordered, and the type of product ordered. By supplying these specific instructions, the sales representative aims to enhance the precision and relevance of the AI block's response.

It is to be appreciated that the prompt of the AI agent may include additional information that may not necessarily be provided by a user during the configuration of the AI block or that comes from various sources or data points within the workflow itself. For example, in some embodiments, the prompt of the AI block may further include user details. User details in this context, encompass one or more pieces of information pertaining to the user. These pieces of may include user's account information of the user under which a trigger occurred resulting in the actuation of the AI block. Such information may include a username, email address, and/or a unique identifier. Additionally or alternatively, entity account information, such as the company name, department, or team, may also be a piece of information included in user details. Additionally or alternatively, specific settings and/or preferences chosen by the user, such as language preferences, display options, or notification settings, may also be a part of user details. Moreover, access privileges, which define the user's level of authority and the actions that can be performed within the platform, may also be included in user details. User details may further include the user's industry, providing contextual information for tailored functionalities, and the user's role within the company or organization, determining responsibilities and access privileges. Lastly, any other relevant user-related information provided to the platform, such as custom attributes or specific requirements, may be considered user details. Incorporating these user details into the AI block prompt may offer several advantages, particularly when the AI agent powering the AI block is versatile and specialized in various operations. By providing user details such as the industry in which the user operates, the AI technology employed may be further refined and tailored to specific needs. For instance, referring to FIG. 13, when the user details of the sales representative are provided, AI block 1302-3 may adapt its powering versatile AI agent, by selecting a technology/model specialized in customer relationship management (CRM). This model specifically trained to process and recognize customer-related terminology, results in a more accurate and relevant output for the sales representative. Integrating user details into the AI block prompt empowers the AI technology to adapt and cater to the specific needs and preferences of the user, resulting in a more customized and valuable user experience within the workflow.

Some disclosed embodiments may involve enabling placement of one or more additional workflow blocks at a position downstream of the AI block in a same branch as the AI block. "Downstream" refers to a later position in the workflow. A branch refers to a specific path or sequence of activities that diverges from the main flow. A same branch is that specific path in which the subject workflow block is located. Enabling placement refers to the software or the systems ability to permit the additional blocks to be placed. The additional blocks may be granted the capability to access the source of dynamic data, as well as access the output generated by the AI block. This access is facilitated by the downstream position of the additional blocks in relation to the AI block. By allowing the placement of subsequent blocks in this manner, a sequential flow is established where the output of the AI block may become an input for the subsequent additional blocks. This may enable a seamless transfer of data and information within the workflow, ensuring that the output generated by the AI block may be further utilized and processed by subsequent blocks. The downstream positioning of these additional blocks in the same branch may enable them to seamlessly access the source of dynamic data as well. This integration may ensure a cohesive flow of data and operations, where each block within the workflow may leverage the outputs and inputs of the preceding and succeeding blocks, respectively. Placement of the one or more additional workflow blocks may be performed in accordance with any of the methods described above in relation to the plurality of blocks or the AI blocks. Particularly, it is to be appreciated that any of the one or more additional workflow blocks may be a preconstructed block selected from a template library.

In reference to FIG. 13 and the steps outlined in process 1200 (steps 1202 through 1208), the subsequent step of process 1200 may involve the placement of blocks 1302-4 through 1302-7. These blocks are positioned downstream of AI block 1302-3 and blocks 1302-1 and 1302-2 within the same branch. As a result of their placement, these blocks inherit the capability to access the internal order database, along with the ability to access the output generated by AI block 1302-3. Each of these blocks, namely blocks 1302-4 through 1302-7, may efficiently perform their respective tasks by utilizing the data available from the aforementioned source. This enables them to seamlessly integrate with the workflow, leveraging the information from the internal order database and the output generated by AI block 1302-3.

Some disclosed embodiments may involve enabling placement of an additional AI block at a site downstream of the AI block in a same branch as the AI block, wherein the additional AI block is enabled to access the source of dynamic data and is enabled to access the output of the AI block by virtue of the downstream site; and providing an additional output from the additional AI block, a prompt of the additional AI block including at least one of data from the source of dynamic data, the output of the AI block, or a combination thereof. The terms in the prior sentence are previously defined herein. Similarly to steps 1206 and 1208 related to the integration of the (first) AI block, the additional AI block is positioned downstream, indicating a sequential flow within the workflow. This downstream placement may allow the additional AI block to inherit the capability to access the source of dynamic data and also gain access to the output generated by the preceding AI block ensuring that the additional AI block has the needed information and inputs to perform its designated tasks.

Additionally, the prompt provided to the additional AI block may be akin to the prompt given to the first AI block.

It may contain relevant information such as data from the dynamic data source, the output of the preceding AI block, or a combination of both. This prompt serves as the input or command for the additional AI block, guiding its actions and influencing its generated output. By enabling the placement of an additional AI block downstream and providing it with access to data and outputs, the workflow management platform or SaaS platform ensures a consistent and coherent flow of information and operations. This allows for the seamless integration of multiple AI blocks, each building upon the outputs and data generated by the preceding blocks, ultimately contributing to the overall effectiveness and efficiency of the workflow.

In certain embodiments, there may be at least one workflow block positioned between the AI block and the additional AI block. This intermediary workflow block serves to separate the two AI blocks, allowing for the execution of specific operations or tasks. Alternatively, in some other embodiment, the additional AI block may be directly positioned immediately after the AI block, without any intermediary workflow block in between. This arrangement enables a more direct and sequential flow of operations between the two AI blocks.

Similar to the AI block, the additional AI block may be also powered by an AI agent. This AI agent provides the intelligence and functionality to the additional AI block, allowing it to process data, generate outputs, and perform specific tasks within the workflow. In some embodiments, both the AI block and the additional AI block may be powered by the same AI agent, utilizing a single AI agent for the execution of related tasks. This may promote consistency and cohesiveness in the AI functionality throughout the workflow. Alternatively, the AI block and the additional AI block may be powered by two distinct AI agents. This permits utilization of different AI technologies or specialized agents tailored to specific tasks. Consistent with the disclosed embodiments, the AI agent of the additional AI block may also be selectable from a plurality of available AI agents.

In some embodiments, the additional AI block may be enabled to use data processed by at least one workflow block preceding the additional AI block in a same branch as the additional AI block. In addition, to have access and utilize data from the source of dynamic data and the output of the AI agent by virtue of its downstream position, the additional AI block may be configured to utilize data processed by at least one of the preceding upstream blocks in the same branch as the additional AI agent. This allows the additional AI block to take advantage of the information gathered and processed by the preceding blocks in the same branch, providing a more comprehensive and informed outcome.

In addition, in some embodiments, the prompt of the additional AI block includes at least one of data from the source of dynamic data, the output of the AI block, or a combination thereof, and at least some of the data processed by the at least one preceding workflow blocks in the same branch as the additional AI block. When considering a specific branch in the workflow, the additional AI block's prompt may encompass relevant data obtained from the dynamic data source, the output of the AI block, or a combination thereof, as well as information processed by the preceding workflow blocks within that branch. This allows the additional AI block to leverage the contextual information and insights derived from the preceding blocks when generating its response or output. By including data processed by preceding workflow blocks in the prompt, the additional AI block may benefit from the accumulated knowledge and intermediate results within the workflow branch. This enhances the additional AI block's ability to analyze, interpret, and respond to the given task or inquiry, taking into account the specific context established by the preceding blocks. Therefore, similar to the AI block, the additional AI block may use of contextual information from the preceding workflow blocks, allowing for a more informed and accurate generation of its output or response.

In some embodiments, providing the additional output from the additional AI block may include providing the additional output from the additional AI block to the AI block as an input in order to modify the prompt of the AI block. This modification allows the AI block to incorporate the output of the additional AI block into its prompt, potentially enhancing the AI block's understanding and response capabilities. By integrating the additional output into the AI block's prompt, a more comprehensive and contextually informed prompt may be created, leading to improved outcomes and results. Achieving a satisfactory quality in the output of the AI agent may indeed require multiple iterations or turns of refining the prompt. The process of fine-tuning the prompt of the Ai agent via the output of the additional AI agent involves iteratively adjusting and optimizing the prompt content to elicit the desired response from the AI agent. Through these iterations, the prompt may be modified, clarified, or made more specific to improve the accuracy, relevance, and overall quality of the AI agent's output. This iterative approach allows for continuous refinement and improvement, increasing the likelihood of obtaining the desired output with the desired level of quality. For example, the prompt of AI agent specialized in and responsible for customer support may be refined by incorporating the output of an additional AI agent specializing in natural language understanding. The output of the additional agent, which extracts key entities from customer queries, may be used to modify the prompt of the original AI agent. This refinement process enables the AI agent to provide more targeted and accurate responses tailored to the specific entity mentioned by the customer, resulting in improved customer support quality.

The use of workflow block templates or workflow templates may significantly speed up the design process of a workflow as explained in previous sections. However, when customization is needed to achieve a specific outcome, it may involve adding multiple workflow blocks and establishing connections, which can be time-consuming. Similarly, adding a specific task may require incorporating several workflow block templates within a workflow, which can also be a lengthy process. Consequently, there are instances where the design of a workflow may benefit from directly adding workflow templates inside the workflow itself. The process of adding workflow templates directly inside a workflow is commonly referred to as nested workflow.

Within the context of this disclosure, nested workflows, also known as sub-workflows or workflows within workflows, may involve a hierarchical structure where at least one smaller, self-contained workflow is embedded within a larger parent workflow. Each smaller workflow corresponds to a template workflow, i.e., a smaller workflow is already preconstructed and has its own set of steps, dependencies, and objectives, and is interconnected with the larger workflow to achieve a specific outcome. Nested workflows offer modularity, reusability, and scalability by breaking down complex processes into manageable components. Nested workflows provide a hierarchical structure, encapsulate logic, and allow for flexibility and parallel execution. The nested workflow approach allows for greater flexibility and streamlines the workflow design process by combining pre-designed templates with customized elements.

It to be appreciated that nested workflows may offer the capability of handling multiple levels of nesting or imbrication. In other words, a self-contained nested workflow may include another self-contained nested workflow, resulting in a workflow within a workflow within a workflow. The nesting process may be extended virtually, allowing for a significant level of depth within the workflow structure, until reaching the limit of a single block. This flexibility enables the design of highly intricate and nested workflows to accommodate complex processes and their various interconnected components. The following section aims to provide a comprehensive overview of the steps for seamlessly integrating a workflow within another workflow, also known as creating nested workflows.

FIG. 14 is a flowchart of an exemplary process (1400) for constructing nested workflows. Process 1400 is discussed herein for explanatory purposes and is not intended to be limiting. In some embodiments, steps of process 1400 may be changed, modified, substituted, or rearranged, consistent with the present disclosure. Process 1400 may be implemented using one or more components of a computing device 2100 (discussed in FIG. 21) or user device 2220 of computing architecture 2200 (discussed in FIG. 22). Some disclosed embodiments may include at least one processor for implementing a graphical workflow builder that may be configured to execute stored instructions to perform operations for constructing nested workflows. As shown in FIG. 14, process 1400 may include steps 1402, 1404, 1406, 1408, 1410, 1412 and 1414 discussed in further detail below.

As discussed previously, some disclosed embodiments may display a canvas for enabling placement and interconnection of workflow blocks thereon. This is exemplified at step 1402 of FIG. 14. By way of a few non-limiting examples, displaying a canvas, such as canvas 208, 308, 408, 608 or 1308, in relation to a display, such as display 206, 306, 406, 606, or 1306, may be accomplished using various methods. For instance, it may involve utilizing a graphical user interface (GUI), a web-based application, or a software application. In the context of a Software-as-a-Service (SaaS) platform, this operation may be performed by a SaaS platform component like workflow manager 110. The canvas may be presented in conjunction with a user device, such as user device 2220. When displaying a canvas, several factors should be considered, including determining the suitable placement of the canvas within the display, ensuring appropriate sizing and proportions relative to the display, and enabling responsive and scalable interaction between the canvas and the display. Additionally, establishing a contextual relationship between the canvas and the display may be achieved through various GUI components like visual cues, borders, scroll bars, or a navigational map. The canvas is designed to accommodate workflow blocks, however, upon initial presentation on the display, the canvas may be empty and devoid of any workflow blocks. In other words, when the canvas is first displayed, there might not be any pre-existing workflow blocks present on it.

The process of placing and constructing workflow blocks on a displayed canvas may be performed in various ways. In some cases, the workflow blocks to be placed and interconnected may be new blocks, meaning that they are generated from scratch during the process. To achieve this, several factors may have to be defined to establish the functionality of the workflow blocks. These factors may include triggers and actions, input and output fields, (local) variables, identification of required resources, or a combination of these elements. To facilitate this process, a graphical user interface (GUI), such as a workflow-building tool or palette, may be provided alongside the canvas. The GUI offers users the tools and options to define and configure the desired properties and functionalities of the workflow blocks. This allows users to easily create new blocks, specify their behaviors, and establish connections between different blocks on the canvas.

In other cases, the workflow blocks to be placed and interconnected may be preconstructed blocks. Preconstructed workflow blocks refer to template blocks that are already partially or fully configured and ready to be used within a workflow. These blocks are designed to provide predefined functionality or perform specific tasks. Additionally, in some instances, the workflow blocks may be selectable from a library of workflow blocks. The canvas, in addition to its primary configuration, placement, and interconnection functions, may also offer block selection and integration capabilities. Users can select workflow blocks from a displayed library when it is presented alongside the canvas. For example, in some embodiments, enabling placement of workflow blocks includes at least one of receiving a selection of workflow blocks from a displayed library of workflow blocks, or dragging and dropping workflow blocks from the displayed library, as described in relation to FIGS. 3A-B.

Some disclosed embodiments may involve enabling access to at least one workflow template, wherein the at least one workflow template includes a series of interconnected blocks predetermined in order and agnostic to information the series of blocks is capable of processing. As used herein, agnostic blocks within in a workflow may refer to components that are capable of handling different types of information. For example, an agnostic block may not be subject matter dependent. In other examples, the agnostic blocks may not be fully format or structure dependent. An agnostic block may be designed to be versatile and adaptable, allowing for seamless integration with various systems and data sources. By focusing on the processing logic rather than the specific characteristics of the data, an agnostic block promotes flexibility, scalability, and interoperability within workflows. It enables efficient and adaptable data processing pipelines that can accommodate diverse data types without extensive modifications. For example, an agnostic workflow block may be capable of processing data in different formats, such as a text file, a CSV file, or an Excel spreadsheet. In some cases, agnostic block may not be concerned with the specific types of information, while in other cases, they may only require a primitive type such as a number or a string. This flexibility allows for the efficient handling of different data formats and types within the workflow, enabling smoother integration and reducing the need for customized adaptations for each specific data format or structure. Accordingly, the agnostic nature of the at least one workflow template enables reusability of the workflow template across different processes or tasks within the workflow management system. A same workflow template may be utilized in multiple contexts, eliminating the need to create new templates from scratch for each specific process or task.

Figure 15:
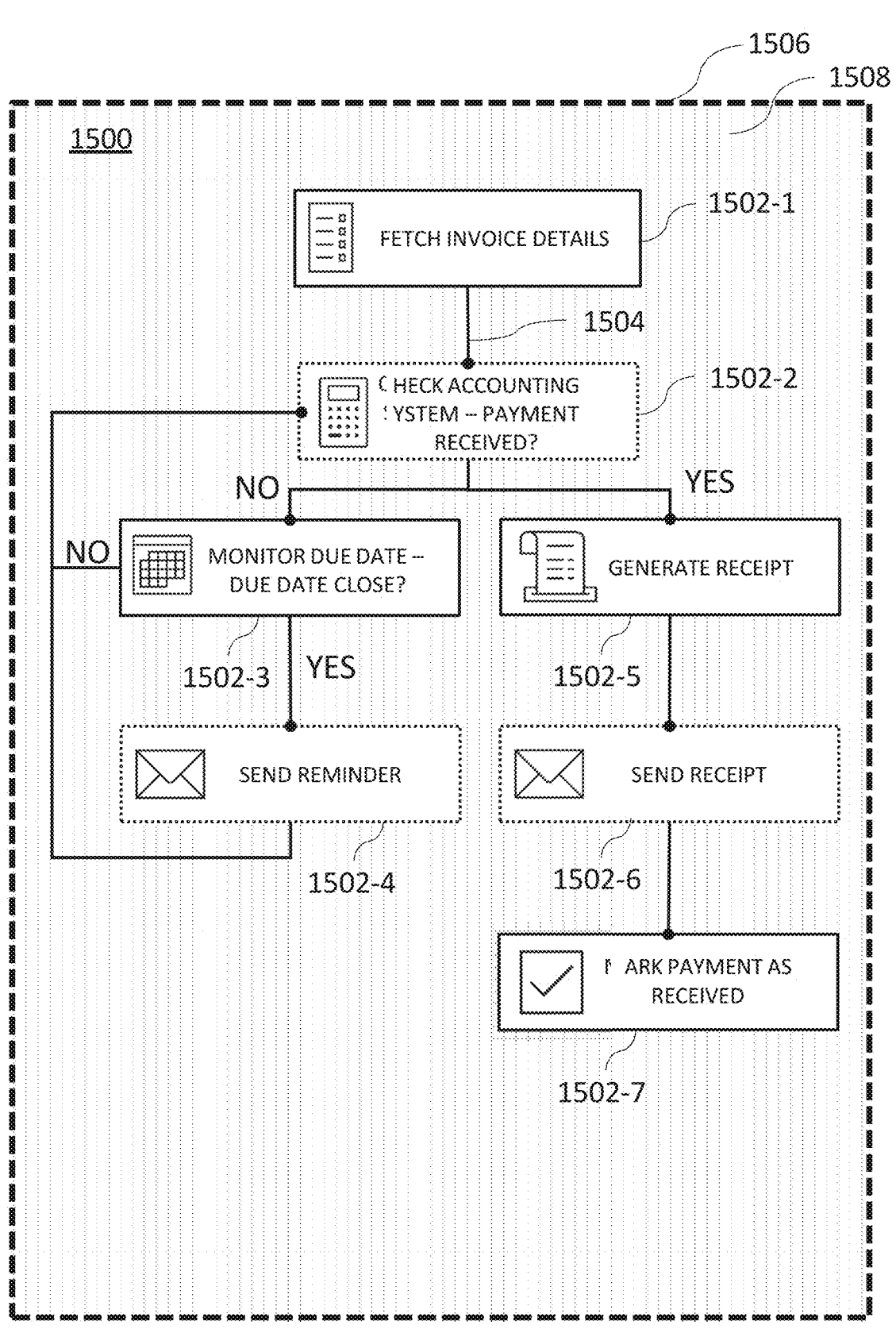
FIG. 15 illustrates an exemplary workflow template including a series of interconnected workflow blocks, consistent with some disclosed embodiments.

FIG. 15 illustrates an exemplary workflow template 1500 including a series of blocks 1502 (1502-1 through 1502-7) interconnected by a plurality of logical connections 1504 and presented on a display 1506 utilizing a canvas 1508. The function of this workflow template is to track payment after an invoice has been sent to a customer. The workflow template comprises several specific workflow blocks with their respective purposes:

Workflow block 1502-1-"Fetching invoice details": This block collects various information related to the invoice sent to the customer, such as the total price, invoice ID, or payment due date.

Workflow block 1502-2-"Check accounting system-Payment received": This block regularly checks the accounting system to determine whether a payment corresponding to the invoice has been received or not. It may incorporate a delay functionality, waiting a predetermined amount of time (e.g., every 24 hours) before checking the accounting system.

Workflow block 1502-3-"Monitor due date-Due date close": If no payment is detected in the accounting system, this block determines whether the payment due date is approaching soon (e.g., one week, three days, or one day before the due date). If not, the trigger action flow is sent back to the previous block.

Workflow block 1502-4-"Send reminder": When the due date is close, this block is configured to send a reminder to notify the customer that the payment has not yet been received. Afterward, the trigger action flow returns to block 1502-2.

Workflow block 1502-5-"Generate receipt": Once the payment has been made by the customer, this block generates the customer receipt.

Workflow block 1502-6-"Send receipt": The purpose of this block is to send the receipt generated by block 1502-5 to the customer.

Workflow block 1502-7-"Mark payment as received": This block flags the payment as received and marks the receipt as sent.

The functionality of workflow blocks 1502 in workflow diagram 1500 is closely tied to specific resources required for their implementation. Among these blocks, 1502-1, 1502-3, 1502-5, and 1502-7 are associated with internal resources. These resources are either controlled by the user designing the workflow configure to incorporate workflow diagram 1500 or are directly managed by the workflow itself. For example, block 1502-5 may rely on receipt template or receipt generating application. On the other hand, blocks 1502-2, 1502-4, and 1502-6 are associated with external resources. These resources exist outside the workflow management platform and may require the establishment of an authentication process to access them. For instance, block 1502-2 may interact with an external accounting system, which necessitates appropriate authentication and integration to check for received payments. Blocks 1502-4 and 1502-6 rely on an external mailbox to send payment reminders, and generated receipts. It is to be appreciated that workflow diagram 1500 is designed to be agnostic, meaning it can operate with any type of invoice, accounting system, or mailboxes. It is not bound to specific invoice formats, accounting system providers, or mailbox services. This agnostic nature of the workflow diagram allows for its broad applicability and adaptability to different contexts.

In some embodiments, each block of the series of blocks of the at least one template may be configured to receive at least one trigger and to implement at least one action. The at least one trigger and the at least one action may encompass any of the triggers and actions described throughout the entirety of the present disclosure. For example, in some embodiments, the at least one trigger may include at least one of a time-based trigger, an event-based trigger, a data trigger, an external trigger, a manual trigger, a conditional trigger, or a combination thereof, and the at least one action may include at least one of a data manipulation action, notification action, user interaction action, control workflow action, decision action, or a combination thereof. Additionally, in some embodiments, at least some of the series of the block of the at least one workflow template may be configured to utilize a variable, a global variable of a combination thereof. Further, in some other embodiments, the series of blocks of the at least one workflow template may include at least one AI block. The at least one AI block may incorporate the functionality of any of the embodiments described in the previous sections in relation to FIGS. 12 and 13.

Some disclosed embodiments involve enabling access to a functionality description associated with the at least one workflow template. A functionality description refers to an explanation of the purpose, tasks, and/or operations performed by the template within a workflow. For example, in some embodiments a functionality description may outline the specific functionality that the workflow template provides to accomplish a particular goal or objective. A functionality description may be expressed in one or more formats such as a textual description, a tabular format presenting the different components of the workflow template in a structured manner, visual mockups, or any other format that may be used to communicate the function of the workflow template. A functionality description may further include some additional information such as use-case scenarios or user feedback. Enabling access to a functionality description refers to providing tools or instructions (e.g., code) to permit a user to view a functionality description. For example, enabling access to a functionality description may include displaying a functionality description in association with a display of a name of a template, providing a button or list that a user can select to view the functionality description, or providing any other user interface that enables presentation of the functionality description to the user. Enabling access to a functionality description is exemplified at step 1406 in FIG. 14. By way of one example, a functionality description for workflow template 1500 may take the form of a textual description, similar to the one provided earlier, or a more concise format like the following text:

"This Workflow Template enables the tracking of payments after sending an invoice to a customer. It includes interconnected blocks with specific functions such as fetching invoice details, checking the accounting system for payments, monitoring due dates, sending reminders, generating receipts, sending them to customers, and marking payments as received. This workflow template streamlines the payment tracking process, ensuring efficient monitoring and communication throughout."

Alternatively, the same template may have a more concise functionality description such as: "Tracks post-invoice payments"

The level of detail to be included in a functionality description is a matter of design choice, and disclosed embodiments are not limited to any particular level of detail. In some embodiments, the at least one workflow template and an associated functionality description may be stored in a workflow template library. A workflow template library may be any repository, storage location, or group of repositories or storage locations. Relevant contents of the workflow template library may be displayed in association with the canvas. Accordingly, in some embodiments, enabling access to the at least one workflow template and the associated functionality description may include displaying the workflow template library in association with the canvas.

This setup is exemplified in FIG. 4, where workflow template library 410 consists of multiple templates labeled as WF 412-1 through WF 412-4, each accompanied by an associated functionality description labeled as 414-1 through 414-4. The sole difference is that canvas 408 displayed in the top panel may already contain at least one workflow block, allowing for the creation of nested workflows by incorporating workflow templates directly within an existing workflow. In some cases, the functionality description may include the number of times the workflow template was included in workflows across the entire workflow management platform or the number of user/entity accounts in which it is incorporated in at least one workflow.

Alternative methods may be employed to enable access to workflow templates. For instance, in certain embodiments, access to a workflow template may be facilitated through the implementation of a marketplace, the provision of import/export functionality, the facilitation of template sharing, the utilization of categories or tags for organization, the offering of personalized recommendations via machine learning algorithms, or integration with external libraries. Furthermore, alternative approaches exist to grant access to the associated functionality description, beyond displaying it alongside the workflow template in a library. For example, access to the functionality description may be provided through the use of tooltips or hover information, the provision of contextual help or documentation, the availability of interactive tutorials or walkthroughs, or the incorporation of collaboration and feedback mechanisms.

Some disclosed embodiments may involve enabling inclusion of the at least one workflow template at a downstream location from at least one first workflow block in a first workflow. Enabling inclusion refers to providing tools and/or instructions (e.g., code) to permit a user to include a template in a workflow. Such instructions, when provided in code, may cause a user interface tool to be displayed, and the user interface tool may provide a user with the ability to include a workflow template in the workflow. Such inclusion may occur at a starting point of workflow generation or may occur after workflow construction is already in progress. Several approaches may be employed to perform the inclusion operation. For example, in some embodiments enabling inclusion of the at least one workflow template in a first workflow may include implementing drag-and-drop functionality in conjunction with a library of template workflow including the at least one workflow template and displayed alongside a canvas used for constructing the first workflow. Enabling inclusion is exemplified, for example, at step 1408 in FIG. 14. In a scenario similar to the one illustrated in FIG. 4, a user utilizing a canvas to edit and create the first workflow may further utilize various GUI components provided by the canvas to access a library of workflow template and drag and drop the at least one desired workflow template from the library at a position downstream from at least one first workflow block in a first workflow. Alternatively, in some other embodiments, enabling inclusion of the at least one workflow template in the first workflow may include allowing selection of the at least one workflow template from a library displayed a canvas used to construct the first workflow. Multiple selection methods may be available, such as interacting with checkboxes or other GUI components provided in the displayed library, in a similar fashion to the situation depicted in FIG. 3A for workflow blocks templates. In some other alternative embodiments, enabling the inclusion of the at least one workflow template in the first workflow may be accomplished through different means. This may include providing a contextual menu or toolbar, enabling copy-paste functionality, or offering programmable interfaces that allow users to include the template. The inclusion of the at least one workflow template at a downstream position within the first workflow may take place by inserting the template between a first workflow block and a second workflow block of the first workflow. Alternatively, the template may be inserted after a last block of the first workflow.

Figure 16A:
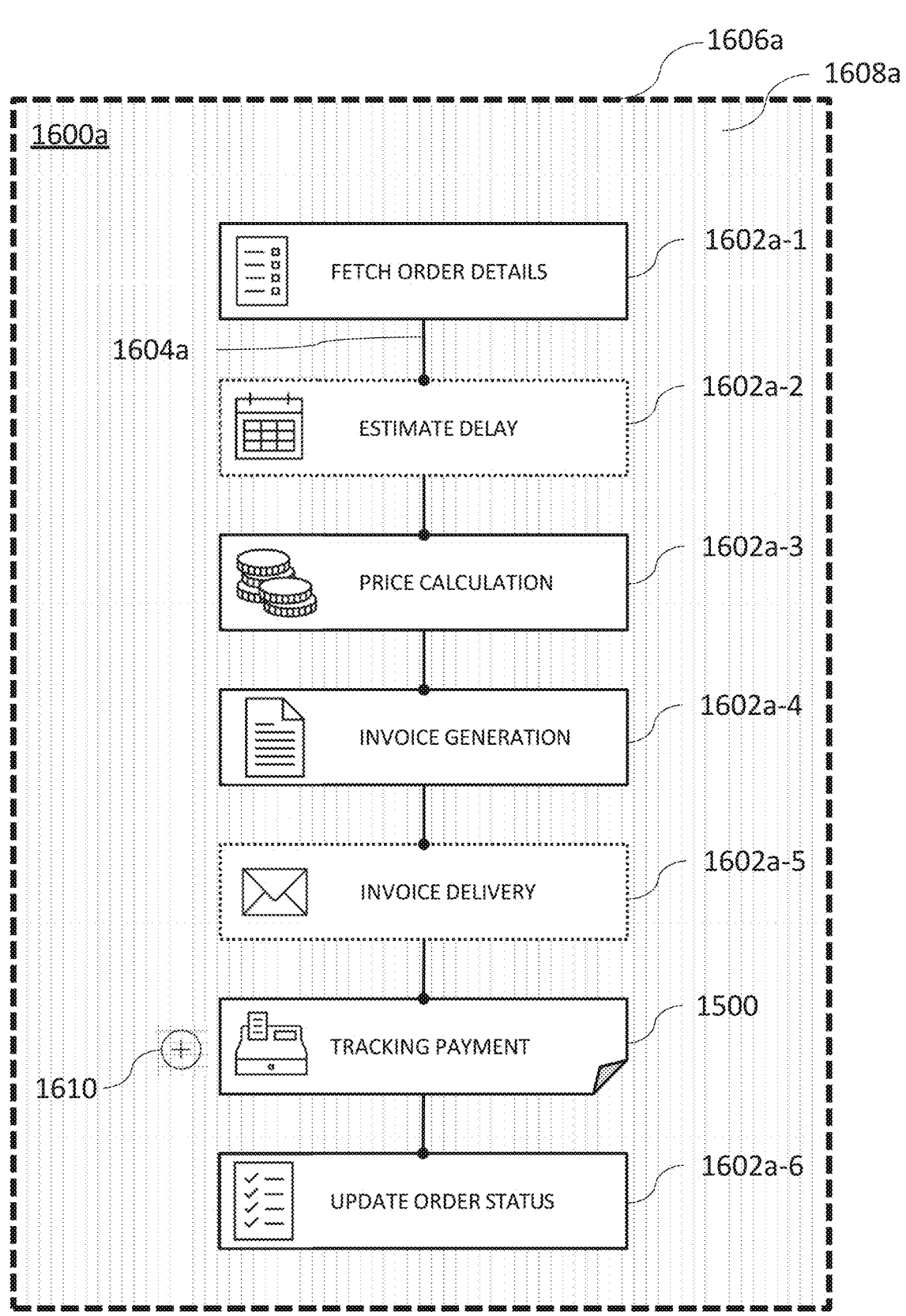
FIG. 16A illustrates a first exemplary workflow diagram including a plurality of interconnected workflow blocks and nesting the workflow template shown in FIG. 15, consistent with some disclosed embodiments.

FIG. 16A depicts a first workflow 1600a constructed on a canvas 1608a presented on display 1606a, consisting of interconnected blocks labeled as 1602a (1602a-1 through 1602a-6), connected by logical connections labeled as 1604a, with the inclusion of workflow template 1500. Workflow 1600a is similar to workflow 600 shown in FIG. 6, with blocks 1602a-1 to 1602a-5 being identical to blocks 602-1 to 602-5, respectively. Except in this particular scenario, the sales representative desired to enhance the overall functionality of their workflow by integrating an invoice/order tracking payment feature provided by workflow template 1500. To achieve this, the sales representative inserted workflow template 1500 just after block 1602a-5. Following the disclosed embodiment, the inclusion of workflow template 1500 may have been accomplished by utilizing a library of template workflows displayed alongside canvas 1608a and performing a drag-and-drop action to position the template downstream from block 1602a-5.

In certain embodiments, after inserting the at least one workflow block in the first workflow, the at least workflow template may be displayed on the canvas in a collapsed form. A collapsed form may refer to any kind of visually compact representation that occupies a smaller portion of the canvas compared to the entirety of the at least one workflow, hiding partially or totally the series of blocks of the at least one workflow template. This condensed view allows for a more efficient use of space and provides an overview of the included workflow template within the larger context of the first workflow. In certain scenarios, a collapsed form may occupy a portion of the canvas that is substantially similar in size to that occupied by a workflow block but adopting a differing visual design. By utilizing a comparable space but differing visual designs, a user may easily identify and understand the presence of the workflow template while maintaining a cohesive and organized workflow design. For example, in FIG. 16A, workflow template 1500 is represented by a rectangular box with a folded corner occupying a portion of canvas 1608a that is similar to the other blocks 1602a.

Furthermore, in certain embodiments, when the workflow template is displayed in a collapsed form, an expansion GUI component may be provided on the canvas. This component serves as a trigger for expanding the collapsed form of the workflow template, allowing it to be displayed in its entirety. By utilizing the expansion GUI component, users can easily expand and view the complete content and details of the workflow template within the canvas interface. Similarly, when the workflow template is displayed in its entirety, a collapsing GUI component may be provided on the canvas to retrieve the collapsed form. This component allows users to collapse the global view of the workflow template back into its condensed form. In certain cases, the expansion GUI component and the collapsing GUI component may be combined into a single toggle GUI component. This toggle component may visually change its design based on the displayed state, allowing users to switch between the expanded and collapsed forms of the workflow template. For example, in FIG. 16A, toggle GUI component 1610 ("+" button) may allow the sales representative to expand the collapsed form displayed on canvas 1608a, thereby revealing the entire workflow template 1500 as depicted in FIG. 15. In some cases, a workflow template may be locked in its collapsed form, and thus preventing users, or unauthorized users, to see how it operates.

Some disclosed embodiments involve enabling permissions for the series of blocks of the at least one workflow template to access data associated with upstream workflow blocks of the first workflow in a same branch of the first workflow as the at least one workflow template. Data associated with upstream workflows encompasses any type of data that is processed or utilized by the upstream workflow blocks. In certain embodiments, enabling permissions for the series of blocks of the at least one workflow template to access data associated with upstream workflow blocks of the first workflow may include enabling access to a source of dynamic data associated with at least one of the upstream workflow blocks of the first workflow. A source of dynamic data refers to data with properties and values that have the potential to change during the execution or running phase of the workflow. This allows the blocks within the workflow template to access and utilize the dynamically changing data from the upstream blocks as required. In some other embodiments, enabling permission for the series of block of the at least one workflow template to access data associated with upstream workflow blocks of the first workflow may include enabling access to at least one resource associated with at least one of the upstream workflow blocks of the first workflow. These resources may be categorized as internal or external resources, or a combination of both. Enabling permissions is exemplified at step 1410 in FIG. 14. Taking FIG. 16A as an example, workflow template 1500 may be granted access to internal resources such as the order database, which also serves as a source of dynamic data, the production line schedule, the pricing algorithm, the invoice generating system, or the mailbox. Furthermore in some embodiments, enabling permission for the series of block of the at least one workflow template to access data associated with upstream workflow blocks of the first workflow may include enabling access to at least one global variable associated with at least one of the upstream workflow blocks of the first workflow. For example, referring to FIG. 16, workflow template 1500 may access and utilize any of the global variables associated with workflow blocks 1602a-1 through 1602a-5, such as global variables 802-1 through 802-6 defined in relation to FIG. 8.

Permissions are access rights or privileges. In a situation where, for example, software code or any other mechanism permits a downstream block to gain access to data from an upstream block, permissions for that activity are said to be "enabled." Enabling permissions to access data associated with upstream workflow blocks may be achieved through various mechanisms. In some embodiments, permissions may be inherited. This means that the series of blocks within the workflow template, like any other blocks, automatically inherit access to the data associated with upstream workflow blocks due to their downstream positions. In other embodiments, there may be a separate permission management process, and access permissions to the data associated with upstream workflow blocks are granted and managed through a user interface displayed in association with the canvas. For example, when a user clicks on the workflow template on the canvas, a contextual menu may appear, allowing the user to establish a set of permissions specifically for that template. In additional embodiments, different mechanisms may be employed to enable permissions. One such mechanism may be the implementation of a role-based access control system, where distinct roles are assigned to the upstream blocks within the workflow. Each role is associated with predetermined permissions, including access to specific data linked to the upstream workflow blocks. Another approach may involve defining data sharing rules that specify which data from the upstream workflow blocks may be accessed by the blocks within the workflow template. Lastly, access tokens may be utilized as a mechanism to grant either full or partial access to the data associated with the upstream workflow blocks. These various mechanisms provide flexibility in managing permissions and ensuring secure and controlled access to the relevant data within the workflow environment.

In some embodiments, when the at least one workflow template is inserted in the first workflow, the at least one workflow template may map to the context of the first workflow. Within this disclosure, the term "workflow context" or simply "context" refers to the environment or landscape in which the workflow operates. Context may encompass one or more aspects that influence the workflow's design, goals, functioning, and/or implementation. This context may include, but is not limited to, the following elements:

Structure and goals: overall structure and objectives of the workflow, including the sequence of tasks, dependencies, and desired outcomes.

Data and resources: resources from which data and information are derived or inputted into the workflow. This may include databases, external systems, APIs, or other data repositories.

Outputs: desired outputs or results that the workflow aims to achieve. This may include reports, documents, notifications, or any other deliverables generated by the workflow.

Security and compliance: security and compliance requirements applicable to the workflow. This includes data privacy, access controls, regulatory compliance, and any other security measures for protecting sensitive information.

Software applications and platforms: specific software applications, platforms, or workflow management systems used to create, automate, and track the workflow. This may also encompass the version or configuration of these tools.

User-related information: Information related to the user designing or implementing the workflow. This may include user accounts, settings, preferences, or details. Considering the workflow context helps ensure that the workflow is designed and implemented in a manner that aligns with the specific requirements, resources, and objectives of the environment in which it will operate. It enables a more effective and tailored workflow design, improving efficiency, accuracy, and the overall success of the workflow within its intended context.

Mapping refers to a process of establishing relationships between different data elements or attributes from one data source or data type to another. Mapping of the at least one workflow template may encompass any kind of integration operations performed to integrate the template within the context of a parent workflow. This may include establishing the connections, dependencies, and interactions between the blocks or steps of the template and the existing components of the parent workflow. Mapping in this scenario may involve aligning the functionality and requirements of the template with the specific needs and structure of the bigger workflow. It may include tasks such as configuring data mappings, defining trigger events, setting up data flows, synchronizing variables or parameters, and ensuring seamless integration with existing processes and systems. The goal of mapping in this context is to ensure that the workflow template harmoniously fits into the larger workflow, maintaining consistency and continuity in the overall workflow process. It allows for the smooth integration of the template's functionality within the existing workflow, enabling the combined workflow to achieve its intended goals and objectives effectively. In some embodiment, enabling permission to access data associated with upstream blocks of a parent workflow may correspond to one of the operations involved in the mapping process. Establish a data mapping mechanism may allow blocks within the workflow template to define and configure the specific data they require from upstream workflow blocks, ensuring that only relevant data is accessed and utilized within the template. In some embodiments, the mapping process may highlight any potential conflicts, missing components, or data mapping discrepancies that need to be addressed during the integration of the at least one workflow template.

In the example illustrated in FIG. 16A, the inclusion of workflow template 1500 within workflow diagram 1600a involves mapping template 1500 to the specific context of the larger workflow 1600a. This process includes understanding the underlying process of workflow diagram 1600a, defining the required data (such as resources, source of dynamic data, and global variables) to be accessed in blocks 1602a-1 through 1602a-5, and establishing the needed connections and integration points. It also entails configuring data mappings, defining trigger events, synchronizing variables or parameters, and ensuring seamless interactions and flow of data between the template and the rest of the workflow.

The mapping process may be carried out in various ways. In some embodiments, mapping of the at least one workflow template to the context of the first workflow may be performed by a workflow management system with automation capabilities. When the mapping process is performed by a workflow management system such as workflow manager 110 with automation capabilities, it may imply that the system has the functionality to analyze the components and requirements of the workflow template and align them with the existing context of the first workflow. The system may automate the process of integrating the template by mapping its blocks, data, and actions to the appropriate positions and connections within the larger workflow notably by identifying the dependencies and interactions between the template and the existing workflow components, ensuring a coherent and functional integration.

In some other embodiments, mapping of the at least one workflow template to the context of the first workflow may be performed by analyzing metadata associated with the at least one workflow template and the first workflow using metadata analysis. Metadata analysis may involve examining the descriptive information and properties of the at least one workflow template and the first workflow to understand their characteristics, relationships and compatibility. By analyzing the metadata, the mapping process may provide a better understanding of the structure, data dependencies, input-output relationships and other relevant information of the workflow model and the first workflow. This analysis may help identify alignment points and integration requirements between the model and the existing workflow, enabling more accurate mapping. Metadata analysis techniques may include examining attributes such as block types, data formats, variables, resource connections, triggers and actions in the workflow model and first workflow.

In some embodiments, mapping of the at least one workflow template to the context of the first workflow may be performed by using artificial intelligence. An AI agent may be specifically trained to analyze and understand the components, relationships, and requirements of both the template and the first workflow. It may use its learning algorithms and pattern recognition abilities to perform the mapping process more efficiently and accurately. More specifically, the AI agent may analyze the structure and dependencies of the template and the first workflow, identify alignment points, recommend mapping strategies, adapt to variations, and continuously learning and improving via user feedback. When utilizing an AI agent to perform the mapping process, it may be integrated into the workflow management platform or connected to it through a communication module, such as the AI communication module 116 depicted in FIG. 1. Before the mapping process, a compliance check may be conducted to ensure that the AI agent meets specific compliance requirements. And can analyze both the workflow template and the first workflow, In some embodiments, a user interface may enable mapping of the at least one workflow to the context of the first workflow. This interface may allow users to manually establish the needed connections to ensure a seamless integration of the workflow template within the first workflow's context. The user interface may be presented alongside a canvas, and it may become available once the workflow template is included in the first workflow. Within the user interface, users may interact with various graphical elements, tools, and options to define and configure the connections between the workflow template and the existing components of the first workflow. This includes specifying data mappings, defining trigger events, synchronizing variables or parameters, and establishing the desired flow of information and actions. By utilizing the user interface, users have control over the mapping process and may tailor it to suit the specific requirements of the first workflow. They may manually set up the connections and fine-tune the integration, ensuring that the workflow template seamlessly fits within the overall workflow context. In certain embodiments, the user interface may go beyond facilitating the mapping process and provide functionality for implementing corrective actions when issues are identified by an automated mapping process such as the one described earlier. When discrepancies or conflicts are detected during the mapping process, the user interface allows users to take corrective measures to resolve these issues. The user interface may present users with options, suggestions, or alerts to address the identified issues. Users may interact with the interface to modify or adjust the mappings, connections, configurations, or data dependencies to resolve the conflicts and ensure proper integration of the workflow template within the first workflow.

Some disclosed embodiments may involve enabling inclusion of the at least one workflow template at a downstream location from at least one second workflow block in a second workflow. Enabling inclusion in this context refers to providing tools and/or instructions (e.g., code) to permit a user to include a template at a downstream location from the second workflow block, similar to earlier discussion of inclusion enablement. For example, step 1412 in FIG. 14 may occur in a manner similar to earlier description associated with step 1408. There may be various approaches to include the workflow template in the second workflow. These approaches may involve implementing drag-and-drop functionality, enabling selection from a library, providing a contextual menu or toolbar, allowing copy-paste functionality, or offering programmable interfaces. These methods provide users with different ways to incorporate the workflow template seamlessly into the second workflow, depending on their preferences and the capabilities of the workflow management system.

Figure 16B:
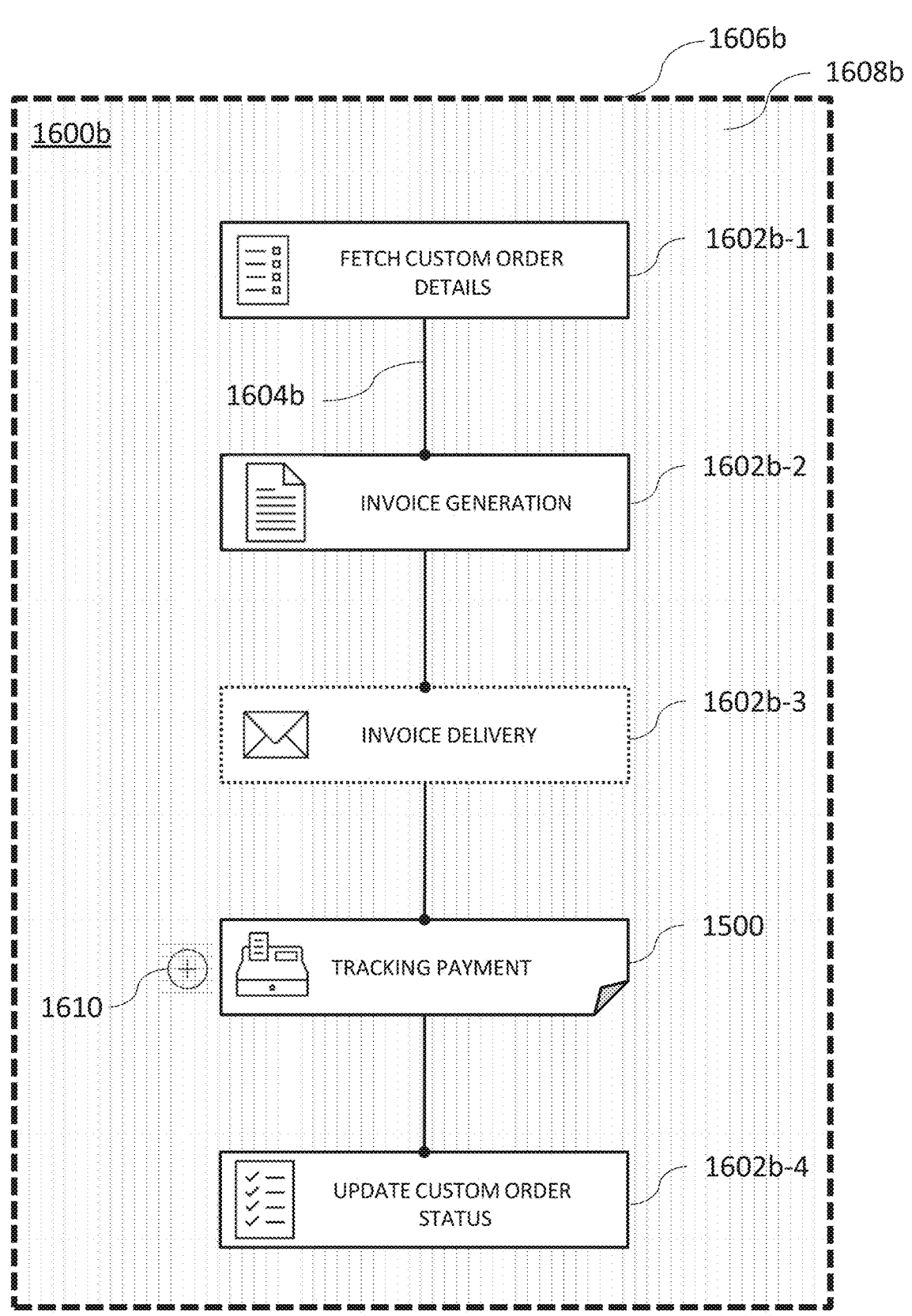
FIG. 16B illustrates a second exemplary workflow diagram including a plurality of interconnected workflow blocks and nesting the workflow template shown in FIG. 15, consistent with some disclosed embodiments.

FIG. 16B depicts a second workflow 1600b constructed on a canvas 1608b presented on display 1606b, consisting of interconnected blocks labeled as 1602b (1602b-1 through 1602b-6), connected by logical connections labeled as 1604b, with the inclusion of workflow template 1500. While workflow 1600b serves the purpose of processing custom orders, it shares similar functionality with workflow 1600a from FIG. 16A, particularly in terms of fetching custom order details, generating invoices, and sending them to customers (represented by blocks 1602b-1 through 1602b-3). However, it should be highlighted that estimating the delay and price for custom orders can only be performed by a human due to the unique nature of these products. These specific details, including the estimated delay and price, are directly stored in the custom order database, which requires human intervention for their population and management. In this scenario the sales representative also aimed to enhance workflow 1600b by integrating the invoice/order tracking payment feature offered by workflow template 1500. To achieve this, the sales representative inserted workflow template 1500 after block 1602b-3. Following the disclosed embodiment, the inclusion of workflow template 1500 may have involved utilizing a library of template workflows displayed alongside canvas 1608b and performing a drag-and-drop action to position the template downstream from block 1602b-3. In FIG. 16B as well workflow template 1500 is represented by a rectangular box with a folded corner on canvas 1608b in association with toggle GUI component 1610 ("+" button).

Some disclosed embodiments involve enabling permissions for the series of blocks of the at least one workflow template to access data associated with upstream workflow blocks of the second workflow in a same branch of the second workflow as the at least one workflow template. In a situation where, for example, software code or any other mechanism permits one or more downstream blocks in a template to gain access to data from one or more upstream blocks, permissions for that activity are said to be "enabled." Enabling permission for the series of block of the at least one workflow template, as exemplified at step 1414 of FIG. 14, to access data associated with upstream workflow block of the second workflow may be performed using any of the mechanisms described earlier in relation to step 1410. Notably, in some embodiments, enabling permissions for the series of blocks of the at least one workflow template to access data associated with upstream workflow blocks of the second workflow may include enabling access to a source of dynamic data associated with at least one of the upstream workflow blocks of the second workflow. For example, in FIG. 16B, workflow template 1500 may be granted access to internal resources such as the custom order database, which also serves as a source of dynamic data.

In some embodiments, permissions for the series of blocks of the at least one workflow template to access data associated with upstream workflow blocks of the first workflow in the same branch of the first workflow as the at least one workflow template may be different from permissions for the series of blocks of the at least one workflow template to access data associated with upstream workflow blocks of the second workflow in the same branch of the second workflow as the at least one workflow template. For example, the set of permissions granted to the workflow template may be considered a distinguishing feature specific to the workflow into which it is inserted. These permissions define the level of access and capabilities that the workflow template has within the context of the particular workflow. The set of permission may therefore be seen as a signature of the context of the specific workflow reflecting the unique requirement and characteristics of the particular workflow context.

In some embodiments, when the at least one workflow template is inserted in the second workflow, the at least one workflow template may map to the context of the second workflow. Additionally, in some embodiments, mapping of the at least one workflow template to the context of the second workflow may be performed by a workflow management system with automation capabilities, by analyzing metadata associated with the at least one workflow template and the first workflow using metadata analysis or by using artificial intelligence. Alternatively, in some other embodiments, a user interface may enable mapping of the at least one workflow template to the context of the second workflow, enabling a user to have control over the mapping process. Such mapping occurs in a manner previously described in connection with mapping. In some cases, during mapping of the at least one workflow template to the second workflow, insights gained from the first mapping of the at least one workflow template to the first workflow may be used/suggested. This application of insights may be applicable when the first and second workflow are employed within the same account, facilitating a smoother mapping process. Conversely, this practice may not be applicable and prevented if the first and second workflows are affiliated with distinct entities. In other cases, each workflow template may be configured to store the configuration of the resources it was associated with in a memory and by processing said memory to improve its mapping capabilities (or suggestions to users to map).

It should be noted that even after the insertion of the workflow template in the first or second workflow, users may still have the ability to edit these workflows. This includes modifying the number of blocks and altering the logical connections between them. Consequently, there may be scenarios where at least one workflow block of the first or second workflow may be positioned downstream from the at least one workflow template. This situation may occur if the workflow template is inserted between two existing workflow blocks, or if a user initially placed the workflow template at the end of a branch and subsequently added at least one workflow block downstream from the template. If the at least one workflow block is positioned downstream from the workflow template in a single branch, and the workflow template has multiple downstream branches, the at least one workflow block may be considered a converging block, i.e., a block configured to carry out its action only after one or all actions of the final block in the multiple downstream branches of the workflow template have been executed. Alternatively, if the workflow template has multiple downstream branches, a user has the option to independently add a distinct set of workflow blocks for each of the branches. This allows for customization and flexibility in designing the workflow, as different actions and processes may be implemented for each specific downstream branch of the workflow template. Furthermore, in the collapsed form of the workflow template, multiple downstream branches may not be visually displayed. However, the presence of multiple branches may still be indicated by the number of logical connections leaving the workflow template in its collapsed form. If there are multiple branches in the template and multiple downstream branch the workflow hosting the template then multiple logical connection will be displayed leaving the workflow block in its collapsed form. If a converging block follow a workflow template with multiple branch, a single logical connection may be displayed, representing the merging of all the logical connections originating from the multiple branches into the converging block.

In some embodiments, an output of the at least one workflow template may be used by at least one downstream workflow block of the first workflow or the second workflow. By using the output, downstream blocks may efficiently process and utilize the results generated by the at least one workflow template, allowing for streamlined and coordinated execution of tasks. This integration enhances the overall functionality and effectiveness of the workflow, facilitating the achievement of desired outcomes and objectives. For example, referring to FIGS. 16A-B workflow blocks 1602$a$-7 and 1602$b$-4 both utilize the output of workflow template 1500 to update respectively the internal order data base and the internal custom order database, marking the order as proceed and payment as received.

In some embodiments, enabling inclusion of the at least one workflow template in either the first workflow or the second workflow includes enabling inclusion of a first workflow template and a second workflow template in either the first workflow or the second workflow. By allowing the insertion of multiple workflow templates within a single workflow, the overall workflow design and implementation process becomes more efficient and streamlined. This approach enables users to leverage pre-existing templates for different aspects of the workflow, promoting consistency and standardization while reducing the time and effort required to design and configure each individual task. The insertion of multiple workflow templates may follow similar approaches as discussed in steps 1408 and 1412 for a single workflow template. The same inclusion mechanisms, such as drag-and-drop functionality, selection from a library, contextual menus, copy-paste functionality, or programmable interfaces, may be employed to enable the inclusion of multiple workflow templates within a workflow. In some embodiments, each of the first workflow template and the second workflow template may have an associated functionality description. These associated functionality descriptions may be included in a workflow template library alongside the first workflow template and the second workflow template.

In some embodiments, the first workflow template and the second workflow template may be sequentially positioned along a single branch and separated by at least one workflow block from the first workflow or the second workflow. For instance, in reference to FIG. 2, where workflow diagram 200 represents the first or second workflow, the first workflow template may be placed at the location of block 202-4, while the second workflow template may be positioned at block 202-10. Notably, in this scenario, the first workflow template consists of two distinct branches.

Alternatively, in some other embodiments the first workflow template and the second workflow template may be positioned in distinct branches of the first workflow or the second workflow. For instance, in reference to FIG. 2, where workflow diagram 200 represents the first or second workflow, the first workflow template may be placed at the location of block 202-6, while the second workflow template may be positioned at block 202-10.

In some embodiments, the first workflow template may differ from the second workflow template, enabling the integration of multiple preconstructed tasks within a single workflow. Alternatively, in some other embodiments, the first workflow template and the second workflow template may be identical. It is to be appreciated that even if the first and second workflow templates are identical, their placement within the first or second workflow may result in different contextual environments. This difference in context may lead to variations in the data processed by each template. As the templates are positioned within different sections of the workflow, they may receive distinct inputs or access different resources, ultimately leading to potentially different outcomes or processing results. Therefore, even with identical templates, the specific placement within the workflow may introduce variations in the processing and handling of data.

In certain embodiments, the processor may also facilitate the inclusion of the workflow template at a downstream position relative to one or more subsequent workflow blocks in multiple subsequent workflows. Additionally, it enables permissions for the series of blocks in the workflow template to access data associated with upstream workflow blocks in the same branch of each of the subsequent workflows as the workflow template. Additionally, each time the at least one workflow template is inserted in a subsequent workflow, the at least one workflow template may map to the context of the subsequent workflow.

Consistent with the disclosed embodiments, mapping of the at least one workflow template to the context of the subsequent workflow may be performed by a workflow management system with automation capabilities, by analyzing metadata associated with the at least one workflow template and the first workflow using metadata analysis or by using artificial intelligence. Alternatively, in some other embodiments, a user interface may enable mapping of the at least one workflow to the context of the subsequent workflow, enabling a user to have control over the mapping process.

During the configuration/construction phase of workflow design, one challenging aspect may correspond to the effective definition of the trigger/action flow. In some workflow management platforms, the trigger/action flow is restricted to follow a single path or branch within a workflow that consists of multiple branches. This limitation can be quite restrictive as many operations within a workflow can be performed independently and in parallel to increase efficiency and productivity.

For example, one may consider a company's workflow for processing incoming customer orders, using the example of a sales representative as mentioned in connection with FIG. 6. In this case, the workflow at the company level may consist of different branches that may be executed independently. One branch of the workflow could be dedicated to order validation and invoice generation, another branch of the workflow may focus on inventory management, where the company's inventory system is updated to reflect the products being ordered and their availability. Additionally, another branch of the workflow may handle marketing communication, where the company's marketing team may collect order details to determine or affine a customer profile, identifying their needs and tailoring future marketing communication in accordance with the customer profile and needs.

By allowing multiple paths or branches within a workflow to execute independently and in parallel, the workflow may benefit from increased efficiency and reduced processing time. Rather than waiting for one task to complete before starting the next, the company may leverage the resources of different teams or systems simultaneously. This enables faster order processing, reduces bottlenecks, and enhances customer satisfaction.

The example provided is just one instance of a workflow involving parallel branches. In real-world scenarios, workflows can be much more complex, involving numerous parallel branches, interdependencies, and conditions. Additionally, the conditions may be dependent in any number of one or more different sources. The flexibility to define and manage these parallel paths within a workflow is valuable tool for optimizing efficiency and achieving desired outcomes.

To overcome the limitation of single-path trigger/action flows, it may be desirable to choose a workflow management platform that supports parallel execution, multi-branching, and the ability to handle complex dependencies and conditions. Such platforms enable users to design workflows that better reflect the real-world intricacies and complexities of their business processes, resulting in more efficient and effective workflows.

The enablement of parallel processing within workflows may be achieved through the use of a switch block or component. In the context of this disclosure, a switch block may refer to a workflow component configured to direct the trigger/action flow to one or more paths or sub-branches. A switch block may therefore act as a decision point within the workflow, allowing the system to determine which path to follow based on certain conditions or criteria. For example, it evaluates the incoming trigger or data and selects the appropriate branch or branches to execute based on predefined rules or logic. By utilizing a switch block, workflow designers may define different paths or sub-branches within the workflow and specify the conditions under which each path should be followed. This enables parallel processing, as multiple branches may be executed independently based on the evaluation of certain conditions.

FIG. 17 is a flowchart of an exemplary process (1700) for performing construction operations of a workflow, wherein the workflow uses at least one switch block. Process 1700 is discussed herein for explanatory purposes and is not intended to be limiting. In some embodiments, steps of process 1700 may be changed, modified, substituted, or rearranged, consistent with the present disclosure. Process 1700 may be implemented using one or more components of a computing device 2100 (discussed in FIG. 21) or user device 2220 of computing architecture 2200 (discussed in FIG. 22). Some disclosed embodiments may include at least one processor for implementing a graphical workflow builder that may be configured to execute stored instructions to perform construction operations of a workflow including at least one switch block. As shown in FIG. 17, process 1700 may include steps 1702, 1704, and 1706 discussed in further detail below.

Some disclosed embodiments may involve displaying a canvas for enabling placement and interconnection of workflow blocks thereon wherein at least some of the workflow blocks are associated with at least one of a plurality of data sources. Canvas display is discussed earlier herein. Displaying a canvas, such as canvas 208, 308, 408, 608, 1308, 1608a or 1608b, in relation to a display, such as display 206, 306, 406, 606, 1306, 1606a or 1606b may be accomplished using various methods. For instance, it may involve utilizing a graphical user interface (GUI), a web-based application, or a software application. In the context of a Software-as-a-Service (SaaS) platform, this operation may be performed by a SaaS platform component like workflow manager 110. The canvas may be presented in conjunction with a user device, such as user device 2220. When displaying a canvas, several factors should be considered, including determining the suitable placement of the canvas within the display, ensuring appropriate sizing and proportions relative to the display, and enabling responsive and scalable interaction between the canvas and the display. Additionally, establishing a contextual relationship between the canvas and the display may be achieved through various GUI components like visual cues, borders, scroll bars, or a navigational map. The canvas is designed to accommodate workflow blocks, however, upon initial presentation on the display, the canvas may be empty and devoid of any workflow blocks. In other words, when the canvas is first displayed, there might not be any pre-existing workflow blocks present on it. The canvas display is further exemplified in FIG. 17 at step 1702.

Consistent with the disclosed embodiments, at least some of the workflow blocks may be associated with at least one of a plurality of data sources. In some embodiments, the at least one of a plurality of data sources may be classified as an internal data source or an external data source, i.e., a data source controlled and managed by a user designing the workflow and that falls within the workflow's jurisdiction or a data source controlled by an external provider requiring the establishment of an authentication process to access the data. The association of the at least one of a plurality of data sources to the workflow blocks may be accomplished using process 500 illustrated in FIG. 5. This process outlines the steps involved in linking the data sources to the respective workflow blocks.

Some disclosed embodiments involve enabling placement of at least one workflow block on the canvas and associating the at least one workflow block with at least one of the plurality of data sources. In addition, in some embodiments, process 1700 may further include enabling generation of the at least one workflow block. The process of placement/construction and generation of workflow blocks on the displayed canvas may be performed in different manners. In some embodiments, the at least one workflow block may be a new block. In other words, the process may enable generation of new, non-preexisting blocks from scratch. To accomplish this, various factors may need to be defined to establish the functionality of the workflow blocks. These factors may include triggers and actions, input, and output fields, (local) variables, identification of required resources, or a combination of these elements. Any of these operations may be performed in conjunction with a GUI like a workflow-building tool or palette displayed in association with the canvas. The GUI may provide users with the needed tools and options to define and configure the desired properties and functionalities of the workflow blocks. This allows users to easily create new blocks, specify their behaviors, and set up the connections between different blocks on the canvas. Enabling placement of workflow blocks is exemplified at step 1704 in FIG. 17.

In some other embodiments, the at least one workflow block may be a preconstructed workflow template block. As used therein preconstructed workflow template blocks may refer to any kind of template blocks already partially configured or fully configured and ready to be used within a workflow. These blocks may be designed to provide predefined functionality or perform specific tasks. Additionally, in some embodiments, the preconstructed workflow block may be selectable from a template library. More specifically, the canvas, in addition to its primary configuration, placement and interconnection functions, may also offer block selection and integration capabilities. This may be achieved by enabling users to select workflow blocks from a template library. When the library of template workflow blocks is displayed in conjunction with the canvas, users can make selections by choosing workflow block templates from the displayed library. In some embodiments, enabling placement on the canvas of preconstructed workflow template blocks may include enabling selection of preconstructed workflow template blocks from the template library by utilizing GUI component or enabling dragging and dropping of preconstructed workflow blocks from the template library to the canvas, as described in relation to FIGS. 3A-B.

The process of associating at least one of a plurality of data sources with at least one workflow block may be performed using any of the methods described above, in particular using process 500 illustrated in FIG. 5.

Some disclosed embodiments may involve enabling placement of a switch block on the canvas at a downstream position of the at least one workflow block, and placement of a plurality of additional workflow blocks at locations downstream of the switch block and arranged in a plurality of alternative downstream branches. In addition, in some embodiments, process 1700 may further include enabling generation of the switch block. The process of placement/construction and generation of the switch blocks on the displayed canvas may be performed in accordance with any of the process described earlier in relation the at least one workflow block. This specific implementation is exemplified at step 1706 in FIG. 17.

Figure 18A:
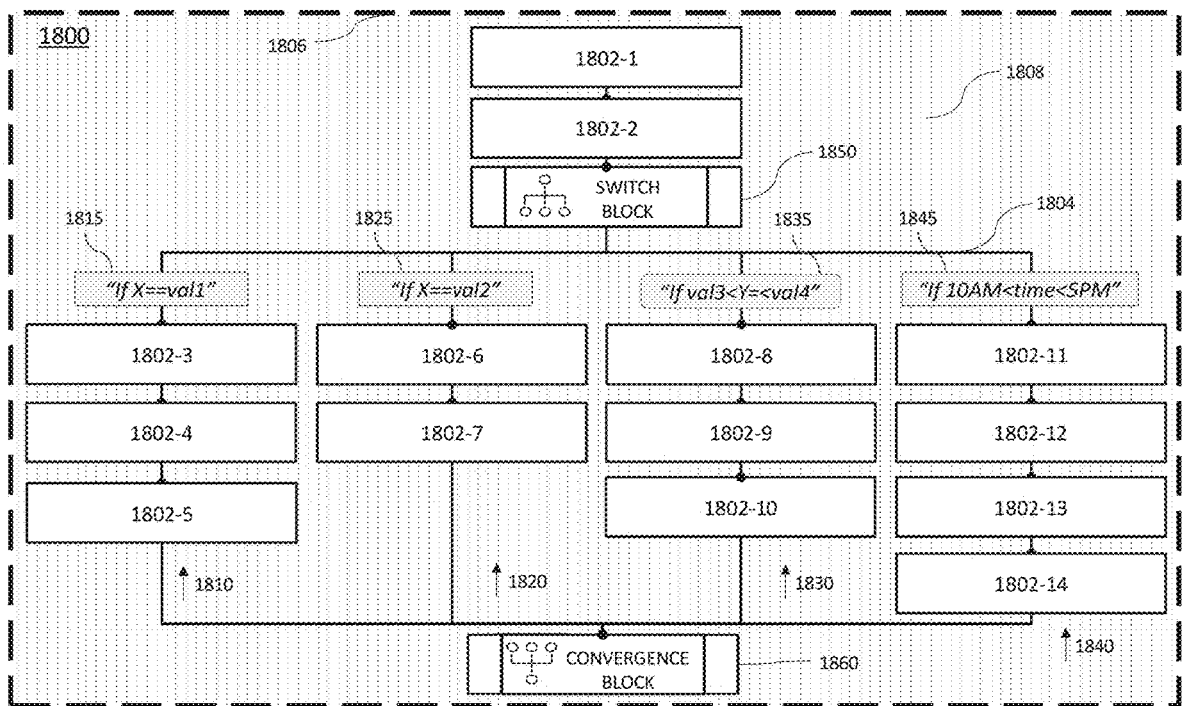
FIG. 18A illustrates an exemplary workflow diagram including at least one workflow block followed by a switch block and a plurality of alternative downstream branches, consistent with some disclosed embodiments.

FIG. 18A illustrates a workflow diagram 1800 that showcases an exemplary workflow initiated by a user of a workflow management platform or a SaaS platform such as SaaS platform 100. The diagram is displayed on a display 1806 using a canvas 1808. Workflow 1800 includes several blocks 1802 (1802-1 through 1802-14) connected by logical connections 1804 and incorporates a switch block 1850. The construction of workflow diagram 1800 may have followed the process described in FIG. 17 (1700). Specifically, canvas 1808 was displayed at step 1702. Then, during the workflow construction process at step 1704, the placement of workflow blocks 1802-1 and 1802-2 was determined. These initial blocks serve as the starting point of workflow. Finally, at step 1706, the switch block 1850 and blocks 1802-3 through 1802-14 were positioned, defining multiple downstream branches 1810 (blocks 1802-3 through 1802-5), 1820 (blocks 1802-6 and 1802-7), 1830 (blocks 1802-8 through 1802-10), and 1840 (blocks 1802-11 through 1802-14) within workflow 1800.

The logical connections 1804 indicated the sequence and dependencies of the tasks or actions within the workflow, and the multiple path that may be followed by the trigger action flow. In some embodiments, the switch block may be configured to direct trigger action flow to at least one of the plurality of alternative downstream branches. In other words, the switch block (1850) may serve the purpose of controlling the flow within the workflow, allowing for branching and the selection of alternative paths. For instance, in reference to FIG. 18A, the switch block 1850 may guide the trigger/action flow towards workflow branches 1810, 1820, 1830, 1840, or a combination thereof. It is to be appreciated that in some embodiments, the switch block may be configured to direct the trigger/action flow to all of the alternative downstream branches. For example, switch block 1850 may be set up to direct the trigger/action flow to all branches 1810 through 1840. By doing so, the switch block enables the parallel execution of all the tasks encompassed within these branches.

Switch block (1850) may have a visual design that differs from the other blocks (1802-1 through 1802-14) within the workflow diagram. The example provided, illustrating switch block 1850 as a rectangular box with double-lined widths and an icon, is not intended to impose limitations on its visual appearance. The visual design of the switch block may be flexible and adaptable and may be customized allowing for various forms of representation. For instance, the switch block could have a different shape, color scheme, border style, or any other visual elements that help distinguish it from the other blocks and signify its specific purpose within the workflow diagram. The actual visual design of the switch block is open to creative interpretation and can be tailored to meet the specific requirements and aesthetic preferences of the workflow designer or users. In some cases, the size of the switch block within the workflow diagram may be adjusted based on the number of alternative downstream branches associated with it. As the number of branches increases, it may be necessary to accommodate the additional connections and paths within the switch block, resulting in a longer dimension. By adapting the size of the switch block based on the number of alternative downstream branches, the workflow diagram may effectively represent the branching structure and facilitate understanding for users. This dynamic sizing approach ensures that the switch block can adequately accommodate the required information and maintain the overall visual balance of the diagram.

In some embodiments, the switch block may be enabled to use data processed by the at least one workflow block preceding the switch block in a same branch as the switch block. "Using data" in this context may refer to the capability of the switch block to access, performed data manipulation actions, make decisions and/or a combination thereof based on the data that has been processed by the preceding upstream block(s). When a workflow contains multiple blocks connected in a sequence or within the same branch, each block may perform certain operations or manipulate data in some way. The switch block, positioned after one or more preceding blocks (the at least one workflow block), may utilize the processed data from those preceding blocks to make decisions or determine the subsequent flow of the workflow.

For example, 1850 switch block may access data from blocks 1802-1 and 1802-2 to make decisions based on certain criteria and direct the flow to different downstream branches or paths depending on the outcomes of the tasks involved at steps 1802-1 and 1802-2. In an alternative example, switch block 1850, may perform some intermediary calculation based on data from blocks 1802-1 and 1802-2 and then used these results to make decisions. By using the data processed by preceding blocks within the same branch, the switch block can incorporate relevant information or conditions to guide the flow of the workflow.

Access and use of data processed by the at least one workflow block may require some form of permission for the switch block. In certain embodiments, permissions for the switch block to access data associated with the at least one workflow block may include permissions to access to a source of dynamic data associated with the at least one workflow block. A source of dynamic data refers to data with properties and values that have the potential to change during the execution or running phase of the workflow. This allows the switch block to access and utilize the dynamically changing data from the at least one upstream block as required. In some other embodiments, permissions for the switch block to access data associated with the at least one workflow block may include permissions to access to at least one resource associated with the at least one workflow block. These resources may be categorized as internal or external resources, or a combination of both. Furthermore, in some embodiments, permissions for the switch block to access data associated with the at least one workflow block may include enabling access to at least one global variable associated with the at least one workflow block.

Enabling permissions to access data associated the at least one workflow block may be achieved through various mechanisms. In some embodiments, permissions may be inherited. This means that the switch block, like any other blocks, automatically inherit access to the data associated with upstream workflow blocks due to its downstream position. In other embodiments, there may be a separate permission management process, and access permissions to the data associated with the at least one workflow block are granted and managed through a user interface displayed in association with the canvas. For example, when a user clicks on the switch block displayed on the canvas, a contextual menu may appear, allowing the user to establish a set of permissions specifically for the switch block. In additional embodiments, different mechanisms may be employed to enable permissions. One such mechanism may involve defining data sharing rules that specify which data from the at least one workflow block may be accessed by the switch block. Another approach may be based on the utilization of access tokens as a mechanism to grant either full or partial access to the data associated with the at least one workflow block. These various mechanisms provide flexibility in managing permissions and ensuring secure and controlled access to the relevant data within the workflow environment.

In some embodiments, the switch block may be configured with a plurality of differing queries associated with the plurality of alternative downstream branches, at least one of the plurality of differing queries being associated with the at least one of the plurality of data sources. As used herein, a query is a question or a call or prompt for an input. A query may be associated with a downstream branch if it relates to information associated with a downstream branch and/or a selection decision for a downstream branch. For example, a query may serve to determine the conditions or criteria for directing the trigger/action flow to each specific branch. Each query within the switch block may be designed to evaluate specific conditions or data parameters. These conditions may be based on various factors such as, data processed in preceding blocks, or external factors. By configuring different queries, each associated with a particular downstream branch, the switch block may determine which branch(es) to direct the trigger/action flow based on the evaluation result. Furthermore, at least one of these queries may be associated with one of the data sources used within the workflow. This means that the query considers the data from a specific data source as part of the evaluation process. Queries allow for conditional evaluation and branching based on specific conditions or values and may adopt a format of an "if" statement.

In line with the disclosed embodiments, at least one of the differing queries within the switch block may be associated with one or more of the data sources utilized within the workflow. By associating a query with a specific data source, the switch block may incorporate data from that source in its evaluation process. This allows the switch block to make decisions based on the information obtained from the associated data source, thereby influencing the direction of the trigger/action flow. In some cases, one or more of the switch block queries may be hidden from an unauthorized user viewing the workflow. For example, in case of a workflow for reporting incidents, a secret query may be added by the builder of the workflow, in which upon positive check for a query, a notification about the incident may be sent to a manager.

Additionally, queries may be one of the methods used by the switch block to utilize data processed by at least one preceding workflow block. The queries within the switch block may include statements that use the data or variables that have been processed or generated by the preceding block(s). These queries may access and manipulate the processed data or variables to make decisions, determine conditions, or define branching logic within the switch block. The data processed by the preceding block(s) may be used as inputs or parameters in the queries to evaluate specific conditions or criteria.

Queries within the switch block may be defined by a user during the generation or configuration of the switch block. For example, by employing a GUI associated with the switch block users are enabled to create and customize the conditions and criteria based on their specific requirements and logic. Alternatively, in cases where the switch block is preconstructed or provided as a predefined component, various queries may already be predefined or automatically created when an alternative downstream branch is added to the workflow. This may be achieved through templates, configuration options, or intelligent systems (e.g., AI agents) that generate queries based on the addition of new branches. By automating the query creation process, the workflow management platform may assist users in efficiently setting up the switch block. The platform may generate initial queries that can then be further customized by the user as needed. In such cases, the predefined or automatically created queries may be based on default conditions or common patterns, taking into account the data, variables, thresholds values, and evaluation operations relevant to the workflow context, therefore streamlining the workflow design process and reducing the effort required to configure the switch block.

In FIG. 18A, queries 1815, 1825, 1835, and 1845 associated with downstream branches 1810, 1820, 1830, and 1840 are depicted. These queries are presented in the form of "if" statements and involve variables such as "X," "Y" and "time" as well as fixed threshold values such as "val1", "val2", "val3", "val4", "10 AM", and "5 PM". The variables "X" and "Y" may be associated with data sources linked to blocks 1802-1 and 1802-2 or with data that has been processed by these blocks, while the "time" variable represent an external factor evaluated by the switch block. The specific content and structure of these queries indicate their purpose to evaluate certain conditions based on the given variables and threshold values. By utilizing "if" statements, these queries facilitate conditional execution of code or branching within the workflow, depending on the evaluation outcomes. It is to be appreciated that while the depicted queries 1815, 1825, 1835, 1845 are presented as "if" statements, other logical or evaluation operations can also be performed within queries. The queries may incorporate different types of conditions, comparisons, calculations, or any other logic needed to determine the appropriate flow of the trigger/action within the workflow. It is to be appreciated that the plurality of differing queries may not be necessarily displayed on the canvas, for example, the plurality of queries may only be displayed when editing the switch block or when interacting with a GUI component associated with the canvas.

In some embodiments, at least some queries of the plurality of differing queries may use data different from data used in other queries of the plurality of differing queries. In other words, each query may be designed to evaluate conditions or criteria based on specific data sources or variables that are distinct from those used in other queries. By using different sets of data in the queries, the switch block may incorporate diverse information and make decisions based on unique considerations for each query. This enhanced flexibility in the evaluation process enables the switch block to handle and combine different scenarios effectively. By utilizing specific data in the queries, the switch block may direct the trigger/action flow to multiple downstream branches, enabling parallel execution of tasks across those branches. Referring to the example depicted in FIG. 18A, queries 1815 and 1825 use data represented by "X", which is distinct from the data used in queries 1835 and 1845 ("Y" and "time"). As a result, the conditions specified in queries 1835 and 1845 may be satisfied independently of the value of "X". Consequently, the trigger/action flow can be directed to branches 1830 and 1840, as well as either branch 1810 or 1820 simultaneously. This allows for the parallel execution of the blocks (1802) contained within these branches.

Alternatively, in some other embodiments, the plurality of differing queries may use common data. In other words, the queries, despite being distinct from each other, may rely on the same set of data sources or variables during the evaluation process. By utilizing common data in the queries, the switch block may evaluate conditions or criteria based on the shared information. This allows for consistency in decision-making and ensures that the trigger/action flow is directed based on a unified evaluation of the common data. For example, consider a workflow where multiple queries within the switch block assess different aspects of a customer behavior. While each query may have unique conditions or criteria, they all rely on common customer data. By using the same set of customer data in the queries, the switch block can make informed decisions consistently across different branches, ensuring that the trigger/action flow is directed based on a cohesive evaluation of the shared information.

In some embodiments, at least one of the plurality of differing queries being associated with the at least one of the plurality of data sources may include all of the plurality of differing queries associated with the at least one of the plurality of data sources. Accordingly, it is possible for all of the differing queries within the switch block to be associated with the same data source or sources. When all the queries are associated with the same data source, the evaluation process and decision-making within the switch block may be based on the information retrieved from that particular data source. This approach allows for a consistent and unified analysis of the data. However, even if all the differing queries within the switch block are associated with the same data source, it does not restrict them from using different subsets or variations of the data from that source. Each query can still independently utilize specific data or variables from the shared data source. While the queries may have a common association with the data source, they can still be designed to evaluate different conditions or criteria based on different aspects of the data.

Alternatively, in some other embodiments, at least one of the plurality of different queries being associated with the at least one of the plurality of data sources includes each of the plurality of differing queries associated with at least one distinct data source of the plurality of data sources. Accordingly, it is possible for each of the differing queries within the switch block to be associated with a different data source from the available plurality of data sources. When each query is associated with a distinct data source, it implies that the evaluation process and decision-making within the switch block rely on different sets of data from multiple sources. This approach allows for the incorporation of diverse information and considerations in determining the appropriate downstream branches.

In some cases where the query involves an element of an internal resource, by selecting the internal resource a popup window will be opened viewing said internal resource, and the user may select one or more elements for which the query should be defined, both as the condition (if status) and for the resolution (status is X). Dragging and dropping items/cells/columns to the switch block may be also applied, enabling accordingly a visual configuration of the switch block rather than textual one.

In some embodiments, the plurality of alternative downstream branches may be united into a single branch at a location of a convergence block configured to implement an action only after all actions of the plurality of alternative downstream branches have been executed. As defined in previous sections, a convergence workflow block may represent a merging point where the plurality of alternative downstream branches reconvene. For example, in FIG. 18A, branches 1810, 1820, 1830 and 1840 all reconvene at a convergence block 1860. For the sake of clarity, the visual design of convergence block 1860 differs from the design of other blocks 1802 and mirrors the design of switch block 1850. The example provided, illustrating convergence block 1860 as a rectangular box with double-lined widths and an icon, is not intended to impose limitations on its visual appearance. In some cases, a dynamic sizing approach may be provided to accommodate the additional connections and paths within the convergence block.

In alternative embodiments, the convergence block may be configured to implement an action only after all actions of a portion of the plurality of downstream alternative branches have been executed, and the portion may be based on the queries associated with the plurality of alternative downstream branches. This configuration may be automatically implemented if some of the switching block's queries are mutually exclusive. Mutually exclusive queries refer to queries that cannot be simultaneously satisfied, indicating that at least two first branches of the downstream branches cannot be executed concurrently due to conflicting conditions or criteria specified in their associated queries. In such cases, the convergence block is designed to implement its action only when all the actions of the remaining branches (excluding the mutually exclusive branches) and one of the conflicting branches have been executed. This ensures that the convergence block executes its action only after the completion of all other feasible branches and one of the conflicting branches, taking into account the mutually exclusive nature of their associated queries. For example, referring to FIG. 18A, queries 1815 and 1825 are mutually exclusive. The variable "X" cannot simultaneously take two different values, making it impossible to execute both workflow branches 1810 and 1820 at the same time. Consequently, the convergence block 1860 will implement its actions only when all the actions of branches 1830, 1840, and either branch 1810 or 1820 have been executed.

Some disclosed embodiments may involve enabling placement of an additional switch block on the canvas in one of the plurality of alternative downstream branches, and placement of a further plurality of workflow blocks downstream of the additional switch block and arranged in a further plurality of alternative downstream branches; wherein the additional switch block is configured with an additional plurality of differing queries associated with the further plurality of alternative downstream branches, at least one of the additional plurality of differing queries being associated with at least one of the plurality of data sources. Additionally in some further embodiments, the additional plurality of queries may differ from the plurality of queries. Enabling placement in this context corresponds to the discussion of enabling placement previously in this disclosure. In the current context for example, the introduction of an additional switch lock in one of the alternative branches downstream of the (first) switch block opens up new possibilities for designing more sophisticated processes. This allows for the potential imbrication, or nesting, of multiple switch blocks within a workflow. By incorporating multiple switch blocks, each potentially with its own set of queries, the process may become more intricate and adaptive. This enables the workflow to respond to different scenarios or conditions, branching out into various paths based on specific criteria.

Figure 18B:
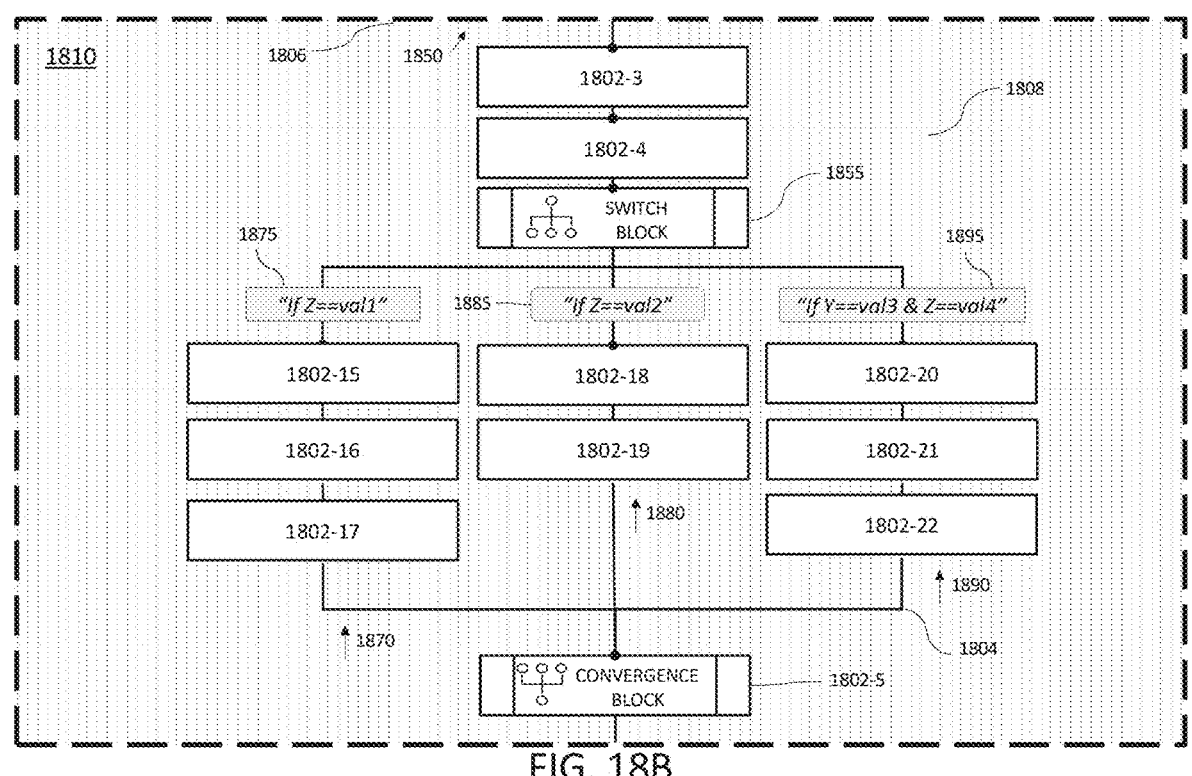
FIG. 18B illustrates a close-up view of one of the plurality of alternative downstream branches shown in FIG. 18 further including an additional switch block and a further plurality of alternative downstream branches, consistent with some disclosed embodiments.

FIG. 18B is a close-up view of branch 1810 of workflow diagram 1800 showing how an additional switch block 1855 may be further incorporated into one of a plurality of alternative downstream branches of a first switch block 1850. This close-up view is still displayed on display 1806 using canvas 1808, and the zooming operation could have been performed by interacting with a GUI component of or directly with canvas 1808. In this example, workflow branch 1810 includes an additional switch block 1855 and a further plurality of workflow blocks 1802-15 to 1802-22, which have been arranged in a further plurality of alternative downstream branches 1870 (blocks 1802-15 through 1802-17), 1880 (blocks 1802-18 and 1802-19) and 1890 (blocks 1802-520 through 1802-22). As illustrated, the additional block 1855 and blocks 1802-15 to 1802-22 have been inserted between blocks 1802-4 and 1802-5, the latter then adopting the structure and function of a convergence block.

Additional switch block 1855 is configured with an additional plurality of differing queries 1875, 1885 and 1895 associated with the further plurality of alternative downstream branches 1870, 1880 and 1890. These queries all take the form of an "if" statement involving variables such as "Y" and "Z" as well as fixed threshold values such as "val1", "val2", "val3", and "val4". The variables "Y" and "Z" may be associated with data sources linked to blocks 1802-1 and 1802-2 but also to blocks 1802-3 and 1802-4 which are at upstream positions with respect the additional switch block 1855. As shown, the additional plurality of differing queries 1875, 1885, and 1895 are different from the plurality of differing queries 1815, 1825, 1835, and 1845.

In some embodiments, the additional switch block may be enabled to use data processed by the at least one workflow block preceding the additional switch block in a same branch as the additional switch block. In a similar fashion to the switch block, the additional switch block may access, performed data manipulation actions, make decisions or a combination thereof based on the data that has been processed by preceding upstream block(s). Notably, data process by upstream blocks may be used by the additional plurality of differing queries of the additional switch block. Accordingly, in FIG. 18B, variables "Y" and "Z" may be associated with data processed by blocks 1802-1, 1802-2, 1802-3 and 1802-4.

In some embodiments, at least some queries of the additional plurality of differing queries may use data different from data used in other queries of the additional plurality of differing queries, or the additional plurality of differing queries may use common data. For example, in the example illustrated in FIG. 18, queries 1875, 1885 and 1895 all use a common variable "Z". Additionally, in some embodiments, at least one of the additional plurality of differing queries being associated with at least one of the plurality of data sources may include all of the additional plurality of differing queries associated with the at least one of the plurality of data sources, or each of the additional plurality of differing queries associated with at least one distinct data source of the plurality of data sources.

Within the context of a SaaS platform, the individual elements or sub-elements of the SaaS platform are not isolated entities, but rather interconnected components that contribute holistically to the overall functionality of the platform. For example, when a workflow is treated as an element or sub-element of the SaaS platform, it becomes an integral part of these interconnected functionalities. These interconnections enable data sharing, collaboration and real-time communication across different aspects of an organization's operations.

Referring to FIG. 1 for example, a workflow (e.g., 100-1 through 110-N5) which is a sub-element of workflow manager 110 may seamlessly be integrated with other elements or sub-elements of SaaS platform 100, such as tables/spreadsheet/boards (102-1 through 102-N1), text documents (104-1 through 104-N2), dashboards (106-1 through 106-N3), or (public or private) applications (108-1 through 108-N4). This interconnectedness facilitates a smooth flow of information between any one of the above-mentioned components and the workflow and ensures that workflow processes are not only efficient, but also capable of evolving according to changing needs.

Furthermore, the ability to leverage third-party integrations within SaaS platform ecosystems empowers organizations to extend the functionality of their workflows, by harnessing the power of external services and data sources (external resources). This interconnected approach amplifies the value of treating workflows as SaaS platform elements, enabling organizations to adapt, innovate, and scale their operations more efficiently.

FIG. 19A is a flowchart of an exemplary process (1900) for performing operations facilitating SaaS platform element interconnections. Process 1900 is discussed herein for explanatory purposes and is not intended to be limiting. In some embodiments, steps of process 1900 may be changed, modified, substituted, or rearranged, consistent with the present disclosure. Process 1900 may be implemented using one or more components of a computing device 2100 (discussed in FIG. 21) or user device 2220 of computing architecture 2200 (discussed in FIG. 22). Some disclosed embodiments may include at least one processor that may be configured to execute stored instructions to perform operations for applying workflows to internal and external resources. As shown in FIG. 19A, process 1900 may include steps 1902, 1904, and 1906 discussed in further detail below. FIG. 19B is a flowchart of a exemplary process of generating a new workflow in association with step 1906 of FIG. 19A. As depicted in FIG. 19B, generating a new workflow may include steps 1916, 1926, 1936, 1946, and 1956 discussed in further details below.

Some disclosed embodiments involve maintaining a plurality of SaaS platform elements of a SaaS platform, wherein each of the plurality of SaaS platform elements include a plurality of sub-elements. Maintaining a plurality of SaaS platform elements refers to storing, managing, and/or overseeing multiple distinct components (elements) or services within a Software as a Service (SaaS) ecosystem or platform. Ongoing management, for example, may encompass various tasks such as coordinating the integration of these elements, ensuring regular updates and maintenance, or handling data management including data sharing policies, security measures, and maintaining data consistency. An example of maintaining a plurality of SaaS platform elements of a SaaS platform is illustrated as step 1902 of FIG. 19A.

Consistent with some disclosed embodiments, each of the plurality of SaaS platform elements include a plurality of sub-elements. A sub element refers to a component or part that is subordinate or part of a larger element or system. By way of example only, referring to FIG. 1, SaaS platform elements 102, 104, 106, 108, and 110 each includes a plurality of SaaS platform sub-elements respectively 102-1 through 102-N1 for Tables 102, 104-1 through 104-N2 for Text documents 104, 106-1 through 106-N3 for Dashboards 106, APP 108-1 through APP 108-N4 for Marketplace 108 and 110-1 through 101-N5 for Workflow Manager 110.

Some disclosed embodiments involve maintaining a permissions manager associating the plurality of SaaS platform elements with entities utilizing the SaaS platform. A permissions manager is a tool or system that allows administrators to control and/or regulate access to resources, data, and/or functionalities. Maintaining a permissions manager generally involves overseeing and/or managing the access rights and permissions granted to individuals or entities within a system, network, or application. Each of the plurality of SaaS platform elements may be associated with at least one entity of the entities utilizing the SaaS platform, and the permissions manager may include an association of a first entity with at least a first SaaS platform element and a second SaaS platform element. By way of one example, maintaining a permissions manager in a SaaS platform may refer to the ongoing management, configuration, and monitoring of associations between various SaaS platform elements and the entities that utilize the SaaS platform. This process may ensure that access rights, privileges, and permissions are appropriately assigned and controlled, optimizing the security, functionality, and user experience within the SaaS platform. For example, referring to FIG. 1, permission manager 114 enables to manage a plurality of associations between SaaS platform elements 102, 104, 106, 108 and 110 and the entities (112-1 through 112-M) included in user manager accounts 112 utilizing SaaS platform 100. Among this plurality of associations one may involve the association of first entity (e.g., entity 112-2 including user 112-21, 112-22 and 112-23), with a least a first SaaS platform element and a second SaaS platform element. Additionally, in some embodiments, the permission manager may enable the direct association of entities that utilize the SaaS platform with specific sub-elements within the SaaS platform. Accordingly, entities may be linked directly to particular components or features within the SaaS platform, allowing for more granular control over access and permissions. An example of maintaining a permissions manager associating the plurality of SaaS platform elements with entities utilizing the SaaS platform, including an association of a first entity with at least a first SaaS platform element and a second SaaS platform element is illustrated as step 1904 in FIG. 19A.

In some embodiments, the first and the second elements may be different types of non-workflow SaaS Platform elements (or sub-elements) or may be a same type of non-workflow SaaS platform element elements (or sub-elements). As used herein, a "non-workflow SaaS platform element" refers to a component of a SaaS platform that does not primarily deal with managing workflow processes. It may be any feature or module within the platform that serves purposes other than workflow automation. To illustrate, as depicted in FIG. 1, entity 112-2 may be associated with SaaS platform element 102 ("Tables") and SaaS platform element 104 ("Text documents"), which represent different types of non-workflow SaaS platform elements. Alternatively, in a different scenario, entity 112-2 could be linked with table 102-1 and table 102-2, both of which belong to the same type of non-workflow SaaS platform (sub-) element category.

Some disclosed embodiments involve enabling a first user of the first entity to generate a new workflow for the at least one entity. As used herein, generating a new workflow refers to completing the configuration and/or construction phase of a new workflow. This process entails a first user, associated with the first entity, generating a new sequence or arrangement of tasks, actions, and/or steps that define a specific operational process within the SaaS platform. Referring to FIG. 1, user 112-21 of entity 112-2 may be enabled to generate a new workflow. This newly created workflow outlines the logical flow of activities, including their order, dependencies, and conditions, and it may be customized to meet the unique requirements and objectives of the entity. An example of enabling a first user of the first entity to generate a new workflow for the at least one entity is illustrated as step 1906 in FIG. 19A. Generating a new workflow may comprise various operations as described above in association with processes 500, 700, 1000, 1200, 1400 and 1700 or as described below in connection with FIG. 19B representing in more detail the step of generating a new workflow included in step 1906 of FIG. 19A.

In some embodiments, enabling a first user of the at least one entity to generate a new workflow for the at least one entity occurs through use of a workflow manager associated with the at least one entity. In this context, a "workflow manager" refers to a tool or system designed to facilitate, streamline, and/or optimize the execution of a series of tasks. For example, a workflow manager may involve a user interface (UI) that serves as a control center, offering a range of functionalities. For example, referring to FIG. 1, user 112-21 may be enabled to generate a new workflow through use of workflow manager 110 associated with entity 112-2. Additionally, in some embodiments, the workflow manager includes further workflows associated with the at least one entity, resources associated with the further workflows, and activations statuses associated the further workflows. As used herein, further workflows refers to workflows other than an initial workflow. For example, the further workflows may include pre-existing workflows, already partially or completely generated and associated with the at least one entity.

The activation status of a workflow reflects whether or not the workflow may be initiated upon meeting its associated trigger condition. While the activation status remains negative, indicating an inactive workflow, it remains incapable of being initiated (the workflow is dormant) and will not execute the associated process. Users may have the capability to activate or deactivate a workflow as needed. For instance, after ensuring that the workflow has been correctly generated and configured, a user may activate it, and conversely, if a workflow is no longer necessary, a user may choose to deactivate it. In some embodiments, preventive mechanisms may be in place to block the activation of a workflow in case construction issues are detected. Examples of these construction issues may include, among others, unfilled fields in global variables, missing dependencies, resources mismatches or incorrect data mappings, which all serve as potential impediments to workflow activation. The activation status of a workflow can be stored in the workflow's associated database or configuration file. It may take various forms, such as a binary representation where '1' indicates an active status and 'O' indicates an inactive status. Alternatively, it may be represented as a Boolean flag where 'True' indicates activation and 'False' indicates inactivity. The exact method used for storage may depend on the specific software or system architecture used within the workflow platform/workflow manager.

The functionalities offered by a workflow manager, such as workflow manager 110 depicted in FIG. 1, may include the creation of new workflows, seamless editing, deletion, activation status control, permission management for existing workflows linked to the at least one entity, efficient search functionality for locating specific workflows within the entity's collection, and tracking the last update timestamp and user responsible for modifications, ensuring a complete and transparent workflow management experience. In essence, the workflow manager serves as a centralized platform, empowering the user to efficiently oversee and manage all workflows affiliated with their entity. This control ensures not only precise configuration and access control but also the ability to maintain and optimize workflows according to evolving needs and objectives.

Figure 20:
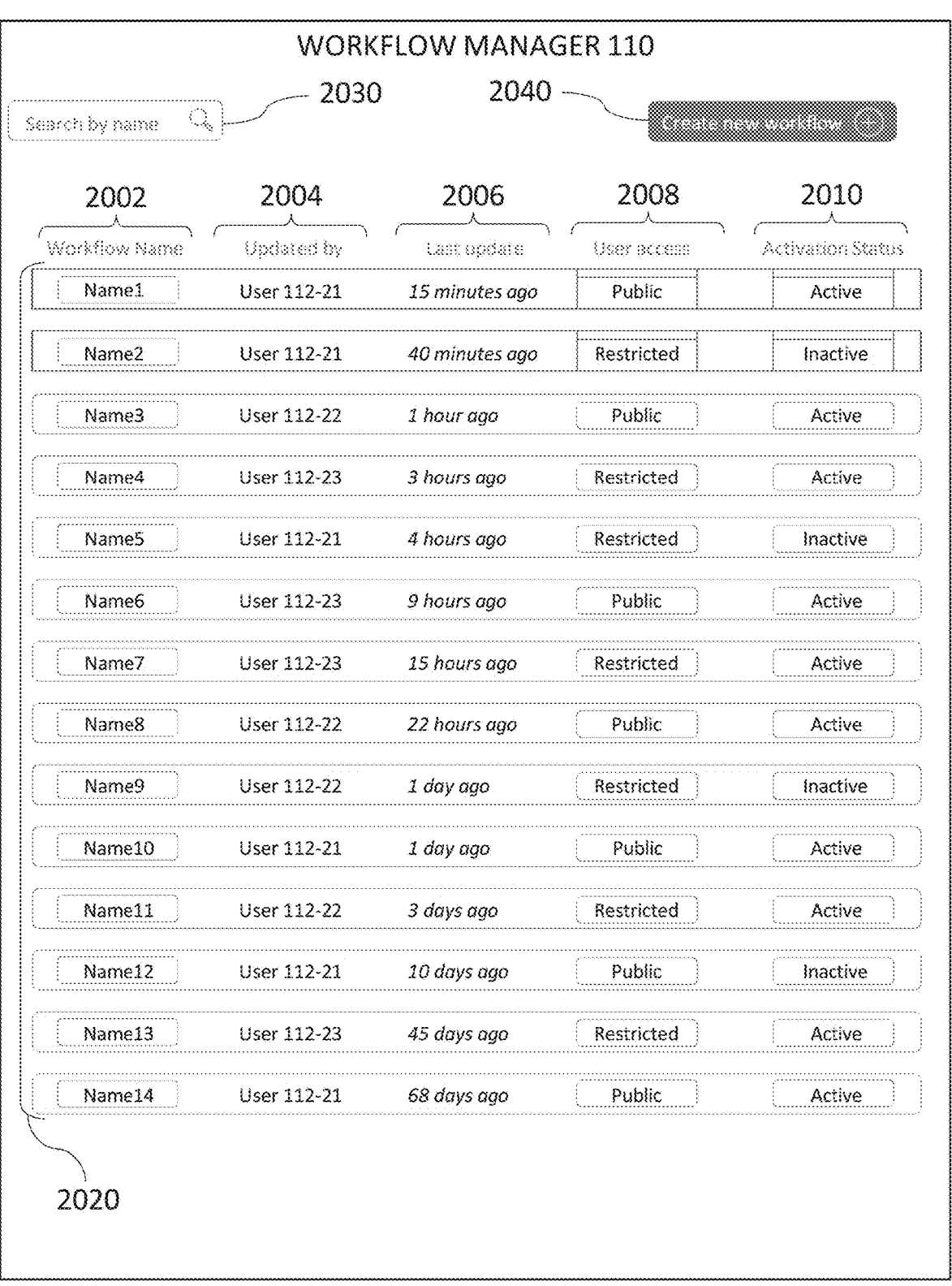
FIG. 20 illustrates an exemplary workflow manager, consistent with some disclosed embodiments.

FIG. 20 provides an exemplary layout representing a workflow manager, akin to the one depicted as workflow manager 110 in FIG. 1. In this specific instance, workflow manager 110 is linked to entity 112-2, consequently showcasing exclusively the workflows owned by entity 112-2 and the users associated with it. It is to be appreciated that the workflows displayed within workflow manager 110 may vary based on the user of the at least one entity. Indeed, certain workflows may have restricted access, meaning that if a user lacks authorization for a particular workflow, it may not appear in their version of the workflow manager. This dynamic display ensures that users only see and interact with the workflows for which they have the requisite permissions.

As depicted, workflow manager 110 provides an overview of a plurality of the workflows associated with entity 112-2. In some embodiments, workflow manager 110 may depict all workflows associated with entity 112-2. It presents information that facilitates the execution of some of the above-mentioned functionalities, including:

Workflow Names (Column 2002): The names of workflows 2020 may be prominently displayed, offering quick identification and access. Clicking one of the name labels in column 2020 may provide access to additional detailed information through a GUI component, such as a pop-up window or a different user interface. This additional information might include the name of the workflow's creator, the date of its creation, and any associated internal or external resources linked to the workflow. Furthermore, upon clicking on the name label, and if the necessary authorization is granted, users may have the option to edit or delete the workflow.

Last Update Information (Column 2004 and 2006): Users can readily discern the individual responsible for the most recent update, as well as the timestamp indicating when the update occurred, ensuring transparency in workflow management.

Authorization Access (Column 2008): The authorization access status of the workflows is clearly presented, enabling users to assess and manage permissions effectively. Labels in this column signify either "Public" (accessible to all entity 112-2 users) or "Restricted" (limited access for at least one entity 112-2 user). By clicking a user access label, users may edit permissions through another GUI component, like a pop-up window, enabling customization of access rights. Users may choose which entity 112-2 users have access and to what extent, whether for viewing, editing, or changing activation status.

Activation Status (Column 2010): Workflow activation status is visually indicated, allowing users to monitor whether workflows are currently active or inactive as indicated by the descriptive labels. Clicking on these status labels may allow users to activate or deactivate workflows thereby eliminating the need for users to navigate through additional menus or interfaces to perform these actions (e.g., edit each workflow individually to change the activation status).

In addition, users are enabled to search among the collection of workflows 2020 associated with entity 112-2 by utilizing the user-friendly search bar 2030, a graphical user interface (GUI) component, and to create new workflows by clicking on button 2040, another GUI component. After a user clicks on button 2040, a distinct user interface tailored for the creation of workflows can be presented. This specialized interface may take the form of a graphical workflow builder, featuring an interactive canvas designed to facilitate the creation of workflow blocks and their arrangement. Within this builder, users can design, connect, and configure the various components of a workflow, providing a visual and user-friendly platform to construct and customize workflows to meet their specific operational requirements.

It is to be appreciated that the depiction of workflow manager 110 in FIG. 20 is purely illustrative, and the UI design as well as the UI components, such as search bar 2030, button 2040, and clickable labels in columns 2008 and 2010, are subject to change. There's flexibility for various other types of GUI components to be incorporated to enhance the functionalities of workflow manager 110. These may encompass buttons, sliders, checkboxes, and text input fields, among others. For instance, a toggle button could potentially replace the "active" and "inactive" labels found in column 2010. Moreover, additional GUI components may be introduced within workflow manager 110. For example, when the number of workflows controlled by an entity surpasses the display capacity, additional components such as a scroll bar may be integrated to enable users to seamlessly navigate the entire workflow collection.

In some embodiments, the generation of the new workflow is performed from an account view, or from an element view. An account view refers to a specific screen, page, or interface that provides a comprehensive presentation of details and/or settings. For example, and account view may include a dedicated user interface for creating workflows. It may be designed as a graphical workflow builder, offering users an interactive canvas, such as canvas 208, 308, 408, 608, 1308, 1508, 1608a, 1608b, or 1808. This canvas provides users with a visual and intuitive platform to construct workflows by arranging and connecting various workflow blocks. In the account view, users have a holistic and comprehensive environment for creating workflows from scratch or customizing existing ones. The element view represents an alternative paradigm within the user interface, where it combines the display of a specific element from the SaaS platform with a dedicated user interface for creating or editing workflows, such as a graphical workflow builder. In this configuration, the element view often may involve a split-screen display, with one part showcasing a distinct SaaS platform element like a table or a text document, and the other part featuring an interactive canvas for workflow design. Within this setup, additional mechanisms may be provided to streamline the interconnection between the SaaS platform element and the newly generated workflow. For example, in some embodiments, users may employ drag-and-drop functionality to seamlessly connect specific workflow blocks with the SaaS platform element, enhancing the contextual relevance of the workflow. This view may be well-suited for users who intend to create workflows closely tied to a specific element of the SaaS platform, ensuring a more focused and efficient workflow creation process. These views (account and element) offer users flexibility in how they approach workflow creation, enabling them to choose the interface that best suits their needs and preferences, whether they require a broad canvas for comprehensive workflow design, or a more specialized view tied to specific platform elements.

In some embodiments, generating a new workflow may involve generating a first workflow block in the new workflow and associating the first workflow block with at least one sub-element of the first SaaS platform element. This "first workflow block" refers to the initial building block or step within the newly created workflow. The first workflow block is connected or tied to at least one sub-element of the first SaaS platform element. This association establishes a link between the workflow (through the first workflow block) and a specific part or functionality of the SaaS platform, allowing the workflow to interact with or exchange data that element as needed. For instance, if the first SaaS platform element associated to entity 112-2 is a table (e.g., 102-1), first user 112-21 has the capability to associate the first workflow block with a specific cell, column, or row within the table, allowing for precise interactions and data exchanges with that chosen sub-element. An example of generating a first workflow block in the new workflow and associating it with at least one sub-element of the first SaaS platform element is illustrated as step 1916 in FIG. 19B.

In some embodiments, generating a new workflow involves generating a second workflow block in the new workflow and associating the second workflow block with at least one sub-element of the second SaaS platform element This second workflow block represents an additional building block or step within the newly created workflow and may be intrinsically connected to at least one sub-element of the second SaaS platform element. This association establishes a connection between the workflow, specifically through the second workflow block, and a distinct part or feature of the SaaS platform element. This linkage empowers the workflow to actively interact with or exchange data with the chosen sub-element as necessary. For example, if the second SaaS platform element associated with entity 112-2 is a text document (e.g., 104), first user 112-21 may associate the second workflow block with a specific section, paragraph, or content element within that text document. An example of generating a second workflow block in the new workflow and associating it with at least one sub-element of the second SaaS platform element is depicted in step 1926 of FIG. 19B.

In some embodiments, generating a new workflow involves interconnecting the first workflow block and the second workflow block. Interconnection, in the context of workflow management and creation, refers to a process of establishing a link or connection between different components i.e., workflow blocks or elements. These connections define the flow of data, actions, or logic between the interconnected components, enabling them to work together cohesively to achieve specific tasks or processes within a workflow. In this instance, this interconnection between the first and the second workflow blocks establishes how the two workflow blocks interact and cooperate to execute specific tasks or processes within the workflow. An example of interconnecting the first workflow block and the second workflow block is illustrated as step 1936 of FIG. 19B.

As an example, in some embodiments, interconnecting the first workflow block and the second workflow block may include interconnecting the first workflow block and the second workflow block with a trigger and action connection. A trigger and action connection refers to a cause-and-effect relationship within the workflow. In this scenario, the first workflow block, which may be referred to as the "trigger block" initiates a specific event or condition. This event may be based on various criteria, such as the completion of a task, the receipt of certain data, or the occurrence of a particular time or date, in conjunction or not with the at least one sub-element of the first SaaS platform element associated with it. On the other hand, the second workflow block, which may be referred as to the "action block" responds to the trigger by executing a predetermined set of actions or tasks. These actions may be designed to achieve a specific outcome or result based on the trigger's occurrence. In essence, when the first and second workflow blocks are interconnected using a trigger and action connection, the second block is programmed to respond automatically as soon as the first block is triggered by a specific event or condition.

Furthermore, in some embodiments the trigger and action connection may be indirect. An indirect trigger and action connection, in the context of workflow management, implies that the action executed by the action block (second workflow block) may not be directly or immediately related to the trigger implemented (or the data involved in the trigger) by the trigger block (first workflow block). In other words, the cause-and-effect relationship between the trigger and action in this type of connection might involve intermediate steps or conditions that bridge the gap between the triggering event and the resultant action, or the trigger event and the action may be entirely unrelated. For example, a workflow may include a trigger block configured to monitor a specific email inbox for the arrival of an email from a client. When such an email arrives, it serves as the trigger. However, the desired action is not to reply to the email directly; instead, it's to update a client table with the client's contact information. In this scenario, the trigger (client email) indirectly leads to the action (updating the client) through intermediate steps or conditions. These intermediate steps may involve data extraction, validation, and transformation before updating the client table. In another scenario, an indirect trigger and action connection may be exemplified by a workflow where the trigger block gets activated when 50% or more of the items on a column of a table are marked as 'Done' (threshold condition). While the trigger condition is directly related to the status of these items, the resulting action may entirely be unrelated to them. For example, instead of modifying the item statuses, the action block's purpose may be to notify a manager about the project's status. In this case, the trigger condition initiates an action that is not directly correlated with the initial trigger condition pertaining to the item statuses on the board.

In contrast, a direct trigger and action connection in workflow management denotes that the action carried out by the second workflow block (action block) is immediately and unequivocally linked to the trigger initiated by the first workflow block (trigger block), considering the pertinent data associated with the trigger. In this straightforward connection, the trigger event, along with its pertinent data, instantaneously initiates the action, obviating the necessity for any intermediary steps or conditions. For instance, as depicted in FIG. 6, when block 602-1 is triggered by the arrival of new order details, block 602-2 directly utilizes the data encompassed in the order details (such as product type and quantity) from the trigger to promptly estimate the delivery time for the order.

In some embodiments, generating the second workflow block in the new workflow and associating the second workflow block with at least one sub-element of the second SaaS platform element includes generating the second workflow block via a GUI component of the first workflow block. Generating the second workflow block via a GUI component of the first workflow block refers to providing a graphical element in the first workflow block that, when selected or otherwise activated, causes the addition of the second workflow block. In some contexts, this may involve creating new records or entries in a database using a form or other UI elements. By way of one example, such an interface may be user-friendly, enabling users such as a a first user (e.g., 122-21) associated with the at least one entity (e.g., 122-2), to seamlessly create and define the characteristics of the second workflow block directly from the context of the first block, enhancing workflow efficiency. The GUI component may assume different forms within the workflow interface. For instance, it could manifest itself as a pop-up window that overlays a graphical workflow builder canvas while the first user is in the process of configuring the first block.

Additionally, in some embodiments, interconnecting the first workflow block and the second workflow block includes configuring the second workflow block such that a completion of action in the first workflow block serves as a trigger for the second workflow block. In this context, when a specific task or process initiated by the first block reaches a designated completion point, it automatically activates the second block to commence its predefined actions or tasks. This trigger mechanism may streamline the workflow's sequential execution, ensuring that actions in the second block are synchronized with the progress of the first block, thus achieving a well-coordinated workflow process. In the described configuration, the interconnection between the first and the second workflow block may encompass various types of connections to facilitate workflow automation and coordination. One of these interconnections, as mentioned earlier, involves the trigger and action connection, where the first block (trigger block) substantially behaves as a trigger for the action of the second block (action block), ensuring a seamless sequence of operations. Another example of interconnection may involve a dependency connection. In this scenario, the second workflow block relies on the successful execution or outcome of certain tasks within the first block before it may commence its actions. For instance, in a project management context, the first block might represent the initial task of gathering information about a project and the second block, dependent on this task's completion, could represent the task of initiating a planning of this project. This dependency connection ensures that project planning begins after all requirements are gathered and verified in the first block. These various types of interconnections offer flexibility in designing workflows, allowing users to choose the most appropriate connection type based on their specific workflow requirements and processes.

In some embodiments, generating the new workflow involves activating the new workflow. Activating a workflow refers to the process of starting or enabling the workflow to start. Activation may cause the workflow to perform its designated tasks or actions based on trigger conditions and defined processes. Activation of the workflow may be performed by the user at its discretion. For example, a user may active a workflow after finishing the construction/configuration phase of the workflow. Once active, modifications or edits to the workflow structure may be restricted, requiring deactivation for further changes. Activation may occur through a graphical workflow builder's dedicated GUI component or via a workflow manager like the one illustrated in FIG. 20. In some embodiments newly created workflows may be initially deactivated by default. An example of activating the new workflow is illustrated as step 1946 in FIG. 19B.

In some embodiments, generating the new workflow involves preventing a second user of the at least one entity from associating the first block in the new workflow with the at least one sub-element of the first SaaS platform element, from associating the second block in the new workflow with the at least one sub-element of the second SaaS Platform element, or a combination thereof. In other words, certain users within the at least one entity may have limitations imposed on their ability to configure or connect specific workflow blocks to SaaS platform elements. In some implementations, the first user may have the authority to prevent any other users associated with the at least one entity from carrying out any of the steps involved in generating the new workflow, replicating the same actions they performed during the workflow creation process. This level of control ensures that workflow configurations and associations align with the intended processes and standards established by the initial user or creator of the new workflow. For example, user 112-21 may prevent user 112-22 for associating at least one sub-element from the first SaaS platform element to the first workflow block and to activate the new workflow. An example of preventing a second user of the at least one entity from associating the first block in the new workflow with the at least one sub-element of the first SaaS platform element, and/or from associating the second block in the new workflow with the at least one sub-element of the second SaaS Platform element is illustrated as step 1956 in FIG. 19B.

Some disclosed embodiments further involve enabling a third user of the at least one entity having a permission level being equal to or above the permission level of the first user, to deactivate the new workflow. In other words, a user with sufficient authorization, such as a supervisor or administrator, may deactivate the workflow if they have an equal or higher permission status compared to the original user who activated it. This delegation of deactivation authority ensures that the workflow may be managed and controlled by authorized individuals with the necessary oversight and permissions. For example, user 112-23 who is affiliated with entity 112-2 and possesses a permission level that matches that of user 112-21 may have the authority to deactivate the newly generated workflow initiated by user 112-21. Furthermore, in certain embodiments, a third user with sufficient permissions may be empowered to execute additional tasks in connection with the newly generated workflow. This expanded authority could encompass actions such as editing the workflow, deleting it, altering the associated resources, or performing other specified tasks, depending on the permissions and responsibilities designated for the third user.

While processes 500, 700, 1000, 1200, 1400, 1700, and 1900 depicted in FIGS. 5, 7, 10, 12, 14, 17, and 19A respectively, illustrate different aspects of managing workflow operations, in some embodiments, the steps within these processes can be combined with each other or integrated into a more comprehensive process for performing workflow management operations. This global process can be implemented using one or more components of a computing device 2100 (as discussed in FIG. 21) or a user device 2220 within the computing architecture 2200 (as discussed in FIG. 22). The disclosed embodiments may involve a graphical workflow builder that includes at least one processor configured to execute stored instructions for performing the global process. By combining the steps from various processes or designing a more extensive workflow management process, users can achieve a comprehensive approach to managing workflows. This allows for the seamless integration of different workflow management functionalities into a unified system. The graphical workflow builder, which includes the relevant computing resources and processors, may play a key role in executing the instructions that drive the global process.

Figure 21:
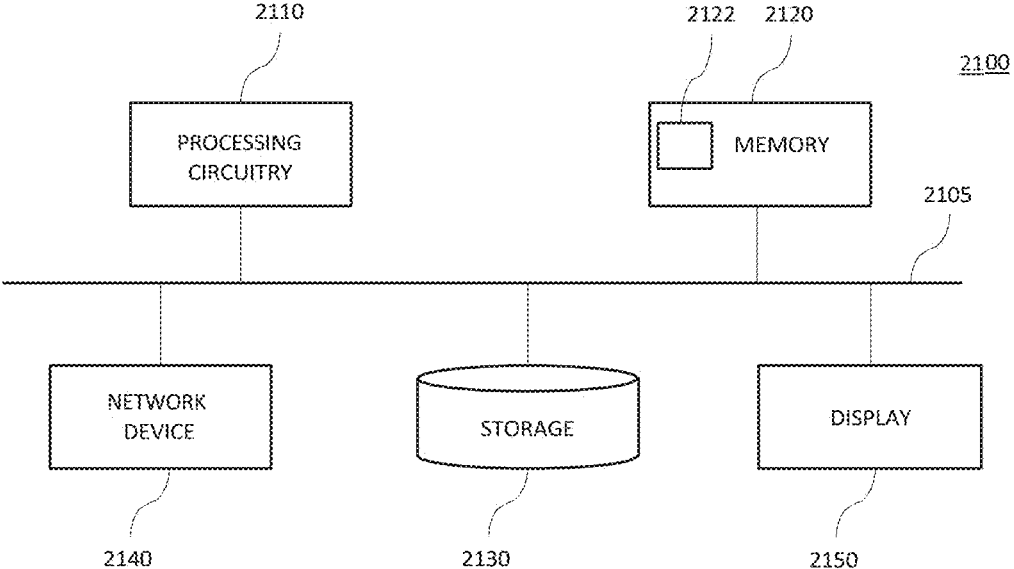
FIG. 21 is a block diagram of an exemplary computing device or system which may be employed in connection with some embodiments of the present disclosure.

FIG. 21 is a block diagram of an exemplary computing device 2100 consistent with some embodiments. In some embodiments, computing device 2100 may be similar in type and function to user device 2220, discussed with respect to FIG. 22. As shown in FIG. 12, computing device 2100 may include processing circuitry 2110, such as, for example, a central processing unit (CPU). In some embodiments, the processing circuitry 2110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 2110 may be coupled via a bus 2105 to a memory 2020.

The memory 2120 may further include a memory portion 2122 that may contain instructions that when executed by the processing circuitry 2210, may perform the methods described in more detail herein. The memory 19 20 may be further used as a working scratch pad for the processing circuitry 2110, a temporary storage, and others, as the case may be. The memory 2120 may be a volatile memory such as, but not limited to, random access memory (RAM), or non-volatile memory (NVM), such as, but not limited to, flash memory. The processing circuitry 2110 may be further connected to a network device 2140, such as a network interface card, for providing connectivity between the computing device 2100 and a network, such as a network 2210, discussed in more detail with respect to FIG. 22 below. The processing circuitry 2110 may be further coupled with a storage device 2130. The storage device 2130 may be used for the purpose of storing single data type column-oriented data structures, data elements associated with the data structures, or any other data structures. While illustrated in FIG. 21 as a single device, it is to be understood that storage device 2130 may include multiple devices either collocated or distributed.

The processing circuitry 2110 and/or the memory 2120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, computing device 19 may include one or more input and output devices (not shown in figure). Computing device may also include a display 19, such as a touchscreen display or other display types discussed herein.

Figure 22:
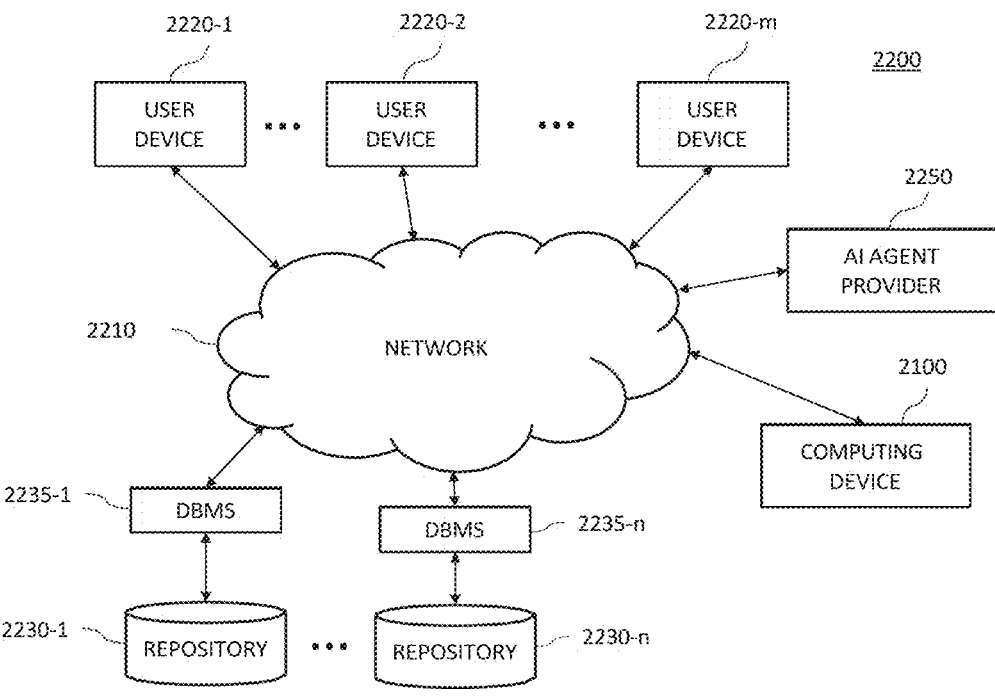
FIG. 22 is a block diagram of an exemplary computing architecture for collaborative work systems, consistent with some embodiments of the present disclosure.

FIG. 22 is a block diagram of computing architecture 2200 that may be used in connection with various disclosed embodiments. The computing device 2100, as described in connection with FIG. 21, may be coupled to network 2210. The network 2210 may enable communication between different elements that may be communicatively coupled with the computing device 1300, as further described below. The network 2210 may include the Internet, the world-wide-web (WWW), a local area network (LAN), a wide area network (WAN), a metro area network (MAN), and other networks capable of enabling communication between the elements of the computing architecture 2200. In some disclosed embodiments, the computing device 2100 may be a server deployed in a cloud computing environment.

One or more user devices 2220-1 through user device 2220-*m*, where 'm' in an integer equal to or greater than 1, referred to individually as user device 2220 and collectively as user devices 2220, may be communicatively coupled with the computing device 2100 via the network 2210. A user device 2220 may be for example, a smart phone, a mobile phone, a laptop, a tablet computer, a wearable computing device, a personal computer (PC), a smart television and the like. A user device 2220 may be configured to send to and receive from the computing device 2100 data and/or meta-data associated with a variety of elements associated with single data type column-oriented data structures, such as columns, rows, cells, schemas, and the like. Furthermore, external third-party application providers such as an AI agent provider 2250 may be communicatively coupled with the computing device 2100 via the network 2210.

One or more data repositories 2230-1 through data repository 2230-*n*, where 'n' in an integer equal to or greater than 1, referred to individually as data repository 2230 and collectively as data repository 2230, may be communicatively coupled with the computing device 2100 via the network 2210, or embedded within the computing device 2100. Each data repository 2230 may be communicatively connected to the network 2210 through one or more database management services (DBMS) 2235-1 through DBMS 2235-*n*. The data repository 2230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 2100.

The embodiments disclosed herein are exemplary and any other means for performing and facilitating display navigation operations may be consistent with this disclosure.

Some disclosed embodiments involve artificial intelligence (also referred to as machine learning models or algorithms) that may be trained using training examples. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Differing embodiments of this disclosure may involve systems, methods, and/or computer readable media containing instructions. A system refers to at least two interconnected or interrelated components or parts that work together to achieve a common objective, function, or sub-function. A method refers to at least two steps, actions, or techniques to be followed to complete a task or a sub-task, to reach an objective, or to arrive at a next step. Computer-readable media containing instructions refers to any storage mechanism that contains program code instructions, for example to be executed by a computer processor. Examples of computer-readable media are further described elsewhere in this disclosure. Instructions may be written in any type of computer programming language, such as an interpretive language (e.g., scripting languages such as HTML and JavaScript), a procedural or functional language (e.g., C or Pascal that may be compiled for converting to executable code), an object-oriented programming language (e.g., Java or Python), a logical programming language (e.g., Prolog or Answer Set Programming), and/or any other programming language. Instructions executed by at least one processor may include implementing one or more program code instructions in hardware, in software (including in one or more signal processing and/or application specific integrated circuits), in firmware, or in any combination thereof, as described earlier. Causing a processor to perform operations may involve causing the processor to calculate, execute, or otherwise implement one or more arithmetic, mathematic, logic, reasoning, or inference steps.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally include a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a touch-sensitive layer such as a touchscreen, or keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above-described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It should be appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer-readable medium containing instructions that when executed by at least one processor cause the at least one processor to provide a canvas for constructing a workflow, the workflow having at least one block with Artificial Intelligence (AI) functionality, the operations comprising:
   displaying a canvas for containing and interconnecting workflow blocks;
   placing a plurality of workflow blocks on the canvas wherein the plurality of workflow blocks includes at least one trigger block and at least one action block, wherein at least one of the at least one trigger block or the at least one action block is configurable to gain permissions to access a source of dynamic data, wherein each of the plurality of workflow blocks is preconfigured with a single functionality;
   placing an AI block at a downstream location from the plurality of workflow blocks on the canvas, wherein the AI block is preconfigured with AI functionality and enabled to access the source of dynamic data by virtue of the downstream location;
   upon placement of the AI block verifying that any block of the plurality of workflow blocks upstream of the AI block is not associated with a private database; and
   providing an output from the AI block, wherein a prompt of the AI block includes data from the source of dynamic data.

2. The non-transitory computer-readable medium of claim 1, wherein the prompt of the AI block further includes user details.

3. The non-transitory computer-readable medium of claim 2, wherein the AI block is powered by a versatile AI agent and the versatile AI agent is configured to be adaptable based on the provided user details.

4. The non-transitory computer-readable medium of claim 1, wherein the operations further include upon placement of the AI block on the canvas displaying in association with the canvas a graphic user interface configured to receive a selection of permissions for the AI block.

5. The non-transitory computer-readable medium of claim 1, wherein at least a portion of the plurality of workflow blocks are preconstructed workflow template blocks.

6. The non-transitory computer-readable medium of claim 5, wherein the preconstructed workflow template blocks are selectable from a template library.

7. The non-transitory computer-readable medium of claim 6, wherein the operations further comprise:
   displaying in association with the canvas the template library; and
   wherein the AI block is selectable from the template library and has a graphical representation distinct from a graphical representation of the plurality of workflow block.

8. The non-transitory computer-readable medium of claim 1, wherein the AI block is enabled to use data processed by at least one of the workflow blocks preceding the AI block in a same branch as the AI block.

9. The non-transitory computer-readable medium of claim 1, wherein the prompt of the AI block includes data from the source of dynamic data and at least some of the data processed by the at least one of the workflow blocks preceding the AI block in the same branch as the AI block.

10. The non-transitory computer-readable medium of claim 1, wherein the AI block is enabled to modify data in the source of dynamic data.

11. The non-transitory computer-readable medium of claim 1, wherein the AI block is powered by an AI agent and the AI agent is selectable from a plurality of available AI agents.

12. The non-transitory computer-readable medium of claim 11, wherein the selection of the AI agent from a plurality of available AI agents is performed via the AI block.

13. The non-transitory computer-readable medium of claim 11, wherein the plurality of available AI agents includes a preselection of pertinent AI agents determined on an analysis of the context of the AI block.

14. The non-transitory computer-readable medium of claim 1, wherein the operations further include enabling placement of one or more additional workflow blocks at a position downstream of the AI block in a same branch as the AI block, each one of the one or more additional blocks being enabled to access the source of dynamic data and being enabled to access the output of the AI block by virtue of the downstream position.

15. The non-transitory computer-readable medium of claim 1, wherein the operations further include:

enabling placement of an additional AI block at a site downstream of the AI block in a same branch as the AI block, wherein the additional AI block is enabled to access the source of dynamic data and is enabled to access the output of the AI block by virtue of the downstream site; and providing an additional output from the additional AI block, a prompt of the additional AI block including at least one of data from the source of dynamic data, the output of the AI block, or a combination thereof.

16. The non-transitory computer-readable medium of claim 15, wherein providing the additional output from the additional AI block includes providing the additional output from the additional AI block to the AI block as an input in order to modify the prompt of the AI block.

17. The non-transitory computer-readable medium of claim 15, wherein the additional AI block is enabled to use data processed by at least one workflow block preceding the additional AI block in a same branch as the additional AI block.

18. The non-transitory computer-readable medium of claim 15, wherein the prompt of the additional AI block includes at least one of data from the source of dynamic data, the output of the AI block, or a combination thereof, and at least some of the data processed by the at least one preceding workflow blocks in the same branch as the additional AI block.

19. The non-transitory computer-readable medium of claim 1, wherein the operations further include enabling generation of the plurality of workflow blocks.

20. The non-transitory computer-readable medium of claim 1, wherein the AI block is powered by a versatile AI agent and the preconfigured AI functionality of the AI block is adapted based on the data from the source of dynamic data included in the prompt.

21. The non-transitory computer-readable medium of claim 1, wherein placing a plurality of workflow blocks on the canvas includes, querying, for each of the plurality of workflow blocks, a plurality of required inputs, via a GUI displayed in association the canvas, to initiate the single functionality.

22. The non-transitory computer-readable medium of claim 1, wherein a visual design of each of the plurality of workflow blocks is configured to offer visual cues corresponding to the single functionality.

23. A method for providing a canvas for constructing a workflow, the workflow having at least one block with Artificial Intelligence (AI) functionality, the method comprising:

displaying a canvas for containing and interconnecting workflow blocks;

placing a plurality of workflow blocks on the canvas wherein the plurality of workflow blocks includes at least one trigger block and at least one action block, wherein at least one of the at least one trigger block or the at least one action block is configurable to gain permissions to access a source of dynamic data, wherein each of the plurality of workflow blocks is preconfigured with a single functionality;

placing an AI block at a downstream location from the plurality of workflow blocks on the canvas, wherein the AI block is preconfigured with AI functionality and enabled to access the source of dynamic data by virtue of the downstream location;

upon placement of the AI block verifying that any block of the plurality of workflow blocks upstream of the AI block is not associated with a private database; and providing an output from the AI block, wherein a prompt of the AI block includes data from the source of dynamic data.

24. A system for providing a canvas for constructing a workflow, the workflow including at least one block with Artificial Intelligence (AI) functionality, the system comprising:

at least one processor configured to:

display a canvas for containing and interconnecting workflow blocks;

place a plurality of workflow blocks on the canvas wherein the plurality of workflow blocks includes at least one trigger block and at least one action block, wherein at least one of the at least one trigger block or the at least one action block is configurable to gain permissions to access a source of dynamic data, wherein each of the plurality of workflow blocks is preconfigured with a single functionality;

place an AI block at a downstream location from the plurality of workflow blocks on the canvas, wherein the AI block is preconfigured with AI functionality and enabled to access the source of dynamic data by virtue of the downstream location;

upon placement of the AI block verify that any block of the plurality of workflow blocks upstream of the AI block is not associated with a private database; and provide an output from the AI block, wherein a prompt of the AI block includes data from the source of dynamic data.

25. The system of claim 24, wherein the AI block is enabled to use data processed by at least one workflow block preceding the AI block in a same branch as the AI block.

* * * * *